United States Patent
Hayata et al.

(10) Patent No.: US 12,333,668 B2
(45) Date of Patent: Jun. 17, 2025

(54) CONTROL PROGRAM OF TERMINAL DEVICE, TERMINAL DEVICE, METHOD OF CONTROLLING TERMINAL DEVICE, CONTROL PROGRAM OF SERVER DEVICE, SERVER DEVICE, AND METHOD OF CONTROLLING SERVER DEVICE

(71) Applicant: GREE, Inc., Tokyo (JP)

(72) Inventors: Daiki Hayata, Tokyo (JP); Motoki Uchida, Tokyo (JP); Keigo Masuzumi, Tokyo (JP)

(73) Assignee: GREE, INC., Tokyo (JP)

( * ) Notice: Subject to any disclaimer, the term of this patent is extended or adjusted under 35 U.S.C. 154(b) by 294 days.

(21) Appl. No.: 18/090,492

(22) Filed: Dec. 29, 2022

(65) Prior Publication Data
US 2023/0298294 A1 Sep. 21, 2023

(30) Foreign Application Priority Data

Mar. 17, 2022 (JP) ................................ 2022-042722
Mar. 31, 2022 (JP) ................................ 2022-060878

(51) Int. Cl.
*G06T 19/20* (2011.01)
*G06F 3/14* (2006.01)
(Continued)

(52) U.S. Cl.
CPC ................ *G06T 19/20* (2013.01); *G06F 3/14* (2013.01); *G06F 3/16* (2013.01); *G06T 7/20* (2013.01);
(Continued)

(58) Field of Classification Search
CPC ..... G06T 19/20; G06T 7/20; G06T 2219/024; G06T 2219/2016; G06T 2219/2024; G06F 3/14; G06F 3/16
See application file for complete search history.

(56) References Cited

U.S. PATENT DOCUMENTS 7,386,799 B1 * 6/2008 Clanton .................. A63F 13/12
715/861
11,481,988 B2 * 10/2022 Van Os ................... G06T 15/04
(Continued)

FOREIGN PATENT DOCUMENTS

JP       2009-199198 A    9/2009
JP       2013-85573 A     5/2013
(Continued)

OTHER PUBLICATIONS

Japanese Office Action issued May 16, 2023, in corresponding Japanese Patent Application No. 2022-060878, 4pp.
(Continued)

*Primary Examiner* — Xin Sheng
(74) *Attorney, Agent, or Firm* — XSENSUS LLP

(57) ABSTRACT

A control method includes displaying, at a terminal device of a first user, a first image and a second image, the first image including a first object representing the first user, and the second image including a second object representing a second user different from the first user; displaying the first image including the first object as being changed in accordance with audio data or a motion of the first user; displaying the second image including the second object as being changed in accordance with audio data or a motion of the second user; and displaying the first image including the first object as being at least partly changed in accordance with an instruction from the first user or displaying the second image including the second object as being at least partly changed in accordance with an instruction from the second user.

20 Claims, 36 Drawing Sheets

(51) Int. Cl.
*G06F 3/16* (2006.01)
*G06T 7/20* (2017.01)
(52) U.S. Cl.
CPC .................. *G06T 2219/024* (2013.01); *G06T 2219/2016* (2013.01); *G06T 2219/2024* (2013.01)

(56) References Cited

U.S. PATENT DOCUMENTS

2018/0318705 A1* 11/2018 Moberg .............. G06F 3/04883
2022/0060800 A1   2/2022 Kurabuchi

FOREIGN PATENT DOCUMENTS

| JP | 2020-96269 A  |   | 6/2020  |
|----|---------------|---|---------|
| JP | 2020096269 A  | * | 6/2020  |
| JP | 2021-149407 A |   | 9/2021  |
| JP | 2021-158558 A |   | 10/2021 |

OTHER PUBLICATIONS

Japanese Office Action issued Apr. 25, 2023 in corresponding Japanese Patent Application No. 2022-042722 (with machine-generated English translation), 8 pages.

* cited by examiner

| USER ID | NAME | CHARACTER OBJECT | OWNED OBJECT | USE OBJECT | ... |
|---|---|---|---|---|---|
| U-00000001 | USER A | C-00000001 | Obj-0004, Obj-0028, ... | Obj-0123, Obj-0338, ... | ... |
| U-00000002 | USER B | C-00000002 | Obj-0021, Obj-0055, ... | Obj-0152, Obj-0311, ... | ... |
| ... | ... | ... | ... | ... | ... |

| OBJECT ID | NAME | IMAGE INFORMATION | RARITY | PLACEMENT POSITION | ... |
|---|---|---|---|---|---|
| Obj-0001 | Mr. KUMA | 0001.pmg | SR | SPACE | ... |
| Obj-0002 | NEKOMIMI | 0002.pmg | R | HEAD | ... |
| ... | ... | ... | ... | ... | ... |

| GROUP ID | NAME | USER MEMBER | ... |
|---|---|---|---|
| G-0013 | GROUP Ga | U-00000001, U-00000012, U-00000025, ... | ... |
| G-0052 | GROUP Gb | U-00000001, U-00000004, U-00000047, ... | ... |
| ... | ... | ... | ... |

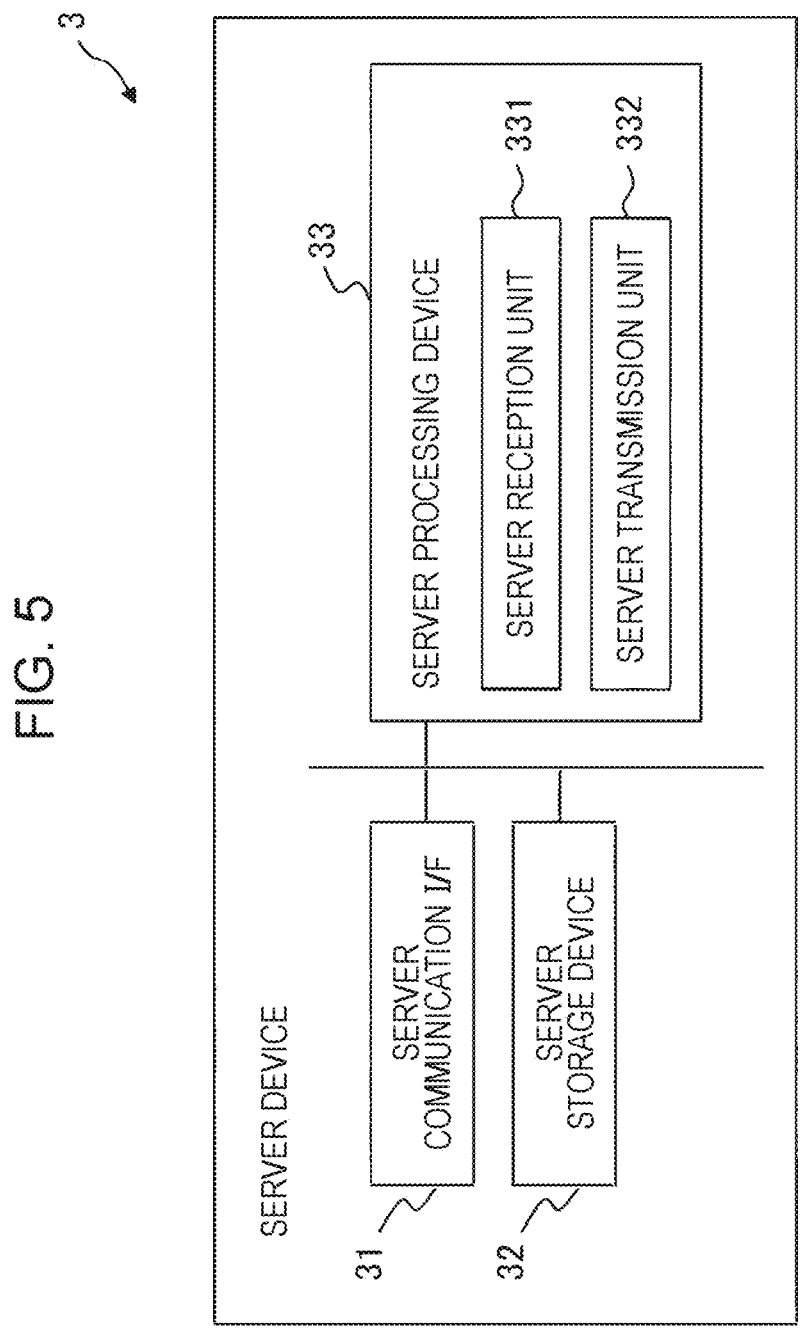

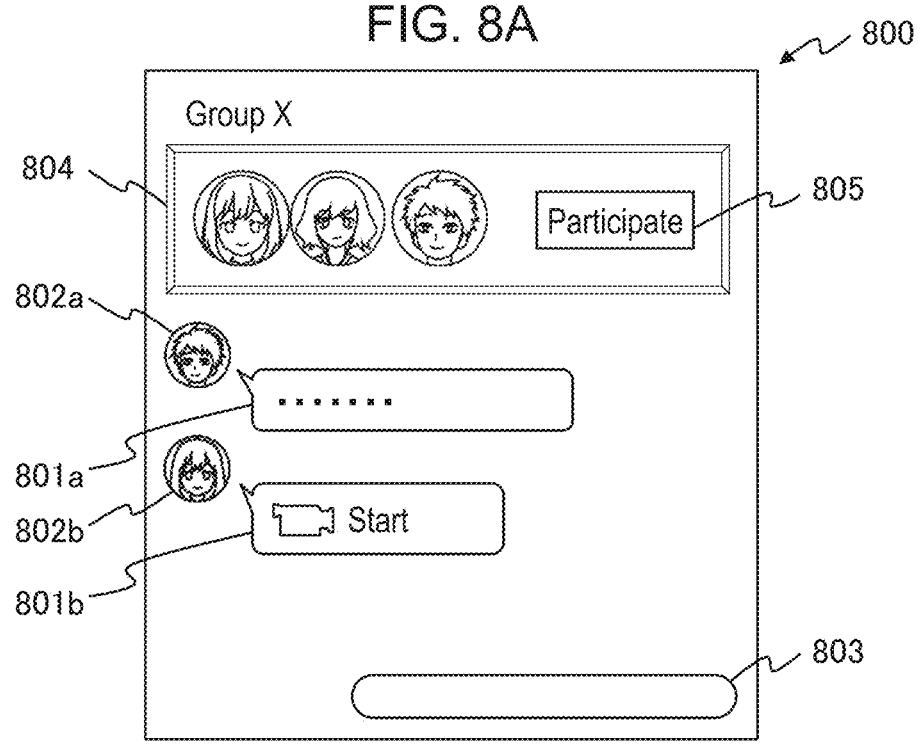
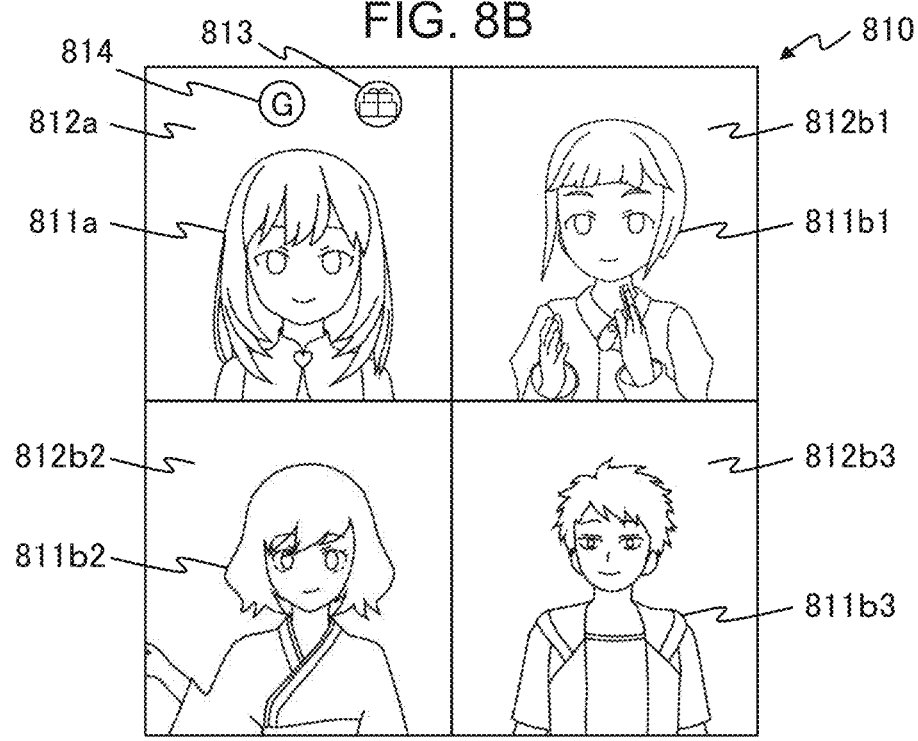

| USER ID | NAME | CHARACTER OBJECT | OWNED OBJECT | USE OBJECT | ... |
|---|---|---|---|---|---|
| U-00000001 | USER A | C-00000001 | Obj-0004, Obj-0028, ... | Obj-0123, Obj-0338, ... | ... |
| U-00000002 | USER B | C-00000002 | Obj-0021, Obj-0055, ... | Obj-0152, Obj-0311, ... | ... |
| ... | ... | ... | ... | ... | ... |

| OBJECT ID | NAME | IMAGE INFORMATION | RARITY | PLACEMENT POSITION | ... |
|---|---|---|---|---|---|
| Obj-0001 | Mr. KUMA | 0001.pmg | SR | SPACE | ... |
| Obj-0002 | NEKOMIMI | 0002.pmg | R | HEAD | ... |
| ... | ... | ... | ... | ... | ... |

| GROUP ID | NAME | USER MEMBER | ... |
|---|---|---|---|
| G-0013 | GROUP Ga | U-00000001, U-00000012, U-00000025, ... | ... |
| G-0052 | GROUP Gb | U-00000001, U-00000004, U-00000047, ... | ... |
| ... | ... | ... | ... |

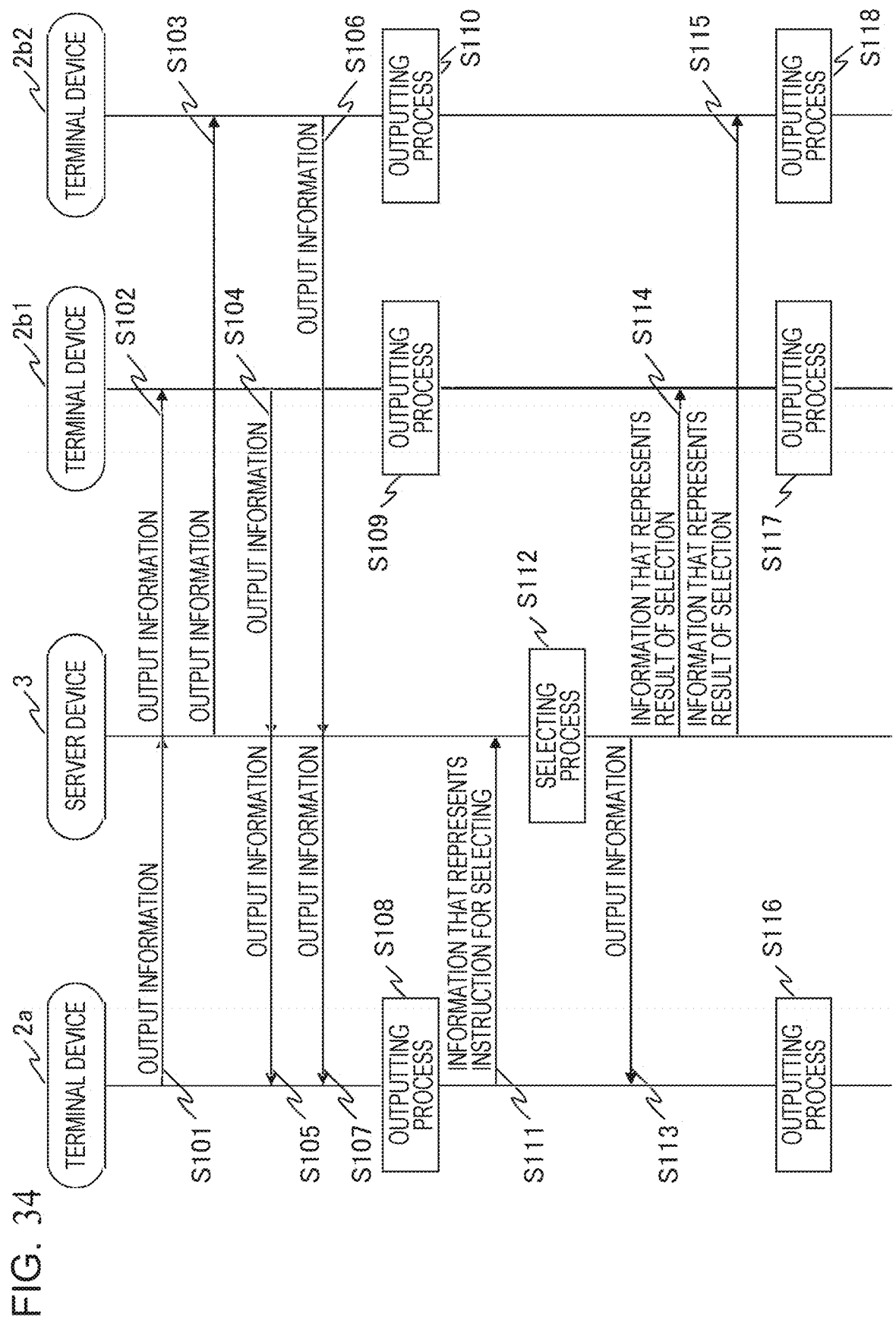

CONTROL PROGRAM OF TERMINAL DEVICE, TERMINAL DEVICE, METHOD OF CONTROLLING TERMINAL DEVICE, CONTROL PROGRAM OF SERVER DEVICE, SERVER DEVICE, AND METHOD OF CONTROLLING SERVER DEVICE

CROSS-REFERENCE TO RELATED APPLICATIONS

The present application claims priority to Japanese Patent Application No. 2022-060878, filed Mar. 31, 2022, and Japanese Patent Application No. 2022-042722, field Mar. 17, 2022, and the contents of each are incorporated by reference in their entirety.

TECHNICAL FIELD

An embodiment disclosed in the present specification relates to a control program of a terminal device, a terminal device, a method of controlling a terminal device, a control program of a server device, a server device, and a method of controlling a server device.

BACKGROUND

A conventional information system may enable communication to be established in a manner in which multiple users transmit various kinds of information such as the images of the users themselves and/or the voices of the users by using terminal devices such as personal computers (PC) to the terminal devices of other users. For example, a conventional information system enables each user to use a character object such as an avatar that acts in a virtual space instead of the user and to participate in a voice chat with a character object of another user.

SUMMARY

In an exemplary implementation of the present disclosure, a control method includes displaying, at a terminal device of a first user, a first image and a second image, the first image including a first object representing the first user, and the second image including a second object representing a second user different from the first user; transmitting, via a network, information about display of the first image to a terminal device of the second user; transmitting, via the network, first audio data of the first user for acquisition by the terminal device of the second user in a case that the terminal of the first user obtains the first audio data; displaying the first image including the first object as being changed in accordance with the first audio data or a motion of the first user; outputting second audio data of the second user, received via the network, in a case that the terminal device of the first user obtains the second audio data; displaying the second image including the second object as being changed in accordance with the second audio data or a motion of the second user; and displaying the first image including the first object as being at least partly changed in accordance with an instruction from the first user or displaying the second image including the second object as being at least partly changed in accordance with an instruction from the second user.

BRIEF DESCRIPTION OF THE DRAWINGS

FIG. 4A to FIG. 4C illustrate examples of data structures of various tables according to the First Example of the present disclosure.

FIG. 5 schematically illustrates a structure of a server device according to the First Example of the present disclosure.

FIG. 8A and FIG. 8B illustrate examples of the screen that is displayed on the display device of the terminal device according to the First Example of the present disclosure.

FIG. 22A to FIG. 22C illustrate examples of data structures of various tables according to the Second Example of the present disclosure.

FIG. 34 illustrates an example of the operation sequence of the information system according to the Second Example of the present disclosure.

DETAILED DESCRIPTION

Figure 1A:
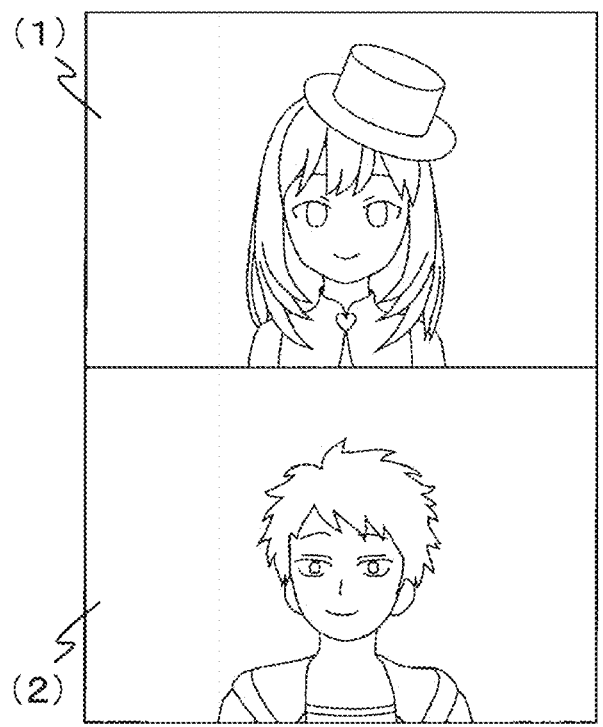
FIG. 1A to FIG. 1C are schematic diagrams for describing an outline of an information system according to a First Example of the present disclosure.

Various embodiments of the present disclosure will hereinafter be described with reference to the drawings. However, the technical scope of the present disclosure is not limited to the embodiments and includes what is recited in claims and the equivalents thereof.

The inventors of the present disclosure have recognized a problem with existing information systems, in that output from the terminal device of the user does not exhibit diversity when the user communicates with the other user, and consequently, the user may get bored with the communication with the other user.

In accordance with a first example of the present disclosure a control program of a terminal device is a control program of a terminal device of a first user for performing processing including: displaying at least a first image including a first object that represents the first user and a second image including a second object that represents a second user different from the first user on the terminal device of the first user; transmitting information about display of the first image to a terminal device of the second user; transmitting a first voice to the terminal device of the second user in a case where the first voice of the first user is acquired; displaying the first image including the first object that changes depending on the first voice or a motion of the first user; outputting a second voice in a case where the second voice of the second user is received; displaying the second image including the second object that changes depending on the second voice or a motion of the second user; and displaying the first image that is at least partly changed or the second image that is at least partly changed depending on an instruction from the first user or an instruction from the second user.

As for the control program of the terminal device, and as for display of the first image that is at least partly changed, the terminal device of the first user is preferably caused to: display the first image including the first object that is partly changed based on a first candidate object that is selected from one or multiple first candidate objects that are associated with the first user depending on the instruction from the first user.

As for the control program of the terminal device, the first object is preferably a three-dimensional object that is placed in a virtual space, and as for display of the first image including the first object, the terminal device of the first user is preferably caused to: display, as the first image, an image that represents the virtual space viewed from a predetermined viewpoint in the virtual space; and the terminal device of the first user is preferably caused to: display, as the first image, an image that represents the virtual space viewed from the predetermined viewpoint that automatically moves in the virtual space.

As for the control program of the terminal device, movement of the predetermined viewpoint is preferably controlled such that the predetermined viewpoint approaches a changed part of the first object.

As for the control program of the terminal device, movement of the predetermined viewpoint is preferably controlled such that the predetermined viewpoint moves around the first object while a direction of a line of sight from the predetermined viewpoint is adjusted to a direction toward the first object.

As for the control program of the terminal device, and as for display of the first image that is at least partly changed, the terminal device of the first user is preferably caused to: display the first image including a third object that corresponds to a second candidate object that is selected from a selection group including one or multiple second candidate objects depending on the instruction from the second user.

As for the control program of the terminal device, in a case where a predetermined condition is satisfied, the selection group preferably includes a specific second candidate object.

As for the control program of the terminal device, the predetermined condition preferably includes a condition related to a display time of the first image and/or a display time of the second image.

As for the control program of the terminal device, the terminal device of the first user is preferably caused to: display the second image including the third object that corresponds to the selected second candidate object, based on the second candidate object that is selected from the selection group including the one or multiple second candidate objects depending on the instruction from the first user; and transmit information about display of the third object to the terminal device of the second user, and the predetermined condition preferably includes a condition related to a number of times the second candidate object is selected by the first user and/or the second user.

As for the control program of the terminal device, and as for display of the first image and the second image, the terminal device of the first user is preferably caused to: display a plurality of the second images each of which represents a corresponding one of a plurality of the second users, and the terminal device of the first user is preferably caused to: display the plurality of the second images each of which represents the corresponding one of the plurality of the second users and the first image including the third object that corresponds to the selected second candidate object, based on the second candidate object that is selected depending on the instruction from the second user.

As for the control program of the terminal device, the first user is preferably able to input an instruction for selecting the third object, and the terminal device of the first user is preferably caused to: display the first image including the first object that is partly changed depending on the instruction for selecting the third object from the first user.

As for the control program of the terminal device, and as for display of the first image that is at least partly changed, the terminal device of the first user is preferably caused to: display an image that represents a progression of a game that is played by the first user and/or the second user instead of at least a part of the first image.

As for the control program of the terminal device, the terminal device of the first user is preferably caused to: display an image that represents a progression of a game that is played by the first user and/or the second user instead of at least a part of the second image in a case where the second candidate object that is selected depending on the instruction from the second user corresponds to the game.

A control program of a server device is a control program of a server device that is capable of communicating with a terminal device of a first user and a terminal device a second user different from the first user for performing processing including: receiving information about display of a first image including a first object that represents the first user from the terminal device of the first user and receiving information about display of a second image including a second object that represents the second user from the terminal device of the second user; transmitting information for displaying at least the first image to at least the terminal device of the second user and transmitting information for displaying at least the second image to at least the terminal device of the first user; transmitting a first voice to the terminal device of the second user in a case where the first voice of the first user is received; transmitting information for displaying the first image including the first object that changes depending on the first voice or a motion of the first user to at least the terminal device of the second user; transmitting a second voice to the terminal device of the first user in a case where the second voice of the second user is received; transmitting information for displaying the second image including the second object that changes depending on the second voice or a motion of the second user to at least the terminal device of the first user; transmitting information for displaying the first image that is at least partly changed to at least the terminal device of the second user depending on an instruction from the first user; and transmitting information for displaying the second image that is at least partly changed to at least the terminal device of the first user depending on an instruction from the second user.

A terminal device is a terminal device of a first user including a processing unit configured to: display at least a first image including a first object that represents the first user and a second image including a second object that represents a second user different from the first user; transmit information about display of the first image to a terminal device of the second user; transmit a first voice to the terminal device of the second user in a case where the first voice of the first user is acquired; display the first image including the first object that changes depending on the first voice or a motion of the first user; output a second voice in a case where the second voice of the second user is received; display the second image including the second object that changes depending on the second voice or a motion of the second user; and display the first image that is at least partly changed or the second image that is at least partly changed depending on an instruction from the first user or an instruction from the second user.

A server device is a server device that is capable of communicating with a terminal device of a first user and a terminal device a second user different from the first user including a processing unit configured to: receive information about display of a first image including a first object that represents the first user from the terminal device of the first user and receive information about display of a second image including a second object that represents the second user from the terminal device of the second user; transmit information for displaying at least the first image to at least the terminal device of the second user and transmit information for displaying at least the second image to at least the terminal device of the first user; transmit a first voice to the terminal device of the second user in a case where the first voice of the first user is received; transmit information for displaying the first image including the first object that changes depending on the first voice or a motion of the first user to at least the terminal device of the second user; transmit a second voice to the terminal device of the first user in a case where the second voice of the second user is received; transmit information for displaying the second image including the second object that changes depending on the second voice or a motion of the second user to at least the terminal device of the first user; transmit information for displaying the first image that is at least partly changed to at least the terminal device of the second user depending on an instruction from the first user; and transmit information for displaying the second image that is at least partly changed to at least the terminal device of the first user depending on an instruction from the second user.

A method of controlling a terminal device is a method of controlling a terminal device of a first user including: displaying at least a first image including a first object that represents the first user and a second image including a second object that represents a second user different from the first user on the terminal device of the first user; transmitting information about display of the first image to a terminal device of the second user; transmitting a first voice to the terminal device of the second user in a case where the first voice of the first user is acquired; displaying the first image including the first object that changes depending on the first voice or a motion of the first user; outputting a second voice in a case where the second voice of the second user is received; displaying the second image including the second object that changes depending on the second voice or a motion of the second user; and displaying the first image that is at least partly changed or the second image that is at least partly changed depending on an instruction from the first user or an instruction from the second user.

A method of controlling a server device is a method of controlling a server device that is capable of communicating with a terminal device of a first user and a terminal device a second user different from the first user including: receiving information about display of a first image including a first object that represents the first user from the terminal device of the first user and receiving information about display of a second image including a second object that represents the second user from the terminal device of the second user; transmitting information for displaying at least the first image to at least the terminal device of the second user and transmitting information for displaying at least the second image to at least the terminal device of the first user; transmitting a first voice to the terminal device of the second user in a case where the first voice of the first user is received; transmitting information for displaying the first image including the first object that changes depending on the first voice or a motion of the first user to at least the terminal device of the second user; transmitting a second voice to the terminal device of the first user in a case where the second voice of the second user is received; transmitting information for displaying the second image including the second object that changes depending on the second voice or a motion of the second user to at least the terminal device of the first user; transmitting information for displaying the first image that is at least partly changed to at least the terminal device of the second user depending on an instruction from the first user; and transmitting information for displaying the second image that is at least partly changed to at least the terminal device of the first user depending on an instruction from the second user.

In accordance with a second example of the present disclosure, a control program of a terminal device is a control program of a terminal device of a first user for performing processing including: displaying at least a first image including a first object that represents the first user and a second image including a second object that represents a second user different from the first user on the terminal device of the first user; transmitting information about display of the first image to a terminal device of the second user; transmitting a first voice to the terminal device of the second user in a case where the first voice of the first user is acquired; displaying the first image including the first object that changes depending on the first voice or a motion of the first user; outputting a second voice in a case where the second voice of the second user is received; displaying the second image including the second object that changes depending on the second voice or a motion of the second user; and displaying the first image including the first object that is at least partly changed based on at least one third object that is selected from multiple third objects depending on an instruction from the first user.

As for the control program of the terminal device, in a case where two or more third objects of the multiple third objects are selected depending on the instruction from the first user, the terminal device of the first user is preferably caused to: display multiple first selection objects for the first user to select the at least one third object that is used to change the first object from the two or more third objects, and a second selection object for collectively selecting all of the two or more third objects that are used to change the first object.

As for the control program of the terminal device, the terminal device of the first user is preferably caused to: receive information about at least one fourth object that is selected from multiple fourth objects depending on an instruction from the second user; display the second image including the second object that is at least partly changed based on the information about the at least one fourth object in a case where the second user instructs the selected at least one fourth object to be used; and display the first image including the first object that is at least partly changed based on the information about the at least one fourth object depending on an instruction from the first user.

As for the control program of the terminal device, the terminal device of the first user is preferably caused to: receive information about at least one fourth object that is selected from multiple fourth objects depending on an instruction from the second user; display the second image including the second object that is at least partly changed based on the information about the at least one fourth object in a case where the second user instructs the selected at least one fourth object to be used; and select the at least one fourth object from the multiple fourth objects depending on an instruction from the first user and display the first image including the first object that is at least partly changed based on the selected at least one fourth object.

As for the control program of the terminal device, the terminal device of the first user is preferably caused to: receive information about at least one fourth object that is selected from multiple fourth objects depending on an instruction from the second user and display the second image including the second object that is at least partly changed based on the information about the at least one fourth object depending on the instruction from the second user; and select the at least one fourth object from the multiple fourth objects depending on an instruction from the first user on the second object that is included in the displayed second image and display the first image including the first object that is at least partly changed based on the selected at least one fourth object.

As for the control program of the terminal device, the terminal device of the first user is preferably caused to: restore the first object that is at least partly changed based on the at least one fourth object to the first object before change in a case where a predetermined first condition is satisfied and display the first image including the restored first object before change, and the first user is preferably able to select the at least one fourth object from the multiple fourth objects in a period after the first object is changed based on the at least one fourth object until the first object is restored to the first object before change.

As for the control program of the terminal device, the predetermined first condition preferably includes that a specific instruction is acquired from the first user, that transmission of the information about display of the first image and the first voice ends, and reception of the second voice ends, that transmission of information about display of the second image and the second voice ends, and reception of the first voice ends, that a predetermined time has passed after the first object is at least partly changed based on the at least one fourth object, or the first user instructs the at least one third object to be selected from the multiple third objects depending on the instruction when the first object is at least partly changed based on the at least one fourth object, and that the second user instructs the at least one third object to be selected from the multiple third objects depending on the instruction when the first object is at least partly changed based on the at least one fourth object.

As for the control program of the terminal device, in a case where a predetermined second condition is satisfied, the first image including the first object that is at least partly changed based on the at least one fourth object is preferably displayed.

As for the control program of the terminal device, the predetermined second condition preferably includes that a number of times the first image including the first object that is at least partly changed based on the at least one fourth object is displayed is equal to or less than a predetermined number.

As for the control program of the terminal device, the terminal device of the first user is preferably caused to: provide a first benefit to the second user in a case where the at least one fourth object is selected from the multiple fourth objects depending on an operation of the first user on a first instruction object.

As for the control program of the terminal device, the terminal device of the first user is preferably caused to: provide a second benefit to the first user in a case where the at least one fourth object is selected from the multiple fourth objects depending on an operation of the first user on a first instruction object.

As for the control program of the terminal device, the terminal device of the first user is preferably caused to: provide a third benefit to the first user in a case where the first user does not operate a first instruction object, and the at least one fourth object is not selected from the multiple fourth objects.

As for the control program of the terminal device, the terminal device of the first user is preferably caused to: display a second instruction object for selecting at least one fifth object from multiple fifth objects and information about selection in a case where a predetermined second condition is satisfied; select the at least one fifth object from the multiple fifth objects depending on an operation of the first user on the second instruction object; and display the first image including the first object that is at least partly changed based on the selected at least one fifth object.

As for the control program of the terminal device, the predetermined second condition is preferably that a predetermined time has passed after the first object is changed based on the at least one third object.

As for the control program of the terminal device, the multiple fifth objects preferably include an object that is used for the second object that represents the second user and that is displayed.

A control program of a server device is a control program of a server device that is capable of communicating with a terminal device of a first user and a terminal device a second user different from the first user for performing processing including: receiving information about display of a first image including a first object that represents the first user from the terminal device of the first user and receiving information about display of a second image including a second object that represents the second user from the terminal device of the second user; transmitting information for displaying at least the first image to at least the terminal device of the second user and transmitting information for displaying at least the second image to at least the terminal device of the first user; transmitting a first voice to the terminal device of the second user in a case where the first voice of the first user is received; transmitting information for displaying the first image including the first object that changes depending on the first voice or a motion of the first user to at least the terminal device of the second user; transmitting a second voice to the terminal device of the first user in a case where the second voice of the second user is received; transmitting information for displaying the second image including the second object that changes depending on the second voice or a motion of the second user to at least the terminal device of the first user; selecting at least one third object from multiple third objects depending on an instruction from the first user; and transmitting information for displaying the first image including the first object that is at least partly changed based on the selected at least one third object to at least the terminal device of the second user.

A terminal device is a terminal device of a first user including a processing unit configured to: display at least a first image including a first object that represents the first user and a second image including a second object that represents a second user different from the first user; transmit information about display of the first image to a terminal device of the second user; transmit a first voice to the terminal device of the second user in a case where the first voice of the first user is acquired; display the first image including the first object that changes depending on the first voice or a motion of the first user; output a second voice in a case where the second voice of the second user is received; display the second image including the second object that changes depending on the second voice or a motion of the second user; and display the first image including the first object that is at least partly changed based on at least one third object that is selected from multiple third objects depending on an instruction from the first user.

A server device is a server device that is capable of communicating with a terminal device of a first user and a terminal device a second user different from the first user including a processing unit configured to: receive information about display of a first image including a first object that represents the first user from the terminal device of the first user and receive information about display of a second image including a second object that represents the second user from the terminal device of the second user; transmit information for displaying at least the first image to at least the terminal device of the second user and transmit information for displaying at least the second image to at least the terminal device of the first user; transmit a first voice to the terminal device of the second user in a case where the first voice of the first user is received; transmit information for displaying the first image including the first object that changes depending on the first voice or a motion of the first user to at least the terminal device of the second user; transmit a second voice to the terminal device of the first user in a case where the second voice of the second user is received; transmit information for displaying the second image including the second object that changes depending on the second voice or a motion of the second user to at least the terminal device of the first user; select at least one third object from multiple third objects depending on an instruction from the first user; and transmit information for displaying the first image including the first object that is at least partly changed based on the selected at least one third object to at least the terminal device of the second user.

A method of controlling a terminal device is a method of controlling a terminal device of a first user including: displaying at least a first image including a first object that represents the first user and a second image including a second object that represents a second user different from the first user on the terminal device of the first user; transmitting information about display of the first image to a terminal device of the second user; transmitting a first voice to the terminal device of the second user in a case where the first voice of the first user is acquired; displaying the first image including the first object that changes depending on the first voice or a motion of the first user; outputting a second voice in a case where the second voice of the second user is received; displaying the second image including the second object that changes depending on the second voice or a motion of the second user; and displaying the first image including the first object that is at least partly changed based on at least one third object that is selected from multiple third objects depending on an instruction from the first user.

A method of controlling a server device is a method of controlling a server device that is capable of communicating with a terminal device of a first user and a terminal device a second user different from the first user including: receiving information about display of a first image including a first object that represents the first user from the terminal device of the first user and receiving information about display of a second image including a second object that represents the second user from the terminal device of the second user; transmitting information for displaying at least the first image to at least the terminal device of the second user and transmitting information for displaying at least the second image to at least the terminal device of the first user; transmitting a first voice to the terminal device of the second user in a case where the first voice of the first user is received; transmitting information for displaying the first image including the first object that changes depending on the first voice or a motion of the first user to at least the terminal device of the second user; transmitting a second voice to the terminal device of the first user in a case where the second voice of the second user is received; transmitting information for displaying the second image including the second object that changes depending on the second voice or a motion of the second user to at least the terminal device of the first user; selecting at least one third object from multiple third objects depending on an instruction from the first user; and transmitting information for displaying the first image including the first object that is at least partly changed based on the selected at least one third object to at least the terminal device of the second user.

First Example

Outline of Information System

Figure 1B:
Figure 1C:
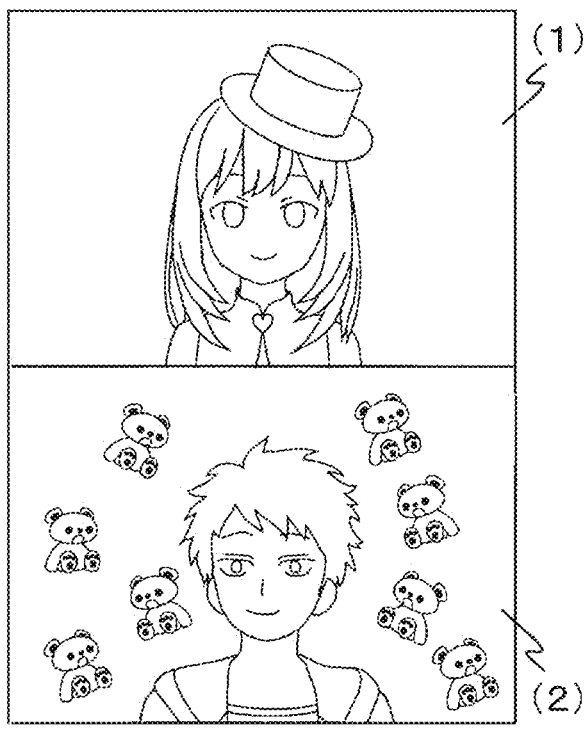

FIG. 1A to FIG. 1C are schematic diagrams for describing an example of the outline of an information system. The information system includes terminal devices that are operated by multiple users and a server device. For example, the terminal devices are information processing apparatuses such as multifunction cellular phones (so-called "smart phones") of the users. An example of the server device is a computer for providing a communication service between the terminal devices via a communication network.

Each terminal device stores a control program such as an application program, loads the control program into a memory depending on a start operation from the user, and starts the communication service by executing instructions that are included in the loaded control program. After the communication service starts, the terminal device executes instructions that are included in the control program and consequently fulfil multiple functions.

For example, the terminal device of the user fulfils a generation function of generating output information including character video data including motion data based on various kinds of input data inputted from the user. Examples of the input data include multiple pieces of imaging data acquired by an imaging device that is included in the terminal device of the user at predetermined sampling time intervals. In this case, the imaging data contains an image of the user. The character video data is an example of information about display of a user output image including a character object that represents the user. During the communication service, the output information is generated every predetermined time.

For example, the terminal device of the user fulfils an output function of transmitting the output information to the server device every predetermined time to display the user output image, based on the character video data and to transmit the generated output information to the terminal device of another user via the server device. For example, the terminal device of the user fulfills a function of displaying an other-user output image including a character object of the other user, based on output information about the other user that is transmitted from the server device every predetermined time.

After the communication service starts, as illustrated in FIG. 1A, the terminal device of the user displays, for example, (1) the user output image and (2) the other-user output image. When the communication service starts, the terminal device of the user displays only (1) the user output image in the case where the other user does not participate in the communication service. When the communication service starts, the terminal device of the other user displays only (2) the other-user output image in the case where the user does not participate in the communication service.

(1) The user output image includes the character object of the user that moves depending on the motion data of the user that is included in the character video data. (2) The other-user output image includes the character object of the other user that moves depending on the motion data of the other user that is included in the received output information about the other user. The terminal device of the user thus displays (1) the user output image including the character object of the user that changes depending on the motion of the user and displays (2) the other-user output image including the character object of the other user that changes depending on the motion of the other user.

The terminal device of the user and the terminal device of the other user includes respective microphones. Accordingly, the terminal device of the user acquires a voice that sounds from the user, and the terminal device of the other user acquires a voice that sounds from the other user. The terminal device of the user adds the data of the acquired voice of the user into the output information and transmits the output information to the server device to transmit the output information including the voice data of the user to the terminal device of the other user via the server device. The terminal device of the user receives, from the server device, the output information including the voice data of the other user that is transmitted by the terminal device of the other user to the server device.

For example, when the voice sounds from the user, the motion data of the user that is included in the character video data includes face motion data that represents the motion of the lips of the user. In this case, the terminal device of the user displays (1) the user output image including the character object of the user that moves the lips substantially in synchronization with the voice that sounds from the user. In some cases, the output information about the other user that is received by the terminal device of the user includes the voice data of the other user together with the motion data of the other user. In this case, the terminal device of the user outputs the voice of the other user and displays (2) the other-user output image including the character object of the other user that moves the lips substantially in synchronization with the voice of the other user.

In addition to the functions described above, the terminal device of the user fulfills a function of at least partly changing (1) the user output image depending on an instruction from the user and displaying (1) the user output image that is changed. The terminal device of the user may fulfill a function of at least partly changing (2) the other-user output image depending on an instruction from the user and displaying (2) the other-user output image that is changed.

For example, the terminal device of the user at least partly changes the character object of the user depending on an instruction for changing from the user and consequently at least partly changes (1) the user output image. As illustrated in FIG. 1B, for example, the terminal device of the user changes a part (an item "hat" that is worn on a head) of the character object of the user depending on the instruction for changing from the user (the item "hat" is changed into an item "ribbon"). For example, the instruction for changing from the user is inputted depending on a selection operation of the user to select a predetermined operation object (such as a button object). The instruction for changing from the user may be inputted depending on a selection operation of the user to select a candidate object among multiple candidate objects that correspond to respective different items. In this case, an item of the character object of the user that is included in (1) the user output image is changed into an item that corresponds to one of the candidate objects that is selected by the user. (1) The user output image including the character object of the user into which the item that corresponds to one of the candidate objects that is selected by the user is added may be displayed.

For example, the terminal device of the user adds an additional object into (2) the other-user output image depending on an instruction for adding from the user and at least partly changes (2) the other-user output image. For example, as illustrated in FIG. 1C, the terminal device of the user adds additional objects into (2) the other-user output image depending on the instruction for adding from the user such that the additional objects are disposed around the character object of the other user or overlaps at least a part of a character of the other user. The instruction for adding from the user is inputted, for example, depending on a selection operation of the user to select a predetermined operation object (such as a button object). The instruction for adding from the user may be inputted depending on a selection operation of the user to select a candidate object among multiple candidate objects that correspond to respective different additional objects. In this case, (2) the other-user output image that includes the additional object that corresponds to one of the candidate objects that is selected by the user is displayed.

The terminal device of the user may at least partly change (1) the user output image depending on an instruction from the other user and may fulfill a function of displaying (1) the user output image that is changed. As for the function, for example, the terminal device of the user adds the additional object into (1) the user output image depending on an instruction for adding from the other user such that the additional object is disposed around the character object of the user or overlaps at least a part of a character of the user. The terminal device of the user may at least partly change (2) the other-user output image depending on an instruction from the other user and may fulfill a function of displaying (2) the other-user output image that is changed. As for the function, for example, the terminal device of the user changes a part of the character object of the other user depending on an instruction for changing from the other user and displays (2) the other-user output image that includes the changed character object of the other user.

The terminal device of the user may change output from the terminal device of the user depending on an instruction from the user or an instruction from the other user. For example, the terminal device of the user may change the sound quality of the voice of the user or the voice of the other user only in a predetermined period depending on the instruction from the user or the instruction from the other user. The terminal device of the user may operate a vibration unit of the terminal device of the user only in a predetermined period depending on the instruction from the user or the instruction from the other user.

As for the control program of each terminal device, the terminal device, a method of controlling the terminal device, the control program of the server device, the server device, and a method of controlling the server device, as described above with reference to FIG. 1A to FIG. 1C, the user output image that is at least partly changed or the other-user output image that is at least partly changed is displayed depending on an instruction from the user or an instruction from the other user. The control program of the terminal device, the terminal device, the method of controlling the terminal device, the control program of the server device, the server device, and the method of controlling the server device can thus improve the willingness of the user to continuously use the communication in a manner in which the output from the terminal device is changed by the user or another user during the communication service.

In examples illustrated in FIG. 1A to FIG. 1C, the user and the other user among the multiple users who can use the communication service belong to a predetermined communication group. For example, the predetermined communication group is created by the user or the other user. In the examples illustrated in FIG. 1A to FIG. 1C, the character objects of the two users are displayed. However, the character objects of three or more users who belong to the predetermined communication group may be displayed, and the three or more users may be able to communicate with each other.

In the examples illustrated in FIG. 1A to FIG. 1C, the user and the other user may have a predetermined relationship. For example, the other user who has the predetermined relationship with the user is a mutual follower of the user. In the case where the user follows the other user, and the other user follows the user (the user and the other user follow each other), the user and the other user are mutual followers. The other user who has the predetermined relationship with the user may be a mutual follower of a user who is a mutual follower of the user. The other user who has the predetermined relationship with the user may be a friend of the user or may be a user of a terminal device that stores specific information (such as a phone number, a mail address, or a predetermined ID (identification)). In the case where the terminal device of the user has a function of livestreaming the user output image including the character object of the user to the terminal devices of one or multiple other users via the server device, the other user who has the predetermined relationship with the user views the user output image that is livestreamed by the user. In this case where the user and the other user who have the predetermined relationship communicate with each other as illustrated in FIG. 1A to FIG. 1C, the predetermined communication group to which the user and the other user belong may be temporarily created by the terminal device of the user or the other user or the server device.

The above description for FIG. 1A to FIG. 1C is merely referred to deepen understanding of the content of the present disclosure. Specifically, the present disclosure is carried out according to embodiments described below but may be carried out according to various modifications substantially without departing from the principle of the present disclosure. The modifications are included in the scope of the present disclosure.

Information System 1

Figure 2:
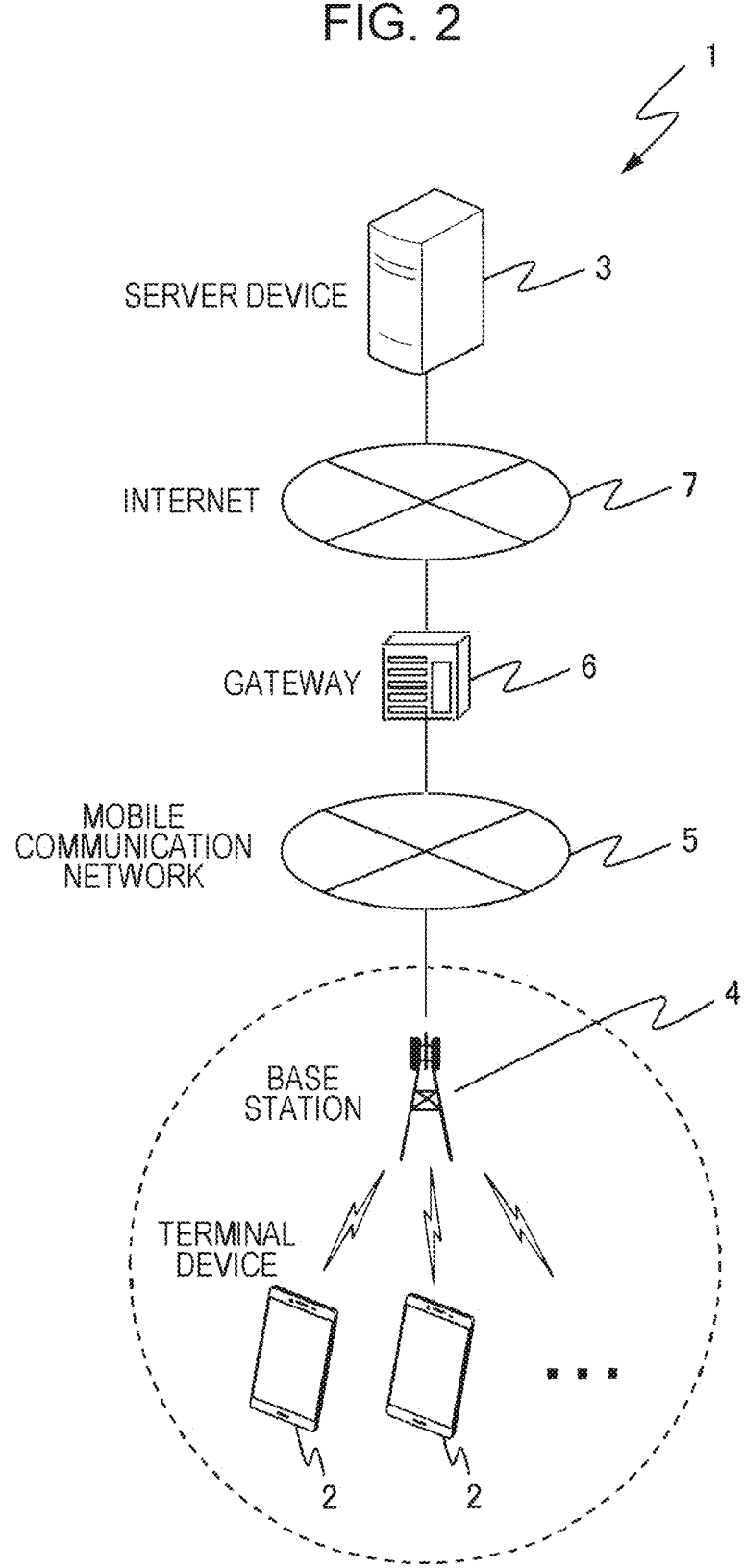
FIG. 2 schematically illustrates a structure of the information system according to the First Example of the present disclosure.

FIG. 2 schematically illustrates an example of the structure of an information system 1. The information system 1 includes terminal devices 2 that are operated by multiple users and a server device 3. The terminal devices 2 and the server device 3 are connected to each other via a communication network such as a base station 4, a mobile communication network 5, a gateway 6, and the internet 7. Communication between the terminal devices 2 and the server device 3 is based on a communication protocol such as a hypertext transfer protocol (HTTP). Connections may be first established between the terminal devices 2 and the server device 3 through HTTP communication, and communication may be subsequently established based on WebSocket for two-way communication at a lower cost (light communication load and light processing load) than the HTTP communication. A communication method for the terminal devices 2 and the server device 3 is not limited to the method described above. The technique of any communication method may be used for the terminal devices 2 and the server device 3, provided that the present embodiment can be carried out.

The terminal devices 2 are information processing apparatuses such as smart phones. The terminal devices 2 may be cellular phones, note PCs, tablet terminals, tablet PCs, head mounted displays (HMDs), electronic book readers, or wearable computers. The terminal devices 2 may be handheld game devices or game consoles. Each terminal device 2 may be any information processing apparatus, provided that the character objects of the user and another user can be outputted for displaying, and the voices of the user and the other user can be outputted.

In an example illustrated in FIG. 2, the single server device 3 is illustrated as a component of the information system 1, but the server device 3 may be a collection of multiple server devices 3 that are physically separated from each other. In this case, the multiple server devices 3 may have the same function or may have functions into which the function of the single server device 3 is divided.

Terminal Device 2

Figure 3:
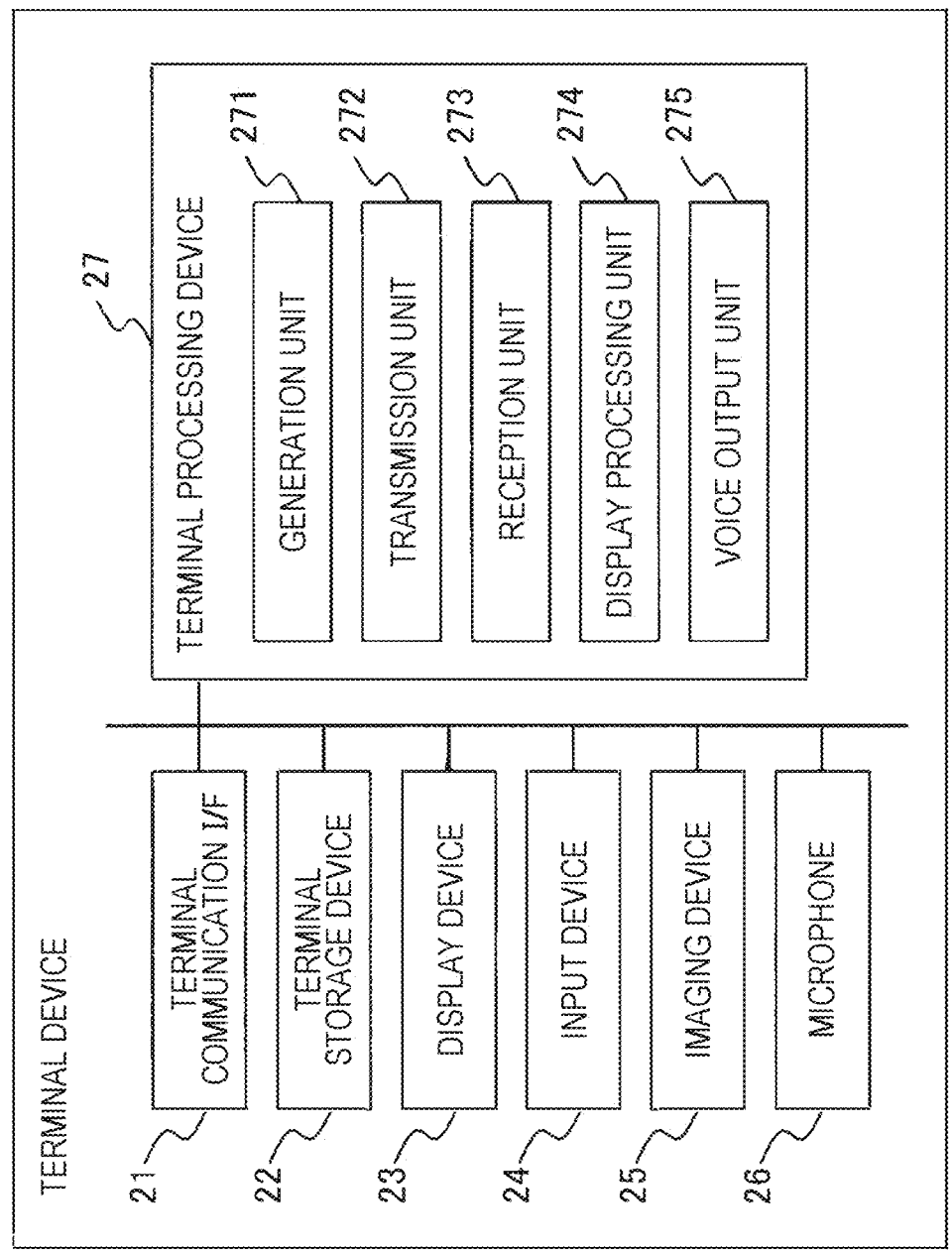
FIG. 3 schematically illustrates a structure of a terminal device according to the First Example of the present disclosure.

FIG. 3 schematically illustrates an example of the structure of each terminal device 2. The terminal device 2 is connected to the server device 3 via the communication network such as the base station 4, the mobile communication network 5, the gateway 6, and the internet 7 and communicates with the server device 3. The terminal device 2 generates the character video data including the motion data in accordance with various kinds of data (such as the imaging data) inputted from the user and transmits the generated character video data and/or the output information including the voice data of the user to the server device 3. The terminal device 2 receives the output information about the other user that is transmitted from the server device 3, displays the character object of the other user, based on the received output information, and/or outputs the voice of the other user. To fulfil such a function, the terminal device 2 includes a terminal communication I/F 21, a terminal storage device 22, a display device 23, an input device 24, an imaging device 25, a microphone 26, and a terminal processing device 27.

The terminal communication I/F 21 is mounted as hardware, firmware, communication software such as a transmission control protocol/internet protocol (TCP/IP) driver or a point-to-point protocol (PPP) driver, or a combination thereof. The terminal device 2 can transmit data to another device such as the server device 3 and can receive data from another device via the terminal communication I/F 21.

An example of the terminal storage device 22 is a semiconductor memory device such as a read only memory (ROM) or a random access memory (RAM). For example, the terminal storage device 22 stores an operating system program, a driver program, a control program, and data that are used for processing of the terminal processing device 27.

Examples of the driver program that is stored in the terminal storage device 22 include an output device driver program that controls the display device 23 and an input device driver program that controls the input device 24. An example of the control program that is stored in the terminal storage device 22 is an application program for fulfilling various functions related to the communication service. The control program may be transmitted from the server device 3 or another device.

The terminal storage device 22 stores data such as identification information (for example, a user ID (identification)) for uniquely identifying the user who operates the terminal device 2. The terminal storage device 22 stores data such as background data and model data. The terminal storage device 22 stores data such as a user table T1, an object table T2, and a group table T3. The terminal storage device 22 may temporarily store data related to predetermined processing.

The background data is asset data for creating a virtual space in which the character object of the user is present in the user output image. The background data includes data for drawing the background of the virtual space, data for drawing various objects that are included in the user output image, and another data for drawing various background objects that are displayed in the user output image. The background data may include object position information that represents the positions of the various background objects in the virtual space.

The display device 23 is a liquid-crystal display. The display device 23 may be an organic electro-luminescence (EL) display. The display device 23 displays, for example, a video image depending on video image data and/or a still image depending on still image data that is supplied from the terminal processing device 27 on a display screen. The display device 23 may not be a component of the terminal device 2. In this case, the display device 23 may be a HMD display that is capable of communicating with the server device 3, a screen device for projection mapping or a projection device for retinal projection that is capable of communicating with the terminal device 2 in a wired or wireless manner.

The input device 24 is a pointing device such as a touch screen. In the case where the input device 24 is a touch screen, the input device 24 can detect various touch operations such as tapping, double tapping, and dragging of the user. The touch screen may include an electrostatic capacity proximity sensor and may be capable of detecting a non-contact operation of the user. The input device 24 may be input keys. For example, the user can input a character, a numeral, a symbol, and a position on the display screen of the display device 23 by using the input device 24. The input device 24 generates a signal that corresponds to the operation of the user. The input device 24 supplies the generated signal, which corresponds to an instruction from the user, to the terminal processing device 27.

The imaging device 25 is a camera that includes, for example, an imaging optical system, an imaging element, and an image processing unit. The imaging optical system, an example of which is an optical lens, images luminous flux from an object on an imaging surface of the imaging element. An example of the imaging element is a charge coupled device (CCD) or a complementary metal oxide semiconductor (CMOS) that outputs an image of the object that is imaged on the imaging surface. The image processing unit generates video image data in a predetermined file format every predetermined period from images that are continuously generated by the imaging element and outputs the video image data as the imaging data. The image processing unit generates still image data in a predetermined file format from an image that is generated by the imaging element and outputs the still image data as the imaging data.

The microphone 26 is a sound collector configured to acquire the voice that sounds from the user and to convert the voice into the voice data. The microphone 26 can acquire a voice input from the user, converts the voice input of the user that is acquired by the microphone 26 into the voice data, and outputs the voice data to the terminal processing device 27.

The terminal processing device 27 is a processor that loads the operating system program, the driver program, and the control program that are stored in the terminal storage device 22 into the memory and that executes instructions that are included in the loaded programs. Examples of the terminal processing device 27 include electronic circuits such as a central processing unit (CPU), a micro processing unit (MPU), a digital signal processor (DSP), a graphics processing unit (GPU) and various combinations of the electronic circuits. The terminal processing device 27 may function by using an integrated circuit such as an application specific integrated circuit (ASIC), a programmable logic device (PLD), a field programmable gate array (FPGA), or a micro controller unit (MCU). In FIG. 3, the terminal processing device 27 is illustrated as a single component. However, the terminal processing device 27 may be a collection of multiple processors that are physically separated from each other.

The terminal processing device 27 executes various instructions that are included in the control program and consequently functions as a generation unit 271, a transmission unit 272, a reception unit 273, a display processing unit 274, and a voice output unit 275. The functions of the generation unit 271, the transmission unit 272, the reception unit 273, the display processing unit 274, and the voice output unit 275 will be described later.

Various Tables

FIG. 4A to FIG. 4C illustrate examples of the data structures of the user table T1, the object table T2, and the group table T3 that are stored in the terminal storage device 22. At least the user table T1, the object table T2, or the group table T3 may be stored in a server storage device 32 of the server device 3. In this case, the terminal device 2 may receive the latest table that is stored in the server storage device 32 with a predetermined timing and may store the latest table in the terminal storage device 22.

User Table T1

FIG. 4A illustrates an example of the data structure of the user table T1 for managing the users who participate in the communication service. The user table T1 stores the user ID, the name of the user, the character object of the user, an owned object of the user, and a use object that are associated with each other as for each user. For example, the user table T1 may store an owned coin of the user (information that represents the total amount of the "coin" that the user owns for representing a virtual monetary value) and/or a user point associated with the user ID of the user. The user ID is an example of identification data for uniquely identifying each user. The name is an example of data that represents the name of each user.

For example, the character object is a model ID for identifying model data for generating the animation of the character object. The model data is associated with the model ID and is stored in the terminal storage device 22. The model data may be three-dimensional model data for generating a three-dimensional animation or may be two-dimensional model data for generating a two-dimensional animation. The model data includes rig data (so-called "skeleton data") that represents, for example, the skeleton of a portion other than the face and the face of the character object and surface data that represents the shape and texture of the surface of the character object. The model data may include multiple different pieces of model data. The multiple pieces of model data may include respective different pieces of rig data or the same rig data. The multiple pieces of model data may include respective different pieces of surface data or the same surface data.

The owned object is the object ID that represents an object that the user owns. Examples of the owned object include a wearable object that can be associated with a specific portion of the character object and the wallpaper object that is placed on the back of the character object of the user in the user output image. The wearable object and the wallpaper object will be described in detail later. The owned object is an object that is selected in a lottery game that is played by using the terminal device 2 of the user or the server device 3 by the operation of the user. The owned object may be an object that the user owns with the result that the user consumes the "coin" for representing the virtual monetary value as for a purchasing function in the information system 1.

The use object is the object ID that represents an object that is used in the user output image that is displayed on the terminal device 2 of the user. For example, in the case where an instruction for changing is inputted from the user during the communication service, the character object of the user that is included in the displayed user output image wears the wearable object that is owned as the owned object of the user. In this case, the object ID of the wearable object that is worn on the character object of the user is associated with the user ID as the use object and is stored in the user table T1. For example, in the case where the instruction for changing is inputted from the user during the communication service, the wallpaper object that is owned as the owned object of the user is placed on the back of the character object of the user in the displayed user output image. In this case, the object ID of the wallpaper object that is placed in the user output image is associated with the user ID as the use object and is stored in the user table T1.

Object Table T2

FIG. 4B illustrates an example of the data structure of the object table T2 for managing the object that is selected as the additional object. An example of the additional object is a gift object that is gifted to the other user from the user. The object table T2 stores the object ID, the name, the image information, rarity, and a placement position that are associated with each other as for each additional object.

The object ID is an example of identification data for uniquely identifying each additional object. The image information is one or multiple still images that correspond to each additional object. The image information may be one or more kinds of video images that correspond to each additional object. The rarity is information that represents the rarity of each additional object. The placement position is information that represents the position at which the image information about each additional object is displayed. In the case where the position at which the character object is displayed and a display range are determined, information that represents a relative position with respect to the character object may be stored as the placement position.

The additional object is classified into multiple kinds (categories). Examples of the additional object include an effect object that is used as an effect gift, a normal object that is used as a normal gift, a wearable object that is used as a wearable gift, and a message object that is used as a message gift. The additional object may include the wallpaper object that is placed on the back of the character object in the user output image. Information that represents the kind (category) of the additional object may be associated with the object ID of the additional object and may be stored in the object table T2. The image information and the placement position depending on the kind of the additional object will now be described.

The effect object affects the impression of the whole of the user output image and/or the other-user output image. An example of the effect object is an object that imitates confetti. In the case where the effect object is the object that imitates the confetti, an image that represents multiple pieces of paper is stored as the image information.

Information that represents a "space" is stored as the placement position of the effect object. For example, the object that imitates the confetti is entirely displayed in the user output image and/or the other-user output image. The effect object may be entirely displayed on a screen (a communication screen described later) including the user output image and the other-user output image depending on an instruction from the user. The effect object may be displayed only in an output image that is selected by the user from the user output image and the other-user output image. The effect object may be displayed so as to overlap the character object that is included in the user output image and/or the other-user output image. The effect object is not associated with a specific portion of a character and is displayed unlike the wearable object described later. The terminal devices 2 of the information system 1 thus display the effect object depending on the instruction from the user and can consequently change the impression of the whole of the user output image and/or the other-user output image from that before the effect object is displayed.

For example, the normal object imitates a stuffed animal, a bouquet, an accessory, or a product suitable for a gift or a present. The information that represents the "space" is stored as the placement position of the normal object. For example, the normal object is associated with information about a predetermined movement route, and the normal object that moves along the predetermined movement route in the user output image or the other-user output image is displayed. The information that represents the "space" that is stored as the placement position of the "normal object" may be classified into multiple kinds. Examples of the multiple kinds of the "spaces" include a "central space" (a central region of the image in the case where the user output image or the other-user output image is divided into three regions in a left-right direction), a "left-hand space" (a left-hand region of the image in the case where the user output image or the other-user output image is divided into three regions in the left-right direction), and a "right-hand space" (a right-hand region of the image in the case where the user output image or the other-user output image is divided into three regions in the left-right direction). The multiple kinds of the "spaces" may be a "central space" (a central region of the image in the case where the user output image or the other-user output image is divided into three regions in an up-down direction), an "upper space" (an upper region of the image in the case where the user output image or the other-user output image is divided into three regions in the up-down direction), and a "lower space" (a lower region of the image in the case where the user output image or the other-user output image is divided into three regions in the up-down direction). In this case, the movement route that is associated with the normal object is set in the "space" of the kind that is associated as the placement position of the normal object. For example, in the case where the normal object stores information that represents the "right-hand space", the normal object is associated with information about a movement route that passes through the right-hand region of the image in the case where the user output image or the other-user output image is divided into the three regions in the left-right direction. The normal object may be displayed so as to move in accordance with a predetermined movement rule from a position that is set for the normal object in the user output image or the other-user output image or a position that is automatically and randomly determined. For example, the predetermined movement rule is set such that the normal object moves so as to free-falls. The normal object may be displayed so as to overlap the character object. In this case, the normal object is not associated with a specific portion of the character object and is displayed unlike the wearable object described later. The normal object may be displayed such that the normal object moves so as to bounce when coming into contact with the character object.

In the case where the normal object is displayed so as to overlap the character object, for example, the normal object may be displayed so as to overlap a "portion other than the "head" including the "face" of the character object. In this case, the normal object is displayed so as not to overlap the "head" of the character object. The normal object may be displayed so as to overlap a "portion other than the "upper body" including the "face" of the character object. In this case, the normal object is displayed so as not to overlap the "upper body" of the character object.

The wearable object is associated with a specific portion (a wearing position) of the character object and is displayed in the user output image or the other-user output image. Examples of the specific portion include the front left, the front right, the rear left, the rear right, the front center, the rear center, the left-hand eye, the right-hand eye, the left-hand ear, the right-hand ear, and the entire hair on the head of the character object. The specific portion may be a thumb, a ring finger, a wrist, an elbow, a shoulder, an upper arm, the whole of a hand, and the whole of an arm.

The wearable object that is associated with the specific portion of the character object is displayed so as to be in contact with the specific portion of the character object in the user output image or the other-user output image. The wearable object that is associated with the specific portion of the character object may be displayed so as to partly or entirely cover the specific portion of the character object in the user output image or the other-user output image. The specific portion may be identified by using three-dimensional position information that represents a position in a three-dimensional coordinate space or may be associated with position information in the three-dimensional coordinate space.

Examples of the image information about the wearable object include image information about imitations of an accessory (such as a headband, a neckless, or an earring), cloth (such as a T-shirt or a dress), and a costume that are worn on the character object, and another object wearable on the character object.

Information that represents a wearing portion that represents which part of the character object is associated with the wearable object is stored as the placement position of the wearable object. For example, in the case where the wearable object is a "headband", information that represents the "head" of the character object is stored as the placement position of the wearable object. In the case where the wearable object is a "T-shirt", information that represents the "torso" of the character object is stored as the placement position of the wearable object.

Information that represents multiple wearing portions in the three-dimensional coordinate space may be stored as the placement position of the wearable object. For example, in the case where the wearable object is the "headband", information that represents two portions of the "rear left of the head" and the "rear right of the head" of the character object may be stored as the placement position of the wearable object. The wearable object that imitates the "headband" is displayed so as to be worn on the "rear left of the head" and the "rear right of the head" of the character object.

In the case where multiple kinds of wearable objects are worn on the character object at the same wearing position, the multiple kinds of wearable objects are worn on the character object at time intervals. Consequently, the multiple kinds of wearable objects at the same wearing portion are not simultaneously worn on the character object. For example, in the case where the "head" is stored as the wearing position of the wearable object that represents the "headband" and the wearable object that represents the "hat", the wearable object that represents the "headband" and the wearable object that represents the "hat" are not simultaneously displayed on the head of the character object.

In the object table T2, a display time depending on the kind of the additional object may be associated with the object ID of the additional object and may be stored. For example, the display time of the wearable object that is stored may be longer than the display time of the effect object and the display time of the normal object. For example, in the case where the stored display time of the wearable object is "60 seconds", the stored display time of the effect object may be "5 seconds", and the stored display time of the normal object may be "10 seconds".

Group Table T3

FIG. 4C illustrates an example of the data structure of the group table T3 for managing a group (such as a group for a friend user, a group for the other user who is the mutual follower, or a group that is freely created by the user or the other user) to which the user belongs. The group table T3 is provided for every user. The group table T3 illustrated in FIG. 4C is the group table T3 of the user who operates the terminal device 2 that stores the group table T3.

In the group table T3, the group ID of the group, the name of the group, a user member who belongs to the group, for example, are associated with each other and are stored as for each group. The group ID is an example of identification data for uniquely identifying each group. The name is an example of data that represents the name of each group. The user member is the user ID of each user who belongs to the group.

Returning to FIG. 3, the functions of the generation unit 271, the transmission unit 272, the reception unit 273, the display processing unit 274, and the voice output unit 275 will be described.

Generation Unit 271

The generation unit 271 acquires, from the imaging device 25, the imaging data that is continuously outputted by the imaging device 25. For example, the imaging device 25 of the terminal device 2 that is held by the user is located in the terminal device 2 such that the face of the user who views the display screen of the display device 23 is directed in a shooting direction. The imaging device 25 continuously images the face of the user in the shooting direction, acquires the imaging data of the face of the user, and outputs the imaging data to the generation unit 271 of the terminal processing device 27. The imaging device 25 may image another portion other than the face of the user such as the head, the arms, the hands (including the fingers), the chest, the torso, the legs, or another portion and may acquire the imaging data. The imaging device 25 may be a 3D camera that can detect the depth of the face of a person.

The generation unit 271 generates face motion data that digitally expresses the motion of the face of the user at any time over time based on the continuously acquired imaging data. The face motion data may be generated at predetermined sampling time intervals. The face motion data that is thus generated by the generation unit 271 enables the motion (a change in expression) of the face of the user to be digitally expressed in time series.

The generation unit 271 may generate body motion data that digitally expresses the positions and directions of the portions (the head, the arms, the hand (including the fingers), the chest, the torso, the legs, or another portion) of the user together with the face motion data or separately from the face motion data.

The body motion data may be generated based on detection information from a known motion sensor that is worn on the user. In this case, the terminal communication I/F 21 of the terminal device 2 includes a predetermined communication circuit for acquiring the detection information through wireless communication from the motion sensor that is worn on the user. The generation unit 271 generates the body motion data, based on the detection information that is acquired by the terminal communication I/F 21. The body motion data may be generated at predetermined sampling time intervals. The body motion data that is thus generated by the generation unit 271 can digitally express the motion of the body of the user in time series.

The body motion data may be generated based on the detection information from the motion sensor that is worn on the user, for example, in a photo studio. In this case, the photo studio may include a base station, a tracking sensor, and a display. An example of the base station is a multi-axis laser emitter. An example of the motion sensor that is worn on the user may be Vive Tracker provided by HTC CORPORATION. An example of the base station may be a base station provided by HTC CORPORATION.

A supporter computer may be installed in another room adjacent to the photo studio. The display in the photo studio may display information that is received from the supporter computer. The server device 3 may be installed in the same room in which the supporter computer is installed. The room in which the supporter computer is installed may be separated from the photo studio by using a glass window. In this case, an operator of the supporter computer can view the user. The supporter computer may be capable of changing the settings of various devices that are provided in the photo studio depending on an operation of a supporter. For example, the supporter computer can change the settings of a scan interval by using the base station, the settings of the tracking sensor, and settings of various other devices. The operator may input a message into the supporter computer, and the inputted message may be displayed on the display in the photo studio.

The generation unit 271 generates the character video data including the face motion data and/or the body motion data generated at any time and outputs the generated character video data to the display processing unit 274. In some cases, the face motion data and the body motion data are referred to below as the motion data. The generation unit 271 generates output information including the generated character video data and the user ID that is stored in the terminal storage device 22 and outputs the generated output information to the transmission unit 272. In the case where the voice data of the user that is outputted from the microphone 26 is acquired, the generation unit 271 generates output information including the generated character video data, the acquired voice data, and the user ID that is stored in the terminal storage device 22 and outputs the generated output information to the transmission unit 272.

The generation unit 271 generates game image data that represents a game screen of a game that is played by the user during the game at any time, generates output information including the generated game image data and the user ID that is stored in the terminal storage device 22, and outputs the generated output information to the transmission unit 272. The output information may include the generated character video data and/or the acquired voice data together with the generated game image data.
Transmission Unit 272

The transmission unit 272 transmits the output information that is outputted from the generation unit 271 to the server device 3 via the terminal communication I/F 21 together with destination information. The destination information includes the user IDs of one or multiple other users who participate in the same communication service as the user. The user IDs that are included in the output information may be used as the destination information. For example, the server device 3 stores the user IDs of one or multiple other users who participate in the same communication service as the user, identifies the user IDs of one or multiple other users who participate in the same communication service as the user having the user ID that is included in the output information when acquiring the output information, and transmits the received output information to the terminal devices 2 of the other users that are represented by the identified user IDs.

The transmission unit 272 transmits information that represents various instructions that are inputted from the user who operates the input device 24 to the server device 3 via the terminal communication I/F 21 together with the user ID that is stored in the terminal storage device 22 and the destination information. Examples of the various instructions from the user include the instruction for adding. The instruction for adding is transmitted to the server device 3 via the terminal communication I/F 21 together with the object ID of the additional object that is added into the other-user output image and the user ID.
Reception Unit 273

For example, the reception unit 273 receives the output information about the other user and information that represents various instructions from the other user that are transmitted from the server device 3 via the terminal communication I/F 21. The reception unit 273 outputs the received information to the terminal processing device 27. The output information about the other user that is transmitted from the server device 3 is the output information that is generated by the generation unit 271 of the terminal device 2 of the other user and that is transmitted to the server device 3 by using the transmission unit 272 of the terminal device 2 of the other user. For example, the output information about the other user includes the character video data of the other user, the voice data of the other user, and the user ID of the other user. In some cases, the output information about the other user may not include the voice data of the other user, and the output information about the other user may not include the character video data of the other user.
Display Processing Unit 274

The display processing unit 274 displays the image that is drawn based on the motion data (the character video data) that is generated by the generation unit 271 on the display device 23 as the user output image. The display processing unit 274 displays the image that is drawn based on the motion data (the character video data) that is included in the output information about the other user that is received by the reception unit 273 on the display device 23 as the other-user output image. A process of drawing the image, based on the motion data will now be described. In the process of drawing the image, based on the motion data of the user (the user who operates the terminal device 2), the user ID that is stored in the terminal storage device 22 is used. In the process of drawing the image, based on the motion data that is included in the output information about the other user that is received by the reception unit 273, the user ID that is included in the output information is used.

The display processing unit 274 first extracts the object ID of the use object and the model ID of the character object associated with the user ID from the user table T1. Subsequently, the display processing unit 274 reads the model data that is associated with the extracted model ID, the placement position, and the image information associated with the extracted object ID of the use object from the terminal storage device 22. Subsequently, the display processing unit 274 generates the animation of the character object that wears the use object at the placement position, based on the read model data, the image information about the use object, the placement position, and the motion data. In the case where the motion data includes the face motion data, the display processing unit 274 generates the animation of the character object such that the expression of the character object changes based on the face motion data. Consequently, the display processing unit 274 can generate the animation of the character object that moves in synchronization with a change in the expression of the user, based on the read model data and the face motion data. In the case where the motion data includes the face motion data and the body motion data, the display processing unit 274 generates the animation of the character object that moves in synchronization with the expression of the user and the motion of the body, based on the read model data, the face motion data, and the body motion data. Subsequently, the display processing unit 274 draws the image including the generated animation (video image) of the character object and the background image that represents the generated background by using the background data that is stored in the terminal storage device 22. The display processing unit 274 may use the wallpaper object that is associated with the communication group in advance and that is stored in the terminal storage device 22 as the background image. In this case, the same wallpaper object may be used as the background image for the entire communication group. The display processing unit 274 outputs drawing data that represents the image to be drawn and ends the process of drawing the image based on the motion data. The image that is drawn based on the character object that is associated with the user ID that is stored in the terminal storage device 22 is the user output image of the user. The image that is drawn based on the character object that is associated with the user ID that is included in the received output information about the other user is the other-user output image of the other user.

The display processing unit 274 may display the character object that wears a new wearable object that the user owns as the owned object of the user on the display device 23 depending on the instruction for changing from the user. For example, in the case where the wearable object for which the instruction for changing is inputted from the user is the "headband", the display processing unit 274 extracts the object ID of the wearable object ("headband") from the owned objects that are associated with the user ID of the user in the user table T1 and stores the object ID as the use object. The display processing unit 274 extracts the placement position and the image information associated with the object ID that is stored as the use object from the object table T2. Subsequently, the display processing unit 274 generates the user output image including the character object that wears the wearable object ("headband") on the head (the placement position that is associated with the object ID of the "headband"), based on the extracted image information and placement position. The display processing unit 274 may generate the user output image including the character object that wears the wearable object that moves in conjunction with the motion of the wearing portion (the placement position) of the character object.

The display processing unit 274 displays the user output image including the additional object depending on the instruction for adding the additional object from the other user. The display processing unit 274 displays the other-user output image including the additional object depending on the instruction for adding from the user for displaying the additional object in the other-user output image.

In the case where the object ID that is included in the instruction for adding the additional object from the other user is the object ID of an effect object, the display processing unit 274 refers the object table T2, extracts the still image or the video image (the image information) of the effect object that is associated with the object ID that is included in the instruction for adding from the terminal storage device 22, and generates the user output image including the extracted still image or video image. For example, in the case where the instruction for adding the effect object that represents confetti or a firework is inputted, the display processing unit 274 generates the user output image including the video image of the effect object that imitates the confetti or the firework. In the case where the object ID that is included in the instruction for adding the additional object from the user is the object ID of an effect object, the display processing unit 274 also refers the object table T2, extracts the still image or the video image (the image information) of the effect object that is associated with the object ID that is included in the instruction for adding from the terminal storage device 22, and generates the other-user output image including the extracted still image or video image.

In the case where the object ID that is included in the instruction for adding the additional object from the other user is the object ID of the normal object, the display processing unit 274 refers the object table T2 and extracts the placement position and the still image or the video image (the image information) of the normal object associated with the object ID of the normal object. Subsequently, the display processing unit 274 generates the user output image including the still image or the video image of the normal object that is placed at a position that is represented by the placement position. In the case where the object ID that is included in the instruction for adding the additional object from the user is the object ID of the normal object, the display processing unit 274 also refers the object table T2, extracts the placement position and the still image or the video image (image information) of the normal object associated with the object ID of the normal object, generates the other-user output image including the still image or the video image of the normal object that is placed at the position that is represented by the placement position.

The display processing unit 274 may generate the user output image and the other-user output image including the video image of the normal object that moves in display regions of the user output image and the other-user output image. In the following description, the user output image and the other-user output image are referred to as the output images in some cases. For example, the display processing unit 274 may generate the output images including the video image of the normal object that falls downward from above in the output images. In this case, the normal object may be displayed in the display regions of the output images while the normal object falls to the lower ends of the output images after the normal object starts falling and may vanish from the output images after the normal object falls to the lower ends of the output images. The movement route of the normal object may be any one of routes in the output images such as a right-hand direction from the left, a left-hand direction from the right, and a lower left direction from the upper left, another route other than these, or a route along straight trajectory, circular trajectory, elliptic trajectory, spiral trajectory, or another trajectory.

In the case where the object ID that is included in the instruction for adding the additional object from the other user is the object ID of the wearable object, the display processing unit 274 displays notification information about an instruction for wearing in the user output image. The display processing unit 274 refers the object table T2 and extracts the placement position and the image information about the wearable object that is associated with the object ID that is included in the instruction for adding depending on the instruction for wearing from the user. Subsequently, the display processing unit 274 generates the user output image including the character object that wears the wearable object on the wearing portion that is represented by the placement position, based on the extracted image information and placement position.

The display processing unit 274 starts the game that is played by the user depending on an instruction from the user and displays the game screen of the game on the display device 23. After the game starts, the display processing unit 274 displays the game screen of the game that progresses depending on an instruction for progressing the game in response to the game operation of the user on the display device 23 and stops displaying the game screen when an end condition of the game is satisfied. The end condition of the game is determined in advance depending on the rules of the game, and examples thereof includes that the game medium (such as the character) of the user wins or loses against an opponent, that the game medium of the user reaches a predetermined goal, or that a game object that is operated by the user is in a predetermined state (for example, multiple pieces (game objects) are arranged on squares in a game filed).

In the case where the output information of the other user that is transmitted from the server device 3 includes the game image data of a game that is played by the other user, the display processing unit 274 displays a game image of the game that is played by the other user on the display device 23. When the game image of the game that is played by the other user is displayed, the other-user output image of the other user is not displayed, but the game image of the game that is played by the other user and the other-user output image of the other user may be displayed at the same time.

Voice Output Unit 275

In the case where the output information about the other user includes the voice data of the other user, the voice output unit 275 outputs the voice of the other user that is generated based on the voice data from a speaker together with the display of the other-user output image by using the display processing unit 274. Consequently, the voice of the other user is outputted while the lips of the character object of the other user that is included in the other-user output image moves, and accordingly, the user can view the other-user output image including the character object of the other user such that the voice sounds.

Server Device 3

FIG. 5 schematically illustrates an example of the structure of the server device 3. The server device 3 that provides the communication service to the terminal devices 2 of the multiple users transmit the information that represents various instructions and the output information that are transmitted from the terminal device 2 of the user to the terminal device 2 of the other user different from the user. For this reason, the server device 3 includes a server communication I/F 31, the server storage device 32, and a server processing device 33. For example, the terminal device 2 to which the terminal device 2 of the user transmits information is the terminal device 2 of the user represented by the user ID that is included in the received destination information.

The server communication I/F 31 is mounted as hardware, firmware, communication software such as a TCP/IP driver or a PPP driver, or a combination thereof. The server device 3 can transmit information to another device and can receive information from another device via the server communication I/F 31.

An example of the server storage device 32 is a semiconductor memory such as a ROM or a RAM. Examples of the server storage device 32 may include a magnetic disk, an optical disk, and various other storage devices that can store data. For example, the server storage device 32 stores an operating system program, a driver program, an application program, and data that are used for processing of the server processing device 33. The server storage device 32 may store the user table T1, the object table T2, and the group table T3 as the data.

The server processing device 33 is a processor that loads the operating system program, the driver program, and the control program that are stored in the server storage device 32 into the memory and that executes instructions that are included in the loaded programs. Examples of the server processing device 33 include electronic circuits such as a CPU, a MPU, a DSP, and a GPU and various combinations of the electronic circuits. The server processing device 33 may function by using an integrated circuit such as an ASIC, a PLD, a FPGA, or a MCU. In FIG. 5, the server processing device 33 is illustrated as a single component. However, the server processing device 33 may be a collection of multiple processors that are physically separated from each other. The server processing device 33 executes various instructions that are included in the control program and consequently functions as a server reception unit 331, and a server transmission unit 332.

Server Reception Unit 331

For example, the server reception unit 331 receives the information that represents various instructions and the output information that are transmitted from the terminal device 2 of a user among the multiple users via the server communication I/F 31. The server reception unit 331 may receive the destination information together with the information that represents various instructions and the output information that are transmitted from the terminal device 2.

Server Transmission Unit 332

The server transmission unit 332 transmits the information that represents various instructions and the output information that are received by the server reception unit 331 to the terminal device 2 of the other user represented by the user ID that is included in the destination information that is received at the same time via the server communication I/F 31. The server transmission unit 332 may transmit the information that represents various instructions that is received by the server reception unit 331 to the terminal devices 2 of one or multiple other users that are specified by the user who transmits the information via the server communication I/F 31.

Examples of Various Screens

Examples of various screens that are displayed on the display device 23 of the terminal device 2 of the user will now be described with reference to FIG. 6A to FIG. 15B. In FIG. 6A to FIG. 15B, multiple components that are designated by like reference characters have like functions.

Figure 6A:
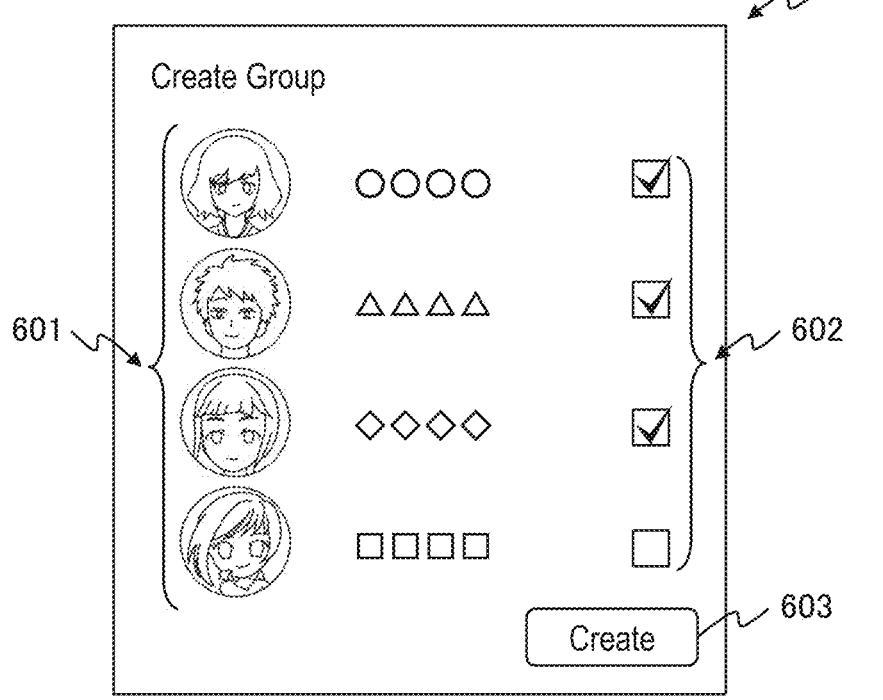
FIG. 6A and FIG. 6B illustrate examples of a screen that is displayed on a display device of the terminal device according to the First Example of the present disclosure.

FIG. 6A illustrates an example of a group creation screen 600 that is displayed on the display device 23 of the terminal device 2 of the user. The group creation screen 600 includes an other-user display region 601, selection objects 602, and a creation button 603. For example, the group creation screen 600 is displayed in the case where a group creation object of a home screen that is displayed depending on running of the control program that is stored in the terminal storage device 22, for example, is selected by the user who operates the input device 24.

Other-user information that represents the other users who have a predetermined relationship with the user is displayed in the other-user display region 601. In an example illustrated in FIG. 6A, the display processing unit 274 of the terminal device 2 of the user displays thumbnail images of the character objects of the other users and the names of the other users as the other-user information.

The selection objects 602 are operation objects for selecting the other users that are represented by the other-user information. In the example illustrated in FIG. 6A, the display processing unit 274 of the terminal device 2 of the user displays check box objects that correspond to the other-user information as the selection objects 602. For example, after the selection objects 602 are selected by the user who operates the input device 24, the selection objects 602 are displayed with "check" marks. In this case, other users in the other-user information that correspond to the selection objects 602 that are displayed with the "check" marks are selected. After one of the selection objects 602 that are displayed with the "check" marks is selected by the user who operates the input device 24, the selection object 602 is displayed with no "check" mark. In this case, another user in the other-user information that corresponds to the selection object 602 that is displayed with no "check" mark is not selected. The selection objects 602 are associated with the respective user IDs of the other users related to the other-user information.

An example of the creation button 603 is a button object for creating a new communication group by the user. After the creation button 603 is selected by the user who operates the input device 24, the new group is created such that the user who operates the terminal device 2 and the selected other users in the selection objects 602 are user members. For example, the display processing unit 274 of the terminal device 2 of the user identifies the user ID of the user that is stored in the terminal storage device 22 and the user IDs of the other users who are associated with the selection objects 602 related to the selected other users in the selection objects 602. The display processing unit 274 associates a newly created group ID with the identified user ID of the user and user IDs of the other users as the user members and stores these in the group table T3. At this time, the display processing unit 274 may associate the newly created group ID with a group name that is automatically created or with a group name that is inputted from the user.

Figure 7A:
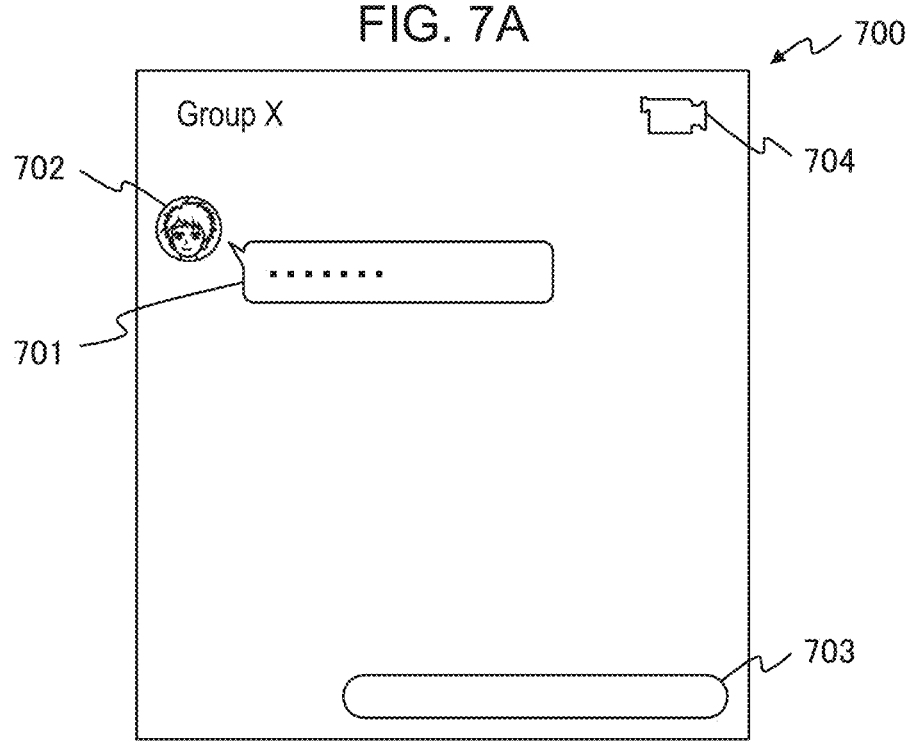
FIG. 7A and FIG. 7B illustrate examples of the screen that is displayed on the display device of the terminal device according to the First Example of the present disclosure.

After the new group is created depending on the selection of the creation button 603, the display processing unit 274 displays an information exchange screen 700 for the user members of the new group. FIG. 7A illustrates an example of the information exchange screen 700 that is displayed on the display device 23 of the terminal device 2 of the user. The information exchange screen 700 includes a display region 701 in which information such as a text or an image that is inputted from each user member of the new group is displayed, information 702 that represents the user member who inputs the information (such as the thumbnail image of the character object) that is displayed in the display region 701, an input object 703 for inputting a text or an image that is to be displayed into a new display region 701 by the user, and a start object 704 for starting the communication service.

After the information exchange screen 700 is displayed, the transmission unit 272 of the terminal device 2 of the user transmits an instruction for displaying the information exchange screen to the server device 3 together with information about the new group and the destination information via the terminal communication I/F 21. The information about the new group includes the group ID, the name, and the user IDs of the user members of the new group. The destination information includes the user IDs of the other users other than the user who operates the terminal device 2 among the user members of the new group. The server reception unit 331 of the server device 3 receives the instruction for displaying the information exchange screen, the information about the new group, and the destination information via the server communication I/F 31. The server reception unit 331 may store the received destination information in the server storage device 32. The server transmission unit 332 of the server device 3 transmits the instruction for displaying the information exchange screen and the information about the new group to the terminal devices 2 of the other users that are represented by the user IDs that are included in the destination information via the server communication I/F 31. After the instruction for displaying the information exchange screen that is transmitted from the terminal device 2 of the user is received via the server device 3, the terminal devices 2 of the other users can display the information exchange screen 700 through which information can be exchanged by the user members of the new group.

The description returns to FIG. 7A. For example, after new information is inputted into the input object 703 by an operation of any one of the user members, the display region 701 in which the new information is displayed is added into the information exchange screen 700 that is displayed by the terminal device 2 of the user who inputs the information. The transmission unit 272 of the terminal device 2 of the user who inputs the information transmits the inputted new information to the terminal devices 2 of the user members other than the user who inputs the information via the server device 3. Consequently, the display region 701 in which the new information is displayed is added also into the information exchange screens 700 that are displayed on the terminal devices 2 of the other users who are the user members other than the user who inputs the information.

An example of the start object 704 is a button object for starting the communication service in which the user members of the new group can participate. After the start object 704 is selected by the user who operates the input device 24, a process of starting the communication service is performed such that the communication group can exchange information by using the information exchange screen 700. An example of the starting process depending on the selection of the start object 704 by the user will now be described.

The display processing unit 274 of the terminal device 2 of the user first displays a communication screen 810 (FIG. 8B) that can be displayed on the terminal devices 2 of the users who belong to the communication group. The display processing unit 274 stores the group ID of the communication group in the terminal storage device 22 as the group ID of the group that starts the communication service. The display processing unit 274 also stores the user ID of the user in the terminal storage device 22 as the user ID of the user who participates in the communication service. In the case where none of the other users who belong to the communication group participates in the communication service, only the user output information of the user is displayed on the communication screen 810.

Subsequently, the transmission unit 272 of the terminal device 2 of the user transmits an instruction for starting the communication service to the server device 3 together with the user ID of the user that is stored in the terminal storage device 22, information about the communication group, and/or the destination information via the terminal communication I/F 21. The information about the communication group includes the group ID, the name, and the user IDs of the user members of the communication group. The destination information includes the user IDs of the other users other than the user who operates the terminal device 2 among the user members of the communication group. In the case where the destination information is stored in the server storage device 32, the destination information may not be transmitted. The server reception unit 331 of the server device 3 receives the instruction for starting, the user ID, the information about the communication group, and the destination information via the server communication I/F 31. The server transmission unit 332 of the server device 3 transmits the instruction for starting, the user ID, and the information about the communication group to the terminal devices 2 of the other users that are represented by the user IDs that are included in the destination information via the server communication I/F 31.

The reception unit 273 of the terminal device 2 of each of the other users receives, from the server device 3, the instruction for starting, the user ID, and the information about the communication group that are transmitted from the terminal device 2 of the user. The reception unit 273 stores the group ID that is included in the information about the communication group in the terminal storage device 22 as the group ID of the group that starts the communication service. The display processing unit 274 stores the transmitted user ID in the terminal storage device 22 as the user ID of the user who participates in the communication service. The display processing unit 274 of the terminal device 2 of each of the other users displays a notification screen, based on the received information about the communication group. The display processing unit 274 displays a group selection screen 710 (FIG. 7B) for participating in the communication service on the display device 23 depending on the selection of a predetermined object in the notification screen by the user. This is the end of the starting process. The display processing unit 274 of the terminal device 2 of each of the other users may include a participation button 805 described later in the notification screen. This enables the other users to immediately participate in the communication service without displaying the group selection screen 710.

The starting process may be performed in the case where the creation button 603 of the group creation screen 600 is selected by the user who operates the input device 24. That is, the starting process of the communication service may be started depending on the selection of the creation button 603 by the user such that the new group that is created on the group creation screen 600 is the communication group. In this case, the information exchange screen 700 is not displayed.

Figure 6B:
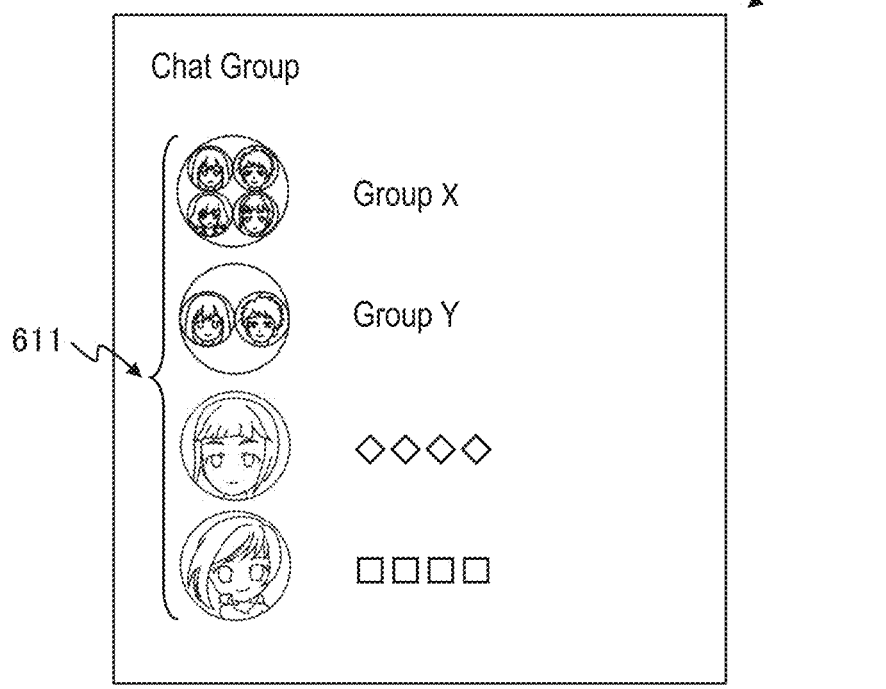

The starting process is not limited to the starting process of the communication service such that the new group that is created on the group creation screen 600 is the communication group. For example, the starting process of the communication service may be performed such that a group that has been already created is the communication group. For example, FIG. 6B illustrates an example of a group selection screen 610 for selecting the communication group that is created by any one of the users. For example, the group selection screen 610 is displayed in the case where a group selection object of the home screen that is displayed depending on running of the control program that is stored in the terminal storage device 22 is selected by the user who operates the input device 24.

The group selection screen 610 that is displayed on the terminal device 2 of the user includes a group display region 611 for selecting any one of the multiple communication groups. Group information that represents each of the created communication groups to which the users belong is displayed in the group display region 611. In an example illustrated in FIG. 6B, the display processing unit 274 of the terminal device 2 of the user displays the thumbnail images of the user members of the communication group and the name of the group as the group information. In the example illustrated in FIG. 6B, the thumbnail images of the other users among the user members are displayed, but the thumbnail images of all of the user members may be displayed. In the case where only another user other than the user belongs to the communication group, as illustrated in FIG. 6B, the name of the other user may be displayed instead of the name of the group.

After a single piece of the group information that is included in the group display region 611 is selected by the user who operates the input device 24, the information exchange screen 700 for the user members of the communication group that corresponds to the selected group information is displayed. The information exchange screen 700 includes information such as the text or the image that is inputted from each user member of the communication group. Also, in this case, the instruction for displaying the information exchange screen and the information about the communication group are transmitted to the terminal devices 2 of the other users among the user members of the communication group via the server device 3, and the information exchange screen 700 is displayed also on the terminal devices 2 of the other users.

In the case where the start object 704 is selected by the user on the information exchange screen 700, the starting process of the communication service for the communication group that exchanges information on the information exchange screen 700 is performed. After the starting process is performed, the display processing unit 274 of the terminal device 2 of the user displays the communication screen 810 (FIG. 8B) that can be displayed by the terminal device 2 of each user who belongs to the communication group. The display processing unit 274 of the terminal device 2 of each of the other users displays the notification screen and displays the group selection screen 710 (FIG. 7B) for participating in the communication service on the display device 23 depending on an operation of the other user on the notification screen. Also, in this case, the display processing unit 274 of the terminal device 2 of the other user may include the participation button 805 described later in the notification screen.

Also, in this case, the starting process may be performed in the case where a single piece of the group information is selected by the user who operates the input device 24 on the group selection screen 610. That is, the starting process of the communication service for the communication group that corresponds to the selected group information may be performed depending on the selection of the single piece of the group information by the user. In this case, the information exchange screen 700 is not displayed.

Figure 7B:
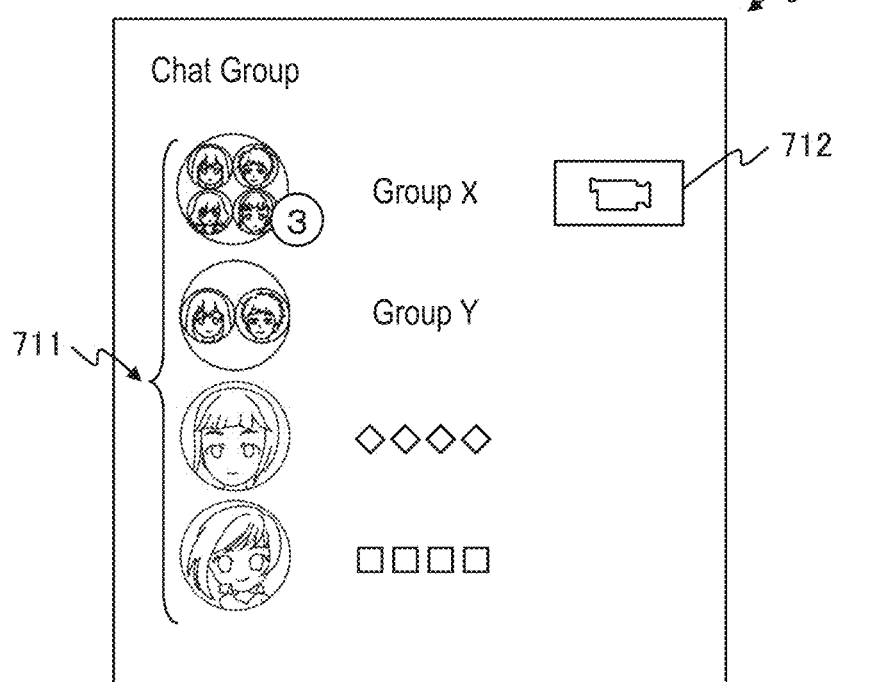

Subsequently, how a user who does not participate in the started communication service participates therein will now be described. FIG. 7B illustrates an example of the group selection screen 710 that is displayed on the display device 23 of the terminal device 2 of the user. For example, the group selection screen 710 is displayed depending on the selection of a predetermined object on the displayed notification screen. The group selection screen 710 may be displayed in the case where the group selection object of the home screen that is displayed depending on the running of the control program that is stored in the terminal storage device 22, for example, is selected by the user who operates the input device 24.

The group information that represents the communication group that starts the communication service is displayed in a group display region 711 of the group selection screen 710 so as to be distinguishable from the other group information. In an example illustrated in FIG. 7B, the group information that is displayed at the uppermost position represents the communication group that starts the communication service. For example, information that represents the number of the user members who participate in the communication service is displayed so as to overlap the thumbnail images of the user members of the communication group or near there. A mark image 712 that represents the communication service is displayed near the name of the communication group.

After the group information that represents the communication group that starts the communication service is selected by the user who operates the input device 24 from the group information that is included in the group display region 711, an information exchange screen 800 for the user members of the communication group that corresponds to the selected group information is displayed.

FIG. 8A illustrates an example of the information exchange screen 800 that is displayed on the display device 23 of the terminal device 2 of the user. The information exchange screen 800 includes display regions 801a to 801b in which information such as the text or the image that is inputted from each user member of the communication group that starts the communication service is displayed, information 802a to 802b (such as the thumbnail images of the character objects) that represents the user members who input the information that is displayed in the display regions

801a to 801b, an input object 803 for the user who inputs a text or an image that is to be displayed into a new display region 801, a service display region 804 that represents the started communication service, and the participation button 805 for participating in the started communication service.

The thumbnail images of the character objects of three users who participate in the communication service are displayed in the service display region 804 illustrated in FIG. 8A. Information that represents the start of the communication service is displayed in the display region 801b illustrated in FIG. 8A. The participation button 805 is selected by the user, and consequently, a participating process is performed. An example of the participating process will now be described.

After the participation button 805 is selected by the user who operates the input device 24, the display processing unit 274 of the terminal device 2 of the user first stores the user ID of the user that is stored in the terminal storage device 22 in the terminal storage device 22 as the user ID of the user who participates in the communication service related to the service display region 804. Subsequently, the display processing unit 274 displays the communication screen 810 (FIG. 8B) including the user output images of all of the users who participate in the communication service.

Subsequently, the transmission unit 272 of the terminal device 2 of the user transmits an instruction for participating in the communication service to the server device 3 together with the user ID of the user that is stored in the terminal storage device 22, the information about the communication group, and/or the destination information via the terminal communication I/F 21. The information about the communication group is the group ID and name of the communication group, and the user IDs of the user members. The destination information includes the user IDs of the other users other than the user who operates the terminal device 2 among the user members of the communication group. The server reception unit 331 of the server device 3 receives the instruction for participating, the user ID, the information about the communication group and/or the destination information via the server communication I/F 31. The server transmission unit 332 of the server device 3 transmits the instruction for participating, the user ID, and the information about the communication group to the terminal devices 2 of the other users that are represented by the user IDs that are included in the destination information via the server communication I/F 31.

The reception unit 273 of the terminal device 2 of each of the other users receives, from the server device 3, the instruction for participating, the user ID, and the information about the communication group that are transmitted from the terminal device 2 of the user. The reception unit 273 stores the received user ID in the terminal storage device 22 as the user ID of the user who participates in the communication service. In the case where the communication screen 810 is displayed on the terminal device, the display processing unit 274 of the terminal device 2 of the other user displays the communication screen 810 including the user output images of all of the users who participate in the communication service. This is the end of the participating process.

A selecting process may be performed in the case where the group information is selected by the user who operates the input device 24 on the group selection screen 710. That is, the participating process for the communication service in which the communication group that corresponds to the group information can participate may be performed depending on the selection of the group information by the user. In this case, the information exchange screen 800 is not displayed.

An embodiment of the start of or the participation in the communication service is not limited to the examples described above. For example, another starting process that differs from the starting process depending on the selection of the start object 704 by the user may be performed. The other starting process is performed in the case where a predetermined display object for specifying the start of the communication service is selected by the user on a predetermined screen such as the home screen. The predetermined display object may be displayed in the case where the thumbnail image of the character object of the user, for example, is selected and may be included in menu items of the predetermined screen. The other starting process may be automatically performed in the case where a predetermined start condition is satisfied. Examples of the predetermined start condition include that the current time becomes a predetermined time, a predetermined time has passed after the previous communication service ends, and the number of the mutual followers of the user exceeds a predetermined number. An example of the other starting process will now be described.

The transmission unit 272 of the terminal device 2 of the user first transmits the instruction for starting the communication service to the server device 3 together with the user ID of the user that is stored in the terminal storage device 22 and/or the destination information via the terminal communication I/F 21. The transmission unit 272 stores the user ID of the user in the terminal storage device 22 as the user ID of the user who participates in the communication service. The destination information includes the user ID of another user or the user IDs of multiple other users who have a predetermined relationship with the user. For example, the destination information may include the user ID of another user or the user IDs of multiple other users who are the mutual followers of the user. The destination information may include the user ID of another user who has a mutual follower relationship with a user who is the mutual follower of the user instead of or in addition to the user ID of the other user or the user IDs of the multiple other users who are the mutual followers of the user.

The server reception unit 331 of the server device 3 receives the instruction for starting, the user ID, and/or the destination information via the server communication I/F 31. The server transmission unit 332 of the server device 3 transmits the instruction for starting, the user ID, and the destination information to the terminal devices 2 of the other users that are represented by the user IDs that are included in the destination information via the server communication I/F 31. The reception unit 273 of the terminal device 2 of each of the other users receives, from the server device 3, the instruction for starting, the user ID, and the destination information that are transmitted from the terminal device 2 of the user. The reception unit 273 stores the transmitted user ID in the terminal storage device 22 as the user ID of the user who participates in the communication service. The display processing unit 274 of the terminal device 2 of the other user displays the notification screen on the display device 23, based on the received user ID. For example, the notification screen includes information for prompting the user represented by the received user ID to participate in the communication service and a participation button.

After the participation button in the notification screen is selected by the other user who operates the input device 24, the display processing unit 274 of the terminal device 2 of the other user stores the user ID of the other user that is stored in the terminal storage device 22 in the terminal storage device 22 as the user ID of the user who participates in the communication service related to the service display region 804. Subsequently, the display processing unit 274 displays the communication screen 810 (FIG. 8B) including the user output images of all of the users who participate in the communication service.

Subsequently, the transmission unit 272 of the terminal device 2 of the other user transmits the instruction for participating in the communication service to the server device 3 together with the user ID of the other user that is stored in the terminal storage device 22 and/or the destination information via the terminal communication I/F 21. The destination information is acquired by removing the user ID of the other user of the terminal device 2 that is to transmit the destination information from the user IDs that are included in the destination information that is received by the reception unit 273 and adding the user ID that is received by the reception unit 273. The server reception unit 331 of the server device 3 receives the instruction for participating, the user ID, and/or the destination information via the server communication I/F 31. The server transmission unit 332 of the server device 3 transmits the instruction for participating, the user ID, and the destination information to the terminal devices 2 of the other users that are represented by the user IDs that are included in the destination information via the server communication I/F 31.

The reception unit 273 of the terminal device 2 of each of the users to which the instruction for participating is transmitted receives, from the server device 3, the instruction for participating, the user ID, and the destination information that are transmitted from the terminal device 2 of the user. The reception unit 273 stores the received user ID in the terminal storage device 22 as the user ID of the user who participates in the communication service. In the case where the communication screen 810 is displayed on the terminal device 2, the display processing unit 274 of the terminal device 2 displays the communication screen 810 including the user output images of all of the users who participate in the communication service. This is the end of the participating process.

An embodiment of the start of or the participation in the communication service with the other users who have the predetermined relationship with the user is not limited to the examples described above. For example, in the case where the predetermined display object for specifying the start of the communication service by the user is selected by the user, the selection screen including the information that represents one or multiple other users who are the mutual followers of the user may be displayed. In this case, after the information that represents any one of the other users is selected by the user, another starting process based on the instruction for starting communication with the selected other user may be performed. Also, in this case, the information exchange screen for the selected other user may be displayed, a start button in the information exchange screen may be selected, and consequently, the other starting process based on the instruction for starting the communication with the other user may be performed.

As for the existing information system, a user cannot input an instruction for starting communication with another user who has a predetermined relationship with the user such as a mutual follower of the user and/or an instruction for participating therein by using a simple interface. The information system 1 disclosed according to the present embodiment performs the other starting process described above. Consequently, a user interface related to the instruction for starting the communication and/or the instruction for participating therein can be improved, and the communication load between the server device 3 and the terminal devices 2 can be reduced.

FIG. 8B illustrates an example of the communication screen 810 that is displayed on the display device 23 of each terminal device 2. The communication screen 810 is the communication screen of the communication group that includes the user who operates the terminal device 2 as the user member. In the following description, the user who operates the terminal device 2 is referred to as the user A, and users who participate in the communication service related to the communication screen 810 other than the user A are referred to as a user B1, a user B2, a user B3 and so on. In some cases, the user B1, the user B2, the user B3, and so on are referred to as the users B.

The communication screen 810 includes at least a user output image 812a including a character object 811a of the user A. In an example illustrated in FIG. 8B, three users (the user B1, the user B2, and the user B3) other than the user A participate in the communication service. That is, the communication screen 810 includes user output images 812b1, 812b2, and 812b3 including character objects 811b1, 811b2, and 811b3 of the user B1, the user B2, and the user B3. In the following description, the character objects 811b1, 811b2, and 811b3 are referred to as the character objects 811b, and the user output images 812b1, 812b2, and 812b3 are referred to as the user output images 812b in some cases. The users B are the other users for the user A. The user output images 812b of the users B that are displayed on the terminal device 2 of the user A are the other-user output images.

In the case where no users other than the user A participate in the communication service, the communication screen 810 includes only the user output image 812a, and the user output image 812b of one of the users B is added into the communication screen 810 whenever the user B participates in the communication service. The upper limit of the number of the users who can participate in the communication service is not limited. For example, in the case where nine users B other than the user A participate in the communication service, the communication screen 810 includes the user output images 812b1, 812b2, and 812b3 to 812b9 of the nine users B together with the user output image 812a of the user A.

The character object 811a is the animation (video image) of the character object of the user A that is generated by the display processing unit 274, based on the motion data of the user A that is generated by the generation unit 271, the use object, and the character object associated with the user ID of the user A in the user table T1. The motion data of the user A that is generated by the generation unit 271 is the same as the motion data that is included in the output information that is transmitted to the terminal devices 2 of the users B. The output information about the user A includes the voice data of the user A together with the motion data of the user A. In the case where the motion data of the user A that is generated by the generation unit 271 includes the face motion data of the user A, the user output image 812a including the character object 811a that changes the expression in synchronization with a change in the expression of the user A is displayed. For example, when the voice sounds from the user A, the user output image 812a including the character object 811a that moves the lips is displayed. In the case where the motion data of the user A that is generated by the generation unit 271 includes the body motion data of the user A, the user output image 812*a* including the character object 811*a* that moves a corresponding portion in synchronization with the motion of the body of the user A is displayed.

The transmission unit 272 of the terminal device 2 of the user A transmits the output information about the user A to the server device 3 together with the destination information (the user IDs of the users B (the user B1 to the user B3) who belong to the communication group) via the terminal communication I/F 21. Subsequently, the server reception unit 331 of the server device 3 receives the output information about the user A that is transmitted from the terminal device 2 of the user A via the server communication I/F 31. Subsequently, the server transmission unit 332 of the server device 3 refers the received user IDs of the users B (the user B1 to the user B3) and transmits the output information about the user A to the terminal devices 2 of the users B (the user B1 to the user B3) via the server communication I/F 31. After the reception unit 273 of the terminal device 2 of each of the users B receives the output information via the terminal communication I/F 21, the display processing unit 274 of the terminal device 2 of the user B displays the user output image 812*a* including the character object 811*a*, based on the motion data of the user A that is represented by the user ID that is included in the output information.

The character objects 811*b* are the animations (video images) of the character objects of the users B that are generated by the display processing unit 274, based on the motion data that is included in the output information about the users B that is received by the reception unit 273 and the character objects that are associated with the user IDs of the users B in the user table T1. In the case where the motion data of the users B that is received by the reception unit 273 includes the face motion data of the users B, the user output images 812*b* including the character objects 811*b* that change the expression in synchronization with a change in the expression of the users B are displayed. For example, in the case where the voices sound from the users B, the user output images 812*b* including the character objects 811*b* that move the lips are displayed. In the case where the motion data of the users B that is generated by the generation unit 271 includes the body motion data of the users B, the user output images 812*b* including the character objects 811*b* that move corresponding portions in synchronization with the motion of the bodies of the users B are displayed. In the case where the output information about the users B that is received by the reception unit 273 includes the voice data of the users B, the display processing unit 274 displays the user output images 812*b*, and the voice output unit 275 outputs the voices of the users B that are generated based on the voice data.

The communication screen 810 including the user output image 812*a* and the user output images 812*b* is thus displayed, and consequently, the user A can hear the voices of the users B while viewing the character objects 811*b* of the users B such that the voices sound. The character object and voice data of the user A is outputted by the terminal devices 2 of the users B. Consequently, the user A and the users B who participate in the communication service can communicate with each other by using each character object.

The communication screen 810 includes an addition button 813 and a game button 814. In the example illustrated in FIG. 8B, the addition button 813 and the game button 814 are placed in the display region of the user output image 812*a* but may be displayed outside the display region of the user output image 812*a*. In the case where a predetermined display condition is satisfied, the addition button 813 and the game button 814 may be controlled by the display processing unit 274 so as to be displayed only for a predetermined time.

The addition button 813 is an object image such as a button object for instructing for displaying a selection screen 1200 for selecting the additional object that is added into the communication screen 810. After the addition button 813 is selected by the user A who operates the input device 24, the selection screen 1200 is displayed. The selection screen 1200 will be described in detail later.

The game button 814 is an object image such as a button object for instructing for starting the game. After the game button 814 is selected by the user A who operates the input device 24, the input device 24 inputs an instruction for starting the game into the display processing unit 274. After the instruction for starting the game that is inputted from the input device 24 is acquired, the terminal processing device 27 implements various instructions that are included in the control program (game program) that is stored in the terminal storage device 22. Consequently, the display processing unit 274 of the terminal processing device 27 starts the game and fulfills a function of displaying a game display object 1500 (FIG. 15A) including the game screen of the started game on the display device 23. The game display object 1500 including the game screen will be described in detail later.

In the case where the user A wishes to wear a new wearable object on the character object 811*a* or in the case where the user A wishes to change the wearable object that is worn on the character object 811*a* into a new wearable object, the character object 811*a* is selected. After the character object 811*a* is selected by the user A who operates the input device 24, the display of the communication screen 810 ends, and a communication screen 900 (FIG. 9A) is displayed. The communication screen 900 may be displayed in the case where the user output image 812*a* is selected by the user A who operates the input device 24.

Figure 9A:
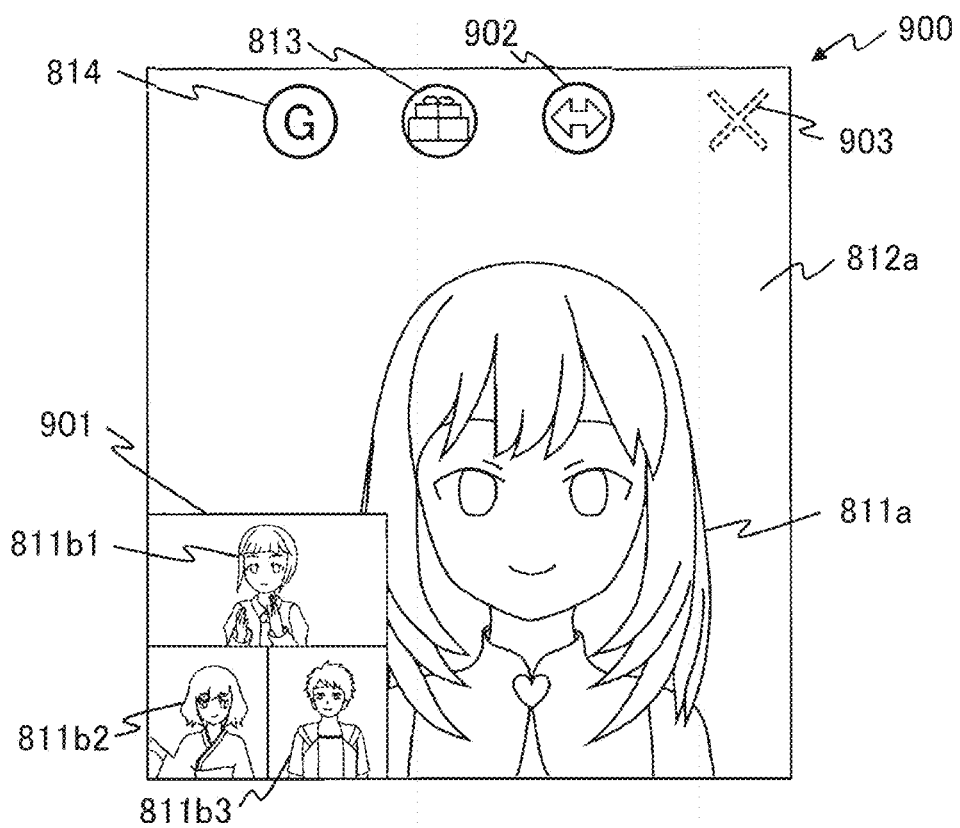
FIG. 9A and FIG. 9B illustrate examples of the screen that is displayed on the display device of the terminal device according to the First Example of the present disclosure.

FIG. 9A illustrates another example of the communication screen 900 that is displayed on the display device 23 of the terminal device 2. The communication screen 900 is displayed in the case where the character object 811*a* or the user output image 812*a* that is included in the communication screen 810 (FIG. 8B) is selected by the user A who operates the input device 24.

The user output image 812*a* including the character object 811*a* of the user A is displayed on the entire surface of the communication screen 900. A user output image 901 including the character objects 811*b*1, 811*b*2, and 811*b*3 of the user B1, the user B2, and the user B3 is displayed so as to overlap the user output image 812*a*. The user output image 901 may not be displayed on the communication screen 900. In this case, the voice data of the user B1, the user B2, and the user B3 may be outputted.

The communication screen 900 includes a change button 902 and a screen end button 903 together with the addition button 813 and the game button 814. The communication screen 900 may not include the addition button 813 and the game button 814.

Figure 9B:
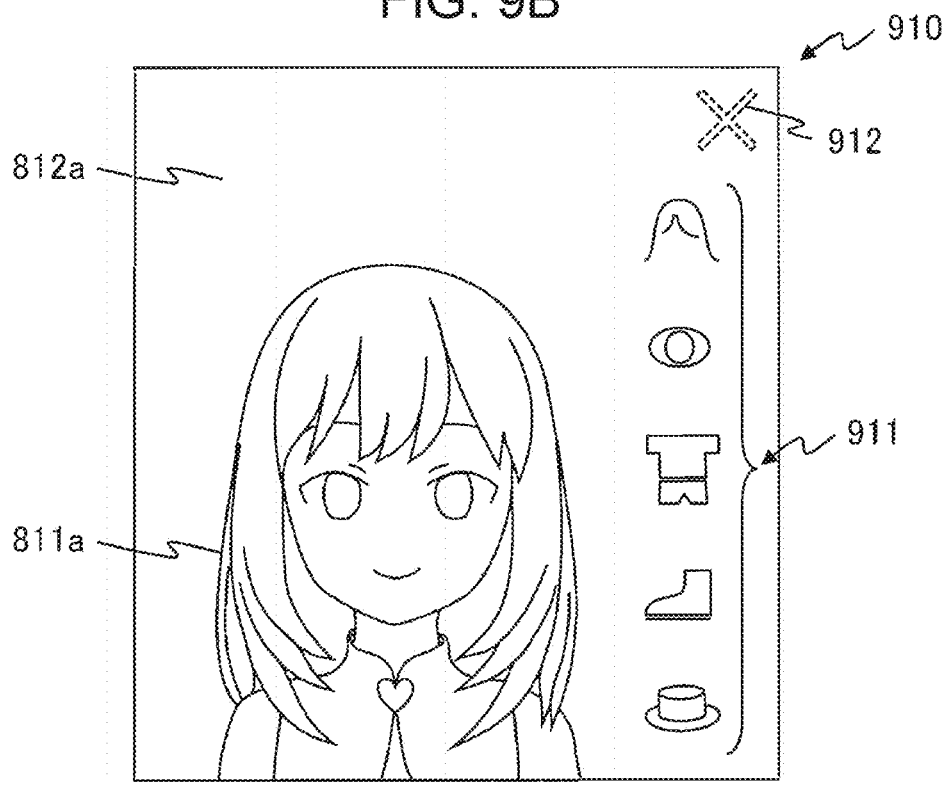

The change button 902 is an object image such as a button object for instructing for displaying a selection screen 910 (FIG. 9B). After the change button 902 is selected by the user A who operates the input device 24, the selection screen 910 for selecting the new wearable object that is to be worn on the character object 811*a* is displayed. The selection screen 910 will be described in detail later.

The screen end button 903 is an object image such as a button object for instructing for ending the display of the communication screen 900. After the screen end button 903 is selected by the user A who operates the input device 24, the display of the communication screen 900 ends, and the communication screen 810 (FIG. 8B) is displayed.

FIG. 9B illustrates an example of the selection screen 910 that is displayed on the display device 23 of the terminal device 2. The user output image 812a including the character object 811a of the user A is displayed on the entire surface of the selection screen 910 as in the communication screen 900 (FIG. 9A). The selection screen 910 includes placement candidate objects 911 and a screen end button 912.

As illustrated in the object table T2, the placement position at which each wearable object is placed is a placement position among multiple predetermined placement positions. In an example illustrated in FIG. 9B, the selection screen 910 includes the multiple placement candidate objects 911 that represent the respective placement positions. The multiple placement candidate objects 911 may correspond to multiple categories (kinds) to which the wearable objects belong. The number of the placement candidate objects 911 that are displayed on the selection screen 910 is not limited to 5. In the case where a part of an image that represents the multiple placement candidate objects 911 cannot be included within the selection screen 910, the display processing unit 274 of the terminal device 2 may display the placement candidate objects 911 in a scrollable manner. In this case, the placement candidate objects 911 that are not currently displayed within the selection screen 910 are displayed within the selection screen 910 by scrolling depending on a swiping operation (such as an operation of moving a finger upward from below the screen with the finger being in contact with the screen) of the user A. The user A first selects the placement position of the wearable object to be worn on the character object 811a. That is, after any one of the multiple placement candidate objects 911 is selected by the user A who operates the input device 24, a selection screen 1000 for selecting the wearable object of the user A that is associated with a placement candidate that corresponds to the selected placement candidate object 911 is displayed.

The screen end button 912 is an object image such as a button object for instructing for ending the display of the selection screen 910. After the screen end button 912 is selected by the user A who operates the input device 24, the display of the selection screen 910 ends, and the communication screen 810 (FIG. 8B) is displayed.

Figure 10A:
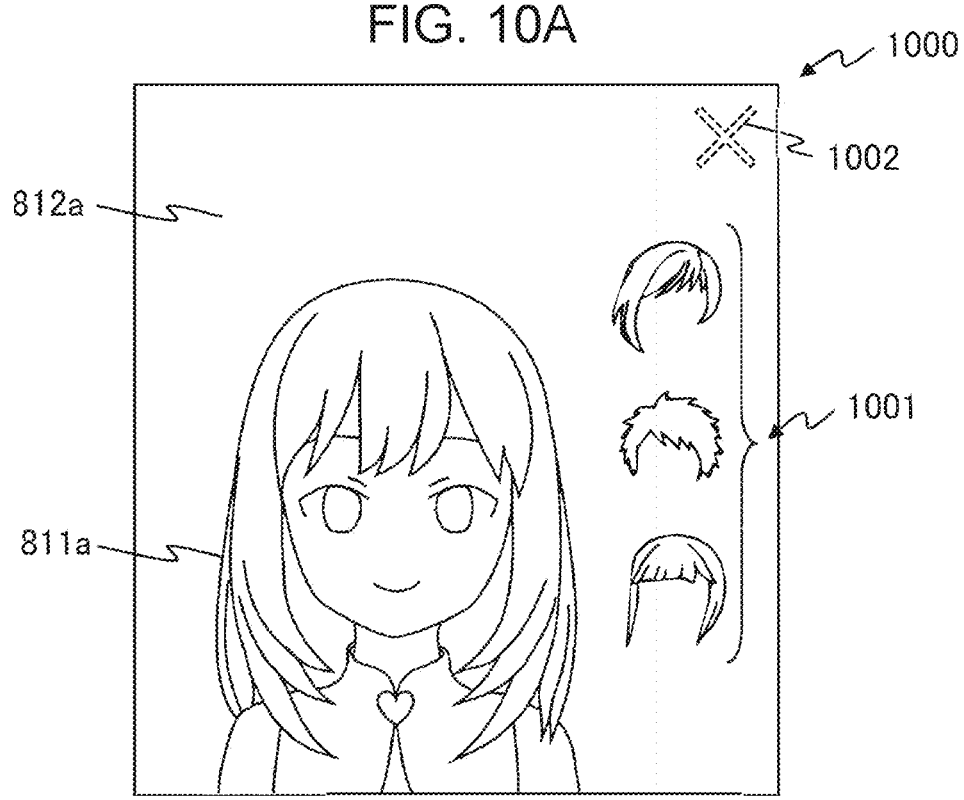
FIG. 10A and FIG. 10B illustrate examples of the screen that is displayed on the display device of the terminal device according to the First Example of the present disclosure.

FIG. 10A illustrates an example of the selection screen 1000 that is displayed on the display device 23 of the terminal device 2. The user output image 812a including the character object 811a of the user A is displayed on the entire surface of the selection screen 1000 as in the communication screen 900 (FIG. 9A). The selection screen 1000 includes wearable candidate objects 1001 that are candidates for the wearable object to be worn on the character object 811a and a screen end button 1002.

The wearable candidate objects 1001 are selection objects that correspond to the object IDs of the owned objects of the user A that are associated with the placement candidate that corresponds to the placement candidate object 911 that is selected on the selection screen 910 (FIG. 9B). In an example illustrated in FIG. 10A, the selection screen 1000 includes three wearable candidate objects 1001 that correspond to the object IDs of three owned objects. The number of the wearable candidate objects 1001 that are displayed on the selection screen 1000 is not limited to 3. In the case where a part of an image that represents the multiple wearable candidate objects 1001 cannot be included within the selection screen 1000, the display processing unit 274 of the terminal device 2 may display the wearable candidate objects 1001 in a scrollable manner. In this case, the wearable candidate objects 1001 that are not currently displayed within the selection screen 1000 are displayed within the selection screen 1000 by scrolling depending on the swiping operation (such as the operation of moving a finger upward from below the screen with the finger being in contact with the screen) of the user A.

After any one of the multiple wearable candidate objects 1001 is selected by the user A who operates the input device 24, the input device 24 inputs an instruction for changing into the terminal processing device 27. The input device 24 inputs the object ID that corresponds to the selected wearable candidate object 1001 into the terminal processing device 27 together with the instruction for changing. An example of a changing process depending on the instruction for changing will now be described.

After the instruction for changing and the object ID that are inputted from the input device 24 are acquired, the display processing unit 274 associates the acquired object ID with the user ID of the user A and stores the object ID in the user table T1 as the use object. In the case where the object ID of another use object to be worn at the same wearing position as the wearable object of the acquired object ID is stored in the user table T1, the display processing unit 274 deletes the object ID of the other use object from the user table T1, associates the acquired object ID with the user ID of the user A, and stores the object ID in the user table T1 as the use object. The display processing unit 274 generates a user output image 1012a including the animation (video image) of a character object 1011a of the user A, based on the motion data of the user A that is generated by the generation unit 271 and the character object and the use object that are associated with the user ID of the user A in the user table T1 and displays a selection screen 1010 (FIG. 10B) including the user output image 1012a. Consequently, the user output image 1012a including the character object 1011a that wears the new wearable object is displayed.

After the instruction for changing and the object ID that are inputted from the input device 24 are acquired, the transmission unit 272 transmits information that represents the instruction for changing to the server device 3 via the terminal communication I/F 21 together with the user ID of the user A that is stored in the terminal storage device 22, the acquired object ID, and the destination information (the user IDs of the users B (the user B1 to the user B3)). Subsequently, the server reception unit 331 of the server device 3 receives the information that represents the instruction for changing, the user ID of the user A, the object ID, and the destination information via the server communication I/F 31. Subsequently, the server transmission unit 332 of the server device 3 transmits the information that represents the instruction for changing, the user ID of the user A, and the object ID to the terminal devices 2 of the users B (the user B1 to the user B3) via the server communication I/F 31. After the information that represents the instruction for changing, the user ID of the user A, and the object ID are received via the terminal communication I/F 21, the reception unit 273 of the terminal device 2 of each of the users B associates the received object ID with the user ID of the user A and stores the object ID in the user table T1 as the use object. The display processing unit 274 of the terminal device 2 of the user B generates the user output image 1012a including the animation (video image) of the character object 1011a of the user A, based on the received motion data of the user A, the character object and the use object that are associated with the user ID of the user A in the user table T1 and displays a communication screen 1110 (FIG. 11B) including the user output image 1012a. Consequently, the user output image 1012a including the character object 1011a that wears the new wearable object is displayed also on the terminal devices 2 of the users B. This is the end of the changing process.

The screen end button 1002 is an object image such as a button object for instructing for ending the display of the selection screen 1000. After the screen end button 1002 is selected by the user A who operates the input device 24, the display of the selection screen 1000 ends, and the communication screen 810 (FIG. 8B) is displayed. After any one of the multiple wearable candidate objects 1001 is selected by the user A who operates the input device 24, the changing process described above may be performed, the display of the selection screen 1000 may end, and the communication screen 1110 (FIG. 11B) including the user output image 1012a including the character object 1011a that wears the new wearable object may be displayed.

Figure 10B:
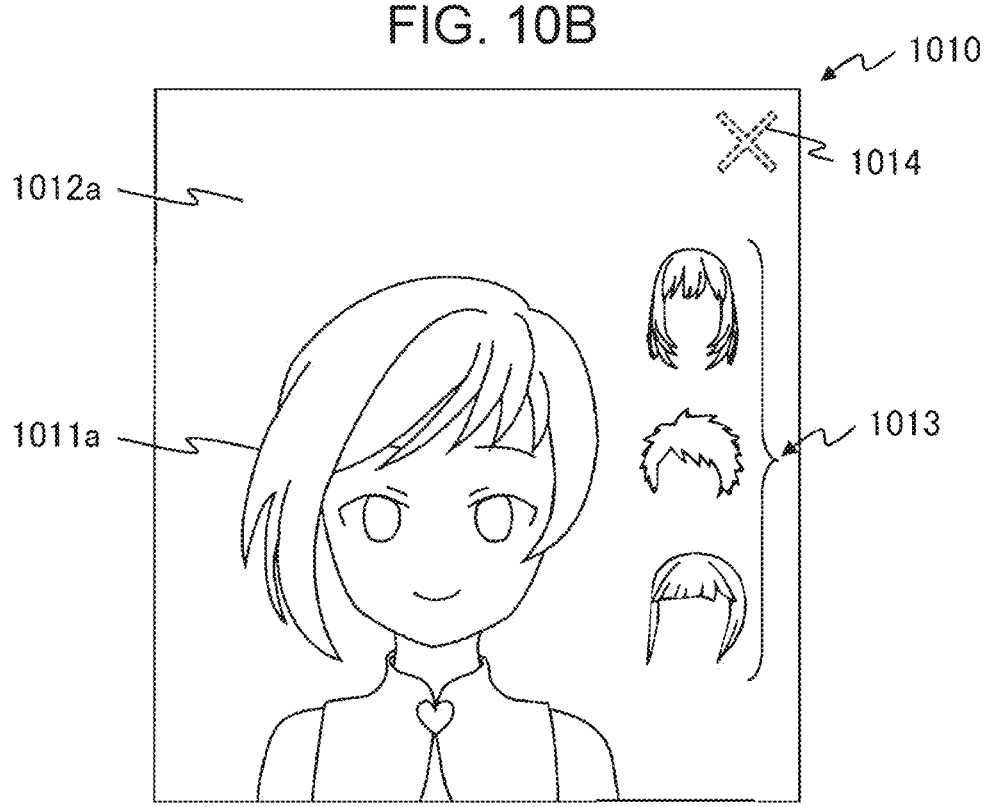

FIG. 10B illustrates an example of the selection screen 1010 that is displayed on the display device 23 of the terminal device 2. The user output image 1012a including the character object 1011a of the user A is displayed on the entire surface of the selection screen 1010 as in the selection screen 1000 (FIG. 10A). The selection screen 1010 includes wearable candidate objects 1013 that are candidates for the wearable object to be worn on the character object 1011a and a screen end button 1014 as in the selection screen 1000. The character object 1011a is the character object of the user after the instruction for changing is inputted on the selection screen 1000 (FIG. 10A). The wearable candidate objects 1013 are the selection objects that correspond to the object IDs of the owned objects of the user A that are associated with the same placement position as the wearable candidate objects 1001 on the selection screen 1000. The character object 1011a wears the wearable object that corresponds to the single wearable candidate object 1001 among the wearable candidate objects 1001 on the selection screen 1000 (FIG. 10A), and accordingly, the wearable candidate object that corresponds to the wearable object that is worn on the character object 1011a is not included in the wearable candidate objects 1013. The wearable candidate object that corresponds to the wearable object that is worn on the character object 1011a may be included in the wearable candidate objects 1013. In this case, the wearable candidate object that corresponds to the worn wearable object may be grayed out so as not to be selected by the user A.

The screen end button 1014 is an object image such as a button object for instructing for ending the display of the selection screen 1010. After the screen end button 1014 is selected by the user A who operates the input device 24, the display of the selection screen 1010 ends, the communication screen 1110 (FIG. 11B) including the user output image 1012a including the character object 1011a that wears the new wearable object is displayed. A determination button may be displayed on the selection screen 1010. After the determination button is selected by the user A who operates the input device 24, the display of the selection screen 1010 ends, and the communication screen 1110 (FIG. 11B) including the user output image 1012a including the character object 1011a that wears the new wearable object may be displayed. In this case, after the screen end button 1014 is selected by the user A who operates the input device 24, the display of the selection screen 1010 may end, and the communication screen 810 (FIG. 8B) including the user output image 812a including the character object 811a before the changing process may be displayed.

Figure 11A:
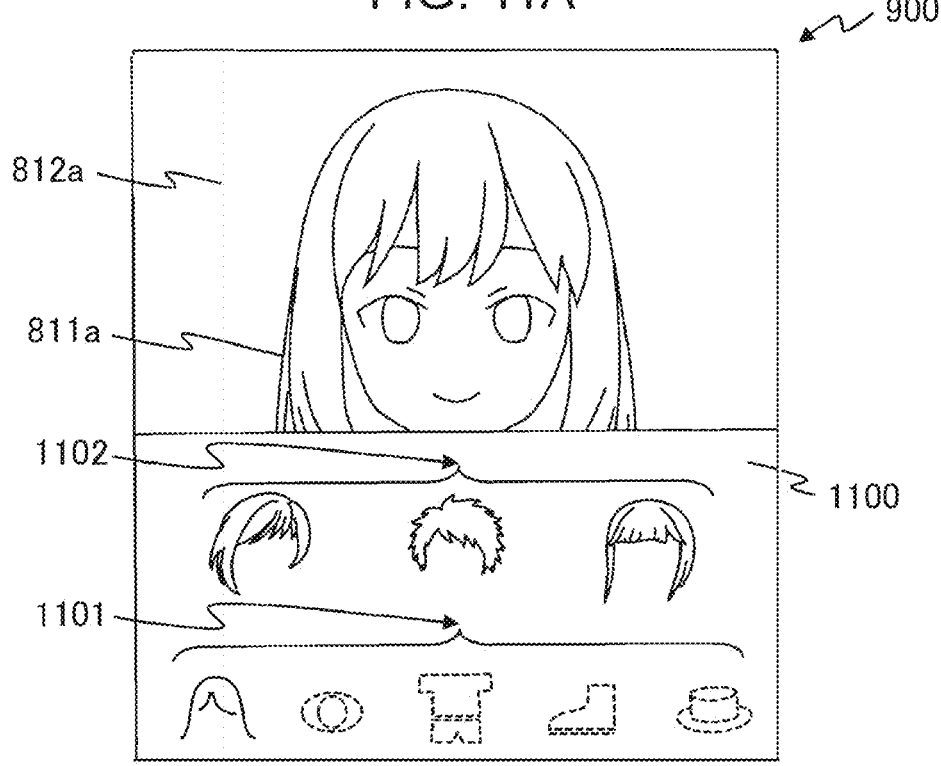
FIG. 11A and FIG. 11B illustrate examples of the screen that is displayed on the display device of the terminal device according to the First Example of the present disclosure.

The screen that is displayed in the case where the change button 902 of the communication screen 900 is selected by the user A who operates the input device 24 is not limited to the selection screen 910, and a selection screen 1100 may be displayed. FIG. 11A is an example of the selection screen 1100 that is displayed on the display device 23 of the terminal device 2.

The selection screen 1100 illustrated in FIG. 11A is displayed so as to overlap the communication screen 900. The selection screen 1100 may be displayed after the display of the communication screen 900 ends.

The selection screen 1100 includes multiple placement candidate objects 1101 that represent the respective placement positions and wearable candidate objects 1102 that are candidates for the wearable object to be worn on the character object 811a. After any one of the multiple placement candidate objects 1101 is selected by the user A who operates the input device 24, the selection screen 1100 includes the wearable candidate objects 1102 that correspond to the object IDs of the owned objects of the user A that are associated with a placement candidate that corresponds to the selected placement candidate object 1101. After any one of the multiple wearable candidate objects 1102 is selected by the user A who operates the input device 24, the input device 24 inputs the instruction for changing into the terminal processing device 27, the changing process described above is performed, and the display processing unit 274 displays the communication screen 1110 (FIG. 11B) including the user output image 1012a including the character object 1011a that wears the new wearable object.

Figure 11B:
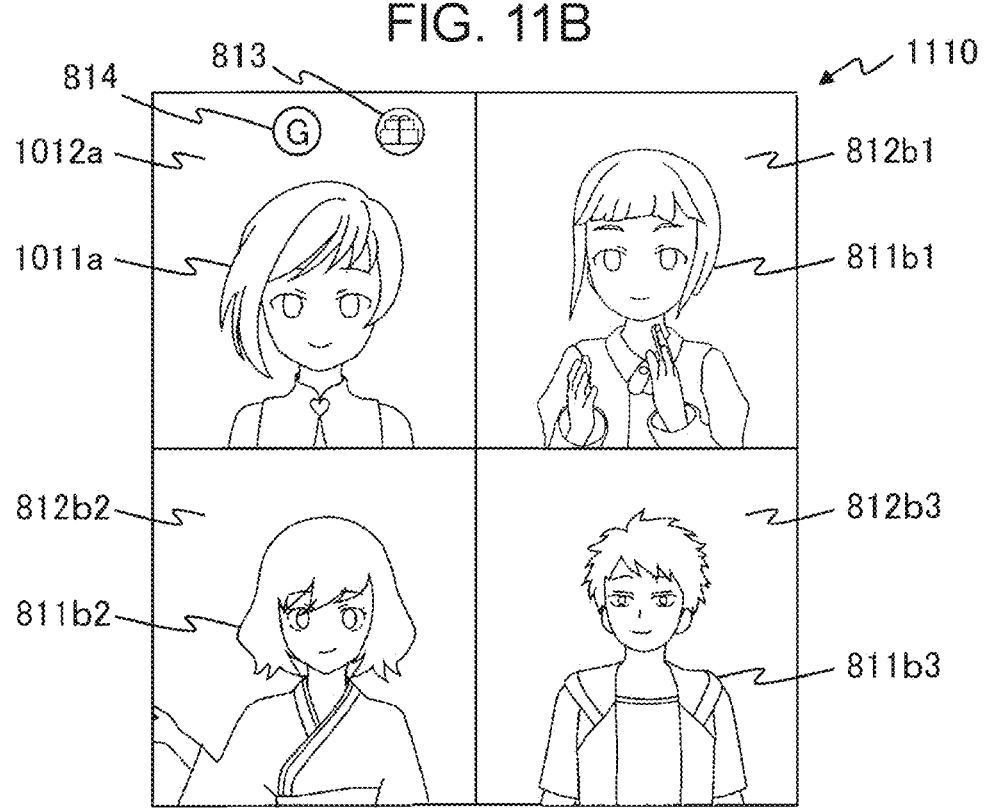

FIG. 11B illustrates another example of the communication screen 1110 that is displayed on the display device 23 of the terminal device 2. The communication screen 1110 includes at least the user output image 1012a including the character object 1011a of the user A that wears the new wearable object.

The communication screen 1110 includes the user output images 812b1, 812b2, and 812b3 including the character objects 811b1, 811b2, and 811b3 of the user B1, the user B2, and the user B3 who participate in the communication service as in the communication screen 810 (FIG. 8B).

After the instruction for changing that is inputted from the users B who participate in the communication service is inputted into the terminal devices 2 of the users B, the changing process depending on the instruction for changing that is inputted from the users B is performed by the terminal devices 2 of the users B and the terminal device 2 of the user A. Consequently, the user output images including the character objects of the users B that wear the new wearable objects are displayed on the terminal devices 2 of the users B and the terminal device 2 of the user A.

As illustrated with reference to FIG. 8B to FIG. 11B, the character object of the user A is at least partly changed depending on the instruction for changing from the user A, or the character objects of the users B are at least partly changed depending on the instruction for changing from the users B. This prevents the user A and the users B from getting bored during the communication by using the character objects and improves the willingness of the users to continuously use communication between the user A and the users B.

As for the existing information system, a user needs to suspend a communication service to change an output image including a character object after communication with another user starts by using the character object. It is necessary to start a function of changing the appearance of the character object and/or an image such as a background in the output image including the character object after the communication service is suspended. The user needs to perform a complex procedure for participating in the communication service again after the character object and/or the output image is changed by using the function of changing. In contrast, the information system 1 according to the present embodiment can change the character object of the user without suspending communication by using the character object and without re-setting the character object of the user. Consequently, as for the information system 1 according to the present embodiment, the user interface for changing the character object of the user during the communication is not complex, and accordingly, the usability can be improved unlike the existing information system. The information system 1 according to the present embodiment can change the character object of the user without suspending the communication and can accordingly reduce the number of the communication between the server device 3 and the terminal device 2 and the amount of the communication. The information system 1 according to the present embodiment can thus improve the communication between the server device 3 and the terminal device 2.

Returning to FIG. 8B, in the case where the user output image 812*b* of at least one of the users B is to be changed by adding the additional object into the user output image 812*b* of at least one of the users B, the user A selects the addition button 813. After the addition button 813 is selected by the user A who operates the input device 24, the selection screen 1200 is displayed.

Figure 12A:
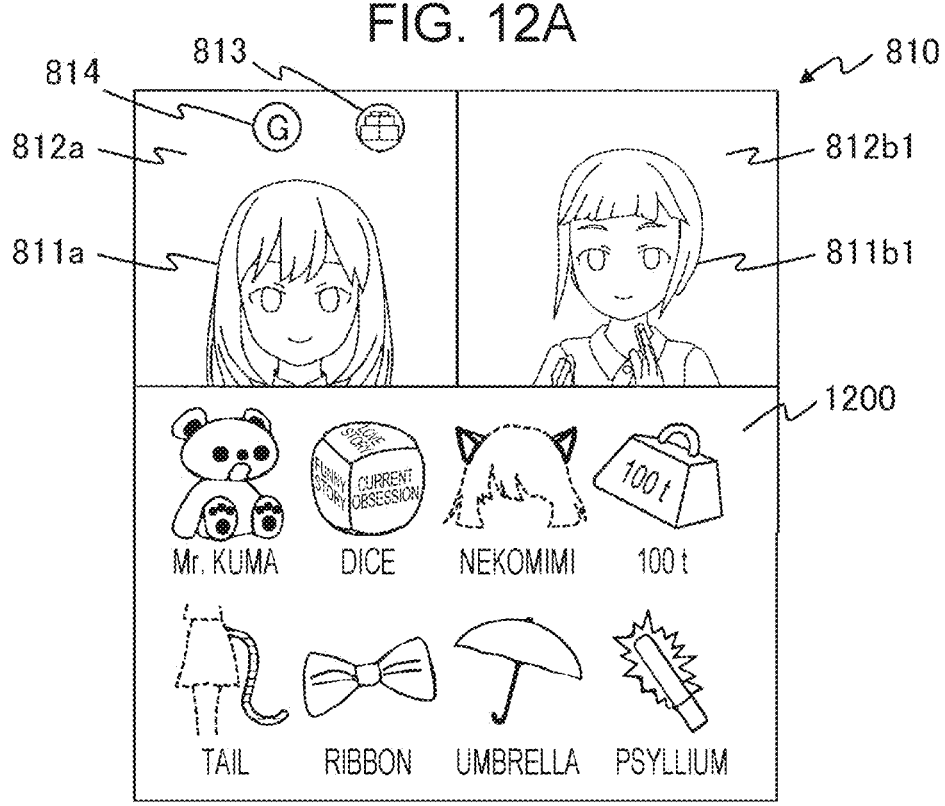
FIG. 12A and FIG. 12B illustrate examples of the screen that is displayed on the display device of the terminal device according to the First Example of the present disclosure.

FIG. 12A illustrates an example of the selection screen 1200 that is displayed on the display device 23 of the terminal device 2. The selection screen 1200 illustrated in FIG. 12A is displayed so as to overlap the communication screen 810. The selection screen 1200 may be displayed after the display of the communication screen 810 ends.

In an example illustrated in FIG. 12A, images and names that represent eight kinds of additional candidate objects are included in the display region of the selection screen 1200. The number of the additional candidate objects that are included in the display region of the selection screen 1200 is not limited to 8. In the case where a part of the images that represent the multiple additional candidate objects cannot be included within the display region of the selection screen 1200, the display processing unit 274 of the terminal device 2 may display the images that represent the additional candidate objects in a scrollable manner. In this case, the images that represent the additional candidate objects that are not currently displayed within the display region of the selection screen 1200 are scrolled and are displayed within the display region of the selection screen 1200 depending on the swiping operation (such as the operation of moving a finger leftward from the right-hand of the screen with the finger being in contact with the screen) of the user A.

The additional candidate objects represent the respective additional objects. Examples of the images that represent the additional candidate objects include an icon image and a thumbnail image that represent a gift object. The images and/or names of the additional candidate objects may be classified into kinds (such as a free gift, a paid gift, an accessory, support goods, an appeal, and variety) of the additional objects and may be displayed on the selection screen 1200. The additional object that belongs to the paid gift can be purchased in a manner in which the user purchases the "coin" for representing the virtual monetary value. The additional object that belongs to the free gift can be acquired, for example, in a manner in which the monetary value is not consumed, but a point that can be acquired by viewing a livestream is consumed. The additional objects may be owned in a manner in which the user A conducts a predetermined mission by using the terminal device 2 and completes the predetermined mission.

After any one of the additional candidate objects is selected by the user A who operates the input device 24, the input device 24 inputs the instruction for adding into the terminal processing device 27. Before and after the additional candidate object is selected, and after any one of the user output images 812*b* of the users B that is to wear the additional object is selected by the user A who operates the input device 24, the user ID of the user B that corresponds to the selected user output image 812*b* is identified. The input device 24 inputs the object ID that corresponds to the selected additional candidate object and the identified user ID into the terminal processing device 27 together with the instruction for adding. In the case where none of the user output images 812*b* of the users B is selected, the input device 24 inputs the object ID that corresponds to the selected additional candidate object into the terminal processing device 27 together with the instruction for adding. In this case, the additional object is included in the user output images 812*b* of all of the users B. The selection of one that is to wear the additional object from the user output images 812*b* of the users B may be the selection of one from the character objects 811*b* that are included in the user output images 812*b*. The character objects 811*b* or the user output images 812*b* of two or more users B may be selected. An example of an adding process depending on the instruction for adding in the case where the user output image 812*b*1 of the user B1 is selected will now be described.

After the instruction for adding and the object ID that are inputted from the input device 24 are acquired, the display processing unit 274 refers the object table T2, extracts the still image or the video image (image information) of the additional object that is associated with the acquired object ID from the terminal storage device 22, and generates the user output image including the extracted still image or video image. In the case where the user ID of the user B1 is acquired together with the instruction for adding, the user output image including the still image or the video image of the extracted additional object corresponds to the acquired user ID of the user B1. In the case where none of the user IDs of the user B1 to the user B3 is acquired together with the instruction for adding, the user output images including the extracted still images or video images correspond to all of the users (the user output images of the user A and the user B1 to the user B3).

After the instruction for adding and the object ID that are inputted from the input device 24 are acquired, the transmission unit 272 transmits information that represents the instruction for adding to the server device 3 via the terminal communication I/F 21 together with the user ID of the user A that is stored in the terminal storage device 22, the acquired object ID, and the destination information (the user IDs of the users B (the users B1 to B3)). Subsequently, the server reception unit 331 of the server device 3 receives the information that represents the instruction for adding, the user ID of the user A, and the object ID via the server communication I/F 31. Subsequently, the server transmission unit 332 of the server device 3 transmits the information that represents the instruction for adding, the user ID of the user A, and the object ID to the terminal devices 2 of all of the users B (the users B1 to B3) via the server communication I/F 31. After the reception unit 273 of the terminal device 2 of each of the users B receives the information that represents the instruction for changing, the user ID of the user A, and the object ID via the terminal communication I/F 21, the display processing unit 274 of the terminal device 2 of the user B refers the object table T2, extracts the still image or video image (image information) of the additional object that is associated with the received object ID from the terminal storage device 22, and generates the user output image including the still image or video image of the extracted additional object. In the case where the transmission unit 272 of the terminal device 2 of the user A transmits the user ID of the user B1 together with the instruction for adding, the server device 3 transmits the user ID of the user B1. In the case where the terminal devices 2 of the users B receive the user ID of the user B1 together with the instruction for adding, only the user output image including the additional object that corresponds to the received user ID of the user B1 is displayed on the terminal devices 2 of the users B. In the case where the terminal devices 2 of the users B acquire no user IDs of the users B together with the instruction for adding, the user output images including the additional object that correspond to all of the users (the user A and the user B1 to the user B3) are displayed on the terminal devices 2 of the users B. This is the end of the adding process.

Figure 12B:
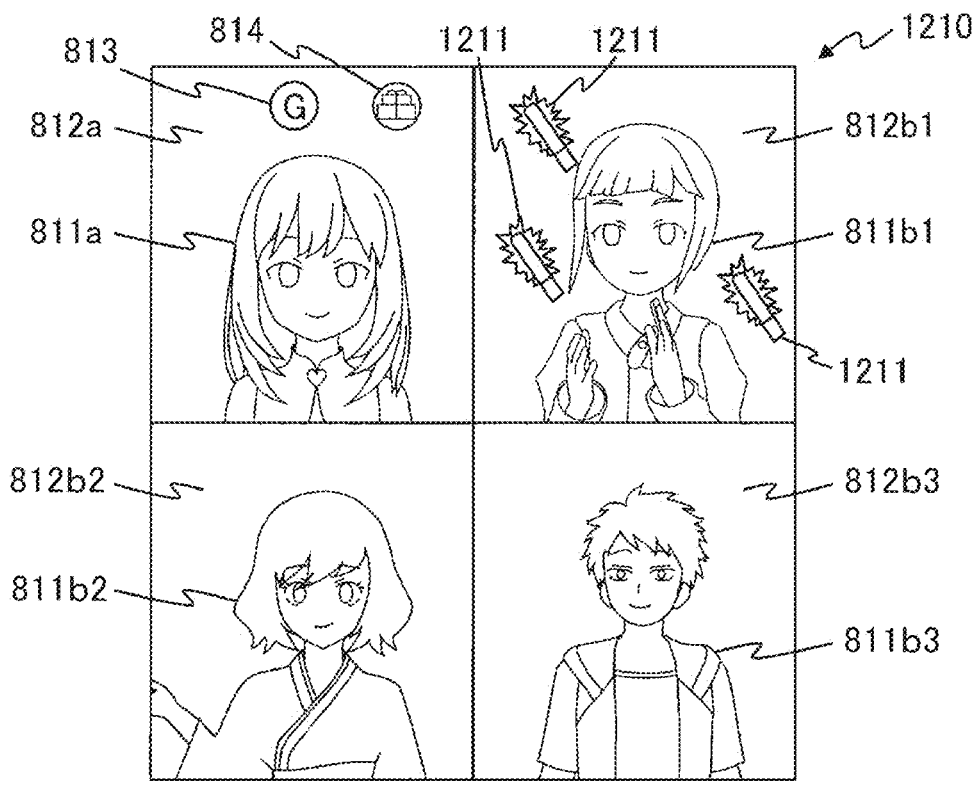

FIG. 12B illustrates another example of a communication screen 1210 that is displayed on the display device 23 of the terminal device 2 after the instruction for adding is inputted from the user A. FIG. 12B illustrates the communication screen 1210 that is displayed on the display device 23 of the terminal device 2 after the instruction for adding is inputted in the case where the user ID of the user B1 is received together with the instruction for adding. As illustrated in FIG. 12B, only the user output image 812b1 that corresponds to the user ID of the user B1 includes additional objects 1211.

Figure 13A:
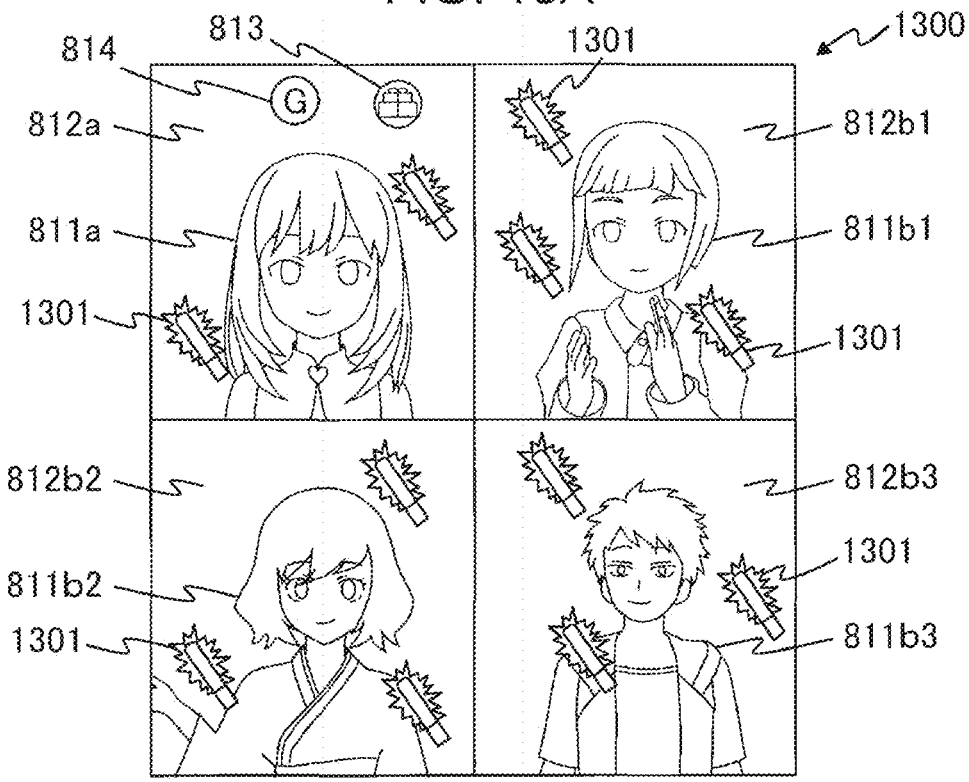
FIG. 13A and FIG. 13B illustrate examples of the screen that is displayed on the display device of the terminal device according to the First Example of the present disclosure.

FIG. 13A illustrates another example of a communication screen 1300 that is displayed on the display device 23 of the terminal device 2 after the instruction for adding is inputted from the user A. FIG. 13A illustrates the communication screen 1300 that is displayed on the display device 23 of the terminal device 2 after the instruction for adding is inputted in the case where none of the user IDs of the users B is received together with the instruction for adding. As illustrated in FIG. 13A, the user output image 812a of the user A and the user output images 812b1 to 812b3 that correspond to the user IDs of all of the users B include additional objects 1301. The user output images 812b1 to 812b3 that correspond to the user IDs of all of the users B may include the additional objects 1301 after the instruction for adding is inputted from the user A (the user output image 812a of the user A may not be included).

In examples illustrated in FIG. 12A to FIG. 13A, the additional objects are automatically added into the user output image of one of the multiple users or the user output images of the multiple users depending on the instruction for adding from the user. However, in the case where an instruction for agreeing is inputted from another user other than the user who inputs the instruction for adding after the instruction for adding is inputted from the user, the additional objects may be added into the user output image of one of the multiple users or the user output images of the multiple users.

Figure 13B:
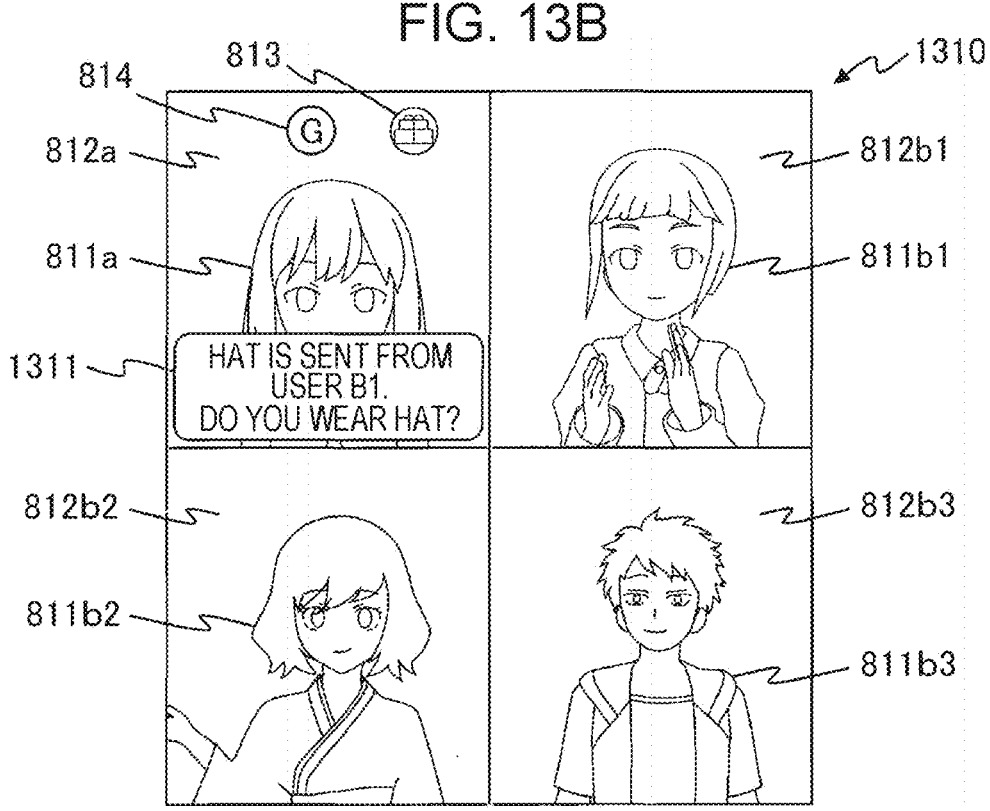

FIG. 13B illustrates another example of a communication screen 1310 that is displayed on the display device 23 of the terminal device 2 after the instruction for adding is inputted.

In an example illustrated in FIG. 13B, the instruction for adding is inputted from the user B1 who operates the input device 24 of the terminal device 2. The instruction for adding in the example illustrated in FIG. 13B is inputted from the input device 24 of the terminal device 2 of the user B1 in the case where any one of the additional candidate objects that represents the wearable object is selected, and the user output image 812a of the user A is selected as the user output image that is to wear the wearable object.

The terminal device 2 of the user A that receives the instruction for adding together with the object ID of the wearable object that corresponds to the selected additional candidate object displays the user output image 812a including an additional object 1311 illustrated in FIG. 13B. As for the additional object 1311, information that represents that the additional object is gifted from the user B1 who inputs the instruction for adding is displayed. The additional object 1311 is not displayed on the terminal devices 2 of the user B1 to the user B3. The additional object 1311 may be displayed on the terminal devices 2 of the user B1 to the user B3.

In the case where the user A performs a predetermined operation (such as an operation of tapping the user output image 812a or an operation of swiping in a predetermined direction) on the communication screen 1310 on which the user output image 812a including the additional object 1311 is displayed, the input device 24 of the terminal device 2 of the user A inputs the instruction for agreeing into the terminal processing device 27 together with the object ID of the wearable object that is transmitted from the terminal device 2 of the user B1. An example of an agreeing process depending on the instruction for agreeing will now be described.

After the instruction for agreeing and the object ID that are inputted from the input device 24 are acquired, the display processing unit 274 first refers the object table T2 and generates the user output image including the character object of the user A that wears the additional object (wearable object) that is associated with the acquired object ID. The display processing unit 274 displays a communication screen 1400 including the user output image 812a including the character object 811a of the user A that wears an additional object (wearable object) 1401.

After the instruction for agreeing and the object ID that are inputted from the input device 24 are acquired, the transmission unit 272 transmits information that represents the instruction for agreeing to the server device 3 via the terminal communication I/F 21 together with the user ID of the user A that is stored in the terminal storage device 22, the acquired object ID, and the destination information (the user IDs of the users B (the user B1 to the user B3)). Subsequently, the server reception unit 331 of the server device 3 receives the information that represents the instruction for agreeing, the user ID of the user A, the object ID, and the destination information via the server communication I/F 31. Subsequently, the server transmission unit 332 of the server device 3 transmits the information that represents the instruction for agreeing, the user ID of the user A, and the object ID to the terminal devices 2 of all of the users B (the users B1 to B3) via the server communication I/F 31. The reception unit 273 of the terminal device 2 of each of the users B receives the information that represents the instruction for agreeing, the user ID of the user A, and the object ID via the terminal communication I/F 21. Subsequently, the display processing unit 274 of the terminal device 2 of the user B refers the object table T2 and generates the user output image 812a including the character object 811a of the user A that wears the additional object (wearable object) 1401 that is associated with the received object ID. The display processing unit 274 displays the communication screen 1400 including the user output image 812a including the character object 811a of the user A that wears the additional object (wearable object) 1401. This is the end of the agreeing process.

The character objects that are changed by using the additional object (wearable object) related to the instruction for adding from the user B1 may be the character objects of the users (the user A, the user B2, and the user B3 in the example illustrated in FIG. 13B) other than the user B1. In this case, the user output images 812a, 812b2, and 812b3 including the additional object 1311 are displayed on the terminal devices 2 of the users other than the user B1. After the instruction for agreeing related to the additional object 1311 is inputted from the user A, the user B2, and the user B3, the user output image 812a including the character object 811a of the user A that wears the additional object (wearable object) 1401, the user output image 812b2 including the character object 811b2 of the user B2 that wears the additional object (wearable object) 1401, and the user output image 812b3 including the character object 811b3 of the user B3 that wears the additional object (wearable object) 1401 are displayed. In this case, the character object 811b1 of the user B1 who inputs the instruction for adding may wear the additional object (wearable object) 1401.

Figure 14A:
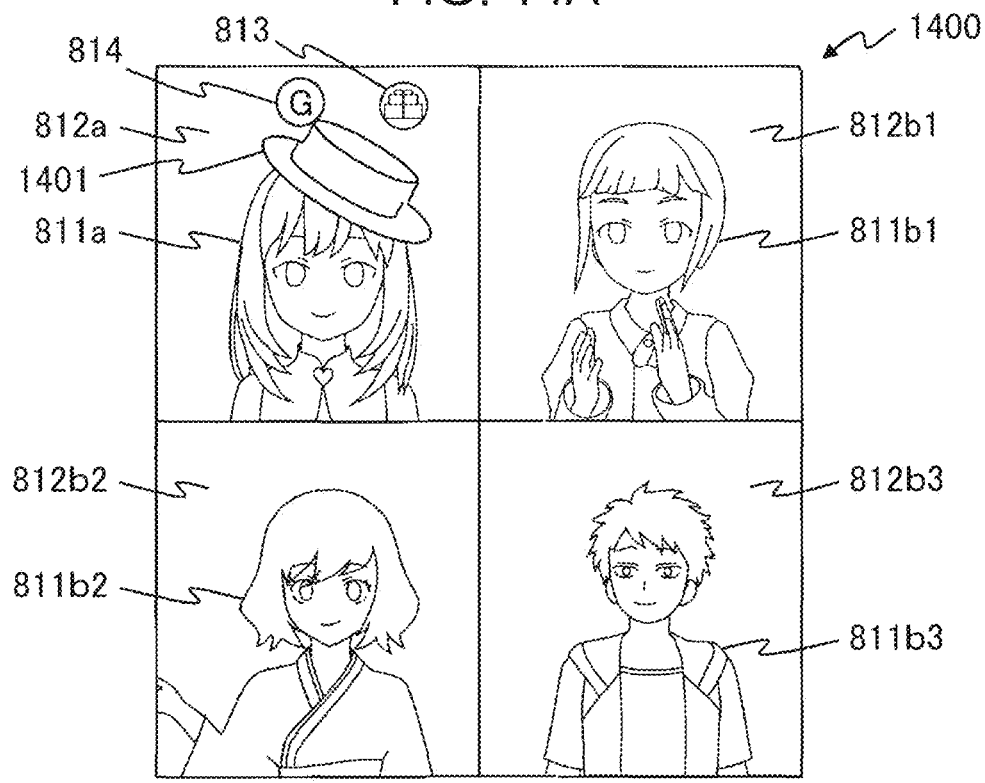
FIG. 14A and FIG. 14B illustrate examples of the screen that is displayed on the display device of the terminal device according to the First Example of the present disclosure.

FIG. 14A illustrates another example of the communication screen 1400 that is displayed on the display device 23 of the terminal device 2 after the instruction for agreeing is inputted. As illustrated in FIG. 14A, the user output image 812a including the character object 811a that wears the additional object (wearable object) 1401 is displayed on the communication screen 1400.

Figure 14B:
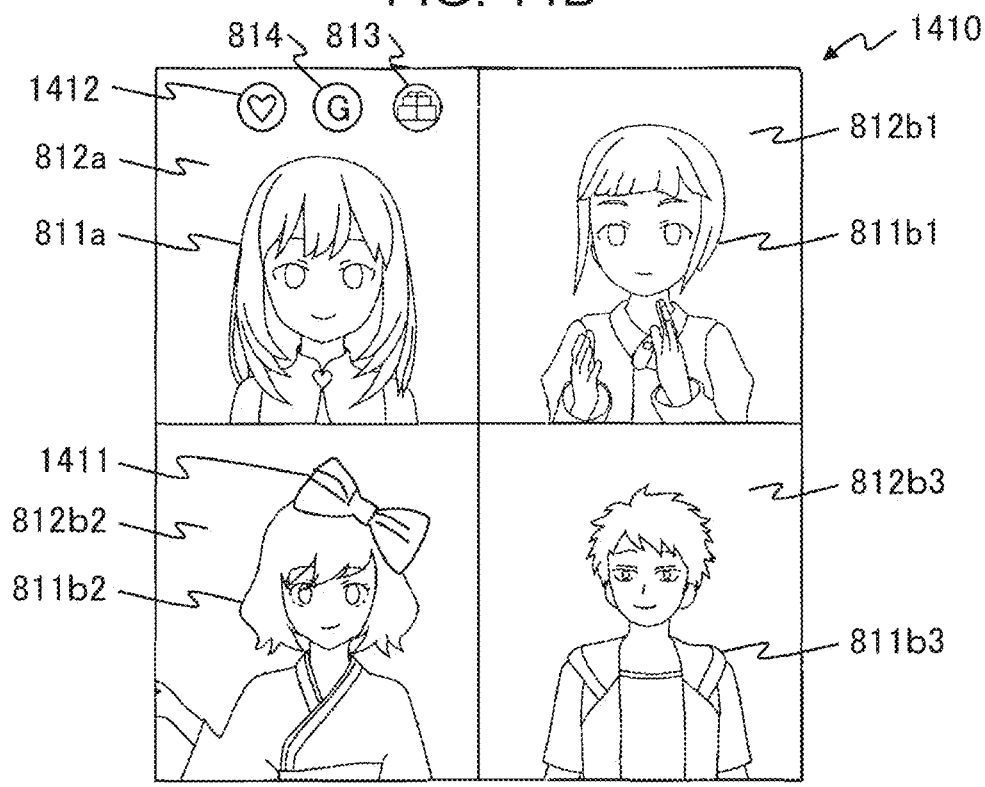

In the case where the character object of the user newly wears a wearable object, another user may be able to make an evaluation. FIG. 14B illustrates another example of a communication screen 1410 that is displayed on the display device 23 of the terminal device 2 of the user A in the case where the character object 811b2 of the user B2 newly wears a wearable object 1411.

The communication screen 1410 includes an evaluation button 1412 together with the addition button 813 and the game button 814. In an example illustrated in FIG. 14B, the evaluation button 1412 is placed in the display region of the user output image 812a but may be displayed outside the display region of the user output image 812a. The evaluation button 1412 may be controlled by the display processing unit 274 so as to be displayed for only a predetermined time (for example, 10 seconds) after the character object 811b2 of the user B2 newly wears the wearable object 1411.

The evaluation button 1412 is an object image for inputting an instruction for evaluating to transmit evaluation data that represents an evaluation when the user A evaluates the character object 811b2 that newly wears the wearable object 1411. After the evaluation button 1412 is selected by the user A who operates the input device 24, the input device 24 inputs the instruction for evaluating into the terminal processing device 27. The input device 24 inputs the user ID of the user A that is stored in the terminal storage device 22 and the user ID of the user B2 related to the character object 811b2 that newly wears the wearable object together with the instruction for evaluating into the terminal processing device 27. An example of an evaluating process depending on the instruction for evaluating will now be described.

After the instruction for evaluating that is inputted from the input device 24, the user ID of the user A, and the user ID of the user B2 are acquired, the display processing unit 274 of the terminal device 2 of the user A displays information that represents a positive evaluation related to the character object 811b2 that newly wears the wearable object. For example, the display processing unit 274 extracts the name of the user B2 that is associated with the user ID of the user B2 and displays a character string for praising the name of the user B2 as the information that represents the positive evaluation. For example, the display processing unit 274 may display a predetermined mark image in the display region of the user output image 812b2 of the character object 811b2 as the information that represents the positive evaluation.

After information that represents the instruction for evaluating that is inputted from the input device 24, the user ID of the user A, and the user ID of the user B2 are acquired, the transmission unit 272 of the terminal device 2 of the user A transmits the acquired information to the server device 3 via the terminal communication I/F 21 together with the destination information (the user IDs of the users B (the user B1 to the user B3)). The server reception unit 331 of the server device 3 receives the information that represents the instruction for evaluating, the user ID of the user A, the user ID of the user B2, and the destination information via the server communication I/F 31. Subsequently, the server transmission unit 332 of the server device 3 transmits the information that represents the instruction for evaluating, the user ID of the user A, and the user ID of the user B2 to the terminal devices 2 of the users B (the user B1 to the user B3) via the server communication I/F 31. After the reception unit 273 of the terminal device 2 of each of the users B receives the information that represents the instruction for evaluating, the user ID of the user A, and the user ID of the user B2 via the terminal communication I/F 21, the display processing unit 274 of the terminal device 2 of each of the users B displays the information that represents the positive evaluation related to the character object 811b2 that newly wears the wearable object. For example, the display processing unit 274 extracts the name of the user B2 that is associated with the user ID of the user B2 and displays the character string for praising the name of the user B2 as the information that represents the positive evaluation. For example, the display processing unit 274 may display the predetermined mark image in the display region of the user output image 812b2 of the character object 811b2 as the information that represents the positive evaluation. This is the end of the evaluating process.

Consequently, in the case where the character objects of the users B wear the wearable object, the user A can react by performing a simple operation, and the willingness of the user A to continuously use the communication with the users B can be improved. The size of the display screen of the display device 23 of the terminal device 2 is limited, and displaying a large amount of information on the display device 23 poses a problem in that it is difficult for the user to recognize the displayed information. The terminal device 2 of the user A according to the present embodiment displays the evaluation button 1412 in the case where the character objects or the user output images of the users other than the user A change. The user A can input the evaluation of the changed character objects or user output images of the users other than the user A by operating the evaluation button 1412. The terminal device 2 of the user A according to the present embodiment can thus provide the evaluation button 1412 to the user A with the timing of the evaluation of the character objects or the user output images, and consequently, the usability can be improved. The information that is displayed depending on the instruction for evaluating from the user A is not limited to the positive information but may be negative information. Multiple kinds of the evaluation buttons 1412 may be displayed. For example, two kinds of evaluation buttons of an evaluation button for transmitting positive evaluation data and an evaluation button for transmitting negative evaluation data, for example, may be displayed.

Returning to FIG. 8B, a game display object including a game screen that represents the progress of the game that is played by the user A may be displayed instead of the user output image 812a of the user A or together with the user output image 812a of the user A. The game display object may be a so-called filter. For example, after the game button 814 is selected by the user A who operates the input device 24, the input device 24 inputs the instruction for starting the game into the terminal processing device 27. The selection screen 1200 may include an object that has the same function as the game button 814 as the additional candidate object. In this case, after the additional candidate object for inputting the instruction for starting the game is selected by the user A who operates the input device 24, the input device 24 inputs the instruction for starting the game into the terminal processing device 27.

Figure 15A:
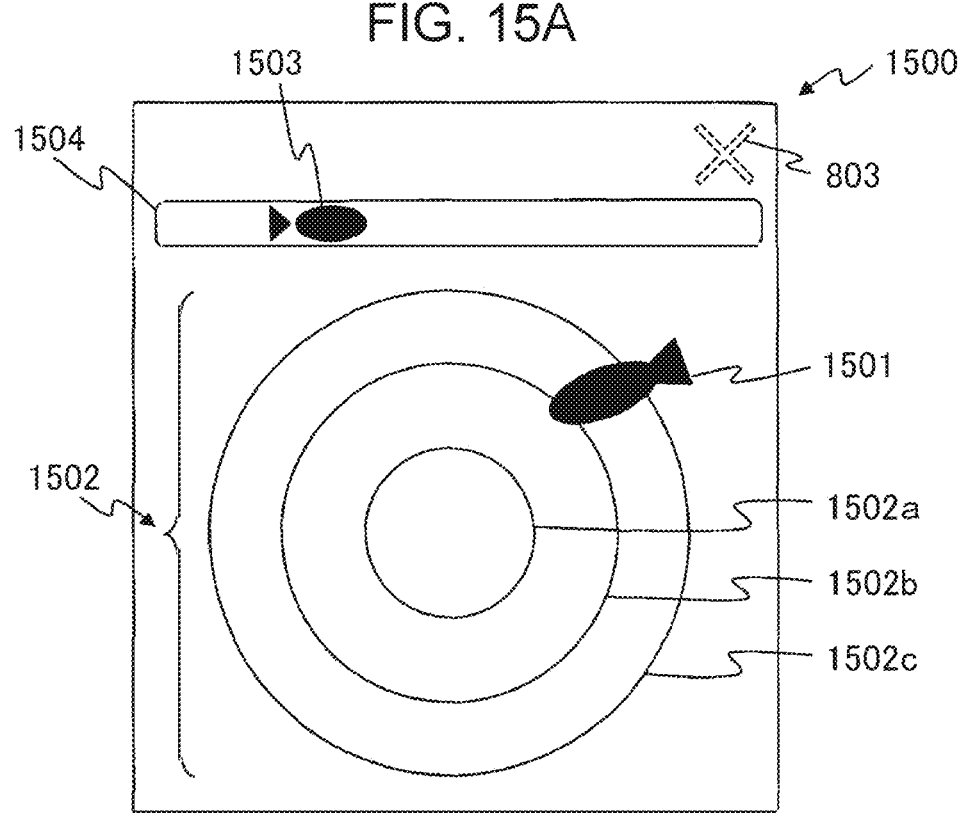
FIG. 15A and FIG. 15B illustrate examples of the screen that is displayed on the display device of the terminal device according to the First Example of the present disclosure.

After the instruction for starting the game that is inputted from the input device 24 is acquired, the display processing unit 274 starts the game by executing various instructions that are included in the control program (such as a game application program) that is stored in the terminal storage device 22 and displays the game display object 1500 including the game screen of the started game on the display device 23. FIG. 15A illustrates an example of the game display object 1500 including the game screen that is displayed on the display device 23 of the terminal device 2 of the user A depending on the instruction for starting the game from the user A.

After the game display object 1500 is displayed, the display processing unit 274 progresses the game of the game display object 1500 depending on various kinds of input information from the user A and the various instructions that are included in the control program (such as a game application program). In the case where a predetermined game end condition is satisfied, the display processing unit 274 ends the game of the game display object 1500.

After the game display object 1500 is displayed, the generation unit 271 generates the game image data that represents the game screen of the game that is played by the user A at any time while the game progresses. Subsequently, the generation unit 271 generates output information including the generated game image data and the user ID that is stored in the terminal storage device 22 and outputs the generated output information to the transmission unit 272.

Figure 15B:
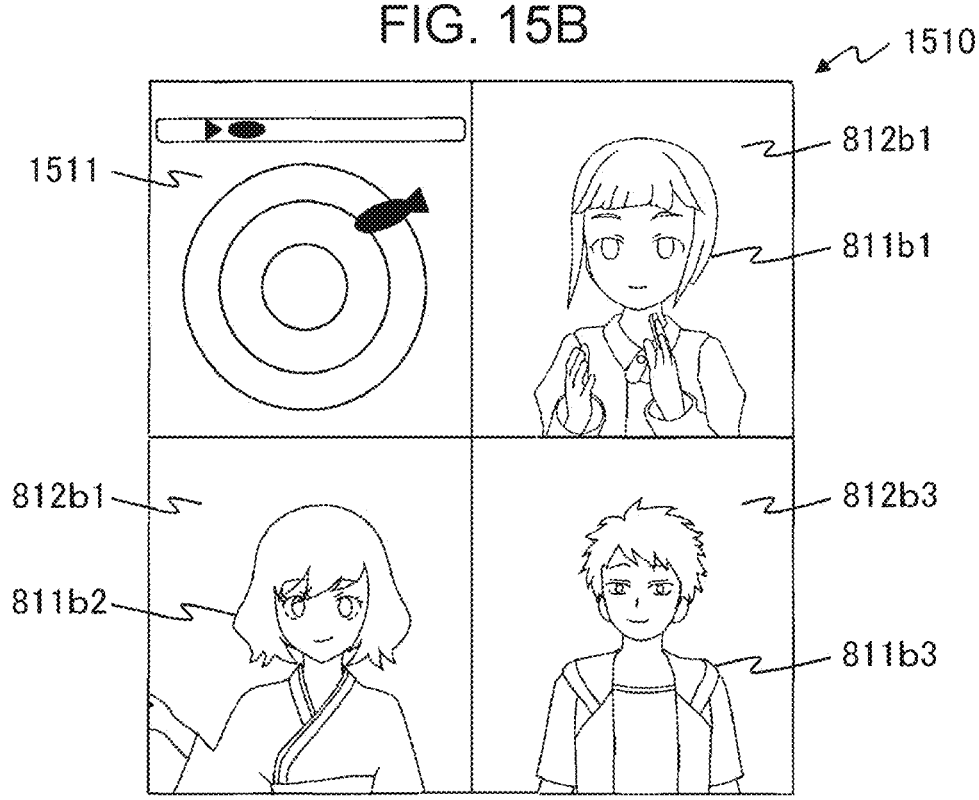

Subsequently, the transmission unit 272 of the terminal device 2 of the user A transmits the output information about the user A to the server device 3 via the terminal communication I/F 21 together with the destination information (the user IDs of the users B (the user B1 to the user B3)). Subsequently, the server reception unit 331 of the server device 3 receives the output information about the user A that is transmitted from the terminal device 2 of the user A via the server communication I/F 31. Subsequently, the server transmission unit 332 of the server device 3 transmits the output information about the user A to the terminal devices 2 of the users B (the user B1 to the user B3) via the server communication I/F 31. After the reception unit 273 of the terminal device 2 of each of the users B receives the output information via the terminal communication I/F 21, the display processing unit 274 of the terminal device 2 of the user B displays a game display object 1511 including a game image based on the game image data that is included in the output information instead of the user output image 812a of the user A that is represented by the user ID that is included in the output information (FIG. 15B).

In an example illustrated in FIG. 15A, the game of the game screen that is included in the game display object 1500 is a fishing game. The game screen that is included in the game display object 1500 includes a game object 1501, a target object 1502, a parameter cursor 1503, and a parameter gauge frame 1504.

The game object 1501 is an object image that imitates a fish and is controlled by the display processing unit 274 so as to be displayed such that the game object 1501 automatically moves along a predetermined path in the game screen or a path that is randomly determined. An initial value that is associated with the game object 1501 is stored in the terminal storage device 22. The display processing unit 274 sets the parameter value of the game object 1501 to the initial value that is associated with the game object 1501 at the beginning of the game.

The target object 1502 includes a first target object 1502a, a second target object 1502b, and a third target object 1502c. The first target object 1502a is an object image that has a substantially circular shape. The second target object 1502b is an object image that has a shape surrounding the first target object 1502a. The third target object 1502c is an object image that has a shape surrounding the second target object 1502b.

In the case where the input device 24 is a touch screen, the user A taps the game object 1501, and consequently, the input device 24 inputs a game input instruction into the display processing unit 274. The display processing unit 274 determines whether a predetermined position (for example, a position that corresponds to the mouse of a fish) on the game object 1501 when the game input instruction is acquired from the input device 24 is the position of the first target object 1502a, the position of the second target object 1502b, or the position of the third target object 1502c.

In the case where it is determined that the predetermined position on the game object 1501 is the position of the first target object 1502a, the position of the second target object 1502b, or the position of the third target object 1502c, the display processing unit 274 changes (increases or decreases) the parameter value of the game object 1501.

The display processing unit 274 changes the amount of change in the parameter value of the game object 1501 depending on the predetermined position on the game object 1501 when the game input instruction is acquired from the input device 24. For example, in the case where the predetermined position on the game object 1501 when the game input instruction is acquired is inside the first target object 1502a, the display processing unit 274 decreases the parameter value of the game object 1501 by a first decrease value. In the case where the predetermined position on the game object 1501 when the game input instruction is acquired is the position of the first target object 1502a, the display processing unit 274 may increase the parameter value of the game object 1501 by a first increase value. In the case where the predetermined position on the game object 1501 when the game input instruction is acquired is outside the first target object 1502a and inside the second target object 1502b, the display processing unit 274 decreases the parameter value of the game object 1501 by a second decrease value smaller than the first decrease value. In the case where the predetermined position on the game object 1501 when the game input instruction is acquired is outside the first target object 1502*a* and inside the second target object 1502*b*, the display processing unit 274 may increase the parameter value of the game object 1501 by a second increase value smaller than the first increase value. In the case where the predetermined position on the game object 1501 when the game input instruction is acquired is outside the second target object 1502*b* and inside the third target object 1502*c*, the display processing unit 274 decreases the parameter value of the game object 1501 by a third decrease value smaller than the second decrease value. In the case where the predetermined position on the game object 1501 when the game input instruction is acquired is outside the second target object 1502*b* and inside the third target object 1502*c*, the display processing unit 274 may increase the parameter value of the game object 1501 by a third increase value smaller than the second increase value. In the case where the predetermined position on the game object 1501 when the game input instruction is acquired is outside the target object 1502, the display processing unit 274 does not change the parameter value of the game object 1501.

The parameter cursor 1503 is a cursor object that represents the parameter value of the game object 1501. The display processing unit 274 places the parameter cursor 1503 at a position that corresponds to the parameter value of the game object 1501 in the parameter gauge frame 1504. In the example illustrated in FIG. 15A, the parameter cursor 1503 can move in the left-right direction in the parameter gauge frame 1504 and is nearer to the right in the parameter gauge frame 1504 as the parameter value of the game object 1501 increases.

In the case where the parameter value of the game object 1501 is equal to or less than a predetermined value (for example, "0" (zero)), the display processing unit 274 determines that the user A has succeeded in completing the game and ends the game. In the case where the parameter value of the game object 1501 is equal to or more than a predetermined value (a value larger than the parameter value at the beginning of the game), the display processing unit 274 may determine that the user A has succeeded in completing the game. The display processing unit 274 may continue the game until the game succeeds and may end the game even though the user A does not succeed in completing the game in the case where a predetermined game period (for example, 30 seconds) has passed after the game starts.

In the case where the game of the game screen that is included in the game display object 1500 ends, the game display object may be displayed on the terminal device 2 of any one of the users B. For example, the transmission unit 272 of the terminal device 2 of the user A transmits information that represents the end of the game to the server device 3, and the server device 3 transmits the information that represents the end of the game related to the user A to the terminal device 2 of the user B1. After the received information about the end of the game is acquired, the display processing unit 274 of the terminal device 2 of the user B1 starts the game by executing various instructions that are included in the control program (such as the game application program) that is stored in the terminal storage device 22 and displays the game display object 1500 including the game screen of the started game on the display device 23. After the game that is played by the user B1 ends, the terminal device 2 of the user B1 transmits the information that represents the end of the game to the terminal device 2 of the user B2 via the server device 3 in the same manner, and the display processing unit 274 of the terminal device 2 of the user B1 displays the game display object 1500. After the game that is played by the user B2 ends, the terminal device 2 of the user B2 transmits the information that represents the end of the game to the terminal device 2 of the user B3 via the server device 3 in the same manner, and the display processing unit 274 of the terminal device 2 of the user B1 displays the game display object 1500. A screen in FIG. 15B is displayed on the terminal devices 2 of the users who do not play the game, and the situation of game play of another user can be viewed. The users who belong to the communication group can thus play the game in turn, and the willingness of the users to continuously use the communication can be improved.

Each terminal device 2 may call a browser function that is incorporated into the control program to perform the game and may perform a game program. For example, the terminal device 2 receives a webpage (a document that is written by using a markup language such as the hypertext markup language (HTML)) by using the called browser function from the server device 3. The terminal device 2 performs the game program that is incorporated into the received webpage. For example, the use of HTML5 as the markup language enables the terminal device 2 to readily perform a new game. The use of the web application described above in the information system 1 enables a game program creator to provide the new game to a client side (the terminal device 2) merely by incorporating a new game program into the webpage that is transmitted by the server device 3 and consequently enables the game program creator to greatly reduce a time required for creating the new game program. The client side can receive the newly provided game merely by receiving the webpage without downloading the new game program. Consequently, the information system 1 can reduce the load of the communication network, communication costs, and/or a communication time unlike downloading of the game program and can simplify the user interface.

The game input instruction that is inputted from the user A by using the input device 24 is not limited to the input depending on the tapping operation. For example, the input device 24 may input the game input instruction into the display processing unit 274 depending on a swiping operation of the user A in a predetermined direction. The game input instruction is not limited to the input from the input device 24. For example, the display processing unit 274 may acquire the face motion data that is generated by the generation unit 271 at any time over time based on continuously acquired imaging data and may generate the game input instruction, based on the face motion data when it is determined that the user A makes a predetermined motion. Examples of the predetermined motion include that the user A closes the eyes, that the face of the user A is directed in a predetermined direction, and that a hand of the user makes a predetermined motion. In the case where the game input instruction is generated based on the face motion data, the game display object 1500 including the game screen that represents the progress of the game that is played by the user A may be displayed together with the user output image 812*a* of the user A. When the user output image 812*a* and the game display object 1500 are displayed at the same time, the user output image 812*a* and the game display object 1500 may be displayed in line, or the user output image 812*a* may be displayed so as to overlap the game display object 1500. For example, the user output image 812*a* may be displayed as the background image of the game display object 1500. Consequently, the user can play the game while checking the motion of the character object of the user, and the operability of the game can be improved. In the case where an acceleration equal to or more than a predetermined value is measured by an acceleration sensor when the user A shakes the terminal device 2 that includes an acceleration sensor, the display processing unit 274 may generate the game input instruction.

The game of the game screen that is included in the game display object 1500 may be a game other than the fishing game. For example, the character object of the user A may move a predetermined distance whenever the user A closes the eyes in a game, or the character objects of the users B may move a predetermined distance whenever the user A closes the eyes in a game.

In the case where the users B can input a predetermined game input instruction on the game image in the game display object 1511, the game that is displayed in the game image in the game display object 1511 may progress in response to the game input instruction depending on the operation of any one of the users B. In the case where the users B can input the predetermined game input instruction on the game image in the game display object 1511, the input device 24 of the terminal device 2 of the user A may be controlled such that the user A cannot input the game input instruction. In the case where the users B can input the predetermined game input instruction on the game image in the game display object 1511, the game that is displayed in the game image in the game display object 1511 may progress in response to the game input instruction from the user A and the game input instruction from all of the users B. Not only the game display object 1511 that is played by the user A but also the game display objects 1511 that are played by the user B1, the user B2, and the user B3 may be displayed on the screen in FIG. 15B. In this case, four game display objects 1511 are displayed on the screen in FIG. 15B, and the users play the games of the game display objects 1511 that correspond to the respective users.

The user A can thus provide the game screen during the communication with the users B. Consequently, the willingness of the user A and the users B to continuously use the communication can be improved.

Operation Sequence of Information System 1

Figure 16:
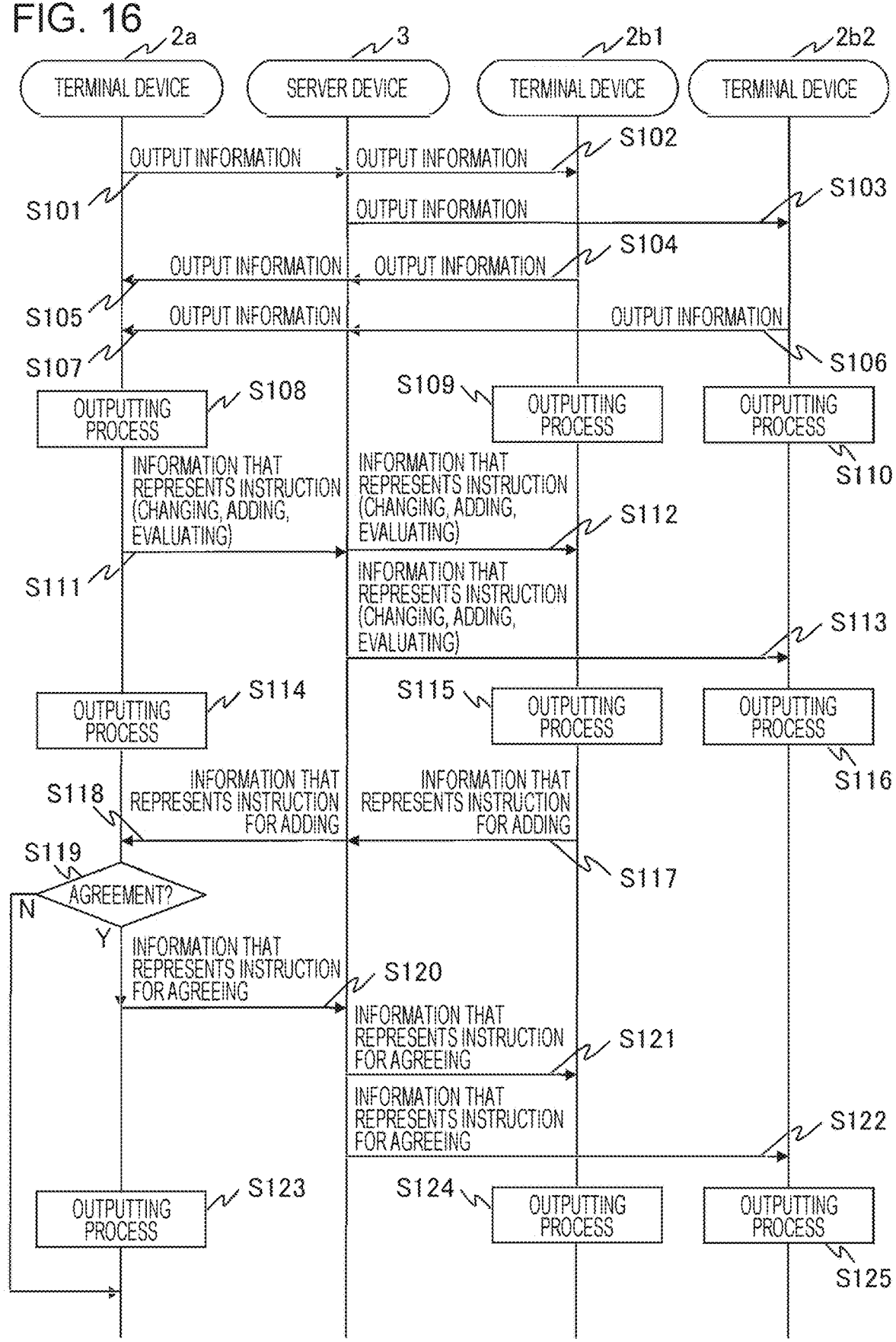
FIG. 16 illustrates an example of the operation sequence of the information system according to the First Example of the present disclosure.

FIG. 16 illustrates an example of the operation sequence of the information system 1. The operation sequence is performed based on the control programs that are stored in each terminal storage device 22 and the server storage device 32 in advance by mainly using each terminal processing device 27 and the server processing device 33 in corporation with each terminal device 2 and the server device 3. In the following description, the user A operates a terminal device 2a, the user B1 operates a terminal device 2b1, and the user B2 operates a terminal device 2b2. The terminal devices of the other users other than the user A are not limited to the terminal device 2b1 and 2b2 of the users B1 and B2, but the terminal devices 2 of three or more users may be connected to the server device 3.

The transmission unit 272 of the terminal device 2a first transmits the character video data including the motion data of the user A that is generated by the generation unit 271, based on the imaging data that is continuously outputted by the imaging device 25, the voice data of the user A that is outputted from the microphone 26, and the output information including the user ID of the user A to the server device 3 via the terminal communication I/F 21 (step S101). The output information may include the game image data that represents the game screen of the game that is played by the user, and the user ID of the user A. The transmission process of the transmission unit 272 may include the destination information. The process at the step S101 is continuously performed at a predetermined time interval (for example, every 2 seconds) until the livestream event ends, and accordingly, the process at the step S101 to a process at a step S110 are intermittently performed.

Subsequently, the server transmission unit 332 of the server device 3 transmits the output information that is received from the terminal device 2a to the terminal device 2b1 (step S102) and to the terminal device 2b2 (step S103) via the server communication I/F 31.

The transmission unit 272 of the terminal device 2b1 transmits the output information including the character video data of the user B1, the voice data of the user B1, and the user ID of the user B1 to the server device 3 via the terminal communication I/F 21 (step S104). Subsequently, the server transmission unit 332 of the server device 3 transmits the output information that is received from the terminal device 2b1 to the terminal device 2a (step S105) and to the terminal device 2b2 via the server communication I/F 31.

The transmission unit 272 of the terminal device 2b2 transmits the output information including the character video data of the user B2, the voice data of the user B2, and the user ID of the user B2 to the server device 3 via the terminal communication I/F 21 (step S106). Subsequently, the server transmission unit 332 of the server device 3 transmits the output information that is received from the terminal device 2b2 to the terminal device 2a (step S107) and to the terminal device 2b1 via the server communication I/F 31.

The display processing unit 274 of the terminal device 2a outputs the communication screen including the user output image including the character object of the user A, the user output image including the character object of the user B1, and the user output image including the character object of the user B2 to the display device 23 of the terminal device 2a for displaying, based on the output information about the user A, the user B1, and the user B2 and outputs the voices of the user B1 and the user B2 (step S108).

The display processing unit 274 of the terminal device 2b1 outputs the communication screen including the user output image including the character object of the user A, the user output image including the character object of the user B1, and the user output image including the character object of the user B2 to the display device 23 of the terminal device 2b1 for displaying, based on the output information about the user A, the user B1, and the user B2 and outputs the voices of the user A and the user B2 (step S109) as in the step S108.

The display processing unit 274 of the terminal device 2b2 outputs the communication screen including the user output image including the character object of the user A, the user output image including the character object of the user B1, and the user output image including the character object of the user B2 to the display device 23 of the terminal device 2b2 for displaying, based on the output information about the user A, the user B1, and the user B2 and outputs the voices of the user A and user B1 (step S110) as in the step S108.

Subsequently, the transmission unit 272 of the terminal device 2a transmits information that represents the instruction for changing, the instruction for adding, or the instruction for evaluating and that is inputted from the user A who operates the input device 24 to the server device 3 via the terminal communication I/F 21 (step S111).

Subsequently, the server transmission unit 332 of the server device 3 transmits the information that represents the instruction for changing, the instruction for adding, or the instruction for evaluating that is received from the terminal device 2*a* to the terminal device 2*b*1 (step S112) and to the terminal device 2*b*2 (step S113) via the server communication I/F 31.

The display processing unit 274 of the terminal device 2*a* at least partly changes the user output image of the user A, the user output image of the user B1, and the user output image of the user B2 depending on the instruction for changing, the instruction for adding, or the instruction for evaluating that is inputted from the user A who operates the input device 24 and outputs these to the display device 23 of the terminal device 2*a* for displaying (step S114).

The display processing unit 274 of the terminal device 2*b*1 at least partly changes the user output image of the user A, the user output image of the user B1, and the user output image of the user B2 depending on the information that represents the instruction for changing, the instruction for adding, or the instruction for evaluating that is transmitted from the terminal device 2*a* of the user A and outputs these to the display device 23 of the terminal device 2*b*1 for displaying (step S115).

The display processing unit 274 of the terminal device 2*b*2 at least partly changes the user output image of the user A, the user output image of the user B1, and the user output image of the user B2 depending on the information that represents the instruction for changing, the instruction for adding, or the instruction for evaluating that is transmitted from the terminal device 2*a* of the user A and outputs these to the display device 23 of the terminal device 2*b*2 for displaying (step S116).

Subsequently, the transmission unit 272 of the terminal device 2*b*1 transmits the information that represents the instruction for adding the wearable object that is inputted from the user B1 who operates the input device 24 to the server device 3 via the terminal communication I/F 21 (step S117).

Subsequently, the server transmission unit 332 of the server device 3 transmits the information that represents the instruction for adding the wearable object that is received from the terminal device 2*b*1 to the terminal device 2*a* via the server communication I/F 31 (step S118).

The display processing unit 274 of the terminal device 2*a* determines whether the user A performs a predetermined operation related to agreement on the additional object that is displayed depending on the information that represents the instruction for adding the wearable object that is transmitted from the terminal device 2*b*1 of the user B1 (step S119).

In the case where it is determined that the user A does not perform the predetermined operation related to agreement (No at the step S119), the step S123 is not performed. In the case where it is determined that the user A performs the predetermined operation related to agreement (Yes at the step S119), the transmission unit 272 of the terminal device 2*a* transmits the information that represents the instruction for agreeing to the server device 3 via the terminal communication I/F 21 (step S120).

Subsequently, the server transmission unit 332 of the server device 3 transmits the information that represents the instruction for agreeing that is received from the terminal device 2*a* to the terminal device 2*b*1 via the server communication I/F 31 (step S121) and to the terminal device 2*b*2 (step S122). The object ID that represents the wearable object related to the information that represents the instruction for adding that is transmitted from the terminal device 2*b*1 of the user B1 at the step S117 is transmitted together with the information that represents the instruction for agreeing.

The display processing unit 274 of the terminal device 2*a* outputs the user output image including the character object of the user A that wears the wearable object related to the information that represents the instruction for adding that is transmitted from the terminal device 2*b*1 of the user B1 at the step S117 to the display device 23 of the terminal device 2*a* for displaying (step S123).

The display processing unit 274 of the terminal device 2*b*1 outputs the user output image including the character object of the user A that wears the wearable object related to the information that represents the instruction for adding that is transmitted from the terminal device 2*b*1 of the user B1 at the step S117 to the display device 23 of the terminal device 2*b*1 for displaying (step S124).

The display processing unit 274 of the terminal device 2*b*2 outputs the user output image including the character object of the user A that wears the wearable object related to the information that represents the instruction for adding that is transmitted from the terminal device 2*b*1 of the user B1 at the step S117 to the display device 23 of the terminal device 2*b*2 for displaying (step S125).

As for the information system 1 according to the present embodiment, the user output image of the user A that is at least partly changed and/or the user output image of at least one of the users B that is at least partly changed is displayed depending on an instruction from the user A as described in detail above. As for the information system 1 according to the present embodiment, the output from the terminal device 2 is thus changed by the user A or at least one of the users B during the communication service, and consequently, the willingness of the users to continuously use the communication can be improved.

First Modification of First Example

The present disclosure is not limited to the present embodiment. For example, in the case where a predetermined condition is satisfied, the display processing unit 274 of the terminal device 2 of the user A may add a new additional candidate object into the display region of the selection screen 1200 (FIG. 12A). In the case where a predetermined condition is satisfied, the display processing unit 274 of the terminal device 2 of the user A may delete at least a part of the additional candidate object that is included in the display region of the selection screen 1200.

The predetermined condition is that a time during which the character object or the user output image of the user A is displayed on the communication screen exceeds a predetermined time. The predetermined condition may be that the time during which the character object or the user output image of the user A is displayed on the communication screen does not exceed a predetermined time. The predetermined condition may be that a time during which the character object or the user output image of any one of the users B is displayed on the communication screen exceeds a predetermined time or does not exceed a predetermined time. The predetermined condition may be that a total time during which the character objects or the user output images of the user A and all of the users B are displayed on the communication screen exceeds a predetermined time or does not exceed a predetermined time. The predetermined condition may be that a total time during which the character objects or the user output images of at least two of the user A and the users B are displayed on the communication screen exceeds a predetermined time or does not exceed a predetermined time.

The predetermined condition may be that a number of times the user A who operates the input device 24 selects any one of the additional candidate objects exceeds a predetermined number. The predetermined condition may be that a number of times the user A who operates the input device 24 selects any one of the additional candidate objects does not exceed a predetermined number. The predetermined condition may be that a number of times any one of the users B who operates the input device 24 selects any one of the additional candidate objects exceeds a predetermined number or does not exceed a predetermined number. The predetermined condition may be that a total number of times the user A and all of the users B who operate the input devices 24 select any one of the additional candidate objects exceeds a predetermined number or does not exceed a predetermined number. The predetermined condition may be that a total number of times at least two of the user A and the users B who operate the input devices 24 select any one of the additional candidate objects exceeds a predetermined number or does not exceed a predetermined number.

Examples of the new additional candidate object that is added into the display region of the selection screen 1200 in the case where the predetermined condition is satisfied may correspond to a specific wearable object and a specific wallpaper object placed on the back of the character object in the user output image.

When the predetermined condition is thus satisfied, the range of selection of the additional object increases (or decreases), and accordingly, the output depending on the operation of the user A during the communication service can exhibit diversity. Accordingly, the willingness of the user A to continuously use the communication with the users B can be improved.

Second Modification of First Example

As illustrated in FIG. 14B, in the case where the character object 811b2 of the user B2 newly wears the wearable object 1411, the user A can operate the evaluation button 1412 that is included in the communication screen 1410 that is newly displayed. As for the terminal device 2 of the user A, the user A may be able to perform an operation other than the operation on the evaluation button 1412 instead of the evaluation button 1412 or together with the evaluation button 1412.

For example, in the case where the character object 811b2 of the user B2 newly wears the wearable object 1411, the communication screen 1410 may include a motion button for causing the character object 811a of the user A to automatically make a predetermined motion in a predetermined display period (for example, 10 seconds). After the motion button is selected by the user A who operates the input device 24, the generation unit 271 cancels the use of the motion data of the user A in a predetermined motion period (for example, 5 seconds), extracts information about the predetermined motion that is stored in the terminal storage device 22 in advance, and causes the character object 811a of the user A to automatically make the predetermined motion in a predetermined motion period (for example, 5 seconds). Examples of the predetermined motion include a handclap motion and a motion that represents a surprise. After the motion button is selected by the user A who operates the input device 24, the generation unit 271 may not cancel the use of a part of the motion data of the user A. For example, in the case where a motion depending on the motion button is related to the arms of the character object 811a, the use of the face motion data may continue. Consequently, the information system 1 is not limited by a uniform motion by using the motion button but can make the character object expressive, and the willingness of the user to continuously use the communication can be improved.

Information about the predetermined motion that is automatically made by the character object 811a of the user A may be associated with multiple predetermined operations of the user A and may be stored in the terminal storage device 22. For example, information about a peace sign motion may be associated with a swiping operation in an upward direction and may be stored in the terminal storage device 22, and information about a jump motion may be associated with a swiping operation in a downward direction and may be stored in the terminal storage device 22. For example, after the input device 24 detects the swiping operation of the user A in the upward direction, the generation unit 271 cancels the use of the motion data of the user A in a predetermined motion period (for example, 5 seconds), extracts the information about the peace sign motion that is stored in the terminal storage device 22 in advance, and causes the character object 811a of the user A to automatically make the peace sign motion in a predetermined motion period (for example, 5 seconds). In this case, the information about the predetermined motion that is associated with the predetermined operation may be changed in a predetermined period (for example, 10 seconds) after the character object 811b2 of the user B2 newly wears the wearable object 1411. For example, the information about the handclap motion may be associated with the swiping operation in the upward direction (the information about the peace sign motion is changed) and may be stored in the terminal storage device 22 in a predetermined period (for example, 10 seconds) after the character object 811b2 of the user B2 newly wears the wearable object 1411. Consequently, after the input device 24 detects the swiping operation of the user A in the upward direction in a predetermined period (for example, 10 seconds) after the character object 811b2 of the user B2 newly wears the wearable object 1411, the generation unit 271 cancels the use of the motion data of the user A in a predetermined motion period (for example, 5 seconds), extracts the information about the handclap motion that is stored in the terminal storage device 22 in advance, and causes the character object 811a of the user A to automatically make the handclap motion in a predetermined motion period (for example, 5 seconds). Even the same operation thus enables the motion of the character object during normal communication to be changed from the motion of the character object when the character object of the other user wears the new wearable object, and the output depending on the operation of the user A during the communication service can exhibit diversity. Accordingly, the willingness of the user A to continuously use the communication with the users B can be improved. In addition, the information system 1 can reduce the processing load of each terminal device 2 more than the case where the motion data is used and can prevent the communication load between the terminal device 2 and the server device 3 from increasing by causing the character object to make the predetermined motion that is associated with the predetermined operation.

Third Modification of First Example

The display processing unit 274 may cause the communication screen to include a selection button for selecting the additional object to be added into the communication screen. For example, after the selection button is selected by the user A who operates the input device 24, the display processing unit 274 selects one or multiple additional objects from a group including multiple additional objects that are stored in the terminal storage device 22 in accordance with a predetermined selection method. Examples of the predetermined selection method include a method of randomly choosing one from the group including the multiple additional objects and a method of selecting one from the group including the multiple additional objects in a predetermined order. The display processing unit 274 and the transmission unit 272 perform the adding process by using the object ID of the selected additional object and the instruction for adding. Consequently, the character object of the user A can change the user output information, based on the selected additional object.

In this case, the communication screen of each user B of the character object that wears the wearable object related to the selected additional object may include a wearing button. Examples of the wearable object related to the additional object include a wearable object that has the same attribution as the additional object and a wearable object that has the same color as the additional object. In this case, information that represents the attribution of each object and/or information that represents the color are associated with the object ID and are stored in the object table T2. Information that represents the attribution of the character object of each user and/or the information that represents the color are associated with the user ID of the user and are stored in the user table T1. Examples of the attribution include an object type (such as a male or a female). The attribution may be the kind of a lottery game that enables an object to be acquired. After the wearing button is selected by the user B who operates the input device 24, the display processing unit 274 identifies the object ID of the selected additional object, and the display processing unit 274 and the transmission unit 272 perform the adding process by using the object ID of the selected additional object and the instruction for adding. Consequently, the character object of the user B can wear the wearable object related to the additional object that is included in the user output image of the user A, and the willingness of the user A to continuously use the communication with the user B can be improved. The communication screen of the user B of the user output image that uses the wallpaper object related to the selected additional object may include the wearing button.

Fourth Modification of First Example

In the case where the user A do not perform the predetermined operation on the communication screen 1310 on which the user output image 812a including the additional object 1311 is displayed, the additional object 1311 may be continuously displayed on the communication screen 1310 of the terminal device 2 of the user A. In this case, the additional object 1311 may be changed into a mark image. Consequently, the user A can change a user character by using, for example, the wearable object that corresponds to the additional object 1311 with a preferable timing.

In the case where the number of the additional object 1311 on which the user A do not perform the predetermined operation exceeds a predetermined number, information about the additional object 1311 on which the user A do not perform the predetermined operation may be transmitted to the terminal devices 2 of the other users B (the users B1 to B3) via the server device 3. In this case, the additional object 1311 on which the user A do not perform the predetermined operation is displayed on the terminal devices 2 of the users B (the users B1 to B3). In the case where each user B performs the predetermined operation on the additional object 1311, the input device 24 of the terminal device 2 of the user B inputs the instruction for agreeing into the terminal processing device 27 together with the object ID of the additional object 1311 instead of the input device 24 of the terminal device 2 of the user A. The agreeing process is subsequently performed. Consequently, even in the case where the user A do not wear the wearable object that corresponds to the additional object that is gifted from another user B, another user other than the user A can wear the wearable object that corresponds to the additional object.

Fifth Modification of First Example

In the case where the character object is generated based on the three-dimensional model data for generating the three-dimensional animation, the user output image of each user may be an image acquired when the character object that is the three-dimensional object that is placed in the virtual space that is defined for every user is viewed from a predetermined viewpoint in the virtual space. For example, as for the display processing unit 274, a two-dimensional screen is placed in the direction of the line of sight from the predetermined viewpoint, the three-dimensional coordinates of various three-dimensional objects that are placed in the virtual space are projected on the two-dimensional screen, and the image of a surface of the two-dimensional screen on which the various objects are projected is displayed as the user output image. For example, the direction of the line of sight from the predetermined viewpoint for displaying the user output image of the user A that is displayed on the terminal device 2 of the user A is a direction toward the character object of the user A. The two-dimensional screen for displaying the user output image of the user A that is displayed on the terminal device 2 of the user A is controlled so as to move and rotate depending on the movement of the predetermined viewpoint and the rotation of the direction of the line of sight.

For example, in the case where the character object 811a of the user A wears the new wearable object, the communication screen 1110 illustrated in FIG. 11B is displayed. The display processing unit 274 may automatically move the predetermined viewpoint before or after the communication screen 1110 is displayed.

For example, in the case where the character object 811a of the user A wears the new wearable object, the display processing unit 274 may move the predetermined viewpoint such that the predetermined viewpoint approaches the character object 811a of the user A. For example, the display processing unit 274 calculates a path that connects the position of the predetermined viewpoint when the character object 811a of the user A wears the new wearable object and the position of the new wearable object and automatically moves the predetermined viewpoint along the path. The display processing unit 274 displays an image that represents the virtual space viewed from the predetermined viewpoint that automatically moves in the virtual space as the user output image.

Figure 17A:
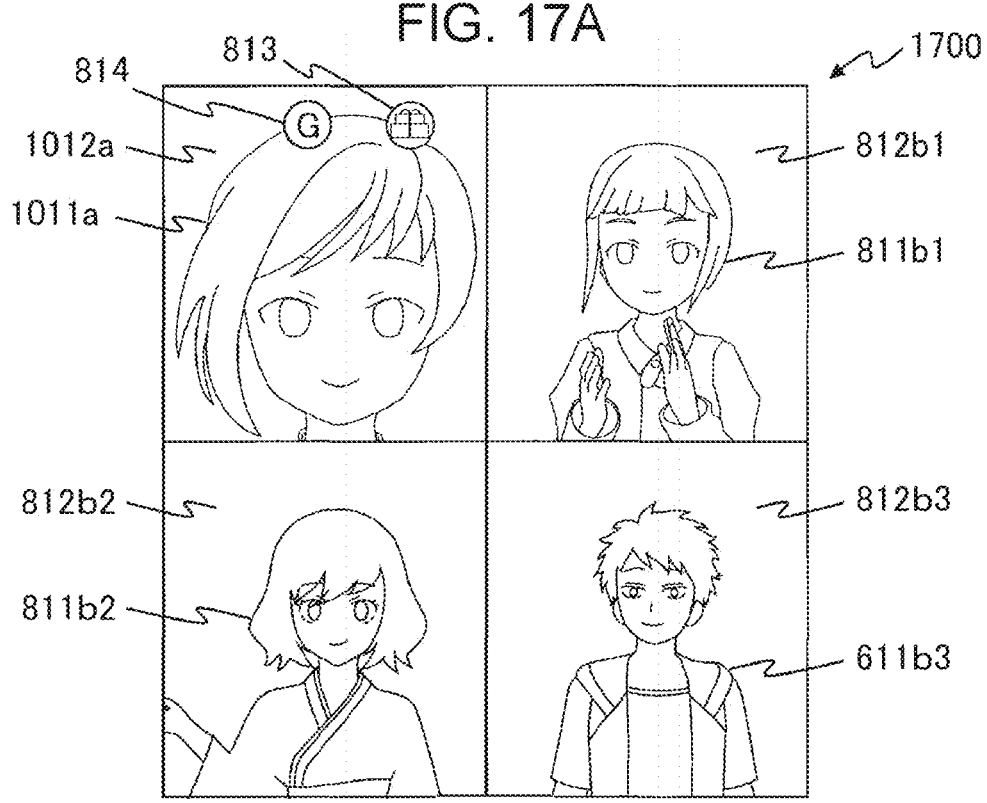
FIG. 17A and FIG. 17B illustrate examples of the screen that is displayed on the display device of the terminal device according to the First Example of the present disclosure.

FIG. 17A illustrates an example of a communication screen 1700 in which the image that represents the virtual space viewed from the predetermined viewpoint that automatically moves in the virtual space is the user output image 1012a. In an example illustrated in FIG. 17A, the hairstyle of the character object 811a of the user A is changed into a new wearable object, and accordingly, the user output image 1012a including the enlarged head of the character object 1011a is displayed.

For example, the display processing unit 274 sets a path around the character object 1011a after the character object 811a of the user A wears the new wearable object. The display processing unit 274 automatically moves the predetermined viewpoint along the path while the direction of the line of sight from the predetermined viewpoint is adjusted to the direction toward the character object 1011a. The display processing unit 274 displays the image that represents the virtual space viewed from the predetermined viewpoint that automatically moves in the virtual space as the user output image.

Figure 17B:
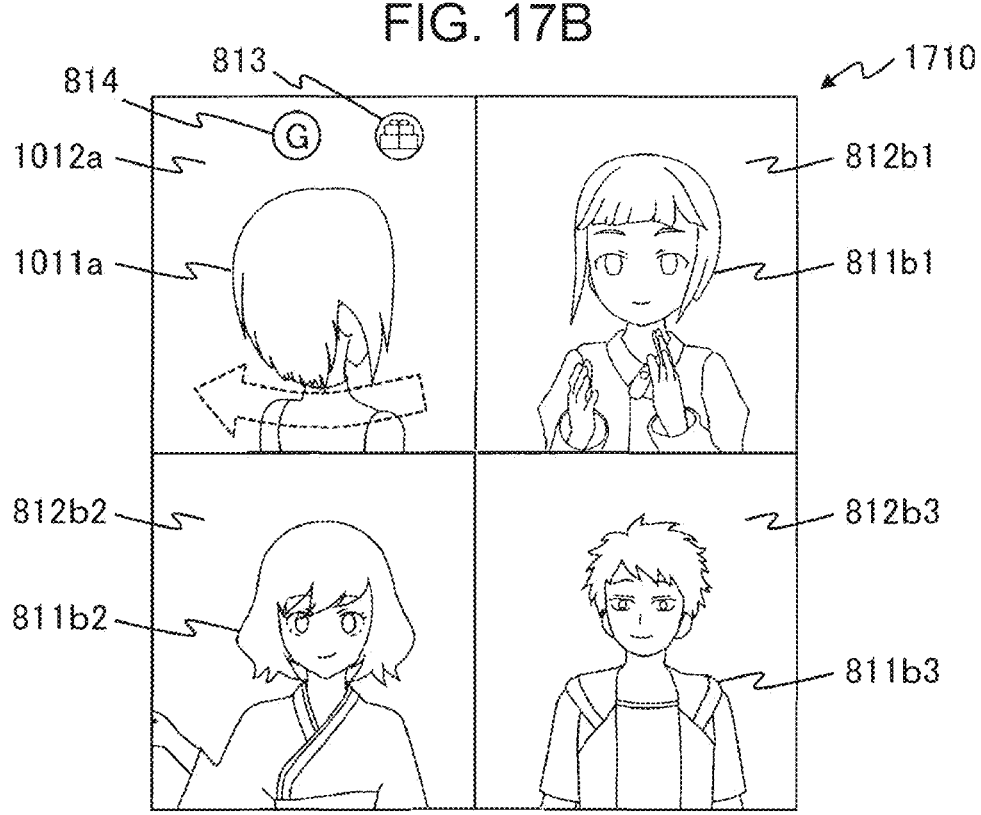

FIG. 17B illustrates another example of a communication screen 1710 in which the image that represents the virtual space viewed from the predetermined viewpoint that automatically moves in the virtual space is the user output image 1012a. In an example illustrated in FIG. 17B, the user output image 1012a including the back of the character object 1011a when the user output image 1012a moves around the character object 1011a of the user A is displayed.

The display processing unit 274 may control the movement of the predetermined viewpoint and/or the rotation of the direction of the line of sight from the predetermined viewpoint depending on the predetermined operation of the user A on the communication screen of the input device 24. The display processing unit 274 may add an automatic movement button for automatically moving the predetermined viewpoint into the communication screen during the communication screen. In this case, for example, after the automatic movement button is selected by the user A who operates the input device 24, the display processing unit 274 may automatically move the predetermined viewpoint depending on a predetermined movement rule.

Sixth Modification of First Example

In the case where the character object is generated based on the three-dimensional model data for generating the three-dimensional animation, the user output image of each user may be an image acquired when the interior of the virtual space is viewed from a user viewpoint that is located at a predetermined position (for example, the position of the eyes of the character object) on the character object that is the three-dimensional object that is placed in the virtual space common to each user. The user viewpoint may move from the predetermined position on the character object depending on the operation of the user and/or automatically and may be positioned behind, above, or in front of the character object.

Figure 18:
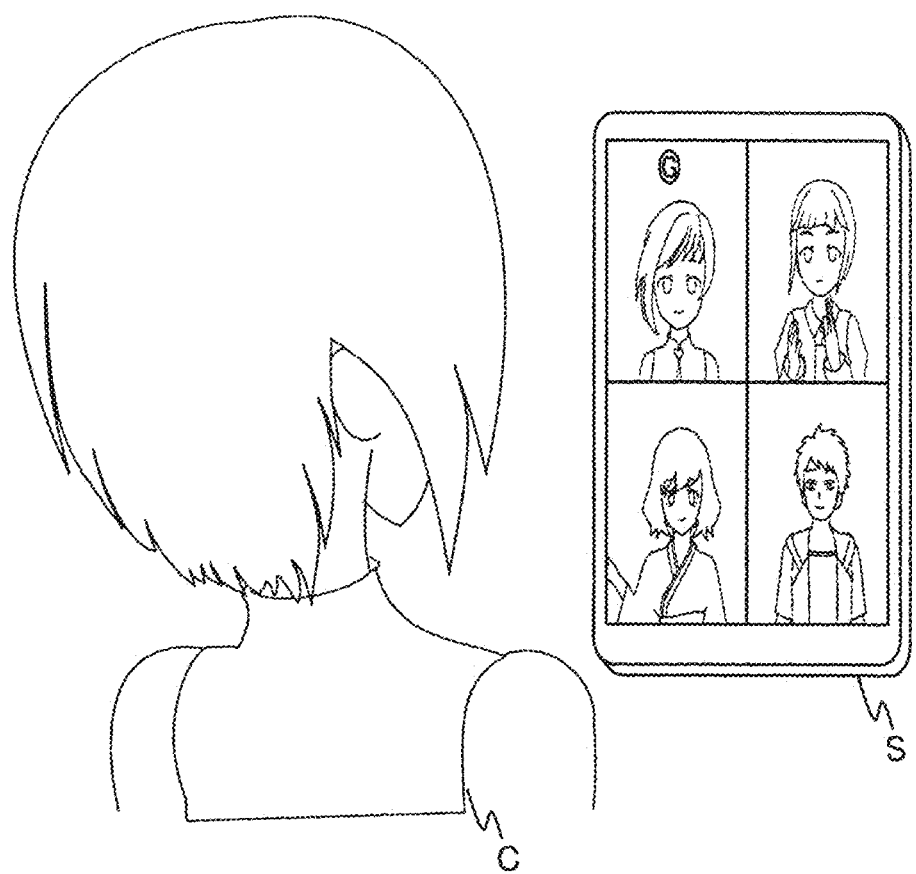
FIG. 18 is a schematic diagram for describing a virtual space according to the First Example of the present disclosure.

An example of a method of using the communication service in the virtual space common to each user will be described. For example, as illustrated in FIG. 18, the display processing unit 274 creates a device object S such as a virtual tablet PC within the range of the field of view from the user viewpoint of a character object C of the user A in the virtual space. The various screens described with reference to FIG. 6A to FIG. 15B, FIG. 17A, and FIG. 17B are displayed on a display device for the device object S. In this case, the user output image of the user A that is displayed on the display device for the device object S is a two-dimensional image acquired when the interior of the virtual space is viewed from a virtual camera that is disposed at a predetermined position on the device object S. The voice data of the user A is acquired by the microphone 26 of the terminal device 2.

The transmission unit 272 of the terminal device 2 transmits the user output image of the user A, the voice data of the user A, and the user ID of the user A to the terminal devices 2 of all of the users B via the server device 3. The transmission unit 272 may transmit the direction of the line of sight and the position of the virtual camera in the virtual space, the direction of the body and the position of the character object of the user A in the virtual space, and the motion data of the user A instead of the user output image of the user A. The terminal device 2 of the user A receives the user output image of each user B, the voice data of the user B, and the user ID of the user B from the terminal device 2 of the user B via the server device 3. The display processing unit 274 of the terminal device 2 of the user A displays the user output image of the user B on the display device for the device object S and outputs the voice data of the user B from the terminal device 2. Consequently, the communication service that uses the virtual device object S can be provided.

Seventh Modification of First Example

At least a part of the function that is fulfilled by the terminal processing device 27 of each terminal device 2 may be fulfilled by using a processor other than the terminal processing device 27 of the terminal device 2. For example, at least a part of the function that is fulfilled by the terminal processing device 27 may be fulfilled by using the server processing device 33 of the server device 3. Specifically, parts of the functions of the generation unit 271 and the display processing unit 274 may be performed by the server device 3. For example, the terminal device 2 transmits the imaging data and the voice data that are continuously acquired to the server device 3 together with the user ID of the user who operates the terminal device 2. The server device 3 generates the character video data by using the functions of the generation unit 271 and the display processing unit 274 and generates display information for displaying the communication screen including the user output images of all of the users on the display device 23. The server device 3 transmits the display information to the terminal devices 2 of all of the users together with the voice information (the voice data). The terminal devices 2 output the information that is received from the server device 3 (so-called "server rendering").

Eighth Modification of First Example

Each terminal device 2 has a function of displaying, for example, the communication screen by executing various instructions that are included in the control program that is stored in the terminal device 2. The terminal device 2 may call a browser function that is incorporated into web application to perform the communication service, may receive a webpage (a document that is written by using a markup language such as the hypertext markup language (HTML)) by using the browser function from the server device, and may perform a control program that is incorporated into the webpage (so-called "browser rendering"). For example, the use of HTML5 as the markup language enables the terminal device 2 to readily perform a new information process. The use of the web application by the terminal device for providing the communication service enables the new information process to be provided to a client side (the terminal device) merely by incorporating a new program into the webpage that is transmitted by the server device and enables a time required for creating the new program to be greatly reduced. The client side can receive a newly provided service merely by receiving the webpage without downloading a new control program, can reduce the load of the communication network, communication costs, and/or a communication time unlike downloading of the control program, and can simplify the user interface.

Ninth Modification of First Example

The generation unit 271 of the terminal device 2 of the user A may generate the output information including the face motion data without using the imaging data. For example, the terminal storage device 22 of each terminal device 2 may store the face motion data that corresponds to the voice data, and the generation unit 271 may extract the face motion data that corresponds to the acquired voice data of the user A from the terminal storage device 22 and may generate the output information including the extracted face motion data, the voice data, and the user ID of the user A. The generation unit 271 of the terminal device 2 of the user A may generate the output information including the voice data of the user A that is outputted from the microphone 26 and the user ID that is stored in the terminal storage device 22 without the face motion data. In this case, the display processing unit 274 of the terminal device 2 of each user B may extract the face motion data that corresponds to the voice data of the user A that is included in the output information about the user A that is received via the server device 3 and may generate the animation of the character object of the user A. A process of generating the face motion data that corresponds to the voice data of the user may use a known lip sync algorithm.

The terminal device 2 of the user A that uses a HMD as the display device 23 can have the communication with the users B by using the character object without acquiring the imaging data of the user A.

Second Example

Outline of Information System

FIG. 19A to FIG. 19D are schematic diagrams for describing an example of the outline of an information system. The information system includes terminal devices that are operated by multiple users and a server device. For example, the terminal devices are information processing apparatuses such as multifunction cellular phones (so-called "smart phones") of the users. An example of the server device is a computer for providing a communication service between the terminal devices via a communication network.

Each terminal device stores a control program such as an application program, loads the control program into a memory depending on a start operation from the user, and starts the communication service by executing instructions that are included in the loaded control program. After the communication service starts, the terminal device executes instructions that are included in the control program and consequently fulfil multiple functions.

For example, the terminal device of the user fulfils a generation function of generating output information including character video data including motion data based on various kinds of input data inputted from the user. Examples of the input data include multiple pieces of imaging data acquired by an imaging device that is included in the terminal device of the user at predetermined sampling time intervals. In this case, the imaging data contains an image of the user. The character video data is an example of information about display of a user output image including a character object that represents the user. During the communication service, the output information is generated every predetermined time.

An example of the character object is a three-dimensional object that has an appearance of a humanoid animation character and that is generated based on three-dimensional model data. The character object may be a three-dimensional object that has an appearance of a shape selected from various shapes of animals such as a dog and a cat and an artifact such as a robot and that is generated based on three-dimensional model data. In this case, the user output image includes the image of the character object viewed from a predetermined viewpoint. The character object may be a two-dimensional object that is generated based on two-dimensional model data. The surface of the character object for which image information that represents an animal such as a dog or a cat or an artifact such as a robot is used has the appearance of, for example, the animal such as a dog or a cat or the artifact such as a robot. In some cases, the three-dimensional object and the two-dimensional object are simply referred to below as the object.

In the case where the character object is an object that has the appearance of the humanoid animation character, the character object includes multiple partial objects. For example, the character object includes a partial object that corresponds to a head, a partial object that corresponds a torso, a partial object that corresponds arms, and a partial object that corresponds to legs. Each partial object may correspond to a part (such as eyes, a mouth, a nose, eyebrows, a beard, or hair) of a face. Multiple kinds of partial objects may be prepared for the same part (such as a head or a torso). For example, a partial object that corresponds to black hair and a partial object that corresponds to brown hair may be prepared as partial objects that correspond to hair, and a partial object that corresponds to black drooping eyes, a partial object that corresponds to blue drooping eyes, a partial object that corresponds to black slanted eyes, and a partial object that corresponds to blue slanted eyes may be prepared as partial objects that correspond to eyes. For example, the character object may include a partial object that corresponds to a hat that covers at least a part of the head, and a partial object that corresponds to clothing that covers at least parts of the torso and the arms. The character object thus includes the multiple partial objects. The partial objects are components of the character object. The sizes of the character object and the partial objects may be changeable. For example, in response to an instruction for changing height from the user, the sizes of the partial objects such as a head, a torso, legs, or arms are changed such that the height is changed. For example, in response to an instruction for changing the size of a partial object from the user, the size of a corresponding partial object may be changed (for example, in response to an instruction for changing a leg length from the user, the lengths of the legs may be changed).

A partial object that is included in the character object can be changed into a new partial object of the same kind as the kind of a partial object at a corresponding position depending on an instruction from the user. For example, a partial object that is included in the character object and that corresponds to long pants is changed into a new partial object that corresponds to short pants, and consequently, the appearance of the character object that seems to wear the long pants is changed into the appearance of the character object that seems to wear the short pants. The new partial object may be set as the partial object that is included in the character object depending on an instruction from the user. For example, a new partial object that corresponds to a hat is used for the character object that does not wear a hat, and consequently, the appearance of the character object that seems to wear nothing on the head is changed into the appearance of the character object that seems to wear the hat. The new partial object is thus used for the character object, and consequently, the appearance of the new partial object of the character object is changed. An additional object that can be worn on the character object described later is a kind of a partial object.

For example, the terminal device of the user fulfils an output function of transmitting the output information to the server device every predetermined time to display the user output image, based on the character video data and to transmit the generated output information to the terminal device of another user via the server device. For example, the terminal device of the user fulfills a function of displaying an other-user output image including a character object of the other user, based on output information about the other user that is transmitted from the server device every predetermined time.

Figure 19A:
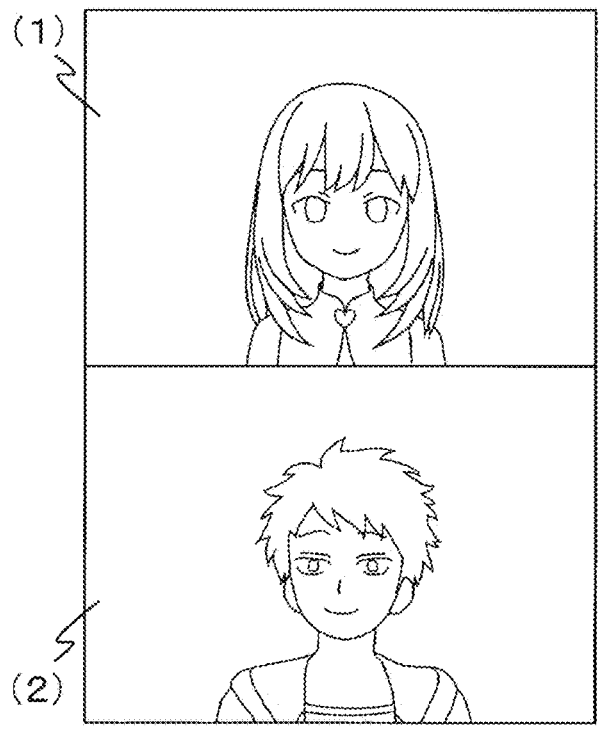
FIG. 19A to FIG. 19D are schematic diagrams for describing an outline of an information system according to a Second Example of the present disclosure.

After the communication service starts, as illustrated in FIG. 19A, the terminal device of the user displays, for example, (1) the user output image and (2) the other-user output image. When the communication service starts, the terminal device of the user displays only (1) the user output image in the case where the other user does not participate in the communication service. When the communication service starts, the terminal device of the other user displays only (2) the other-user output image in the case where the user does not participate in the communication service.

(1) The user output image includes the character object of the user that moves depending on the motion data of the user that is included in the character video data. (2) The other-user output image includes the character object of the other user that moves depending on the motion data of the other user that is included in the received output information about the other user. The terminal device of the user thus displays (1) the user output image including the character object of the user that changes depending on the motion of the user and displays (2) the other-user output image including the character object of the other user that changes depending on the motion of the other user.

The terminal device of the user and the terminal device of the other user includes respective microphones. Accordingly, the terminal device of the user acquires a voice that sounds from the user, and the terminal device of the other user acquires a voice that sounds from the other user. The terminal device of the user adds the data of the acquired voice of the user into the output information and transmits the output information to the server device to transmit the output information including the voice data of the user to the terminal device of the other user via the server device. The terminal device of the user receives, from the server device, the output information including the voice data of the other user that is transmitted by the terminal device of the other user to the server device.

For example, when the voice sounds from the user, the motion data of the user that is included in the character video data includes face motion data that represents the motion of the lips of the user. In this case, the terminal device of the user displays (1) the user output image including the character object of the user that moves the lips substantially in synchronization with the voice that sounds from the user. In some cases, the output information about the other user that is received by the terminal device of the user includes the voice data of the other user together with the motion data of the other user. In this case, the terminal device of the user outputs the voice of the other user and displays (2) the other-user output image including the character object of the other user that moves the lips substantially in synchronization with the voice of the other user.

In addition to the functions described above, the information system may fulfil a function of providing a selection event for selecting information about at least one specific object from multiple specific objects depending on an instruction from the user. In the case where the specific object can be used as a partial object of the character object, the terminal device of the user may fulfil a function of displaying (1) the user output image including the character object of the user that is at least partly changed based on the selected at least one specific object. In the selection event, anything may be selected provided that the thing changes the form of the character object of the user that is displayed and/or changes the voice data to be outputted. For example, in the selection event, a background image that is used as the background of the character object in the user output image may be selected. In the selection event, an image or a partial object for changing the expression of the character object in the user output image may be selected. For example, after the user uses (applies) the image or the partial object for changing the expression, at least a part of the face in the animation of the character object that is generated such that the expression of the character object changes based on the face motion data of the user is changed into the image or the partial object for changing the expression. The image or the partial object does not change based on the face motion data. Accordingly, the use of the image or the partial object changes the expression into an expression that differs from the face motion data of the user. In the selection event, automatic motion data for causing the character object to automatically move (such as a hand-waving motion or a peace sign motion) may be selected. In the selection event, sound source data for outputting a predetermined sound effect or music may be selected. In the selection event, when the inputted voice data is outputted, right data that represents a right to perform a voice conversion process of changing the pitch of the voice data and/or a voice element such as a formant may be selected. After the user uses (applies) the right data related to the voice conversion process, the voice data that is inputted from the user is changed in the voice conversion process, and the output information including the changed voice data is transmitted. In the selection event, the character object may be selected. For example, after the character object is selected in the selection event, the current character object of the user may be changed into the selected character object temporarily (for example, for 1 minute) or until the communication service ends. In the selection event, right data that represents a right to organize a predetermined event may be selected. For example, the right data represents a right to organize a specific selection event.

Figure 19B:
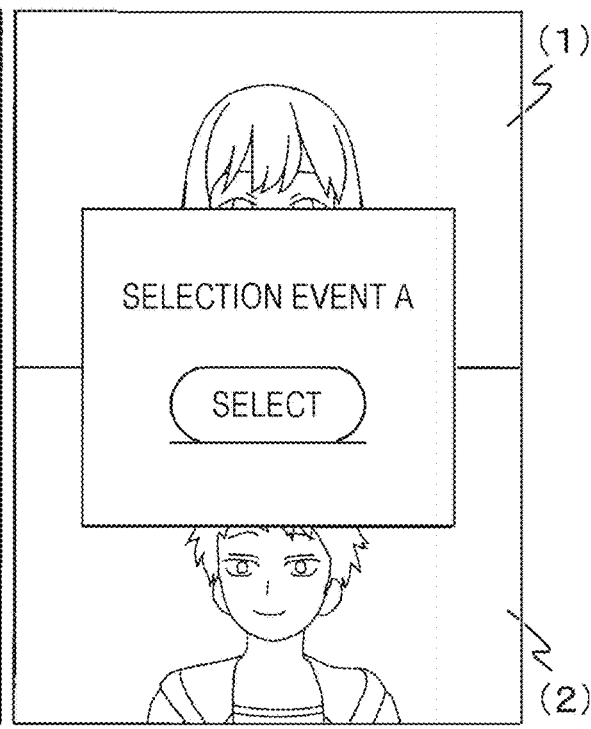

For example, in the case where an instruction for displaying a selection instruction screen is inputted from the user during the communication service, the terminal device of the user displays the selection instruction screen (FIG. 19B). For example, the selection instruction screen includes a selection instruction button. In the case where the selection instruction button that is included in the displayed selection instruction screen is selected depending on the operation of the user, the terminal device of the user transmits information that represents an instruction for selecting to the server device. The server device stores information about the multiple specific objects. For example, the information about the specific objects includes identification information (object IDs (identification)) for identifying the specific objects. For example, the information about the specific objects may include the attributions and names of the specific objects.

The server device receives the information that represents the instruction for selecting from the terminal device of the user and extracts the stored information about the multiple specific objects. The server device selects information about at least one specific object from the extracted information about the multiple specific objects in accordance with a predetermined selection method. The predetermined selection method is a method of selecting the information about at least one specific object from the information about the multiple specific objects, for example, based on predetermined probability of selection that is associated with the information about each specific object. The predetermined probability of selection is an example of the probability of selection that the information about the specific object is selected. For example, in the case where the information about each specific object is selected from the information about the multiple specific objects with equal probability, the same probability of selection is associated with the information about the respective specific objects. The predetermined selection method may be a method of selecting the information about at least one specific object from the information about the multiple specific objects in an order associated with the information about the specific objects.

Figure 19C:
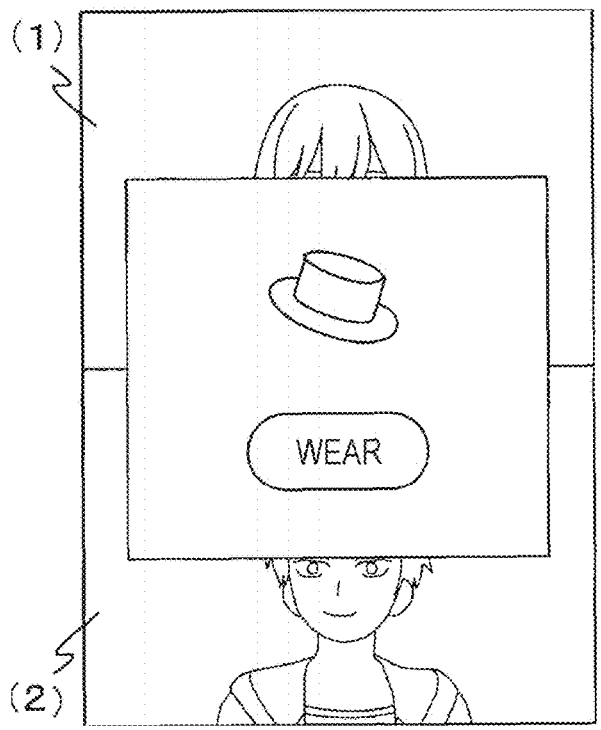

The server device transmits the selected information about at least one specific object to the terminal device of the user (the terminal device that transmits the information that represents the instruction for selecting). The terminal device of the user displays a selection result screen, based on the received information about at least one specific object (FIG. 19C). For example, the selection result screen includes information that represents at least one specific object and a use button. In the case where the use button that is included in the displayed selection result screen is selected depending on the operation of the user, an instruction for using is inputted into the terminal device of the user. The terminal device of the user displays (1) the user output image including the character object of the user that is at least partly changed based on the information about at least one specific object depending on the instruction for using (FIG. 19D).

For example, the information about at least one specific object is the object ID for identifying a wearable object that changes the appearance of a part of the character object of the user. The information about at least one specific object may be the object ID for identifying a wallpaper object that is placed on the back of the character object of the user. In an example illustrated in FIG. 19C, the information about the specific object that is used to change at least a part of the character object of the user is the object ID for identifying a wearable object of a "hat" that changes the appearance of the "head" of the character object.

Figure 19D:
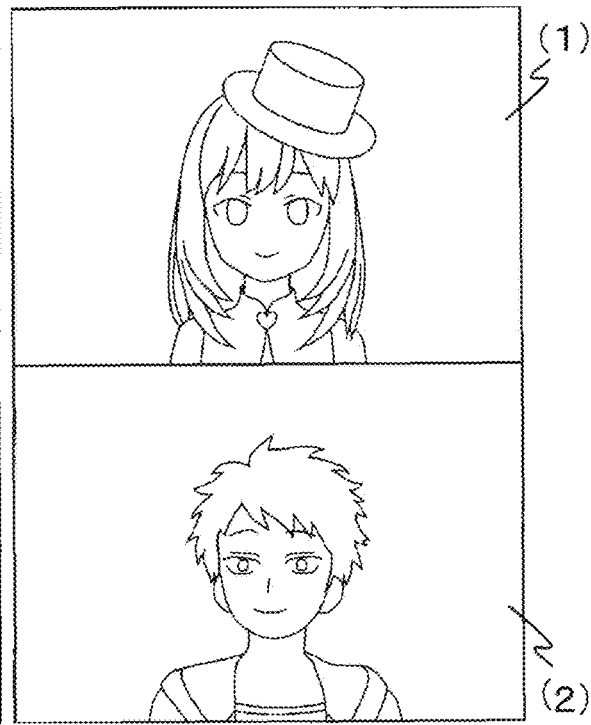

In an example illustrated in FIG. 19C and FIG. 19D, the terminal device of the user acquires image information that represents the wearable object of the "hat", based on information about the wearable object of the "hat" depending on the instruction for using from the user. For example, the terminal device of the user acquires the image information about the "hat" associated with the object ID for identifying the wearable object of the "hat" that is received from the server device from a storage device of the terminal device. The terminal device of the user generates the animation of the character object of the user that wears the wearable object of the "hat" on the "head", based on the acquired image information. As illustrated in FIG. 19D, the terminal device of the user displays (1) the user output image including the character object of the user that wears the "hat", based on the generated animation.

As for the control program of each terminal device, the terminal device, a method of controlling the terminal device, the control program of the server device, the server device, and a method of controlling the server device, as described above with reference to FIG. 19A to FIG. 19D, (1) the user output image including the character object of the user that is at least partly changed based on the specific object that is selected from the multiple specific objects depending on an instruction from the user is displayed. The control program of the terminal device, the terminal device, the method of controlling the terminal device, the control program of the server device, the server device, and the method of controlling the server device can thus improve the willingness of the user to continuously use the communication in a manner in which the output from the terminal device is changed by the user or another user during the communication service.

As for an existing information system, it is necessary for a user to suspend or end a communication service to start another service or event while the user communicates with another user by using a character object such as an avatar that represents the user. Subsequently, a server device, for example, is instructed to start the other service or event, and consequently, the other service can be provided to the user and the other user. The existing information system thus establishes multiple communications related to the suspension or end of the service and the start of the other service to provide, for example, the other service while the service is provided to the user and the other user. This leads to a problem in that the processing load of a terminal device and/or communication load between the terminal device and the server device. In contrast, as for the control program of the terminal device of the user, the terminal device of the user, the method of controlling the terminal device of the user, the control program of the server device, the server device, and the method of controlling the server device disclosed according to the embodiment, the selection event of the specific object can be provided to the user and the other user by using only a communication related to the start of the selection event of the specific object, and the processing load of the terminal device and/or communication load between the terminal device and the server device can be reduced. The control program of the terminal device of the user, the terminal device of the user, the method of controlling the terminal device of the user, the control program of the server device, the server device, and the method of controlling the server device disclosed according to the embodiment achieve seamless transition to another service or another event such as the selection event by using a simple interface while the communication service continues.

In examples illustrated in FIG. 19A to FIG. 19D, the user and the other user among the multiple users who can use the communication service belong to a predetermined communication group. For example, the predetermined communication group is created by the user or the other user. In the examples illustrated in FIG. 19A to FIG. 19D, the character objects of the two users are displayed. However, the character objects of three or more users who belong to the predetermined communication group may be displayed, and the three or more users may be able to communicate with each other.

In the examples illustrated in FIG. 19A to FIG. 19D, the user and the other user may have a predetermined relationship. For example, the other user who has the predetermined relationship with the user is a mutual follower of the user. In the case where the user follows the other user, and the other user follows the user (the user and the other user follow each other), the user and the other user are mutual followers. The other user who has the predetermined relationship with the user may be a mutual follower of a user who is a mutual follower of the user. The other user who has the predetermined relationship with the user may be a friend of the user or may be a user of a terminal device that stores specific information (such as a phone number, a mail address, or a predetermined ID (identification)). In the case where the terminal device of the user has a function of livestreaming the user output image including the character object of the user to the terminal devices of one or multiple other users via the server device, the other user who has the predetermined relationship with the user views the user output image that is livestreamed by the user. In this case where the user and the other user who have the predetermined relationship communicate with each other as illustrated in FIG. 19A to FIG. 19D, the predetermined communication group to which the user and the other user belong may be temporarily created by the terminal device of the user or the other user or the server device.

The above description for FIG. 19A to FIG. 19D is merely referred to deepen understanding of the content of the present disclosure. The modifications are included in the scope of the present disclosure.

Information System 1

Figure 20:
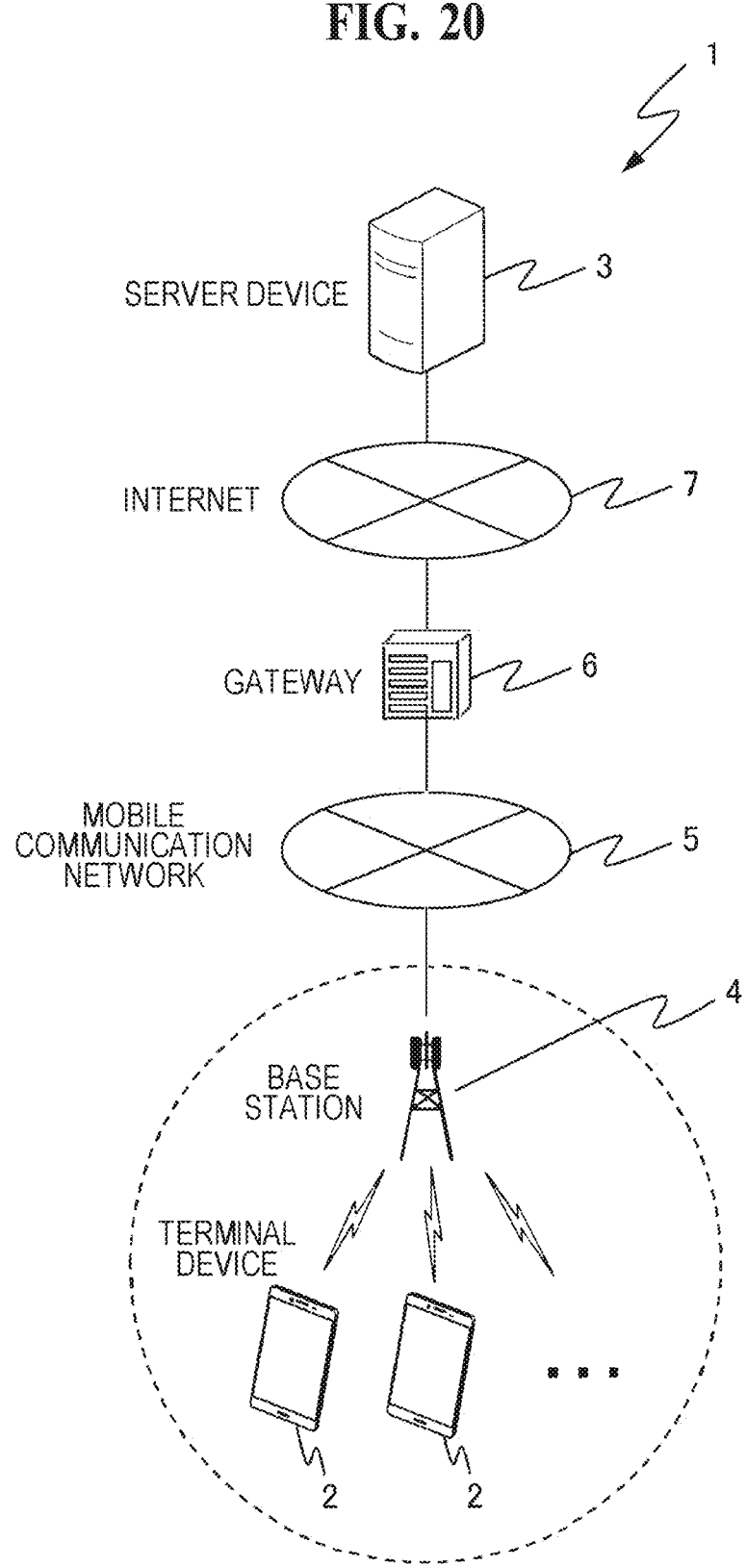
FIG. 20 schematically illustrates a structure of the information system according to the Second Example of the present disclosure.

FIG. 20 schematically illustrates an example of the structure of an information system 1. The information system 1 includes terminal devices 2 that are operated by multiple users and a server device 3. The terminal devices 2 and the server device 3 are connected to each other via a communication network such as a base station 4, a mobile communication network 5, a gateway 6, and the internet 7. Communication between the terminal devices 2 and the server device 3 is based on a communication protocol such as a hypertext transfer protocol (HTTP). Connections may be first established between the terminal devices 2 and the server device 3 through HTTP communication, and communication may be subsequently established based on WebSocket for two-way communication at a lower cost (light communication load and light processing load) than the HTTP communication. A communication method for the terminal devices 2 and the server device 3 is not limited to the method described above. The technique of any communication method may be used for the terminal devices 2 and the server device 3, provided that the present embodiment can be carried out.

The terminal devices 2 are information processing apparatuses such as smart phones. The terminal devices 2 may be cellular phones, note PCs, tablet terminals, tablet PCs, head mounted displays (HMDs), electronic book readers, or wearable computers. The terminal devices 2 may be handheld game devices or game consoles. Each terminal device 2 may be any information processing apparatus, provided that the character objects of the user and another user can be outputted for displaying, and the voices of the user and the other user can be outputted.

In an example illustrated in FIG. 2, the single server device 3 is illustrated as a component of the information system 1, but the server device 3 may be a collection of multiple server devices 3 that are physically separated from each other. In this case, the multiple server devices 3 may have the same function or may have functions into which the function of the single server device 3 is divided. For example, a server device 3a that has a function of receiving and transmitting the output information about the user and the output information about the other user and a server device 3b that has a function of providing the selection event to the user may be components that are included in the information system 1.

Terminal Device 2

Figure 21:
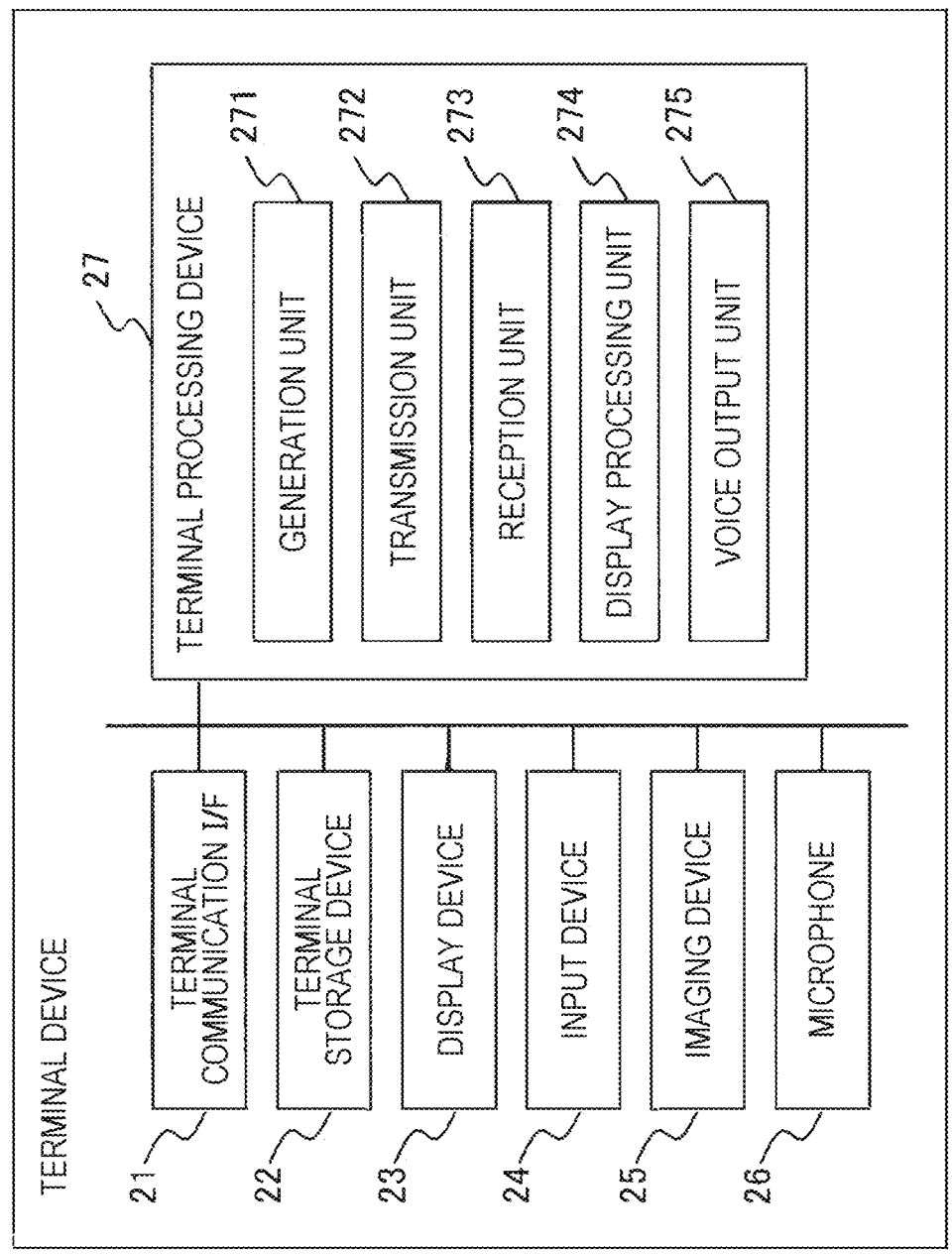
FIG. 21 schematically illustrates a structure of a terminal device according to the Second Example of the present disclosure.

FIG. 21 schematically illustrates an example of the structure of each terminal device 2. The terminal device 2 is connected to the server device 3 via the communication network such as the base station 4, the mobile communication network 5, the gateway 6, and the internet 7 and communicates with the server device 3. The terminal device 2 generates the character video data including the motion data in accordance with various kinds of data (such as the imaging data) inputted from the user and transmits the generated character video data and/or the output information including the voice data of the user to the server device 3. The terminal device 2 receives the output information about the other user that is transmitted from the server device 3, displays the character object of the other user, based on the received output information, and/or outputs the voice of the other user. To fulfil such a function, the terminal device 2 includes a terminal communication I/F 21, a terminal storage device 22, a display device 23, an input device 24, an imaging device 25, a microphone 26, and a terminal processing device 27.

The terminal communication I/F 21 is mounted as hardware, firmware, communication software such as a transmission control protocol/internet protocol (TCP/IP) driver or a point-to-point protocol (PPP) driver, or a combination thereof. The terminal device 2 can transmit data to another device such as the server device 3 and can receive data from another device via the terminal communication I/F 21.

An example of the terminal storage device 22 is a semiconductor memory device such as a read only memory (ROM) or a random access memory (RAM). For example, the terminal storage device 22 stores an operating system program, a driver program, a control program, and data that are used for processing of the terminal processing device 27. Examples of the driver program that is stored in the terminal storage device 22 include an output device driver program that controls the display device 23 and an input device driver program that controls the input device 24. An example of the control program that is stored in the terminal storage device 22 is an application program for fulfilling various functions related to the communication service. The control program may be transmitted from the server device 3 or another device.

The terminal storage device 22 stores data such as identification information (for example, a user ID (identification)) for uniquely identifying the user who operates the terminal device 2. The terminal storage device 22 stores data such as background data and model data. The terminal storage device 22 stores data such as a user table T1, an object table T2, and a group table T3. The terminal storage device 22 may temporarily store data related to predetermined processing.

The background data is asset data for creating a virtual space in which the character object of the user is present in the user output image. The background data includes data for drawing the background of the virtual space, data for drawing various objects that are included in the user output image, and another data for drawing various background objects that are displayed in the user output image. The background data may include object position information that represents the positions of the various background objects in the virtual space.

The display device 23 is a liquid-crystal display. The display device 23 may be an organic electro-luminescence (EL) display. The display device 23 displays, for example, a video image depending on video image data and/or a still image depending on still image data that is supplied from the terminal processing device 27 on a display screen. The display device 23 may not be a component of the terminal device 2. In this case, the display device 23 may be a HMD display that is capable of communicating with the server device 3, a screen device for projection mapping or a projection device for retinal projection that is capable of communicating with the terminal device 2 in a wired or wireless manner.

The input device 24 is a pointing device such as a touch screen. In the case where the input device 24 is a touch screen, the input device 24 can detect various touch operations such as tapping, double tapping, and dragging of the user. The touch screen may include an electrostatic capacity proximity sensor and may be capable of detecting a non-contact operation of the user. The input device 24 may be input keys. For example, the user can input a character, a numeral, a symbol, and a position on the display screen of the display device 23 by using the input device 24. The input device 24 generates a signal that corresponds to the operation of the user. The input device 24 supplies the generated signal, which corresponds to an instruction from the user, to the terminal processing device 27.

The imaging device 25 is a camera that includes, for example, an imaging optical system, an imaging element, and an image processing unit. The imaging optical system, an example of which is an optical lens, images luminous flux from an object on an imaging surface of the imaging element. An example of the imaging element is a charge coupled device (CCD) or a complementary metal oxide semiconductor (CMOS) that outputs an image of the object that is imaged on the imaging surface. The image processing unit generates video image data in a predetermined file format every predetermined period from images that are continuously generated by the imaging element and outputs the video image data as the imaging data. The image processing unit generates still image data in a predetermined file format from an image that is generated by the imaging element and outputs the still image data as the imaging data.

The microphone 26 is a sound collector configured to acquire the voice that sounds from the user and to convert the voice into the voice data. The microphone 26 can acquire a voice input from the user, converts the voice input of the user that is acquired by the microphone 26 into the voice data, and outputs the voice data to the terminal processing device 27.

The terminal processing device 27 is a processor that loads the operating system program, the driver program, and the control program that are stored in the terminal storage device 22 into the memory and that executes instructions that are included in the loaded programs. Examples of the terminal processing device 27 include electronic circuits such as a CPU, a MPU, a DSP, a GPU and various combinations of the electronic circuits. The terminal processing device 27 may function by using an integrated circuit such as an ASIC, a PLD, a FPGA, or a MCU. In FIG. 3, the terminal processing device 27 is illustrated as a single component. However, the terminal processing device 27 may be a collection of multiple processors that are physically separated from each other.

The terminal processing device 27 executes various instructions that are included in the control program and consequently functions as a generation unit 271, a transmission unit 272, a reception unit 273, a display processing unit 274, and a voice output unit 275. The functions of the generation unit 271, the transmission unit 272, the reception unit 273, the display processing unit 274, and the voice output unit 275 will be described later.

Various Tables

FIG. 22A to FIG. 22C illustrate examples of the data structures of the user table T1, the object table T2, and the group table T3 that are stored in the terminal storage device 22. At least the user table T1, the object table T2, or the group table T3 may be stored in a server storage device 32 of the server device 3. In this case, the terminal device 2 may receive the latest table that is stored in the server storage device 32 with a predetermined timing and may store the latest table in the terminal storage device 22.

User Table T1

FIG. 22A illustrates an example of the data structure of the user table T1 for managing the users who participate in the communication service. The user table T1 stores the user ID, the name of the user, the character object of the user, an owned object of the user, and a use object that are associated with each other as for each user. For example, the user table T1 may store an owned coin of the user (information that represents the total amount of the "coin" that the user owns for representing a virtual monetary value) and/or a user point associated with the user ID of the user. The user ID is an example of identification data for uniquely identifying each user. The name is an example of data that represents the name of each user.

For example, the character object is a model ID for identifying model data for generating the animation of the character object. The model data is associated with the model ID and is stored in the terminal storage device 22. The model data may be three-dimensional model data for generating a three-dimensional animation or may be two-dimensional model data for generating a two-dimensional animation. The model data includes rig data (so-called "skeleton data") that represents, for example, the skeleton of a portion other than the face and the face of the character object and surface data that represents the shape and texture of the surface of the character object. The model data may include multiple different pieces of model data. The multiple pieces of model data may include respective different pieces of rig data or the same rig data. The multiple pieces of model data may include respective different pieces of surface data or the same surface data. Multiple object IDs that are associated with the respective partial objects that are included in the character object may be associated with the model ID. In this case, the three-dimensional model data for generating the three-dimensional animation may be stored in the terminal storage device 22 and the server storage device 32 for the respective object IDs of the multiple partial objects. In this case, in a process of displaying the character object, the object IDs of the multiple partial objects that are associated with the model ID may be extracted, the three-dimensional model data that corresponds to the respective object IDs (of the partial objects) may be identified, and the character object may be displayed based on the identified three-dimensional model data (of the partial objects). The image information that corresponds to the three-dimensional model data may be stored.

The owned object is the object ID that represents an object that the user owns. Examples of the owned object include a wearable object that can be associated with a specific portion of the character object and the wallpaper object that is placed on the back of the character object of the user in the user output image. The wearable object and the wallpaper object will be described in detail later. The owned object may include a specific object that is selected in the selection event that is provided by the server device 3 depending on the operation of the user. The owned object may be an object that the user owns with the result that the user consumes the "coin" for representing the virtual monetary value as for a purchasing function in the information system 1.

The use object is the object ID that represents an object that is used in the user output image that is displayed on the terminal device 2 of the user. For example, in the case where an instruction for changing is inputted from the user during the communication service, the character object of the user that is included in the displayed user output image wears the wearable object that is owned as the owned object of the user. In this case, the object ID of the wearable object that is worn on the character object of the user is associated with the user ID as the use object and is stored in the user table T1. For example, in the case where the instruction for changing is inputted from the user during the communication service, the wallpaper object that is owned as the owned object of the user is placed on the back of the character object of the user in the displayed user output image. In this case, the object ID of the wallpaper object that is placed in the user output image is associated with the user ID as the use object and is stored in the user table T1.

Object Table T2

FIG. 22B illustrates an example of the data structure of the object table T2 for managing the object that is selected as the additional object. An example of the additional object is a gift object that is gifted to the other user from the user. The object table T2 stores the object ID, the name, the image information, rarity, and a placement position that are associated with each other as for each additional object.

The object ID is an example of identification data for uniquely identifying each additional object. The image information is one or multiple still images that correspond to each additional object. The image information may be one or more kinds of video images that correspond to each additional object. The rarity is information that represents the rarity of each additional object. The placement position is information that represents the position at which the image information about each additional object is displayed. In the case where the position at which the character object is displayed and a display range are determined, information that represents a relative position with respect to the character object may be stored as the placement position.

The additional object is classified into multiple kinds (categories). Examples of the additional object include an effect object that is used as an effect gift, a normal object that is used as a normal gift, a wearable object that is used as a wearable gift, and a message object that is used as a message gift. The additional object may include the wallpaper object that is placed on the back of the character object in the user output image. Information that represents the kind (category) of the additional object may be associated with the object ID of the additional object and may be stored in the object table T2. The image information and the placement position depending on the kind of the additional object will now be described.

The effect object affects the impression of the whole of the user output image and/or the other-user output image. An example of the effect object is an object that imitates confetti. In the case where the effect object is the object that imitates the confetti, an image that represents multiple pieces of paper is stored as the image information.

Information that represents a "space" is stored as the placement position of the effect object. For example, the object that imitates the confetti is entirely displayed in the user output image and/or the other-user output image. The effect object may be entirely displayed on a screen (a communication screen described later) including the user output image and the other-user output image depending on an instruction from the user. The effect object may be displayed only in an output image that is selected by the user from the user output image and the other-user output image. The effect object may be displayed so as to overlap the character object that is included in the user output image and/or the other-user output image. The effect object is not associated with a specific portion of a character and is displayed unlike the wearable object described later. The terminal devices 2 of the information system 1 thus display the effect object depending on the instruction from the user and can consequently change the impression of the whole of the user output image and/or the other-user output image from that before the effect object is displayed.

For example, the normal object imitates a stuffed animal, a bouquet, an accessory, or a product suitable for a gift or a present. The information that represents the "space" is stored as the placement position of the normal object. For example, the normal object is associated with information about a predetermined movement route, and the normal object that moves along the predetermined movement route in the user output image or the other-user output image is displayed. The information that represents the "space" that is stored as the placement position of the "normal object" may be classified into multiple kinds. Examples of the multiple kinds of the "spaces" include a "central space" (a central region of the image in the case where the user output image or the other-user output image is divided into three regions in a left-right direction), a "left-hand space" (a left-hand region of the image in the case where the user output image or the other-user output image is divided into three regions in the left-right direction), and a "right-hand space" (a right-hand region of the image in the case where the user output image or the other-user output image is divided into three regions in the left-right direction). The multiple kinds of the "spaces" may be a "central space" (a central region of the image in the case where the user output image or the other-user output image is divided into three regions in an up-down direction), an "upper space" (an upper region of the image in the case where the user output image or the other-user output image is divided into three regions in the up-down direction), and a "lower space" (a lower region of the image in the case where the user output image or the other-user output image is divided into three regions in the up-down direction). In this case, the movement route that is associated with the normal object is set in the "space" of the kind that is associated as the placement position of the normal object. For example, in the case where the normal object stores information that represents the "right-hand space", the normal object is associated with information about a movement route that passes through the right-hand region of the image in the case where the user output image or the other-user output image is divided into the three regions in the left-right direction. The normal object may be displayed so as to move in accordance with a predetermined movement rule from a position that is set for the normal object in the user output image or the other-user output image or a position that is automatically and randomly determined. For example, the predetermined movement rule is set such that the normal object moves so as to free-falls. The normal object may be displayed so as to overlap the character object. In this case, the normal object is not associated with a specific portion of the character object and is displayed unlike the wearable object described later. The normal object may be displayed such that the normal object moves so as to bounce when coming into contact with the character object.

In the case where the normal object is displayed so as to overlap the character object, for example, the normal object may be displayed so as to overlap a "portion other than the "head" including the "face" of the character object. In this case, the normal object is displayed so as not to overlap the "head" of the character object. The normal object may be displayed so as to overlap a "portion other than the "upper body" including the "face" of the character object. In this case, the normal object is displayed so as not to overlap the "upper body" of the character object.

The wearable object is associated with a specific portion (a wearing position) of the character object and is displayed in the user output image or the other-user output image. Examples of the specific portion include the front left, the front right, the rear left, the rear right, the front center, the rear center, the left-hand eye, the right-hand eye, the left-hand ear, the right-hand ear, and the entire hair on the head of the character object. The specific portion may be a thumb, a ring finger, a wrist, an elbow, a shoulder, an upper arm, the whole of a hand, and the whole of an arm.

The wearable object that is associated with the specific portion of the character object is displayed so as to be in contact with the specific portion of the character object in the user output image or the other-user output image. The wearable object that is associated with the specific portion of the character object may be displayed so as to partly or entirely cover the specific portion of the character object in the user output image or the other-user output image. The specific portion may be identified by using three-dimensional position information that represents a position in a three-dimensional coordinate space or may be associated with position information in the three-dimensional coordinate space.

Examples of the image information about the wearable object include image information about imitations of an accessory (such as a headband, a neckless, or an earring), cloth (such as a T-shirt or a dress), and a costume that are worn on the character object, and another object wearable on the character object.

Information that represents a wearing portion that represents which part of the character object is associated with the wearable object is stored as the placement position of the wearable object. For example, in the case where the wearable object is a "headband", information that represents the "head" of the character object is stored as the placement position of the wearable object. In the case where the wearable object is a "T-shirt", information that represents the "torso" of the character object is stored as the placement position of the wearable object.

Information that represents multiple wearing portions in the three-dimensional coordinate space may be stored as the placement position of the wearable object. For example, in the case where the wearable object is the "headband", information that represents two portions of the "rear left of the head" and the "rear right of the head" of the character object may be stored as the placement position of the wearable object. The wearable object that imitates the "headband" is displayed so as to be worn on the "rear left of the head" and the "rear right of the head" of the character object.

In the case where multiple kinds of wearable objects are worn on the character object at the same wearing position, the multiple kinds of wearable objects are worn on the character object at time intervals. Consequently, the multiple kinds of wearable objects at the same wearing portion are not simultaneously worn on the character object. For example, in the case where the "head" is stored as the wearing position of the wearable object that represents the "headband" and the wearable object that represents the "hat", the wearable object that represents the "headband" and the wearable object that represents the "hat" are not simultaneously displayed on the head of the character object.

In the object table T2, a display time depending on the kind of the additional object may be associated with the object ID of the additional object and may be stored. For example, the display time of the wearable object that is stored may be longer than the display time of the effect object and the display time of the normal object. For example, in the case where the stored display time of the wearable object is "60 seconds", the stored display time of the effect object may be "5 seconds", and the stored display time of the normal object may be "10 seconds".

Group Table T3

FIG. 22C illustrates an example of the data structure of the group table T3 for managing a group (such as a group for a friend user, a group for the other user who is the mutual follower, or a group that is freely created by the user or the other user) to which the user belongs. The group table T3 is provided for every user. The group table T3 illustrated in FIG. 22C is the group table T3 of the user who operates the terminal device 2 that stores the group table T3.

In the group table T3, the group ID of the group, the name of the group, a user member who belongs to the group, for example, are associated with each other and are stored as for each group. The group ID is an example of identification data for uniquely identifying each group. The name is an example of data that represents the name of each group. The user member is the user ID of each user who belongs to the group.

Returning to FIG. 3, the functions of the generation unit 271, the transmission unit 272, the reception unit 273, the display processing unit 274, and the voice output unit 275 will be described.

Generation Unit 271

The generation unit 271 acquires, from the imaging device 25, the imaging data that is continuously outputted by the imaging device 25. For example, the imaging device 25 of the terminal device 2 that is held by the user is located in the terminal device 2 such that the face of the user who views the display screen of the display device 23 is directed in a shooting direction. The imaging device 25 continuously images the face of the user in the shooting direction, acquires the imaging data of the face of the user, and outputs the imaging data to the generation unit 271 of the terminal processing device 27. The imaging device 25 may image another portion other than the face of the user such as the head, the arms, the hands (including the fingers), the chest, the torso, the legs, or another portion and may acquire the imaging data. The imaging device 25 may be a 3D camera that can detect the depth of the face of a person.

The generation unit 271 generates face motion data that digitally expresses the motion of the face of the user at any time over time based on the continuously acquired imaging data. The face motion data may be generated at predetermined sampling time intervals. The face motion data that is thus generated by the generation unit 271 enables the motion (a change in expression) of the face of the user to be digitally expressed in time series.

The generation unit 271 may generate body motion data that digitally expresses the positions and directions of the portions (the head, the arms, the hand (including the fingers), the chest, the torso, the legs, or another portion) of the user together with the face motion data or separately from the face motion data.

The body motion data may be generated based on detection information from a known motion sensor that is worn on the user. In this case, the terminal communication I/F 21 of the terminal device 2 includes a predetermined communication circuit for acquiring the detection information through wireless communication from the motion sensor that is worn on the user. The generation unit 271 generates the body motion data, based on the detection information that is acquired by the terminal communication I/F 21. The body motion data may be generated at predetermined sampling time intervals. The body motion data that is thus generated by the generation unit 271 can digitally express the motion of the body of the user in time series.

The body motion data may be generated based on the detection information from the motion sensor that is worn on the user, for example, in a photo studio. In this case, the photo studio may include a base station, a tracking sensor, and a display. An example of the base station is a multi-axis laser emitter. An example of the motion sensor that is worn on the user may be Vive Tracker provided by HTC CORPORATION. An example of the base station may be a base station provided by HTC CORPORATION.

A supporter computer may be installed in another room adjacent to the photo studio. The display in the photo studio may display information that is received from the supporter computer. The server device 3 may be installed in the same room in which the supporter computer is installed. The room in which the supporter computer is installed may be separated from the photo studio by using a glass window. In this case, an operator of the supporter computer can view the user. The supporter computer may be capable of changing the settings of various devices that are provided in the photo studio depending on an operation of a supporter. For example, the supporter computer can change the settings of a scan interval by using the base station, the settings of the tracking sensor, and settings of various other devices. The operator may input a message into the supporter computer, and the inputted message may be displayed on the display in the photo studio.

The generation unit 271 generates the character video data including the face motion data and/or the body motion data generated at any time and outputs the generated character video data to the display processing unit 274. In some cases, the face motion data and the body motion data are referred to below as the motion data. The generation unit 271 generates output information including the generated character video data and the user ID that is stored in the terminal storage device 22 and outputs the generated output information to the transmission unit 272. In the case where the voice data of the user that is outputted from the microphone 26 is acquired, the generation unit 271 generates output information including the generated character video data, the acquired voice data, and the user ID that is stored in the terminal storage device 22 and outputs the generated output information to the transmission unit 272.

The generation unit 271 generates game image data that represents a game screen of a game that is played by the user during the game at any time, generates output information including the generated game image data and the user ID that is stored in the terminal storage device 22, and outputs the generated output information to the transmission unit 272. The output information may include the generated character video data and/or the acquired voice data together with the generated game image data.

Transmission Unit 272

The transmission unit 272 transmits the output information that is outputted from the generation unit 271 to the server device 3 via the terminal communication I/F 21 together with destination information. The destination information includes the user IDs of one or multiple other users who participate in the same communication service as the user. The user IDs that are included in the output information may be used as the destination information. For example, the server device 3 stores the user IDs of one or multiple other users who participate in the same communication service as the user, identifies the user IDs of one or multiple other users who participate in the same communication service as the user having the user ID that is included in the output information when acquiring the output information, and transmits the received output information to the terminal devices 2 of the other users that are represented by the identified user IDs.

The transmission unit 272 transmits information that represents various instructions that are inputted from the user who operates the input device 24 to the server device 3 via the terminal communication I/F 21 together with the user ID that is stored in the terminal storage device 22 and the destination information. Examples of the various instructions from the user include the instruction for selecting, the instruction for using, and an instruction for adding. Information that represents the instruction for adding is transmitted to the server device 3 via the terminal communication I/F 21 together with the object ID of the additional object that is added into the other-user output image and the user ID that is stored in the terminal storage device 22. The information that represents the instruction for selecting is transmitted to the server device 3 via the terminal communication I/F 21 together with, for example, the user ID that is stored in the terminal storage device 22. Information that represents the instruction for using is transmitted to the server device 3 via the terminal communication I/F 21 together with, for example, the object ID of at least one specific object that is set as the use object and the user ID that is stored in the terminal storage device 22. In the case where the user selects partial objects and instructs a character object that includes the selected partial objects to be created, the model ID for identifying the model data of the character object and the object IDs of the multiple partial objects that are included in the character object may be transmitted to the server device 3 via the terminal communication I/F 21 together with, for example, the user ID that is stored in the terminal storage device 22. In this case, the server device 3 may associate the user ID, the model ID, the object IDs of the multiple partial objects that are included in the character object with each other and may store these in the server storage device 32. The terminal device 2 of the other user that receives the model ID for identifying the model data of the character object of the user, the object IDs of the multiple partial objects that are included in the character object of the user, and the user ID of the user via the server device 3 may associate the user ID, the model ID, the object IDs of the multiple partial objects that are included in the character object with each other and may store these in the terminal storage device 22. Consequently, the terminal device of the other user can extract the object IDs of the multiple partial objects that are associated with the received user ID (or the model ID) merely in a manner in which the terminal device 2 of the user transmits only the user ID (or the model ID) to the terminal device of the other user via the server device 3. The terminal device of the other user can display the character object of the user, based on the three-dimensional model data (of the partial objects) that corresponds to the extracted object IDs.

Reception Unit 273

For example, the reception unit 273 receives the output information about the other user and information that represents various instructions from the other user that are transmitted from the server device 3 via the terminal communication I/F 21. The reception unit 273 outputs the received information to the terminal processing device 27. The output information about the other user that is transmitted from the server device 3 is the output information that is generated by the generation unit 271 of the terminal device 2 of the other user and that is transmitted to the server device 3 by using the transmission unit 272 of the terminal device 2 of the other user. For example, the output information about the other user includes the character video data of the other user, the voice data of the other user, and the user ID of the other user. In some cases, the output information about the other user may not include the voice data of the other user, and the output information about the other user may not include the character video data of the other user.

The reception unit 273 receives information that represents the result of selection that is transmitted from the server device 3 via the terminal communication I/F 21. The information that represents the result of selection is information that represents the result of a selecting process that is performed by the server device 3 depending on the instruction for selecting from the user or the other user. The reception unit 273 receives the user ID of the user who inputs the instruction for selecting together with the information that represents the result of selection. In the case where the user ID of the user who operates the terminal device 2 is the same as the user ID of a receiver, the reception unit 273 associates the object ID of at least one specific object that is received as the information that represents the result of selection with the user ID of the user and stores the object ID in the user table T1 as the owned object of the user.

Display Processing Unit 274

The display processing unit 274 displays the image that is drawn based on the motion data (the character video data) that is generated by the generation unit 271 on the display device 23 as the user output image. The display processing unit 274 displays the image that is drawn based on the motion data (the character video data) that is included in the output information about the other user that is received by the reception unit 273 on the display device 23 as the other-user output image. A process of drawing the image, based on the motion data will now be described. In the process of drawing the image, based on the motion data of the user (the user who operates the terminal device 2), the user ID that is stored in the terminal storage device 22 is used. In the process of drawing the image, based on the motion data that is included in the output information about the other user that is received by the reception unit 273, the user ID that is included in the output information is used.

The display processing unit 274 first extracts the object ID of the use object and the model ID of the character object associated with the user ID from the user table T1. Subsequently, the display processing unit 274 reads the model data that is associated with the extracted model ID, the placement position, and the image information associated with the extracted object ID of the use object from the terminal storage device 22. Subsequently, the display processing unit 274 generates the animation of the character object that wears the use object at the placement position, based on the read model data, the image information about the use object, the placement position, and the motion data. In the case where the object IDs of the multiple partial objects that are included in the character object are associated with the model ID of the character object, the display processing unit 274 extracts the model data that corresponds to the object IDs of the multiple partial objects that are associated with the extracted model ID. Subsequently, the display processing unit 274 generates the animation of the character object that wears the use object at the placement position, based on the read model data of the multiple partial objects, the image information about the use object, the placement position, and the motion data. The use object may be included in the multiple partial objects.

In the case where the motion data includes the face motion data, the display processing unit 274 generates the animation of the character object such that the expression of the character object changes based on the face motion data. Consequently, the display processing unit 274 can generate the animation of the character object that moves in synchronization with a change in the expression of the user, based on the read model data and the face motion data. In the case where the motion data includes the face motion data and the body motion data, the display processing unit 274 generates the animation of the character object that moves in synchronization with the expression of the user and the motion of the body, based on the read model data, the face motion data, and the body motion data. Subsequently, the display processing unit 274 draws the image including the generated animation (video image) of the character object and the background image that represents the generated background by using the background data that is stored in the terminal storage device 22. The display processing unit 274 may use the wallpaper object that is associated with the communication group in advance and that is stored in the terminal storage device 22 as the background image. In this case, the same wallpaper object may be used as the background image for the entire communication group. The display processing unit 274 outputs drawing data that represents the image to be drawn and ends the process of drawing the image based on the motion data. The image that is drawn based on the character object that is associated with the user ID that is stored in the terminal storage device 22 is the user output image of the user. The image that is drawn based on the character object that is associated with the user ID that is included in the received output information about the other user is the other-user output image of the other user.

The display processing unit 274 may display the character object that wears a new wearable object that the user owns as the owned object of the user on the display device 23 depending on the instruction for changing from the user. For example, in the case where the wearable object for which the instruction for changing is inputted from the user is the "headband", the display processing unit 274 extracts the object ID of the wearable object ("headband") from the owned objects that are associated with the user ID of the user in the user table T1 and stores the object ID as the use object. The display processing unit 274 extracts the placement position and the image information associated with the object ID that is stored as the use object from the object table T2. Subsequently, the display processing unit 274 generates the user output image including the character object that wears the wearable object ("headband") on the head (the placement position that is associated with the object ID of the "headband"), based on the extracted image information and placement position. The display processing unit 274 may generate the user output image including the character object that wears the wearable object that moves in conjunction with the motion of the wearing portion (the placement position) of the character object.

The display processing unit 274 reads the image information that is associated with the object ID of the specific object that is received as the information that represents the result of selection from the terminal storage device 22 and displays the selection result screen on the display device 23, based on the read image information.

The display processing unit 274 may display the user output image including the character object that wears the new wearable object on the display device 23, based on the information that represents the result of selection that is received from the server device 3. The information that represents the result of selection is the information that represents the result of the selecting process that is performed by the server device 3 depending on the instruction for selecting from the user. For example, the information that represents the result of selection includes the object ID of the specific object that is selected in the selecting process. The number of the object ID of the specific object that is included in the information that represents the result of selection may be 1, or 2 or more. An example of a using process depending on the instruction for using will now be described.

The display processing unit 274 of the terminal device 2 of the user first performs a process of storing the object ID of the specific object that is included in the information that represents the result of selection in response to the input of the instruction for using from the user who operates the input device 24. In the process of storing the specific object, the object ID of the specific object that is included in the information that represents the result of selection is associated with the user ID of the user and is stored in the user table T1 as the use object. In the case where the information that represents the result of selection includes the object IDs of the multiple specific objects, the object ID of at least one specific object that is instructed to be used by the user among the multiple specific objects is associated with the user ID of the user and is store in the user table T1 as the use object. The object ID of at least one specific object that is set as the use object is thus stored.

In the case where the specific object that is stored as the use object is the wearable object, the display processing unit 274 performs a process of displaying the wearable object. An example of the process of displaying the wearable object will now be described. In the description of the example of the process of displaying the wearable object, the specific object that is stored as the use object is referred to as the "wearable object". The display processing unit 274 first extracts the placement position and the image information associated with the object ID of the wearable object (the specific object) that is stored as the use object from the object table T2. The display processing unit 274 generates the animation of the character object of the user that wears the wearable object at the placement position, based on the extracted image information and placement position. The display processing unit 274 displays the user output image including the character object of the user that wears the wearable object at the placement position, based on the generated animation. This is the end of the process of displaying the wearable object and the end of the using process depending on the instruction for using.

In the process of displaying the wearable object, the display processing unit 274 may display the user output image including the character object that wears the wearable object that moves in conjunction with the motion of the wearing portion (the placement position) of the character object. For example, in the case where the specific object that is stored as the use object is the wearable object "headband", the user output image including the character object of the user that wears the wearable object "headband" on the head is displayed. As for the user output image, the wearable object "headband" is displayed so as to move in conjunction with the motion of the head of the character object.

In the case where the specific object that is stored as the use object is the wallpaper object, the display processing unit 274 performs a process of displaying the wallpaper object. An example of the process of displaying the wallpaper object will now be described. In the description of the example of the process of displaying the wallpaper object, the specific object that is stored as the use object is referred to as the "wallpaper object". The display processing unit 274 first extracts the image information that is associated with the object ID of the wallpaper object (the specific object) that is stored as the use object from the object table T2. The display processing unit 274 displays the user output image in which the extracted image information is used as the background image of the character object of the user. This is the end of the process of displaying the wallpaper object and the end of the using process depending on the instruction for using.

The display processing unit 274 displays the user output image including the additional object depending on the instruction for adding the additional object from the other user. The display processing unit 274 displays the other-user output image including the additional object depending on the instruction for adding from the user for displaying the additional object in the other-user output image.

In the case where the object ID that is included in the instruction for adding the additional object from the other user is the object ID of an effect object, the display processing unit 274 refers the object table T2, extracts the still image or the video image (the image information) of the effect object that is associated with the object ID that is included in the instruction for adding from the terminal storage device 22, and generates the user output image including the extracted still image or video image. For example, in the case where the instruction for adding the effect object that represents confetti or a firework is inputted, the display processing unit 274 generates the user output image including the video image of the effect object that imitates the confetti or the firework. In the case where the object ID that is included in the instruction for adding the additional object from the user is the object ID of an effect object, the display processing unit 274 also refers the object table T2, extracts the still image or the video image (the image information) of the effect object that is associated with the object ID that is included in the instruction for adding from the terminal storage device 22, and generates the other-user output image including the extracted still image or video image.

In the case where the object ID that is included in the instruction for adding the additional object from the other user is the object ID of the normal object, the display processing unit 274 refers the object table T2 and extracts the placement position and the still image or the video image (the image information) of the normal object associated with the object ID of the normal object. Subsequently, the display processing unit 274 generates the user output image including the still image or the video image of the normal object that is placed at a position that is represented by the placement position. In the case where the object ID that is included in the instruction for adding the additional object from the user is the object ID of the normal object, the display processing unit 274 also refers the object table T2, extracts the placement position and the still image or the video image (image information) of the normal object associated with the object ID of the normal object, generates the other-user output image including the still image or the video image of the normal object that is placed at the position that is represented by the placement position.

The display processing unit 274 may generate the user output image and the other-user output image including the video image of the normal object that moves in display regions of the user output image and the other-user output image. In the following description, the user output image and the other-user output image are referred to as the output images in some cases. For example, the display processing unit 274 may generate the output images including the video image of the normal object that falls downward from above in the output images. In this case, the normal object may be displayed in the display regions of the output images while the normal object falls to the lower ends of the output images after the normal object starts falling and may vanish from the output images after the normal object falls to the lower ends of the output images. The movement route of the normal object may be any one of routes in the output images such as a right-hand direction from the left, a left-hand direction from the right, and a lower left direction from the upper left, another route other than these, or a route along straight trajectory, circular trajectory, elliptic trajectory, spiral trajectory, or another trajectory.

In the case where the object ID that is included in the instruction for adding the additional object from the other user is the object ID of the wearable object, the display processing unit 274 displays notification information about an instruction for wearing in the user output image. The display processing unit 274 refers the object table T2 and extracts the placement position and the image information about the wearable object that is associated with the object ID that is included in the instruction for adding depending on the instruction for wearing from the user. Subsequently, the display processing unit 274 generates the user output image including the character object that wears the wearable object on the wearing portion that is represented by the placement position, based on the extracted image information and placement position.

The display processing unit 274 starts the game that is played by the user depending on an instruction from the user and displays the game screen of the game on the display device 23. After the game starts, the display processing unit 274 displays the game screen of the game that progresses depending on an instruction for progressing the game in response to the game operation of the user on the display device 23 and stops displaying the game screen when an end condition of the game is satisfied. The end condition of the game is determined in advance depending on the rules of the game, and examples thereof includes that the game medium (such as the character) of the user wins or loses against an opponent, that the game medium of the user reaches a predetermined goal, or that a game object that is operated by the user is in a predetermined state (for example, multiple pieces (game objects) are arranged on squares in a game filed).

Voice Output Unit 275

In the case where the output information about the other user includes the voice data of the other user, the voice output unit 275 outputs the voice of the other user that is generated based on the voice data from a speaker together with the display of the other-user output image by using the display processing unit 274. Consequently, the voice of the other user is outputted while the lips of the character object of the other user that is included in the other-user output image moves, and accordingly, the user can view the other-user output image including the character object of the other user such that the voice sounds.

Server Device 3

Figure 23:
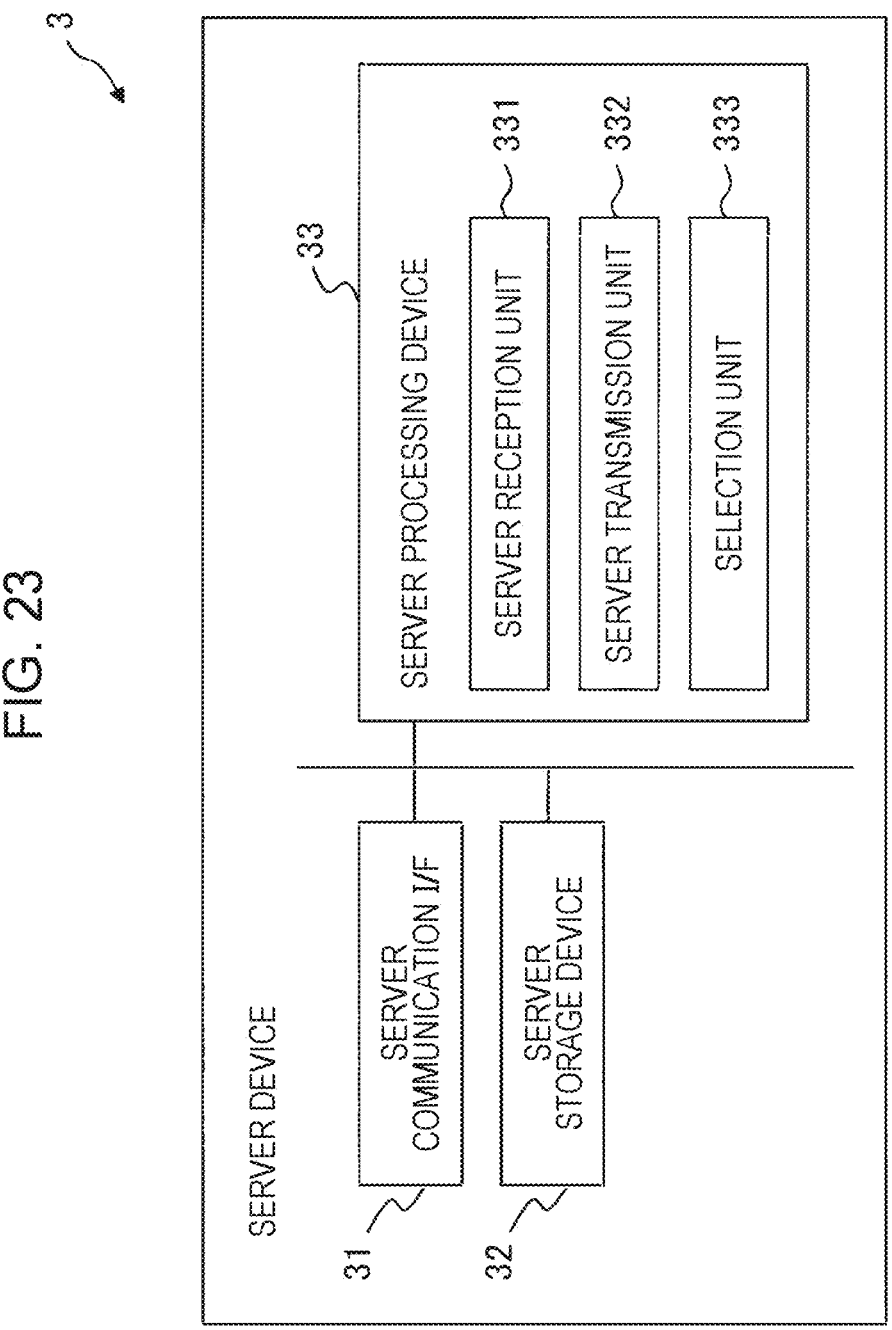
FIG. 23 schematically illustrates a structure of a server device according to the Second Example of the present disclosure.

FIG. 23 schematically illustrates an example of the structure of the server device 3. The server device 3 that provides the communication service to the terminal devices 2 of the multiple users transmit the information that represents various instructions and the output information that are transmitted from the terminal device 2 of the user to the terminal device 2 of the other user different from the user. For this reason, the server device 3 includes a server communication I/F 31, the server storage device 32, and a server processing device 33. For example, the terminal device 2 to which the terminal device 2 of the user transmits information is the terminal device 2 of the user represented by the user ID that is included in the received destination information.

The server communication I/F 31 is mounted as hardware, firmware, communication software such as a TCP/IP driver or a PPP driver, or a combination thereof. The server device 3 can transmit information to another device and can receive information from another device via the server communication I/F 31.

An example of the server storage device 32 is a semiconductor memory such as a ROM or a RAM. Examples of the server storage device 32 may include a magnetic disk, an optical disk, and various other storage devices that can store data. For example, the server storage device 32 stores an operating system program, a driver program, an application program, and data that are used for processing of the server processing device 33. The server storage device 32 may store the user table T1, the object table T2, and the group table T3 as the data. The server storage device 32 associates a selection event ID for identifying the selection event and an object group ID for identifying an object group that is used for the selection event with each other and stores these. The server storage device 32 stores the object IDs of the multiple specific objects associated with the object group ID. For example, in the case where the server device 3 can provide multiple kinds of selection events, multiple selection event IDs for identifying the respective kinds of selection events are stored. Multiple object group IDs that are associated with the respective selection event IDs are stored. The object IDs of the multiple specific objects are stored in the object group IDs.

The server processing device 33 is a processor that loads the operating system program, the driver program, and the control program that are stored in the server storage device 32 into the memory and that executes instructions that are included in the loaded programs. Examples of the server processing device 33 include electronic circuits such as a CPU, a MPU, a DSP, and a GPU and various combinations of the electronic circuits. The server processing device 33 may function by using an integrated circuit such as an ASIC, a PLD, a FPGA, or a MCU. In FIG. 23, the server processing device 33 is illustrated as a single component. However, the server processing device 33 may be a collection of multiple processors that are physically separated from each other. The server processing device 33 executes various instructions that are included in the control program and consequently functions as a server reception unit 331, a server transmission unit 332, and a selection unit 333.

Server Reception Unit 331

For example, the server reception unit 331 receives the information that represents various instructions and the output information that are transmitted from the terminal device 2 of a user among the multiple users via the server communication I/F 31. The server reception unit 331 may receive another information such as the destination information together with the information that represents various instructions and the output information that are transmitted from the terminal device 2.

For example, the server reception unit 331 receives the information that represents the instruction for selecting, the selection event ID, the user ID of a user A, and the destination information from the terminal device 2 of the user via the server communication I/F 31. The server reception unit 331 inputs the received information that represents the instruction for selecting and selection event ID into the selection unit 333. In the case where information that represents the number of selection is transmitted together with the information that represents the instruction for selecting, the server reception unit 331 receives the information that represents the number of selection together with the information that represents the instruction for selecting and inputs the received information that represents the number of selection into the selection unit 333.

Server Transmission Unit 332

The server transmission unit 332 transmits the information that represents various instructions and the output information that are received by the server reception unit 331 to the terminal device 2 of the other user represented by the user ID that is included in the destination information that is received at the same time via the server communication I/F 31. The server transmission unit 332 may transmit the information that represents various instructions that is received by the server reception unit 331 to the terminal devices 2 of one or multiple other users that are specified by the user who transmits the information via the server communication I/F 31.

The server transmission unit 332 has a function of transmitting the object ID of the selected specific object after the selection unit 333 described later selects the object ID of at least one specific object depending on the instruction for selecting from the user. For example, the server transmission unit 332 acquires the object ID of at least one specific object that is selected by the selection unit 333 in the selection event that is specified by the user from the selection unit 333 as the information that represents the result of selection. The server transmission unit 332 acquires the destination information and the user ID of the user received together with the information that represents the instruction for selecting from the server reception unit 331. Subsequently, the server transmission unit 332 transmits the information that represents the result of selection and the user ID of the user who inputs the instruction for selecting to the terminal device 2 of the user and the terminal device 2 of the other user represented by the user ID that is included in the destination information via the server communication I/F 31.

Selection Unit 333

The selection unit 333 acquires the information that represents the instruction for selecting and the selection event ID from the server reception unit 331. In the case where the information that represents the number of selection is transmitted together with the information that represents the instruction for selecting, the selection unit 333 acquires the information that represents the number of selection from the server reception unit 331. The selection unit 333 extracts the object group ID that is associated with the inputted selection event ID from the multiple object group IDs that are stored in the server storage device 32.

Subsequently, the selection unit 333 selects the object ID of at least one specific object from the object IDs of the multiple specific objects that are associated with the extracted object group ID in accordance with a predetermined selection method. In the case where the information that represents the number of selection is acquired, the selection unit 333 selects the object ID of the specific object a number of times equal to the number of selection from the object IDs of the multiple specific objects that are associated with the extracted object ID. For example, in the case where information that represents that the number of selection is "1" is acquired, the selection unit 333 selects the object ID of a single specific object from the object IDs of the multiple specific objects that are associated with the extracted object ID. For example, in the case where information that represents that the number of selection is "10" is acquired, the selection unit 333 selects the object IDs of 10 specific objects from the object IDs of the multiple specific objects that are associated with the extracted object ID. The selection unit 333 inputs the object ID of the selected specific object or the object IDs of the selected specific objects into the server transmission unit 332.

Examples of Various Screens

Examples of various screens that are displayed on the display device 23 of the terminal device 2 of the user will now be described with reference to FIG. 24A to FIG. 33B. In FIG. 24A to FIG. 33B, multiple components that are designated by like reference characters have like functions.

Figure 24A:
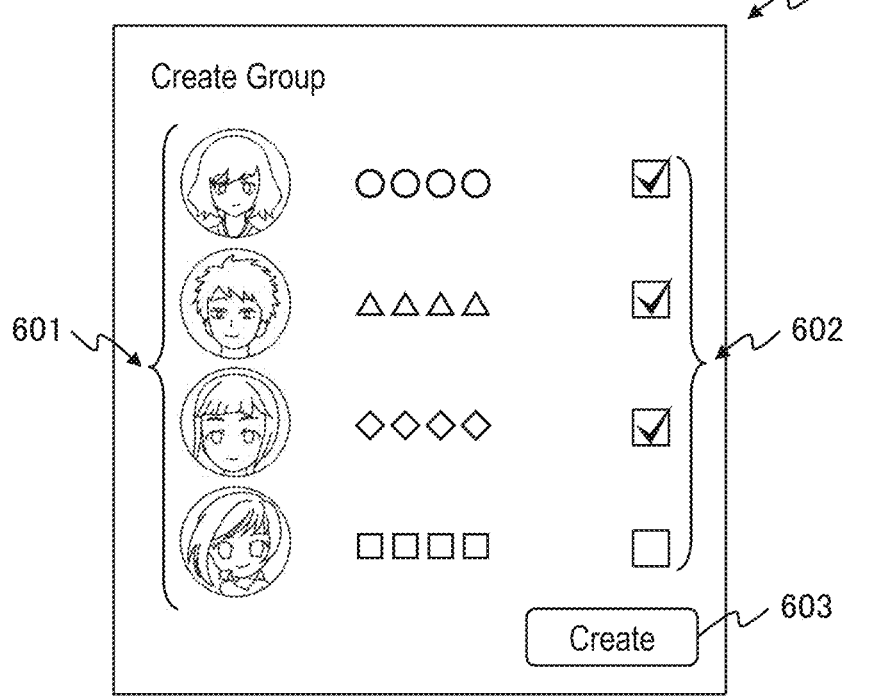
FIG. 24A and FIG. 24B illustrate examples of a screen that is displayed on a display device of the terminal device according to the Second Example of the present disclosure.

FIG. 24A illustrates an example of a group creation screen 600 that is displayed on the display device 23 of the terminal device 2 of the user. The group creation screen 600 includes an other-user display region 601, selection objects 602, and a creation button 603. For example, the group creation screen 600 is displayed in the case where a group creation object of a home screen that is displayed depending on running of the control program that is stored in the terminal storage device 22, for example, is selected by the user who operates the input device 24.

Other-user information that represents the other users who have a predetermined relationship with the user is displayed in the other-user display region 601. In an example illustrated in FIG. 24A, the display processing unit 274 of the terminal device 2 of the user displays thumbnail images of the character objects of the other users and the names of the other users as the other-user information.

The selection objects 602 are operation objects for selecting the other users that are represented by the other-user information. In the example illustrated in FIG. 24A, the display processing unit 274 of the terminal device 2 of the user displays check box objects that correspond to the other-user information as the selection objects 602. For example, after the selection objects 602 are selected by the user who operates the input device 24, the selection objects 602 are displayed with "check" marks. In this case, other users in the other-user information that correspond to the selection objects 602 that are displayed with the "check" marks are selected. After one of the selection objects 602 that are displayed with the "check" marks is selected by the user who operates the input device 24, the selection object 602 is displayed with no "check" mark. In this case, another user in the other-user information that corresponds to the selection object 602 that is displayed with no "check" mark is not selected. The selection objects 602 are associated with the respective user IDs of the other users related to the other-user information.

An example of the creation button 603 is a button object for creating a new communication group by the user. After the creation button 603 is selected by the user who operates the input device 24, the new group is created such that the user who operates the terminal device 2 and the selected other users in the selection objects 602 are user members. For example, the display processing unit 274 of the terminal device 2 of the user identifies the user ID of the user that is stored in the terminal storage device 22 and the user IDs of the other users who are associated with the selection objects 602 related to the selected other users in the selection objects 602. The display processing unit 274 associates a newly created group ID with the identified user ID of the user and user IDs of the other users as the user members and stores these in the group table T3. At this time, the display processing unit 274 may associate the newly created group ID with a group name that is automatically created or with a group name that is inputted from the user.

Figure 25A:
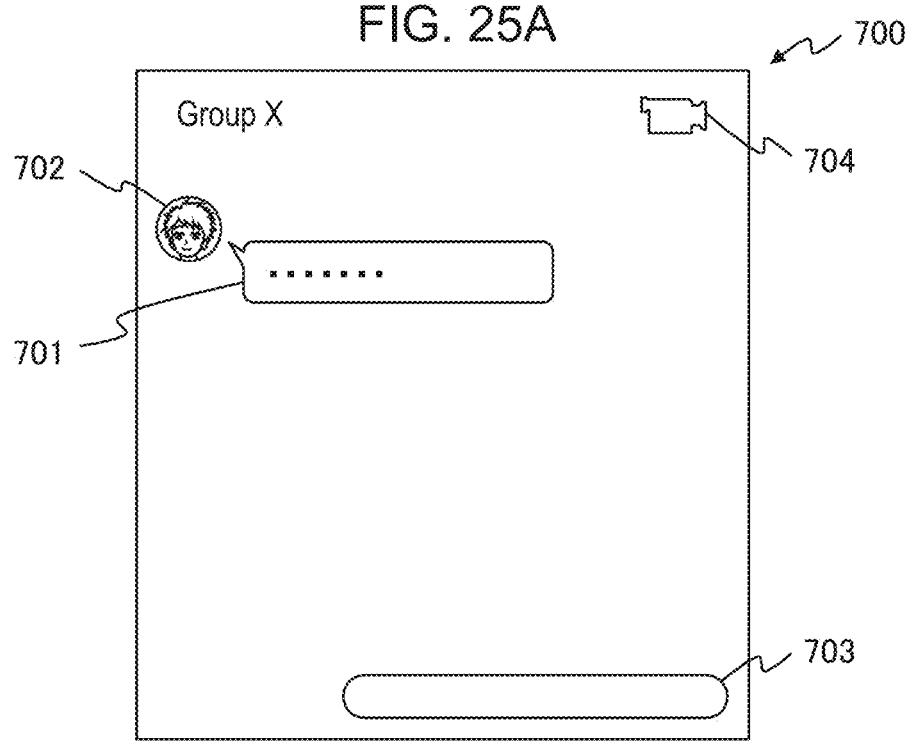
FIG. 25A and FIG. 25B illustrate examples of the screen that is displayed on the display device of the terminal device according to the Second Example of the present disclosure.

After the new group is created depending on the selection of the creation button 603, the display processing unit 274 displays an information exchange screen 700 for the user members of the new group. FIG. 25A illustrates an example of the information exchange screen 700 that is displayed on the display device 23 of the terminal device 2 of the user. The information exchange screen 700 includes a display region 701 in which information such as a text or an image that is inputted from each user member of the new group is displayed, information 702 that represents the user member who inputs the information (such as the thumbnail image of the character object) that is displayed in the display region 701, an input object 703 for inputting a text or an image that is to be displayed into a new display region 701 by the user, and a start object 704 for starting the communication service.

After the information exchange screen 700 is displayed, the transmission unit 272 of the terminal device 2 of the user transmits an instruction for displaying the information exchange screen to the server device 3 together with information about the new group and the destination information via the terminal communication I/F 21. The information about the new group includes the group ID, the name, and the user IDs of the user members of the new group. The destination information includes the user IDs of the other users other than the user who operates the terminal device 2 among the user members of the new group. The server reception unit 331 of the server device 3 receives the instruction for displaying the information exchange screen, the information about the new group, and the destination information via the server communication I/F 31. The server reception unit 331 may store the received destination information in the server storage device 32. The server transmission unit 332 of the server device 3 transmits the instruction for displaying the information exchange screen and the information about the new group to the terminal devices 2 of the other users that are represented by the user IDs that are included in the destination information via the server communication I/F 31. After the instruction for displaying the information exchange screen that is transmitted from the terminal device 2 of the user is received via the server device 3, the terminal devices 2 of the other users can display the information exchange screen 700 through which information can be exchanged by the user members of the new group.

The description returns to FIG. 25A. For example, after new information is inputted into the input object 703 by an operation of any one of the user members, the display region 701 in which the new information is displayed is added into the information exchange screen 700 that is displayed by the terminal device 2 of the user who inputs the information. The transmission unit 272 of the terminal device 2 of the user who inputs the information transmits the inputted new information to the terminal devices 2 of the user members other than the user who inputs the information via the server device 3. Consequently, the display region 701 in which the new information is displayed is added also into the information exchange screens 700 that are displayed on the terminal devices 2 of the other users who are the user members other than the user who inputs the information.

An example of the start object 704 is a button object for starting the communication service in which the user members of the new group can participate. After the start object 704 is selected by the user who operates the input device 24, a process of starting the communication service is performed such that the communication group can exchange information by using the information exchange screen 700. An example of the starting process depending on the selection of the start object 704 by the user will now be described.

The display processing unit 274 of the terminal device 2 of the user first displays a communication screen 810 (FIG. 26B) that can be displayed on the terminal devices 2 of the users who belong to the communication group. The display processing unit 274 stores the group ID of the communication group in the terminal storage device 22 as the group ID of the group that starts the communication service. The display processing unit 274 also stores the user ID of the user in the terminal storage device 22 as the user ID of the user who participates in the communication service. In the case where none of the other users who belong to the communication group participates in the communication service, only the user output image of the user is displayed on the communication screen 810.

Subsequently, the transmission unit 272 of the terminal device 2 of the user transmits an instruction for starting the communication service to the server device 3 together with the user ID of the user that is stored in the terminal storage device 22, information about the communication group, and/or the destination information via the terminal communication I/F 21. The information about the communication group includes the group ID, the name, and the user IDs of the user members of the communication group. The destination information includes the user IDs of the other users other than the user who operates the terminal device 2 among the user members of the communication group. In the case where the destination information is stored in the server storage device 32, the destination information may not be transmitted. The server reception unit 331 of the server device 3 receives the instruction for starting, the user ID, the information about the communication group, and the destination information via the server communication I/F 31. The server transmission unit 332 of the server device 3 transmits the instruction for starting, the user ID, and the information about the communication group to the terminal devices 2 of the other users that are represented by the user IDs that are included in the destination information via the server communication I/F 31.

The reception unit 273 of the terminal device 2 of each of the other users receives, from the server device 3, the instruction for starting, the user ID, and the information about the communication group that are transmitted from the terminal device 2 of the user. The reception unit 273 stores the group ID that is included in the information about the communication group in the terminal storage device 22 as the group ID of the group that starts the communication service. The display processing unit 274 stores the transmitted user ID in the terminal storage device 22 as the user ID of the user who participates in the communication service. The display processing unit 274 of the terminal device 2 of each of the other users displays a notification screen, based on the received information about the communication group. The display processing unit 274 displays a group selection screen 710 (FIG. 25B) for participating in the communication service on the display device 23 depending on the selection of a predetermined object in the notification screen by the user. This is the end of the starting process. The display processing unit 274 of the terminal device 2 of each of the other users may include a participation button 805 described later in the notification screen. This enables the other users to immediately participate in the communication service without displaying the group selection screen 710.

The starting process may be performed in the case where the creation button 603 of the group creation screen 600 is selected by the user who operates the input device 24. That is, the starting process of the communication service may be started depending on the selection of the creation button 603 by the user such that the new group that is created on the group creation screen 600 is the communication group. In this case, the information exchange screen 700 is not displayed.

Figure 24B:
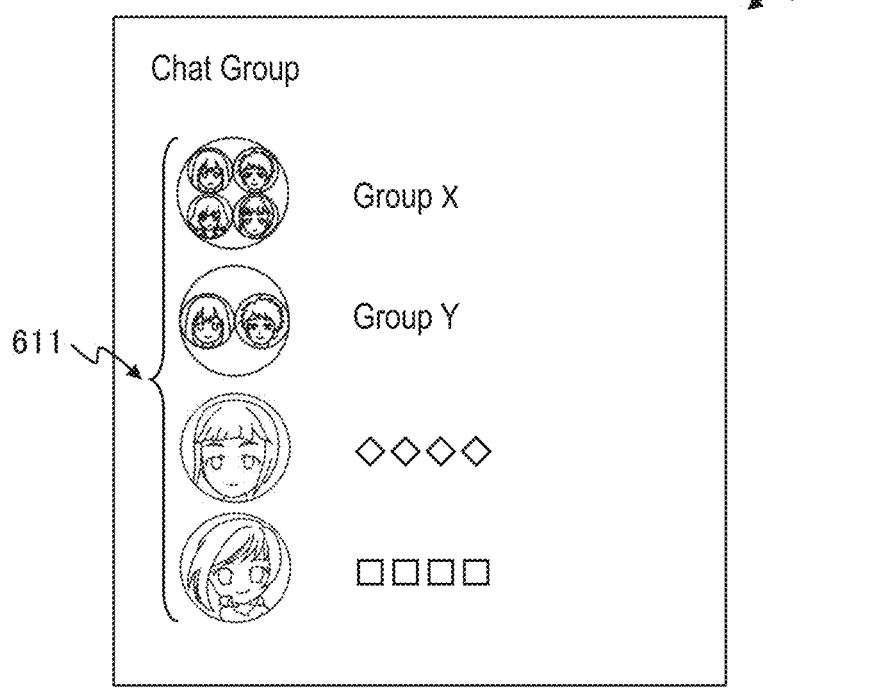

The starting process is not limited to the starting process of the communication service such that the new group that is created on the group creation screen 600 is the communication group. For example, the starting process of the communication service may be performed such that a group that has been already created is the communication group. For example, FIG. 24B illustrates an example of a group selection screen 610 for selecting the communication group that is created by any one of the users. For example, the group selection screen 610 is displayed in the case where a group selection object of the home screen that is displayed depending on running of the control program that is stored in the terminal storage device 22 is selected by the user who operates the input device 24.

The group selection screen 610 that is displayed on the terminal device 2 of the user includes a group display region 611 for selecting any one of the multiple communication groups. Group information that represents each of the created communication groups to which the users belong is displayed in the group display region 611. In an example illustrated in FIG. 24B, the display processing unit 274 of the terminal device 2 of the user displays the thumbnail images of the user members of the communication group and the name of the group as the group information. In the example illustrated in FIG. 24B, the thumbnail images of the other users among the user members are displayed, but the thumbnail images of all of the user members may be displayed. In the case where only another user other than the user belongs to the communication group, as illustrated in FIG. 24B, the name of the other user may be displayed instead of the name of the group.

After a single piece of the group information that is included in the group display region 611 is selected by the user who operates the input device 24, the information exchange screen 700 for the user members of the communication group that corresponds to the selected group information is displayed. The information exchange screen 700 includes information such as the text or the image that is inputted from each user member of the communication group. Also, in this case, the instruction for displaying the information exchange screen and the information about the communication group are transmitted to the terminal devices 2 of the other users among the user members of the communication group via the server device 3, and the information exchange screen 700 is displayed also on the terminal devices 2 of the other users.

In the case where the start object 704 is selected by the user on the information exchange screen 700, the starting process of the communication service for the communication group that exchanges information on the information exchange screen 700 is performed. After the starting process is performed, the display processing unit 274 of the terminal device 2 of the user displays the communication screen 810 (FIG. 26B) that can be displayed by the terminal device 2 of each user who belongs to the communication group. The display processing unit 274 of the terminal device 2 of each of the other users displays the notification screen and displays the group selection screen 710 (FIG. 25B) for participating in the communication service on the display device 23 depending on an operation of the other user on the notification screen. Also, in this case, the display processing unit 274 of the terminal device 2 of the other user may include the participation button 805 described later in the notification screen.

Also, in this case, the starting process may be performed in the case where a single piece of the group information is selected by the user who operates the input device 24 on the group selection screen 610. That is, the starting process of the communication service for the communication group that corresponds to the selected group information may be performed depending on the selection of the single piece of the group information by the user. In this case, the information exchange screen 700 is not displayed.

Figure 25B:
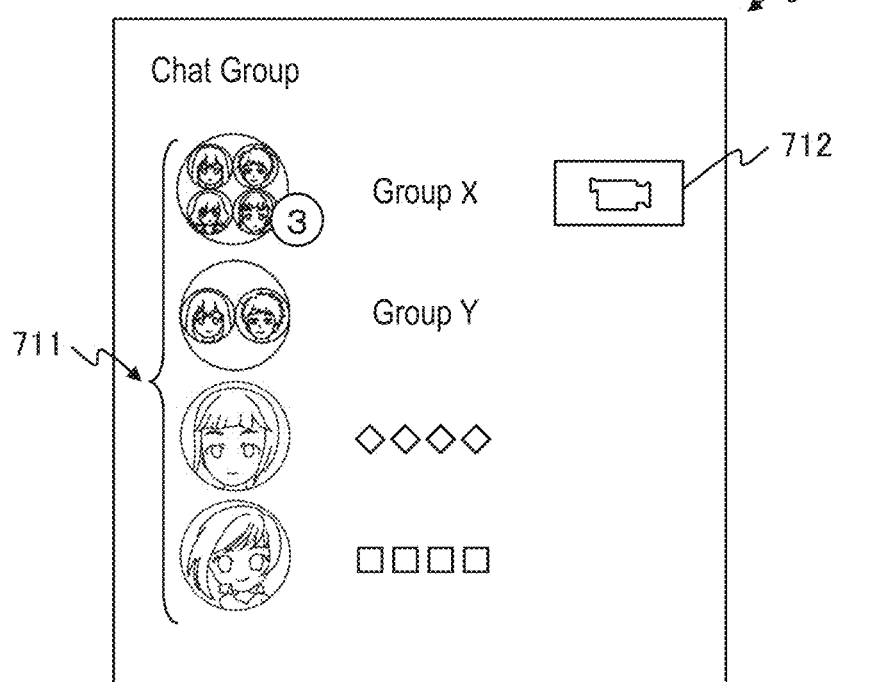

Subsequently, how a user who does not participate in the started communication service participates therein will now be described. FIG. 25B illustrates an example of the group selection screen 710 that is displayed on the display device 23 of the terminal device 2 of the user. For example, the group selection screen 710 is displayed depending on the selection of a predetermined object on the displayed notification screen. The group selection screen 710 may be displayed in the case where the group selection object of the home screen that is displayed depending on the running of the control program that is stored in the terminal storage device 22, for example, is selected by the user who operates the input device 24.

The group information that represents the communication group that starts the communication service is displayed in a group display region 711 of the group selection screen 710 so as to be distinguishable from the other group information. In an example illustrated in FIG. 25B, the group information that is displayed at the uppermost position represents the communication group that starts the communication service. For example, information that represents the number of the user members who participate in the communication service is displayed so as to overlap the thumbnail images of the user members of the communication group or near there. A mark image 712 that represents the communication service is displayed near the name of the communication group.

After the group information that represents the communication group that starts the communication service is selected by the user who operates the input device 24 from the group information that is included in the group display region 711, an information exchange screen 800 for the user members of the communication group that corresponds to the selected group information is displayed.

Figure 26A:
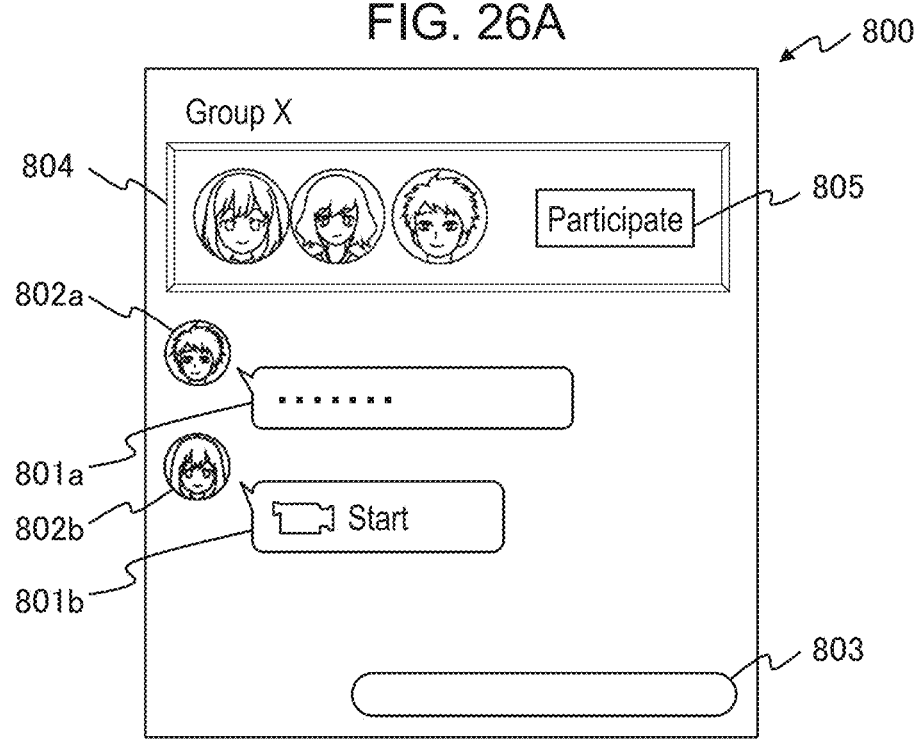
FIG. 26A and FIG. 26B illustrate examples of the screen that is displayed on the display device of the terminal device according to the Second Example of the present disclosure.

FIG. 26A illustrates an example of the information exchange screen 800 that is displayed on the display device 23 of the terminal device 2 of the user. The information exchange screen 800 includes display regions 801a to 801b in which information such as the text or the image that is inputted from each user member of the communication group that starts the communication service is displayed, information 802a to 802b (such as the thumbnail images of the character objects) that represents the user members who input the information that is displayed in the display regions 801a to 801b, an input object 803 for the user who inputs a text or an image that is to be displayed into a new display region 801, a service display region 804 that represents the started communication service, and the participation button 805 for participating in the started communication service.

The thumbnail images of the character objects of three users who participate in the communication service are displayed in the service display region 804 illustrated in FIG. 26A. Information that represents the start of the communication service is displayed in the display region 801b illustrated in FIG. 26A. The participation button 805 is selected by the user, and consequently, a participating process is performed. An example of the participating process will now be described.

After the participation button 805 is selected by the user who operates the input device 24, the display processing unit 274 of the terminal device 2 of the user first stores the user ID of the user that is stored in the terminal storage device 22 in the terminal storage device 22 as the user ID of the user who participates in the communication service related to the service display region 804. Subsequently, the display processing unit 274 displays the communication screen 810 (FIG. 26B) including the user output images of all of the users who participate in the communication service.

Subsequently, the transmission unit 272 of the terminal device 2 of the user transmits an instruction for participating in the communication service to the server device 3 together with the user ID of the user that is stored in the terminal storage device 22, the information about the communication group, and/or the destination information via the terminal communication I/F 21. The information about the communication group is the group ID and name of the communication group, and the user IDs of the user members. The destination information includes the user IDs of the other users other than the user who operates the terminal device 2 among the user members of the communication group. The server reception unit 331 of the server device 3 receives the instruction for participating, the user ID, the information about the communication group and/or the destination information via the server communication I/F 31. The server transmission unit 332 of the server device 3 transmits the instruction for participating, the user ID, and the information about the communication group to the terminal devices 2 of the other users that are represented by the user IDs that are included in the destination information via the server communication I/F 31.

The reception unit 273 of the terminal device 2 of each of the other users receives, from the server device 3, the instruction for participating, the user ID, and the information about the communication group that are transmitted from the terminal device 2 of the user. The reception unit 273 stores the received user ID in the terminal storage device 22 as the user ID of the user who participates in the communication service. In the case where the communication screen 810 is displayed on the terminal device, the display processing unit 274 of the terminal device 2 of the other user displays the communication screen 810 including the user output images of all of the users who participate in the communication service. This is the end of the participating process.

The participating process may be performed in the case where the group information is selected by the user who operates the input device 24 on the group selection screen 710. That is, the participating process for the communication service in which the communication group that corresponds to the group information can participate may be performed depending on the selection of the group information by the user. In this case, the information exchange screen 800 is not displayed.

An embodiment of the start of or the participation in the communication service is not limited to the examples described above. For example, another starting process that differs from the starting process depending on the selection of the start object 704 by the user may be performed. The other starting process is performed in the case where a predetermined display object for specifying the start of the communication service is selected by the user on a predetermined screen such as the home screen. The predetermined display object may be displayed in the case where the thumbnail image of the character object of the user, for example, is selected and may be included in menu items of the predetermined screen. The other starting process may be automatically performed in the case where a predetermined start condition is satisfied. Examples of the predetermined start condition include that the current time becomes a predetermined time, a predetermined time has passed after the previous communication service ends, and the number of the mutual followers of the user exceeds a predetermined number. An example of the other starting process will now be described.

The transmission unit 272 of the terminal device 2 of the user first transmits the instruction for starting the communication service to the server device 3 together with the user ID of the user that is stored in the terminal storage device 22 and/or the destination information via the terminal communication I/F 21. The transmission unit 272 stores the user ID of the user in the terminal storage device 22 as the user ID of the user who participates in the communication service. The destination information includes the user ID of another user or the user IDs of multiple other users who have a predetermined relationship with the user. For example, the destination information may include the user ID of another user or the user IDs of multiple other users who are the mutual followers of the user. The destination information may include the user ID of another user who has a mutual follower relationship with a user who is the mutual follower of the user instead of or in addition to the user ID of the other user or the user IDs of the multiple other users who are the mutual followers of the user.

The server reception unit 331 of the server device 3 receives the instruction for starting, the user ID, and/or the destination information via the server communication I/F 31. The server transmission unit 332 of the server device 3 transmits the instruction for starting, the user ID, and the destination information to the terminal devices 2 of the other users that are represented by the user IDs that are included in the destination information via the server communication I/F 31. The reception unit 273 of the terminal device 2 of each of the other users receives, from the server device 3, the instruction for starting, the user ID, and the destination information that are transmitted from the terminal device 2 of the user. The reception unit 273 stores the transmitted user ID in the terminal storage device 22 as the user ID of the user who participates in the communication service. The display processing unit 274 of the terminal device 2 of the other user displays the notification screen on the display device 23, based on the received user ID. For example, the notification screen includes information for prompting the user represented by the received user ID to participate in the communication service and a participation button.

After the participation button in the notification screen is selected by the other user who operates the input device 24, the display processing unit 274 of the terminal device 2 of the other user stores the user ID of the other user that is stored in the terminal storage device 22 in the terminal storage device 22 as the user ID of the user who participates in the communication service related to the service display region 804. Subsequently, the display processing unit 274 displays the communication screen 810 (FIG. 26B) including the user output images of all of the users who participate in the communication service.

Subsequently, the transmission unit 272 of the terminal device 2 of the other user transmits the instruction for participating in the communication service to the server device 3 together with the user ID of the other user that is stored in the terminal storage device 22 and/or the destination information via the terminal communication I/F 21. The destination information is acquired by removing the user ID of the other user of the terminal device 2 that is to transmit the destination information from the user IDs that are included in the destination information that is received by the reception unit 273 and adding the user ID that is received by the reception unit 273. The server reception unit 331 of the server device 3 receives the instruction for participating, the user ID, and/or the destination information via the server communication I/F 31. The server transmission unit 332 of the server device 3 transmits the instruction for participating, the user ID, and the destination information to the terminal devices 2 of the other users that are represented by the user IDs that are included in the destination information via the server communication I/F 31.

The reception unit 273 of the terminal device 2 of each of the users to which the instruction for participating is transmitted receives, from the server device 3, the instruction for participating, the user ID, and the destination information that are transmitted from the terminal device 2 of the user. The reception unit 273 stores the received user ID in the terminal storage device 22 as the user ID of the user who participates in the communication service. In the case where the communication screen 810 is displayed on the terminal device 2, the display processing unit 274 of the terminal device 2 displays the communication screen 810 including the user output images of all of the users who participate in the communication service. This is the end of the participating process.

An embodiment of the start of or the participation in the communication service with the other users who have the predetermined relationship with the user is not limited to the examples described above. For example, in the case where the predetermined display object for specifying the start of the communication service by the user is selected by the user, the selection screen including the information that represents one or multiple other users who are the mutual followers of the user may be displayed. In this case, after the information that represents any one of the other users is selected by the user, another starting process based on the instruction for starting communication with the selected other user may be performed. Also, in this case, the information exchange screen for the selected other user may be displayed, a start button in the information exchange screen may be selected, and consequently, the other starting process based on the instruction for starting the communication with the other user may be performed.

As for the existing information system, a user cannot input an instruction for starting communication with another user who has a predetermined relationship with the user such as a mutual follower of the user and/or an instruction for participating therein by using a simple interface. The information system 1 disclosed according to the present embodiment performs the other starting process described above. Consequently, a user interface related to the instruction for starting the communication and/or the instruction for participating therein can be improved, and the communication load between the server device 3 and the terminal devices 2 can be reduced.

Figure 26B:
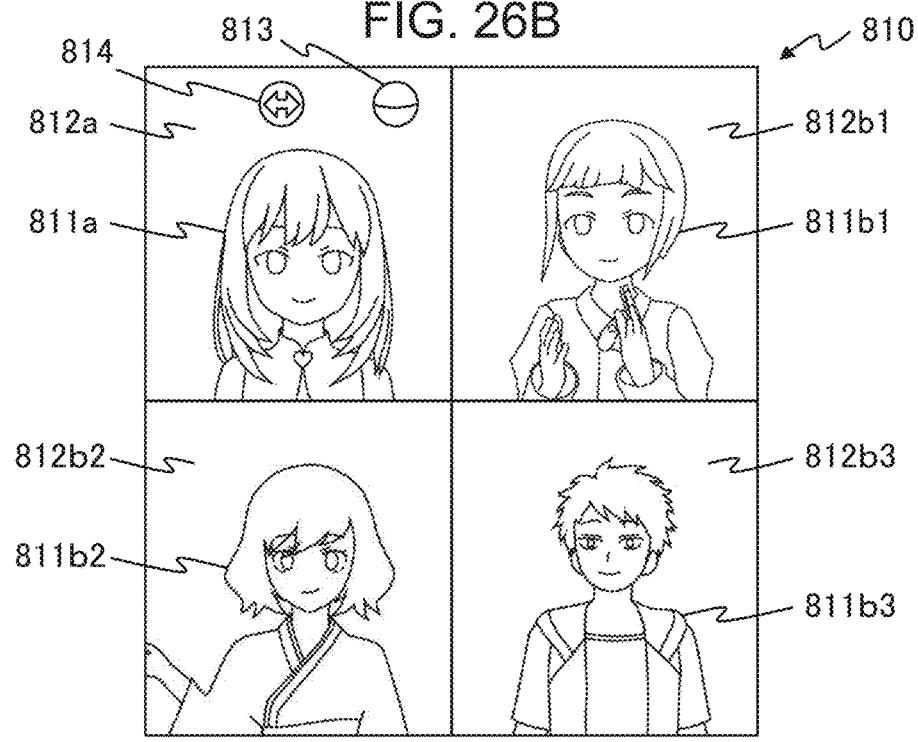

FIG. 26B illustrates an example of the communication screen 810 that is displayed on the display device 23 of each terminal device 2. The communication screen 810 is the communication screen of the communication group that includes the user who operates the terminal device 2 as the user member. In the following description, the user who operates the terminal device 2 is referred to as the user A, and users who participate in the communication service related to the communication screen 810 other than the user A are referred to as a user B1, a user B2, a user B3 and so on. In some cases, the user B1, the user B2, the user B3, and so on are referred to as the users B.

The communication screen 810 includes at least a user output image 812a including a character object 811a of the user A. In an example illustrated in FIG. 26B, three users (the user B1, the user B2, and the user B3) other than the user A participate in the communication service. That is, the communication screen 810 includes user output images 812b1, 812b2, and 812b3 including character objects 811b1, 811b2, and 811b3 of the user B1, the user B2, and the user B3. In the following description, the character objects 811b1, 811b2, and 811b3 are referred to as the character objects 811b, and the user output images 812b1, 812b2, and 812b3 are referred to as the user output images 812b in some cases. The users B are the other users for the user A. The user output images 812b of the users B that are displayed on the terminal device 2 of the user A are the other-user output images.

In the case where no users other than the user A participate in the communication service, the communication screen 810 includes only the user output image 812a, and the user output image 812b of one of the users B is added into the communication screen 810 whenever the user B participates in the communication service. The upper limit of the number of the users who can participate in the communication service is not limited. For example, in the case where nine users B other than the user A participate in the communication service, the communication screen 810 includes the user output images 812b1, 812b2, and 812b3 to 812b9 of the nine users B together with the user output image 812a of the user A.

The character object 811a is the animation (video image) of the character object of the user A that is generated by the display processing unit 274, based on the motion data of the user A that is generated by the generation unit 271, the use object, and the character object associated with the user ID of the user A in the user table T1. The motion data of the user A that is generated by the generation unit 271 is the same as the motion data that is included in the output information that is transmitted to the terminal devices 2 of the users B. The output information about the user A includes the voice data of the user A together with the motion data of the user A. In the case where the motion data of the user A that is generated by the generation unit 271 includes the face motion data of the user A, the user output image 812*a* including the character object 811*a* that changes the expression in synchronization with a change in the expression of the user A is displayed. For example, when the voice sounds from the user A, the user output image 812*a* including the character object 811*a* that moves the lips is displayed. In the case where the motion data of the user A that is generated by the generation unit 271 includes the body motion data of the user A, the user output image 812*a* including the character object 811*a* that moves a corresponding portion in synchronization with the motion of the body of the user A is displayed.

The transmission unit 272 of the terminal device 2 of the user A transmits the output information about the user A to the server device 3 together with the destination information (the user IDs of the users B (the user B1 to the user B3) who belong to the communication group) via the terminal communication I/F 21. Subsequently, the server reception unit 331 of the server device 3 receives the output information about the user A that is transmitted from the terminal device 2 of the user A via the server communication I/F 31. Subsequently, the server transmission unit 332 of the server device 3 refers the received user IDs of the users B (the user B1 to the user B3) and transmits the output information about the user A to the terminal devices 2 of the users B (the user B1 to the user B3) via the server communication I/F 31. After the reception unit 273 of the terminal device 2 of each of the users B receives the output information via the terminal communication I/F 21, the display processing unit 274 of the terminal device 2 of the user B displays the user output image 812*a* including the character object 811*a*, based on the motion data of the user A that is represented by the user ID that is included in the output information.

The character objects 811*b* are the animations (video images) of the character objects of the users B that are generated by the display processing unit 274, based on the motion data that is included in the output information about the users B that is received by the reception unit 273 and the character objects that are associated with the user IDs of the users B in the user table T1. In the case where the motion data of the users B that is received by the reception unit 273 includes the face motion data of the users B, the user output images 812*b* including the character objects 811*b* that change the expression in synchronization with a change in the expression of the users B are displayed. For example, in the case where the voices sound from the users B, the user output images 812*b* including the character objects 811*b* that move the lips are displayed. In the case where the motion data of the users B that is generated by the generation unit 271 includes the body motion data of the users B, the user output images 812*b* including the character objects 811*b* that move corresponding portions in synchronization with the motion of the bodies of the users B are displayed. In the case where the output information about the users B that is received by the reception unit 273 includes the voice data of the users B, the display processing unit 274 displays the user output images 812*b*, and the voice output unit 275 outputs the voices of the users B that are generated based on the voice data.

The communication screen 810 including the user output image 812*a* and the user output images 812*b* is thus displayed, and consequently, the user A can hear the voices of the users B while viewing the character objects 811*b* of the users B such that the voices sound. The character object and voice data of the user A is outputted by the terminal devices 2 of the users B. Consequently, the user A and the users B who participate in the communication service can communicate with each other by using each character object.

The communication screen 810 includes a selection event button 813 and a change button 814. In the example illustrated in FIG. 26B, the selection event button 813 and the change button 814 are placed in the display region of the user output image 812*a* but may be displayed outside the display region of the user output image 812*a*. In the case where a predetermined display condition is satisfied, the selection event button 813 and the change button 814 may be controlled by the display processing unit 274 so as to be displayed only for a predetermined time. Examples of the predetermined display condition include that a predetermined time has passed after the communication service related to the communication screen 810 starts. The predetermined display condition may be that the number of the users who participate in the communication service related to the communication screen 810 exceeds a predetermined number (for example, 2). The predetermined display condition may be that a specific user participates in the communication service related to the communication screen 810. An example of the specific user is a user who has a specific parameter value equal to or more than a predetermined value. In the case where the specific parameter value of the user is the number of the followers of the user, the specific user has a predetermined number (for example, 30) or more of the followers. In the case where the specific parameter value of the user is a number of times the selection event is organized by the user, the specific user has organized the selection event a predetermined number or more of times. In the case where the specific parameter value of the user is the number of participants in the communication service that is started by the user, the specific user has started the communication service that has a predetermined number or more of participants. In the case where the specific parameter value of the user is a total time the communication service in which the user participates is used, the specific user has participated in the communication service that is used for a predetermined time or more in total. In the case where the specific parameter value of the user is a parameter value such as a level related to the communication service, the specific user has a parameter value such as a level related to the communication service equal to or more than a predetermined value. The level related to the communication service increases depending on the participation of the user in the communication service. In the case where the specific parameter value of the user is a parameter value such as a level related to a livestream event, the specific user has a parameter value such as a level related to the livestream event equal to or more than a predetermined value. The level related to the livestream event increases whenever the user as a livestream user livestreams a livestream image. The level related to the livestream event may increase whenever the user as a viewing user views a livestream image. The predetermined display condition may be that two or more conditions among the conditions described above are satisfied.

The selection event button 813 is an object image such as a button object for instructing for displaying a selection screen 900 for selecting the selection event. After the selection event button 813 is selected by the user A who operates the input device 24, the selection screen 900 is displayed. The selection screen 900 will be described in detail later.

The change button 814 is an object image such as a button object for wearing a new wearable object on the character object 811*a*. In the case where the character object 811*a* has already worn the same kind of a wearable object as the kind of the new wearable object or a wearable object at the same placement position, the wearable object that has been already worn is changed into the new wearable object. After the change button 814 is selected by the user A who operates the input device 24, a communication screen 1100 (FIG. 29B) is displayed. The communication screen 1100 may be displayed by the user A who operates the input device 24 in the case where the character object 811*a* or the user output image 812*a* is selected. The communication screen 1100 will be described in detail later.

Figure 27A:
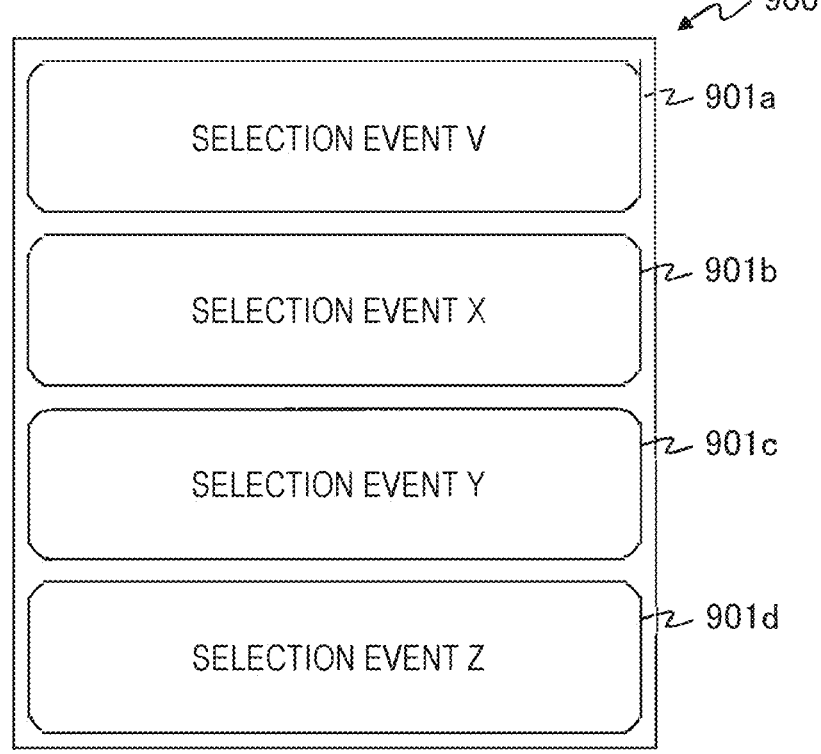
FIG. 27A and FIG. 27B illustrate examples of the screen that is displayed on the display device of the terminal device according to the Second Example of the present disclosure.

FIG. 27A illustrates an example of the selection screen 900 that is displayed on the display device 23 of the terminal device 2. The selection screen 900 includes event start buttons 901 that correspond to multiple kinds of the selection events. In each selection event, at least one specific object is selected from object groups for constituting the multiple specific objects depending on an instruction from the user in accordance with a predetermined selection method and is provided to the user. The selection event that corresponds to the event start button 901 that is selected by the user A from the multiple event start buttons 901 is provided to the user A. The event start button 901 is associated with the selection event ID of the corresponding selection event.

The object groups that are used in the respective kinds of the selection events differ from each other. For example, multiple specific objects that is included in the object group that is used in a selection event are not included in the object group that is used in another selection event. A specific object of the multiple specific objects that are included in the object group that is used in a selection event may be included in the object group that is used in another selection event. Multiple specific objects that are included in the object group that is used in a selection event may be the same as multiple specific objects that are included in the object group that is used in another selection event. The number of the specific objects that are selected in a selection event may differ from the number of the specific objects that are selected in another selection event.

In an example illustrated in FIG. 27A, the selection screen 900 includes four event start buttons 901*a* to 901*d* that correspond to four kinds of the selection events. The number of the event start buttons 901 that are displayed on the selection screen 900 is not limited to 4. In the case where all kinds of the event start buttons 901 cannot be included within the selection screen 900, the display processing unit 274 of the terminal device 2 may display the event start buttons 901 in a scrollable manner. In this case, the event start buttons 901 that are not currently displayed within the selection screen 900 are displayed within the selection screen 900 by scrolling depending on a swiping operation (such as an operation of moving a finger upward from below the screen with the finger being in contact with the screen) of the user A.

After any one of the multiple event start buttons 901 is selected by the user A who operates the input device 24, the input device 24 inputs the instruction for displaying the selection instruction screen into the terminal processing device 27. The input device 24 inputs the selection event ID that is associated with the selected event start button 901 into the terminal processing device 27 together with the display of the selection instruction screen. After any one of the event start buttons 901 is selected by the user A who operates the input device 24, the display of the selection screen 900 ends, and a communication screen 910 and a selection instruction screen 911 are displayed.

The transmission unit 272 of the terminal device 2 of the user A may add information for displaying the selection screen 900 into the output information that is transmitted to the terminal devices 2 of the users B (the users B1 to B3) via the server device 3 in a period in which the selection screen 900 is displayed. The information for displaying the selection screen 900 is video information for displaying the video image of the selection screen 900 that is displayed on the display device 23 of the terminal device 2 of the user A. The information for displaying the selection screen 900 may be image information for displaying the still image of the selection screen 900 that is displayed on the display device 23 of the terminal device 2 of user A. In this case, the output information may not include the character video data including the motion data of the user A. Consequently, after the output information about the user A is received via the server device 3, the terminal devices 2 of the users B (the users B1 to B3) can display the selection screen 900 depending on the operation of the user A, and the users B can view the situation of the operation of the user A on the selection screen 900. The information for displaying the selection screen 900 may be the object IDs for identifying the event start buttons 901*a* to 901*d*. In this case, after the output information about the user A is received via the server device 3, the terminal devices 2 of the users B (the users B1 to B3) may extract the drawing data of the event start buttons 901*a* to 901*d* that correspond to the object IDs that are included in the output information from the terminal storage device 22 and may draw the selection screen 900.

Figure 27B:
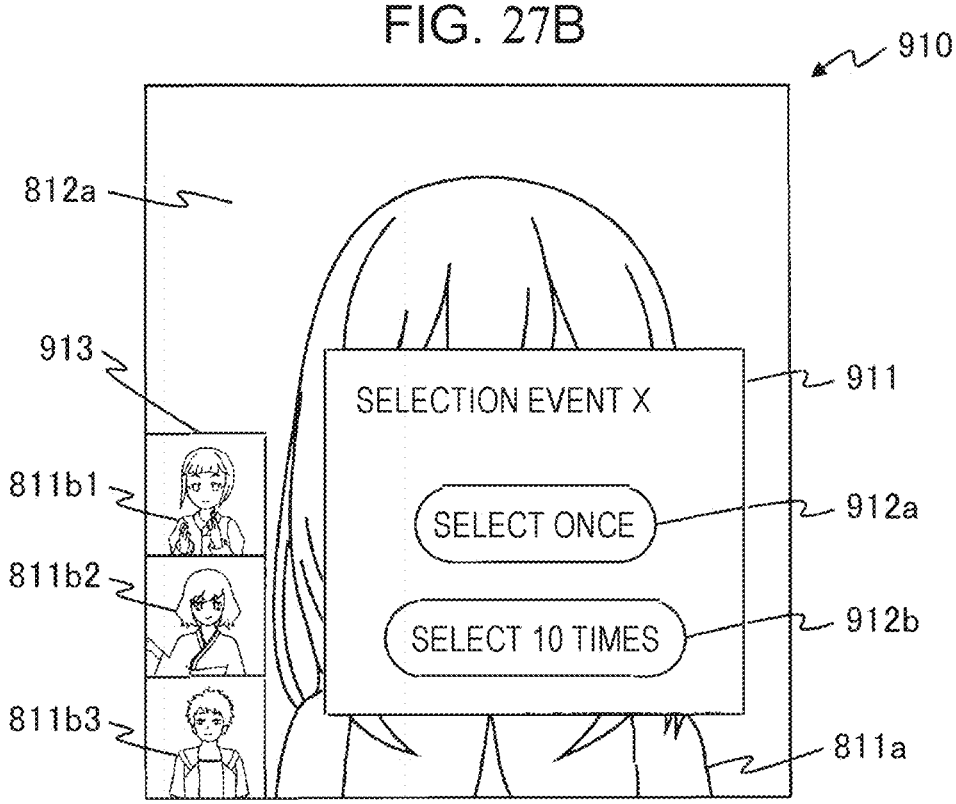

FIG. 27B illustrates examples of the communication screen 910 and the selection instruction screen 911 that are displayed on the display device 23 of the terminal device 2. As illustrated in FIG. 27B, the selection instruction screen 911 is displayed so as to overlap the communication screen 910. The selection instruction screen 911 may be displayed on the entire screen of the display device 23. In this case, the communication screen 910 is not displayed.

The user output image 812*a* including the character object 811*a* of the user A is enlarged and is displayed on the communication screen 910. A user output image 913 including the character objects 811*b*1, 811*b*2, and 811*b*3 of the user B1, the user B2, and the user B3 is displayed so as to overlap the user output image 812*a*. While the communication screen 910 is displayed, the voice data of the user B1, the user B2, and the user B3 is outputted. The user output image 913 may not be displayed on the communication screen 910. Also, in this case, the voice data of the user B1, the user B2, and the user B3 may be outputted.

The selection instruction screen 911 includes information about the selection event (such as the name of the selection event) that is represented by the selection event ID that is associated with the event start button 901 that is selected on the selection screen 900 and selection instruction buttons 912. The selection instruction screen 911 illustrated in FIG. 27B includes two kinds of selection instruction buttons 912*a* and 912*b*. In the case where the selection instruction button 912*a* is selected by the user A, the number of selection of the object ID of the specific object that is selected in the selection event is "1". In the case where the selection instruction button 912*b* is selected by the user A, the number of selection of the object ID of the specific object that is selected in the selection event is "10". The number of the selection instruction buttons 912 that are included in the selection instruction screen 911 may be 1 or 3 or more. The number of selection of the object ID of the specific object that is selected in the selection event depending on the selection instruction buttons 912 is not limited to "1" or "10" but may be any number.

The transmission unit 272 of the terminal device 2 of the user A may add the information for displaying the selection instruction screen 911 into the output information that is transmitted to the terminal devices 2 of the users B (the users B1 to B3) via the server device 3 in a period in which the communication screen 910 and the selection instruction screen 911 are displayed. The information for displaying the selection instruction screen 911 is video information for displaying the video image of the selection instruction screen 911 that is displayed on the display device 23 of the terminal device 2 of the user A. The information for displaying the selection instruction screen 911 may be image information for displaying the still image of the selection instruction screen 911 that is displayed on the display device 23 of the terminal device 2 of the user A. Consequently, after the output information about the user A is received via the server device 3, the terminal devices 2 of the users B (the users B1 to B3) can display the communication screen 910 and the selection instruction screen 911 depending on the operation of the user A, and the users B can view the situation of the operation of the user A on the selection instruction screen 911. The information for displaying the selection instruction screen 911 may be the selection event ID that is associated with the event start button 901 that is selected by the user A and the object IDs for identifying the two kinds of the selection instruction buttons 912*a* and 912*b*. In this case, after the output information about the user A is received via the server device 3, the terminal devices 2 of the users B (the users B1 to B3) may extract the information about the selection event (such as the name of the selection event) that corresponds to the selection event ID that is included in the output information and the drawing data of the selection instruction buttons 912*a* and 912*b* that correspond to the object IDs that are included in the output information from the terminal storage device 22 and may draw the selection instruction screen 911. Information for displaying selection result screens 1000 and 1010 may be transmitted to the terminal devices 2 of the users B (the users B1 to B3) via the server device 3 in a period in which the selection result screens 1000 and 1010 are displayed on the terminal device 2 of the user A. Consequently, the selection result screens 1000 and 1010 are displayed on the terminal devices 2 of the users B (the users B1 to B3).

In the following description, the two kinds of the selection instruction buttons 912*a* and 912*b* that are included in the selection instruction screen 911 that is displayed on the terminal device 2 of the user A are referred to as the selection instruction buttons 912, and the function common to these will be described. After one of the selection instruction buttons 912 is selected by the user A who operates the input device 24, the input device 24 first inputs the instruction for selecting into the terminal processing device 27 together with the selection event ID that is inputted together with the instruction for displaying the selection instruction screen. The transmission unit 272 of the terminal device 2 of the user A transmits the inputted information that represents the instruction for selecting and selection event ID to the server device 3 via the terminal communication I/F 21 together with the user ID of the user A and the destination information. In an example illustrated in FIG. 27B, in the case where the selection instruction button 912*a* or the selection instruction button 912*b* is selected, the information that represents the number of selection that corresponds to the selected selection instruction button 912 is transmitted together with the information that represents the instruction for selecting.

The server reception unit 331 of the server device 3 receives the information that represents the instruction for selecting, the selection event ID, the user ID of the user A, and the destination information via the server communication I/F 31. The server reception unit 331 inputs the received information that represents the instruction for selecting and selection event ID into the selection unit 333. In the case where the information that represents the number of selection is transmitted together with the information that represents the instruction for selecting, the server reception unit 331 receives the information that represents the number of selection together with the information that represents the instruction for selecting and inputs the received information that represents the number of selection into the selection unit 333.

The selection unit 333 of the server device 3 extracts the object group ID that is associated with the inputted selection event ID from the multiple object group IDs that are stored in the server storage device 32. Subsequently, the selection unit 333 selects the object ID of at least one specific object from the object IDs of the multiple specific objects that are associated with the extracted object group ID in accordance with a predetermined selection method. In the case where the information that represents the number of selection is inputted, the selection unit 333 selects the object ID of the specific object a number of times equal to the number of selection from the object IDs of the multiple specific objects that are associated with the extracted object ID. For example, in the case where the information that represents that the number of selection is "1" is inputted, the selection unit 333 selects the object ID of the single specific object from the object IDs of the multiple specific objects that are associated with the extracted object ID. For example, in the case where the information that represents that the number of selection is "10" is inputted, the selection unit 333 selects the object IDs of 10 specific objects from the object IDs of the multiple specific objects that are associated with the extracted object ID. The selection unit 333 inputs the object ID of the selected specific object into the server transmission unit 332 as the information that represents the result of selection.

The server transmission unit 332 of the server device 3 acquires the information that represents the result of selection from the selection unit 333. The server transmission unit 332 acquires the received user ID of the user A and destination information from the server reception unit 331 together with the information that represents the instruction for selecting. Subsequently, the server transmission unit 332 transmits the information that represents the result of selection and the user ID of the user A to the terminal device 2 of the user A and the terminal devices 2 of the users B1 to B3 that are represented by the user IDs that are included in the destination information via the server communication I/F 31.

The reception unit 273 of the terminal device 2 of the user A receives the information that represents the result of selection and the user ID of the user A that are transmitted from the server device 3 via the terminal communication I/F 21. The reception unit 273 of the terminal device 2 of the user A associates the object ID of the specific object that is received as the information that represents the result of selection with the user ID of the user A and stores the object ID in the user table T1 as the owned object of the user A.

The display processing unit 274 of the terminal device 2 of the user A refers the object table T2 and extracts a name and/or image information associated with the object ID of the specific object that is received as the information that represents the result of selection. The display processing unit 274 of the terminal device 2 of the user A displays the selection result screen 1000 or the selection result screen 1010 on the display device 23, based on the read image information and/or name.

Figure 28A:
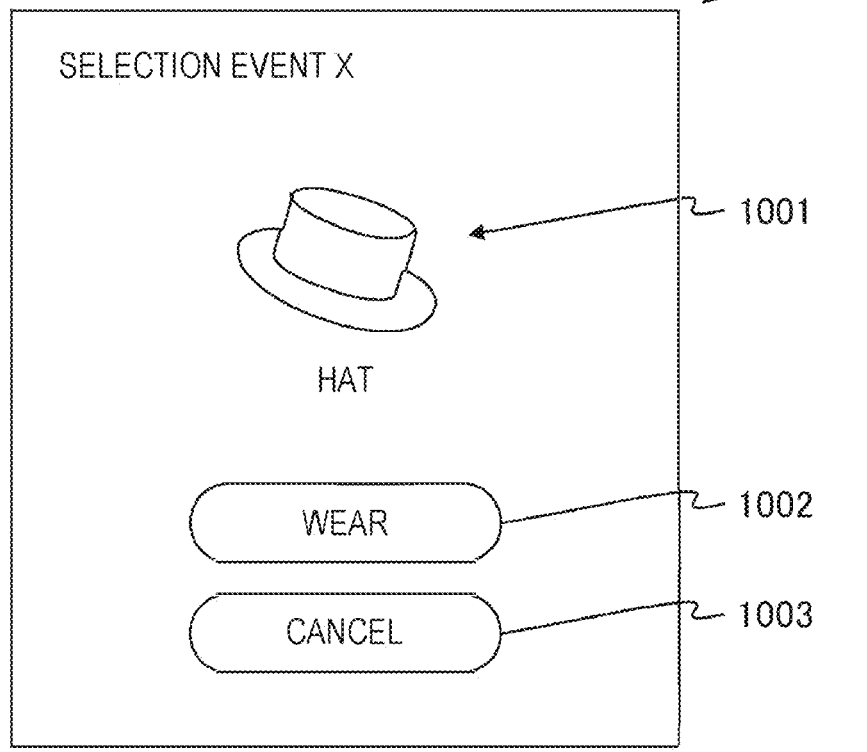
FIG. 28A and FIG. 28B illustrate examples of the screen that is displayed on the display device of the terminal device according to the Second Example of the present disclosure.
Figure 28B:
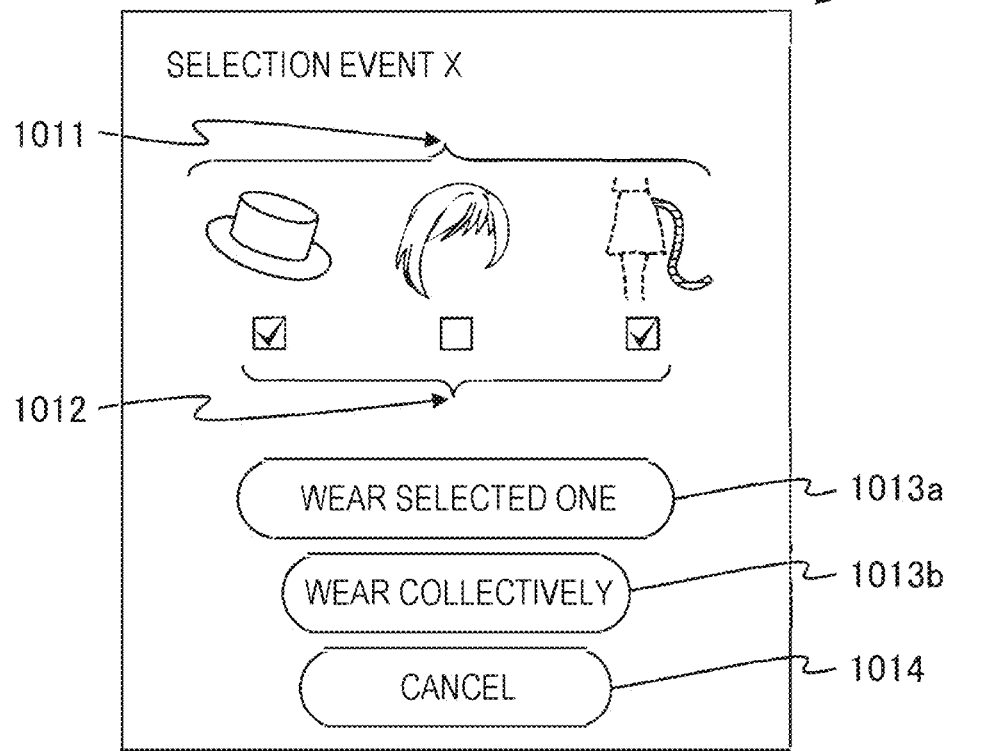

FIG. 28A illustrates an example of the selection result screen 1000 that is displayed on the display device 23 of the terminal device 2 of the user A. FIG. 28B illustrates an example of the selection result screen 1010 that is displayed on the display device 23 of the terminal device 2 of the user A. The selection result screen 1000 is displayed in the case where the object ID of the single specific object is received as the information that represents the result of selection. The selection result screen 1010 is displayed in the case where the object IDs of the multiple specific objects are received as the information that represents the result of selection.

The selection result screen 1000 illustrated in FIG. 28A includes information 1001 that represents the single specific object, a use button 1002, and a cancel button 1003. The information 1001 that represents the single specific object is the name and/or the image information associated with the object ID of the single specific object that is received as the information that represents the result of selection. The use button 1002 is an object image such as a button object for instructing for using the single specific object as the result of selection. After the use button 1002 is selected by the user A who operates the input device 24, the using process described above is performed. The cancel button 1003 is an object image such as a button object for ending the display of the selection result screen 1000 and displaying the communication screen 810 (FIG. 26B) again.

Figure 29A:
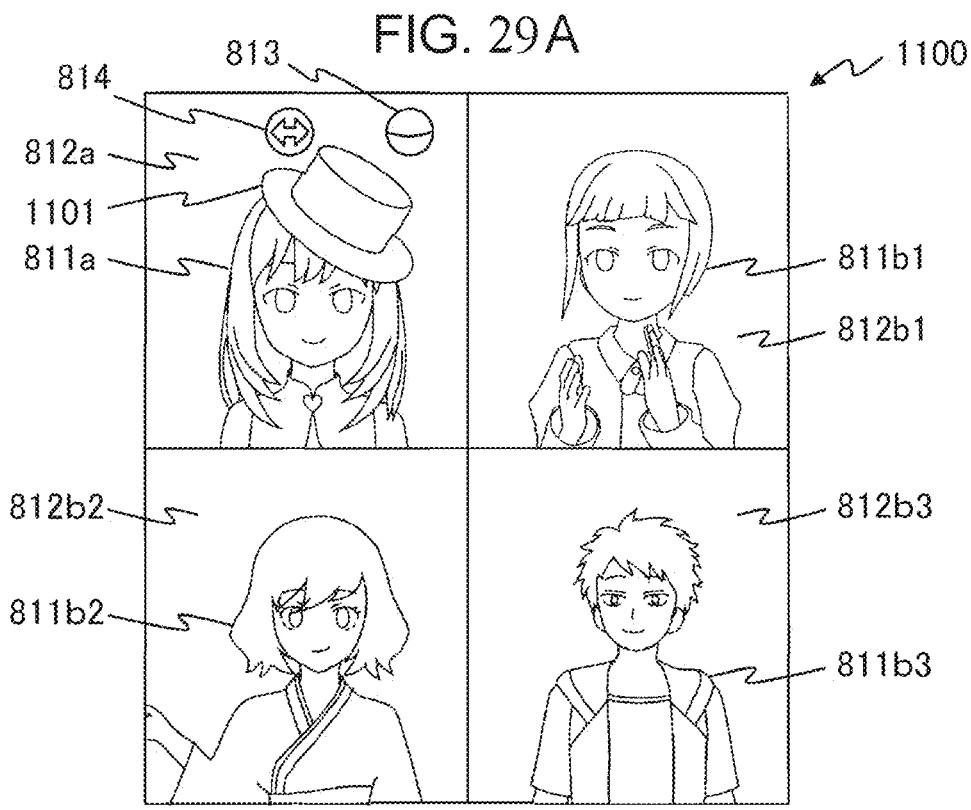
FIG. 29A and FIG. 29B illustrate examples of the screen that is displayed on the display device of the terminal device according to the Second Example of the present disclosure.

After the use button 1002 is selected by the user A who operates the input device 24, the display processing unit 274 of the terminal device 2 of the user A displays the communication screen 1100 on the display device 23. FIG. 29A illustrates an example of the communication screen 1100 that is displayed on the display device 23 of the terminal device 2 of the user. The communication screen 1100 includes the user output image 812a including the character object 811a of the user A and the user output images 812b1, 812b2, and 812b3 including the character objects 811b1, 811b2, and 811b3 of the user B1, the user B2, and the user B3 as in the communication screen 810. The communication screen 1100 includes the selection event button 813 and the change button 814 as in the communication screen 810.

The user A who operates the input device 24 selects the use button 1002 and consequently, the using process described above is performed based on the object ID of the single specific object that is received as the information that represents the result of selection. The using process is performed, and consequently, the user output image 812a including the character object 811a of the user A that is changed by using the image information that is associated with the object ID of the single specific object that is received as the information that represents the result of selection is displayed. In an example illustrated in FIG. 29A, the character object 811a is changed into the character object 811a that wears a wearable object "hat" 1101 on the head, and the user output image 812a including the changed character object 811a is displayed.

The selection result screen 1010 illustrated in FIG. 28B includes information 1011 that represents multiple specific objects, selection objects 1012, a use button 1013a, a use button 1013b, and a cancel button 1014. The information 1011 that represents the multiple specific objects is names and/or image information associated with the object IDs of the multiple specific objects that are received as the information that represents the result of selection.

The selection objects 1012 are operation objects for selecting the object IDs of the multiple specific objects. In an example illustrated in FIG. 28B, the display processing unit 274 of the terminal device 2 of the user displays check box objects that correspond to information that represents the specific objects as the selection objects 1012. For example, after the selection objects 1012 are selected by the user who operates the input device 24, the selection objects 1012 are displayed with "check" marks. In this case, the object IDs of the specific objects that correspond to the selection objects 1012 that are displayed with the "check" marks are selected. After one of the selection objects 1012 that are displayed with the "check" marks is selected by the user who operates the input device 24, the selection object 1012 is displayed with no "check" mark. In this case, the object ID of the specific object that corresponds to the selection object 1012 that is displayed with no "check" mark is not selected. The selection objects 1012 are associated with the respective object IDs of the specific objects.

The use button 1013a and the use button 1013b are object images such as button objects for instructing for using the specific objects as the result of selection. After the use button 1013a is selected by the user A who operates the input device 24, the using process is performed based on the object IDs of the specific objects that are selected by the user A who operates the selection objects 1012. The using process is performed, and consequently, the character object 811a is changed based on the image information that is associated with the object IDs that are selected by the user A among the object IDs of the multiple specific objects that are received as the information that represents the result of selection. The user output image 812a including the changed character object 811a is displayed on the communication screen 1100. After the use button 1013b is selected by the user A who operates the input device 24, the using process is performed based on the object IDs of all of the specific objects that are received as the information that represents the result of selection. The using process is performed, and consequently, the character object 811a is changed based on the image information that is associated with the object IDs of all of the specific objects that are received as the information that represents the result of selection. The user output image 812a including the changed character object 811a is displayed on the communication screen 1100. The cancel button 1014 is an object image such as a button object for ending the display of the selection result screen 1010 and displaying the communication screen 810 (FIG. 26B) again.

The instruction for using to perform the using process is not limited to the input depending on the operation of the user on the selection result screens 1000 and 1010. For example, the instruction for using may be inputted depending on the operation of the user on a selection screen 1110 for selecting an object to be used from the owned objects of the user.

Figure 29B:
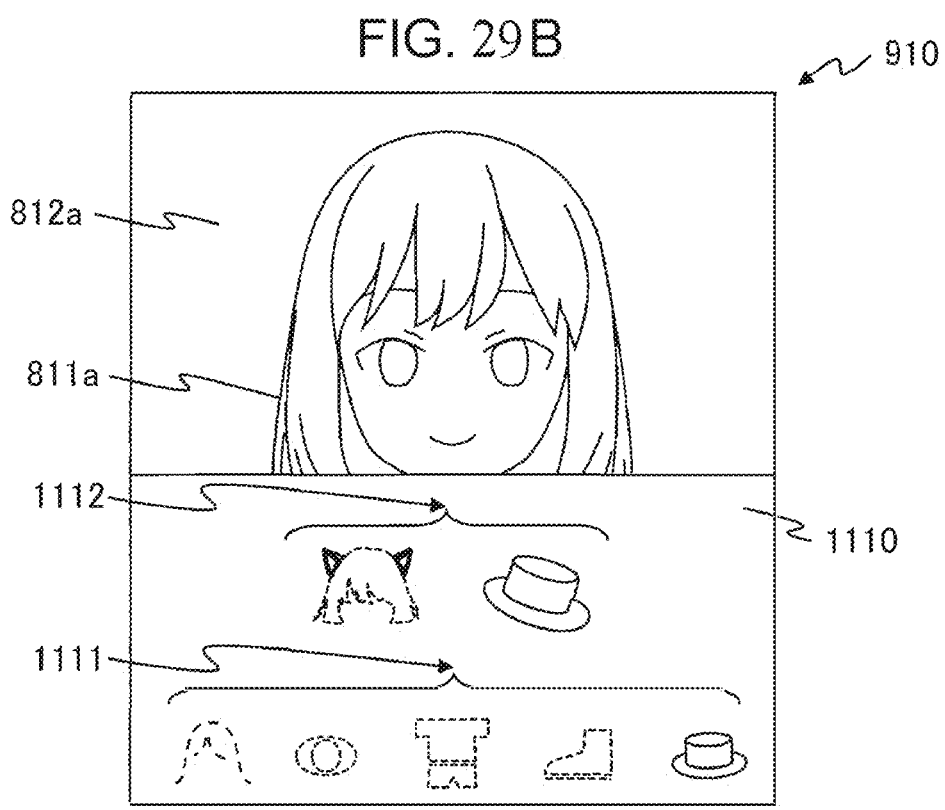

FIG. 29B illustrates an example of the selection screen 1110 that is displayed on the display device 23 of the terminal device 2. The selection screen 1110 illustrated in FIG. 29B is displayed so as to overlap the communication screen 910. The selection screen 1110 may be displayed after the display of the communication screen 910 ends.

The selection screen 1110 includes multiple kind objects 1111 that represent the kinds of the wearable objects and multiple wearable candidate objects 1112 that represent the wearable objects. After any one of the multiple kind objects 1111 is selected by the user A who operates the input device 24, the kind of wearable object that corresponds to the selected kind object 1111 is identified. After the kind of wearable object is identified, the wearable candidate objects 1112 that each represent the identified kind of wearable object among the owned objects of the user A are displayed on the selection screen 1110. When the terminal device 2 of the user A receives the information that represents the result of selection, the object ID of the specific object that is received as the information that represents the result of selection is associated with the user ID of the user A and is stored in the user table T1 as the owned object of the user A. For this reason, the wearable candidate objects 1112 include each wearable candidate object 1112 that represents the specific object that is selected in the selection event.

After each wearable candidate object 1112 that corresponds to the object ID of the specific object that is selected in the selection event is selected by the user A who operates the input device 24 from the multiple wearable candidate objects 1112, the input device 24 inputs the instruction for using into the terminal processing device 27, and the using process described above is performed based on the object ID of the selected specific object. Consequently, the display processing unit 274 displays the communication screen 1100 including the user output image 812a including the character object 811a that wears the specific object that is selected in the selection event.

The information that represents the result of selection in the selection event depending on the instruction for selecting from the user A is transmitted to the terminal device 2 of the user A and is transmitted also to the terminal devices 2 of the users B (the users B1 to B3). The character objects 811b of the users B may be changed based on the information that represents the result of selection in the selection event depending on the instruction for selecting from the user A. Various processes that are performed by the terminal device 2 of the user B1 and that are related to changes in the character object 811b1 of the user B1 will now be described. The various processes that are performed by the terminal device 2 of the user B1 are performed also by the terminal device 2 of the user B2 and the terminal device 2 of the user B3.

The reception unit 273 of the terminal device 2 of the user B1 receives the user ID of the user A and the information that represents the result of selection in the selection event depending on the instruction for selecting from the user A that are transmitted from the server device 3 via the terminal communication I/F 21. The reception unit 273 of the terminal device 2 of the user B1 stores the object ID of the specific object that is received as the information that represents the result of selection in the terminal storage device 22 until the communication service in which the user B1 participates ends. The object ID of the specific object is not stored as the owned object of the user B1. Consequently, the user B1 can temporarily use the result of selection in the selection event depending on the instruction for selecting from the user A.

Subsequently, the display processing unit 274 of the terminal device 2 of the user B1 refers the object table T2 and extracts the name and/or the image information associated with the object ID of the specific object that is received as the information that represents the result of selection in the selection event depending on the instruction for selecting from the user A. The display processing unit 274 of the terminal device 2 of the user B1 displays a selection result screen 1200 or a selection result screen 1210 on the display device 23 based on the read image information and/or name.

Figure 30A:
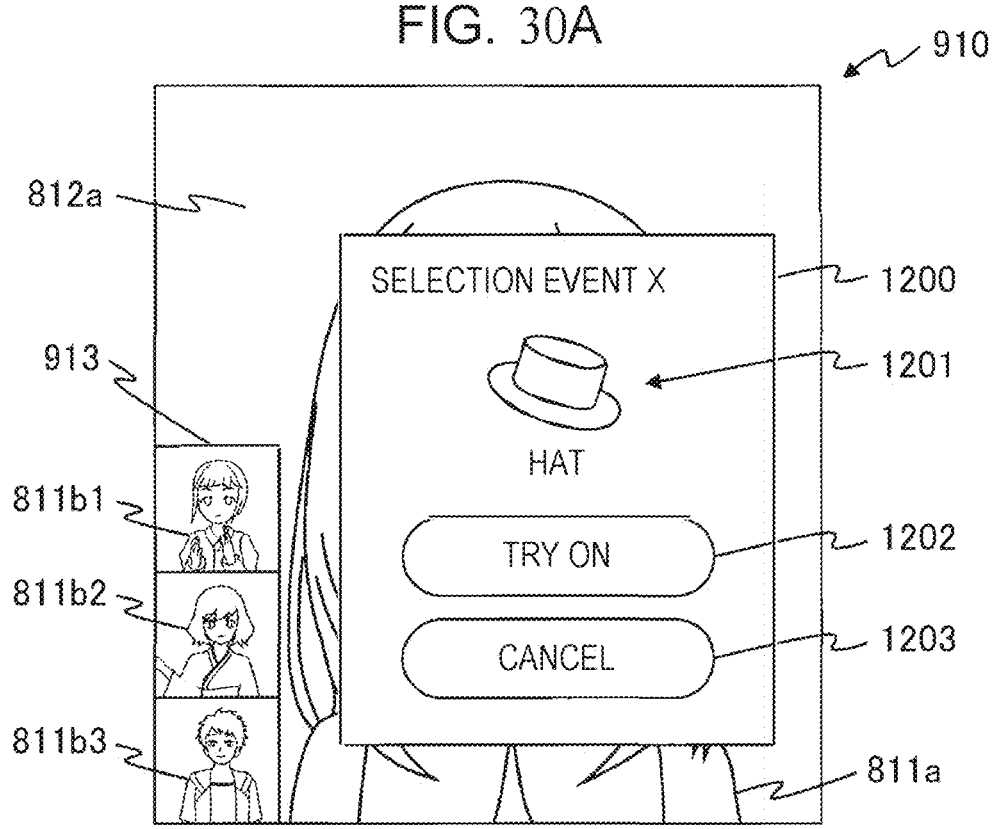
FIG. 30A and FIG. 30B illustrate examples of the screen that is displayed on the display device of the terminal device according to the Second Example of the present disclosure.
Figure 30B:
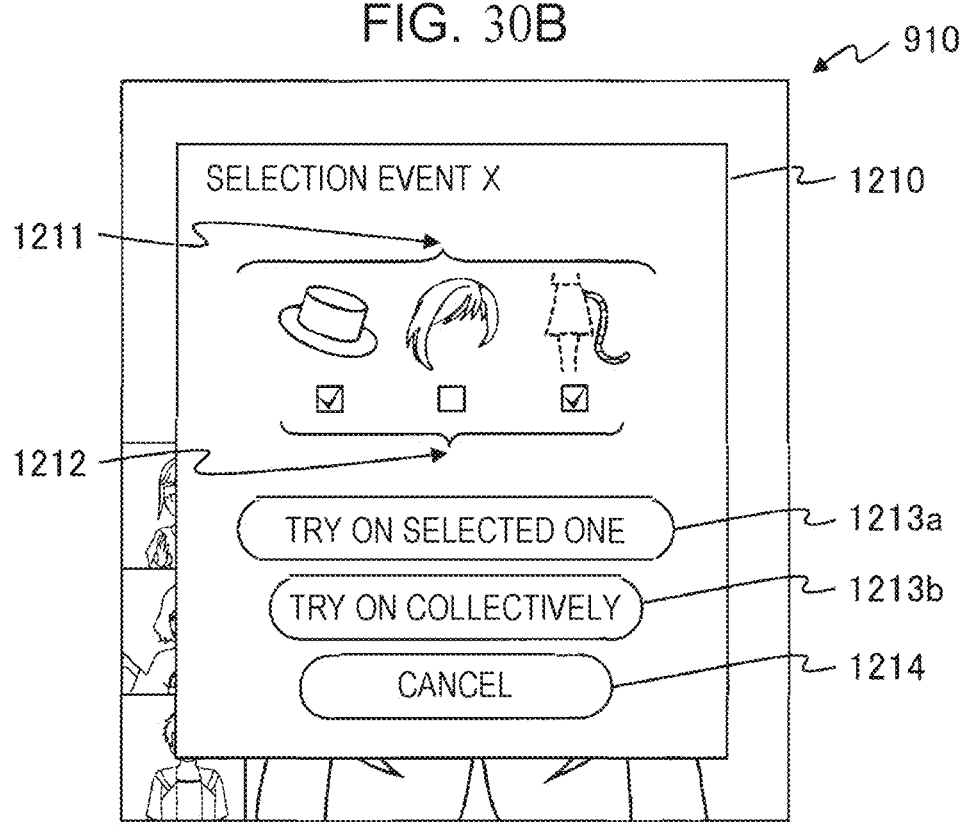

FIG. 30A illustrates an example of the selection result screen 1200 that is displayed on the display device 23 of the terminal device 2 of the user B1. FIG. 30B illustrates an example of the selection result screen 1210 that is displayed on the display device 23 of the terminal device 2 of the user B1. The selection result screen 1200 is displayed in the case where the object ID of the single specific object is received as the information that represents the result of selection in the selection event depending on the instruction for selecting from the user A. The selection result screen 1210 is displayed in the case where the object IDs of the multiple specific objects are received as the information that represents the result of selection in the selection event depending on the instruction for selecting from the user A.

The selection result screen 1200 illustrated in FIG. 30A includes information 1201 that represents the single specific object, a temporary use button 1202, and a cancel button 1203. The information 1201 that represents the single specific object is the name and/or the image information associated with the object ID of the single specific object that is received as the information that represents the result of selection in the selection event depending on the instruction for selecting from the user A. The temporary use button 1202 is an object image such as a button object for instructing for temporarily using the single specific object as the result of selection in the selection event depending on the instruction for selecting from the user A. The meaning of the temporary use of the specific object is that a specific object that is not stored as one of the owned objects of the users B1 is used until a predetermined end condition is satisfied.

Examples of the predetermined end condition include that the user A performs an operation of instructing for ending the temporary use, and the instruction for ending the temporary use depending on the operation is acquired. The predetermined end condition may be that the participation of the user A in the communication service ends depending on an instruction from the user A. For example, the participation of the user A in the communication service ends, the transmission of the output information about the user A and the reception of the output information about the users B1 to B3 consequently end, and the predetermined condition is satisfied. The predetermined end condition may be that the participation of any one of the users B1 to B3 in the communication service ends depending on an instruction from the any one of the users B1 to B3. For example, the participation of the user B1 in the communication service ends, the transmission of the output information about the user B1 and the reception of the output information about the users A, B2, and B3 consequently end, and the predetermined condition is satisfied. The predetermined end condition may be that the participation of any one of the users B1 to B3 in the communication service is forcefully ended depending on an instruction from the user A. The predetermined end condition may be that the participation of the user A in the communication service is forcefully ended depending on an instruction from the any one of the users B1 to B3.

The predetermined end condition may be that a predetermined time has passed after the single specific object is temporarily used. The predetermined end condition may be that the user A starts the selection event while the single specific object is temporarily used. The predetermined end condition may be that any one of the users B1 to B3 starts the selection event while the single specific object is temporarily used.

After the temporary use button 1202 is selected by the user B1 who operates the input device 24, the same process as the using process described above is performed. The cancel button 1203 is an object image such as a button object for ending the display of the selection result screen 1200 and displaying the communication screen 810 again.

The temporary use button 1202 may be controlled such that the temporary use button 1202 is permitted to be selected only in the case where a predetermined use condition is satisfied. Examples of the predetermined use condition include that a number of times (the number of the temporary use) the using process of the specific object is performed depending on the selection of a temporary use button 1213a as a result of the operation of the user (the user B1 in an example illustrated in FIG. 30A) of the terminal device that displays the selection result screen 1200 is equal to or less than a predetermined number. The predetermined use condition may be that a predetermined time (for example, 10 minutes) has passed after the communication service in which the user (the user B1 in the example illustrated in FIG. 30A) of the terminal device that displays the selection result screen 1200 participates starts. The predetermined use condition may be a period after the communication service in which the user (the user B1 in the example illustrated in FIG. 30A) of the terminal device that displays the selection result screen 1200 participates starts until a predetermined time (for example, 10 minutes) has passed. A predetermined trial use condition may be a period until the user A starts the selection event again.

For example, after the temporary use button 1202 is selected by the user B1 who operates the input device 24, the display processing unit 274 of the terminal device 2 of the user B1 displays the communication screen 1100 on the display device 23. The communication screen 1100 includes the user output image 812a including the character object 811a of the user A and the user output images 812b1, 812b2, and 812b3 including the character objects 811b1, 811b2, and 811b3 of the user B1, the user B2, and the user B3 as in the communication screen 810. The communication screen 1100 includes the selection event button 813 and the change button 814 as in the communication screen 810.

The temporary use button 1202 is selected by the user B1 who operates the input device 24, and consequently, the using process described above is performed based on the object ID of the single specific object that is received as the information that represents the result of selection in the selection event depending on the instruction for selecting from the user A. The using process is performed, and consequently, the user output image 812b1 including the character object 811b1 of the user B1 that is changed by using the image information that is associated with the object ID of the single specific object that is received as the information that represents the result of selection depending on the instruction for selecting from the user A is displayed.

The selection result screen 1210 illustrated in FIG. 30B includes information 1211 that represents the multiple specific objects, selection objects 1212, the temporary use button 1213a, a temporary use button 1213b, and a cancel button 1214. The information 1211 that represents the multiple specific objects is the name and/or the image information associated with the object IDs of the multiple specific objects that are received as the information that represents the result of selection in the selection event depending on the instruction for selecting from the user A.

The selection objects 1212 are operation objects for selecting the object IDs of the multiple specific objects. In an example illustrated in FIG. 30B, the display processing unit 274 of the terminal device 2 of the user displays check box objects that correspond to information that represents the specific objects as the selection objects 1212. For example, after the selection objects 1212 are selected by the user who operates the input device 24, the selection objects 1212 are displayed with "check" marks. In this case, the object IDs of the specific objects that correspond to the selection objects 1212 that are displayed with the "check" marks are selected. After one of the selection objects 1212 that are displayed with the "check" marks is selected by the user who operates the input device 24, the selection object 1212 is displayed with no "check" mark. In this case, the object ID of the specific object that corresponds to the selection object 1212 that is displayed with no "check" mark is not selected. The selection objects 1212 are associated with the respective object IDs of the specific objects.

The temporary use button 1213a and the temporary use button 1213b are object images such as button objects for instructing for temporarily using the specific objects as the result of selection in the selection event depending on the instruction for selecting from the user A. After the temporary use button 1213a is selected by the user B1 who operates the input device 24, the using process is performed based on the object IDs of the specific objects as the result information in the selection event depending on the instruction for selecting from the user A. The using process is performed depending on the selection of the temporary use button 1213a, and consequently, the character object 811b1 is changed based on the image information that is associated with the object IDs that are selected by the user B1 among the object IDs of the multiple specific objects that are received as the information that represents the result of selection by the user A. The user output image 812b1 including the change character object 811b1 is displayed on the communication screen 1100.

After the temporary use button 1213b is selected by the user A who operates the input device 24, the using process is performed based on the object IDs of all of the specific objects that are received as the information that represents the result of selection in the selection event depending on the instruction for selecting from the user A. The using process is performed depending on the selection of the temporary use button 1213b, and consequently, the character object 811b1 is changed based on the image information that is associated with the object IDs of all of the specific objects that are received as the information that represents the result of selection in the selection event depending on the instruction for selecting from the user A. The user output image 812b1 including the changed character object 811b1 is displayed on the communication screen 1100. The cancel button 1214 is an object image such as a button object for ending the display of the selection result screen 1210 and displaying the communication screen 810 (FIG. 26B) again.

After the terminal devices 2 of the users B (the users B1 to B3) receive the information that represents the result of selection in the selection event depending on the instruction for selecting from the user A, the same selection event as the selection event depending on the instruction for selecting from the user A may be provided to the users B (the users B1 to B3). Various processes related to the provision of the same selection event that are performed by the terminal device 2 of the user B1 will now be described. The various processes are performed by the terminal device 2 of the user B1 in the same manner as in the terminal device 2 of the user B2 and the terminal device 2 of the user B3.

In the case where the object IDs of the multiple specific objects are received as the information that represents the result of selection in the selection event depending on the instruction for selecting from the user A, multiple selection result screens 1200 may be sequentially displayed instead of the display of the selection result screen 1210. The selection result screen 1200 that is first displayed includes the information 1201 that represents a first specific object among the multiple specific objects, the temporary use button 1202, and the cancel button 1203. After the temporary use button 1202 is selected by the user B1 who operates the input device 24, the same process as the using process described above is performed, and the selection result screen 1200 related to a second specific object among the multiple specific objects is displayed. The cancel button 1203 is an object image such as a button object for ending the display of the selection result screen 1200 and displaying the selection result screen 1200 related to the second specific object among the multiple specific objects. In the case where the selection result screens 1200 related to all of the multiple specific objects are displayed, after the temporary use button 1202 of the selection result screen 1200 that is lastly displayed is selected, the same process as the using process is performed, and a selection result screen 1300 is displayed. In the case where the selection result screens 1200 related to all of the multiple specific objects are displayed, after the cancel button 1203 of the selection result screen 1200 that is lastly displayed is selected, the selection result screen 1300 is displayed.

Figure 31A:
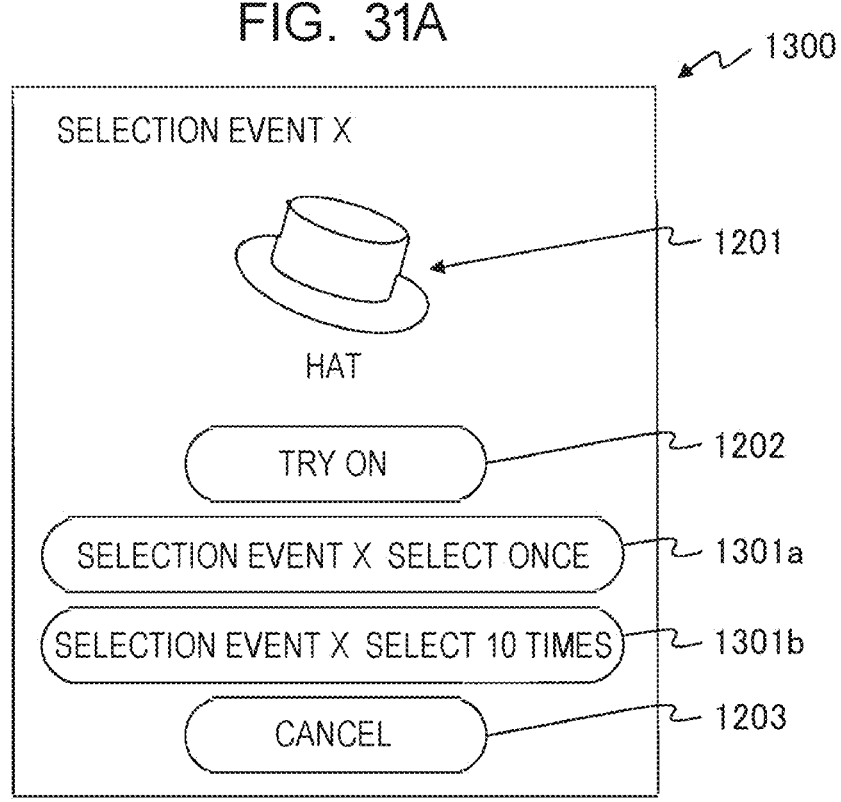
FIG. 31A and FIG. 31B illustrate examples of the screen that is displayed on the display device of the terminal device according to the Second Example of the present disclosure.
Figure 31B:
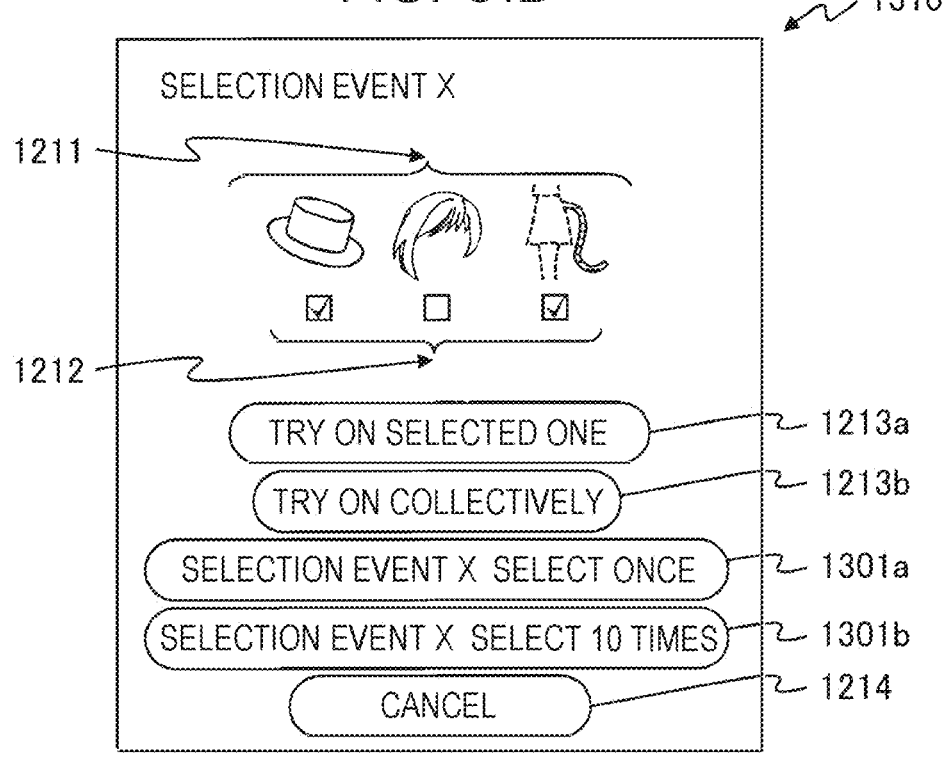

FIG. 31A illustrates an example of the selection result screen 1300 that is displayed on the display device 23 of the terminal device 2 of the user B1. FIG. 31B illustrates an example a selection result screen 1310 that is displayed on the display device 23 of the terminal device 2 of the user B1. The selection result screen 1300 is displayed in the case where the object ID of the single specific object is received as the information that represents the result of selection in the selection event depending on the instruction for selecting from the user A. The selection result screen 1310 is displayed in the case where the object IDs of the multiple specific objects are received as the information that represents the result of selection in the selection event depending on the instruction for selecting from the user A.

The selection result screen 1300 is acquired by adding two kinds of selection instruction buttons 1301a and 1301b into the selection result screen 1200 (FIG. 30A). The selection result screen 1310 is acquired by adding the two kinds of the selection instruction buttons 1301a and 1301b into the selection result screen 1210 (FIG. 30B). The two kinds of the selection instruction buttons 1301a and 1301b have the same function as the two kinds of the selection instruction buttons 912a and 912b of the selection instruction screen 911 (FIG. 27B). The terminal devices 2 or the server device 3 may implement control such that the selection instruction buttons 912a and 912b can be selected with the result that a predetermined object (for example, a "ticket object") of the user is consumed or the user pays the price.

For example, after the selection instruction button 1301a is selected by the user B1 who operates the input device 24, the terminal device 2 of the user B1 transmits the information that represents the instruction for selecting, the selection event ID (the selection event ID of the selection event depending on the instruction for selecting from the user A), the user ID of the user B1, and the destination information (the user IDs of the user A, the user B2, and the user B3) to the server device 3. The server device 3 selects the object ID of the single specific object from the object IDs of the multiple specific objects that are associated with the received selection event ID in accordance with a predetermined selection method and transmits the selected object ID of the specific object to the terminal device 2 of the user B1 and the terminal devices 2 of the users that are represented by the user IDs that are included in the destination information as the information that represents the result of selection.

After the selection instruction button 1301b is selected by the user B1 who operates the input device 24, the terminal device 2 of the user B1 transmits the information that represents the instruction for selecting, the selection event ID (the selection event ID of the selection event depending on the instruction for selecting from the user A), the user ID of the user B1, and the destination information (the user IDs of the user A, the user B2, and the user B3) to the server device 3. The server device 3 selects the object IDs of 10 specific objects from the object IDs of the multiple specific objects that are associated with the received selection event ID in accordance with a predetermined selection method and transmits the selected object IDs of the specific objects to the terminal device 2 of the user B1 and the terminal devices 2 of the users that are represented by the user IDs that are included in the destination information as the information that represents the result of selection.

After the selection event is performed depending on the instruction for selecting from the user among the multiple users who participate in the communication service, communicate with each other, and belong to the communication group, another user who belongs to the communication group can perform the same selection event as the selection event that is performed by the user. In the case where the other user wishes to perform the selection event that has been already performed, there is a problem in that the other user cannot arrive at a screen for performing the desired selection event unless multiple operations are performed, for example, unless the other user looks for the desired selection event from multiple selection events. The information system 1 according to the present embodiment enables the user to arrive at the screen for performing the desired selection event by performing a simple user operation and enables the usability to be greatly improved.

In FIGS. 31A and 13B, the selection result screens for providing the same selection event as the selection event that is performed by the other user to the user are displayed when the information that represents the result of selection in the selection event depending on the instruction for selecting from the other user is received. An event provision button for the user to perform the same selection event as the selection event that is performed by the other user may be displayed in a period in which the character object of the other user that uses the specific object that corresponds to the result of selection in the selection event depending on the instruction for selecting from the other user is displayed.

Figure 32A:
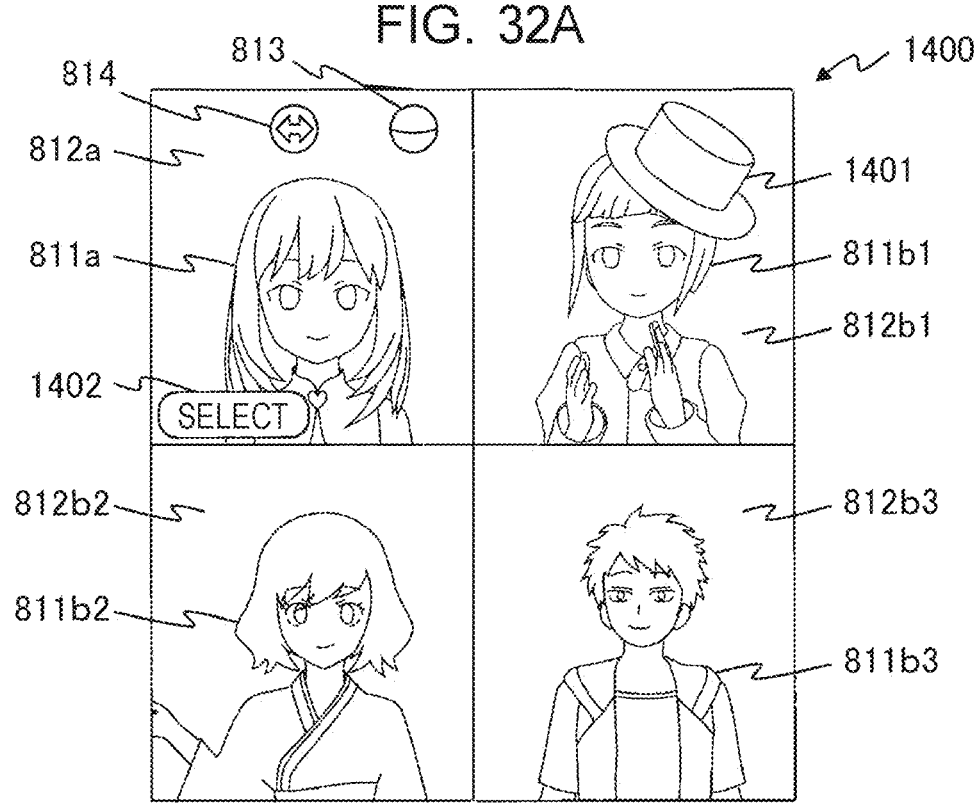
FIG. 32A and FIG. 32B illustrate examples of the screen that is displayed on the display device of the terminal device according to the Second Example of the present disclosure.

FIG. 32A illustrates an example of a communication screen 1400 that is displayed on the display device 23 of the terminal device 2 of the user A. The character object 811b1 of the user B1 in the user output image 812b1 that is included in the communication screen 1400 is changed based on the specific object that corresponds to the result of selection in the selection event depending on the instruction for selecting from the user B1. An event provision button 1402 is displayed in the display region of the user output image 812a of the user A in a period in which the user output image 812b1 including the changed character object 811b1 is displayed.

Figure 32B:
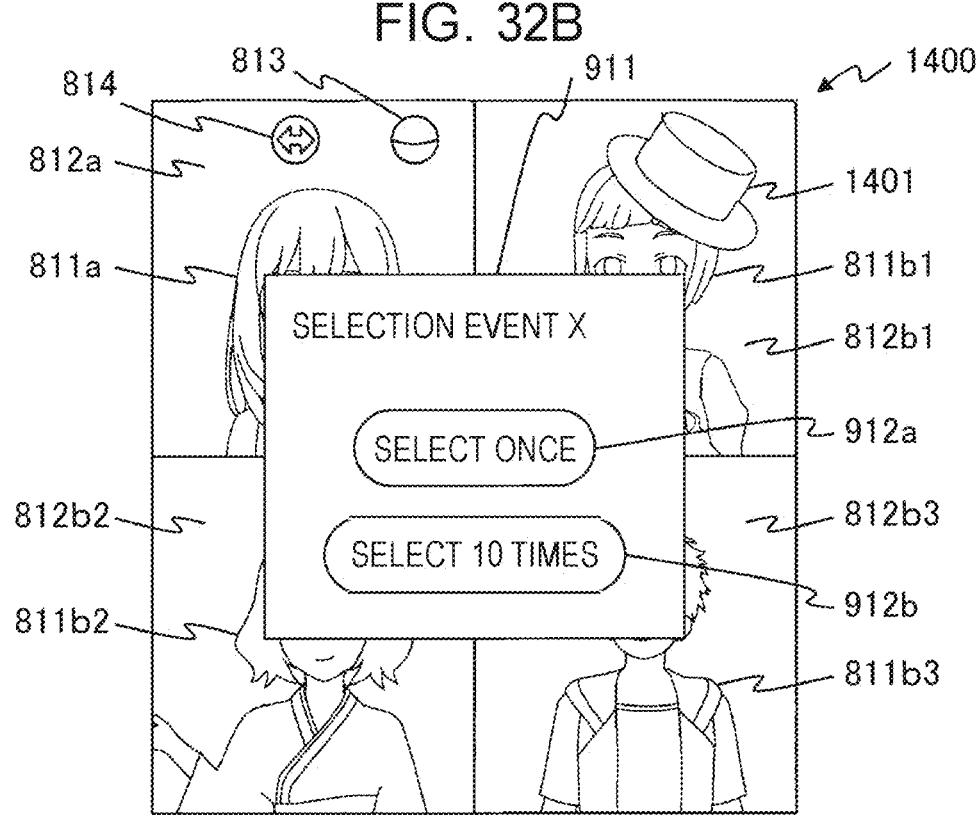

After the event provision button 1402 is selected by the user A who operates the input device 24, the selection instruction screen 911 (FIG. 32B) is displayed. The selection instruction screen 911 illustrated in FIG. 32B has the same function as the selection instruction screen 911 illustrated in FIG. 27B. In the case where the selection instruction buttons 912 (the selection instruction buttons 912a and 912b) that are included in the selection instruction screen 911 illustrated in FIG. 32B are selected, the process of selecting the same selection event as the selection event depending on the instruction for selecting from the user B1 is performed. In the case where two or more users among the users B1 to B3 have performed the selection event, the character objects 811b of the two or more users are changed based on the specific object that corresponds to the result of selection of the selection event. The user A selects any one of the user output images 812b (or a predetermined button in the user output images 812b) in which the character objects 811b are changed before and after the event provision button 1402 is selected. Consequently, the selection instruction screen 911 (FIG. 32B) related to the selection event that has been performed by the user B who corresponds to the selected user output image 812b is displayed. In this case, after the event provision button 1402 is selected by the user A, a screen for selecting any one of the two or more users who have performed the selection event may be displayed. The user A operates the screen, and consequently, the selection instruction screen 911 (FIG. 32B) related to the selection event that has been performed by the selected user B is displayed. The event provision button 1402 may not be displayed in the display region of the user output image 812a of the user A in a period in which the user output image 812b1 including the changed character object 811b1 is displayed. In this case, after the character object 811b1 or the user output image 812b1 is selected by the user A who operates the input device 24, the selection instruction screen 911 (FIG. 32B) is displayed.

In the case where the selection event is performed depending on the instruction for selecting from the single user among the multiple users who participate in the communication service, communicate with each other, and belong to the communication group, another user who belongs to the communication group can perform the same selection event as the selection event that is performed by the user in a period in which the character object or the user output image of the single user is changed based on the specific object that is selected in the selection event.

The event provision button 1402 that can be operated by the user A illustrated in FIG. 32A may be displayed in a period in which the character object of the user A temporarily uses the specific object that is received as the information that represents the result of selection in the selection event depending on the instruction for selecting from any one of the users B1 to B3.

Figure 33A:
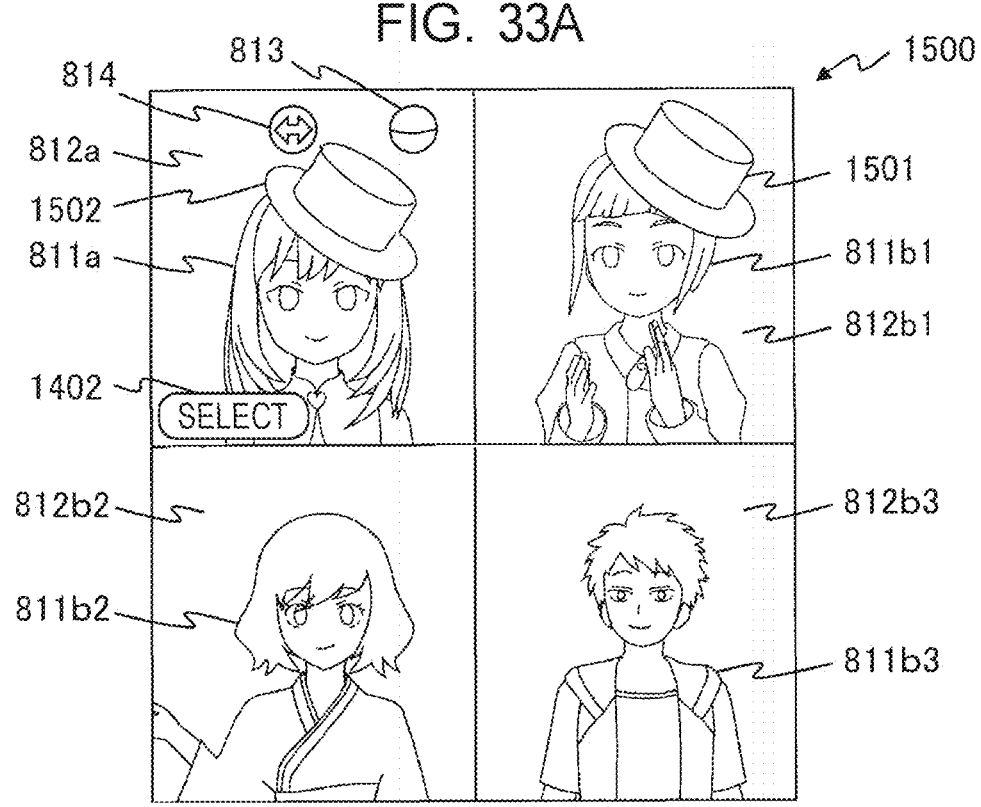
FIG. 33A and FIG. 33B illustrate examples of the screen that is displayed on the display device of the terminal device according to the Second Example of the present disclosure.

FIG. 33A illustrates an example of a communication screen 1500 that is displayed on the display device 23 of the terminal device 2 of the user A. The character object 811b1 of the user B1 in the user output image 812b1 that is included in the communication screen 1500 is changed based on the specific object that corresponds to the result of selection in the selection event depending on the instruction for selecting from the user B1. In this case, the event provision button 1402 may be displayed in the display region of the user output image 812a of the user A in a period in which the character object 811a of the user A in the user output image 812a that is included in the communication screen 1500 temporarily uses the specific object that corresponds to the result of selection in the selection event depending on the instruction for selecting from the user B1.

The event provision button 1402 that can be operated by the user A illustrated in FIG. 33A may be displayed in the case where the number of the character object that temporarily uses the specific object that is received as the information that represents the result of selection in the selection event depending on the instruction for selecting from any one of the users B1 to B3 is equal to or more than a predetermined number (for example, "2"). After the event provision button 1402 is selected by the user A who operates the input device 24, the selection instruction screen 911 is displayed. The displayed selection instruction screen 911 has the same function as the selection instruction screen 911 illustrated in FIG. 27B. In the case where the selection instruction buttons 912 (the selection instruction buttons 912a and 912b) that are included in the selection instruction screen 911 are selected, the selecting process of the same selection event as the selection event depending on the instruction for selecting from the user B1 is performed.

Figure 33B:
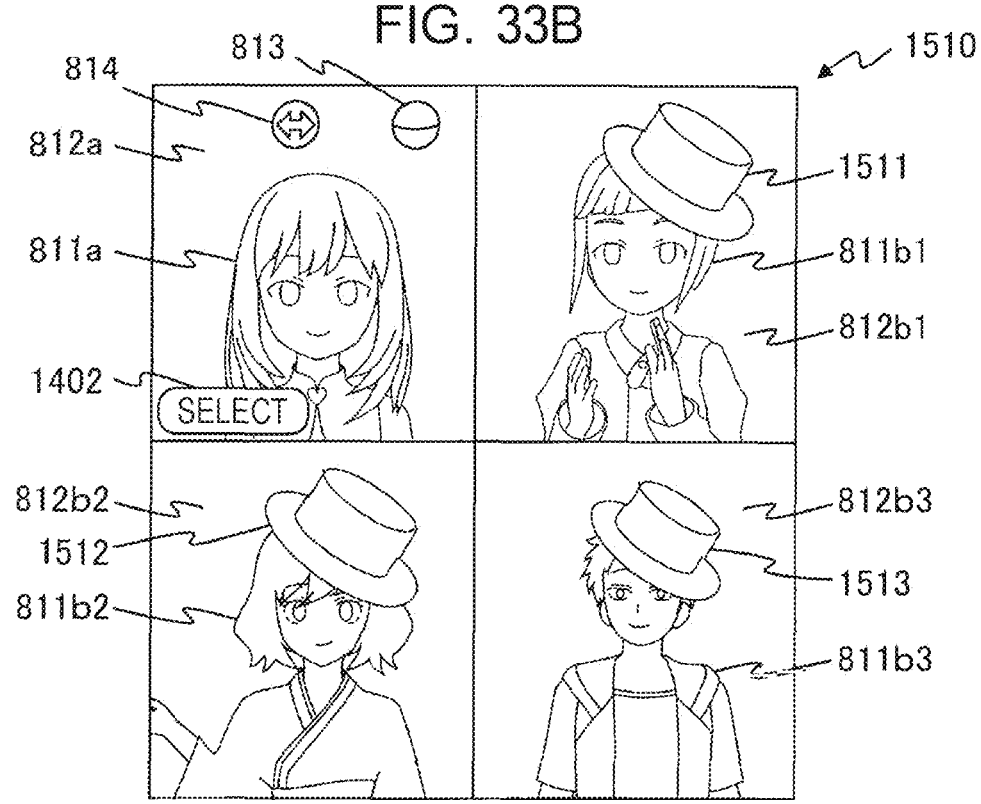

FIG. 33B illustrates an example of a communication screen 1510 that is displayed on the display device 23 of the terminal device 2 of the user A. The character object 811b1 of the user B1 in the user output image 812b1 that is included in the communication screen 1510 is changed based on the specific object that corresponds to the result of selection in the selection event depending on the instruction for selecting from the user B1. In this case, the event provision button 1402 may be displayed in the display region of the user output image 812a of the user A in the case where two (equal to the predetermined number or more) character objects of the character object 811b2 of the user B2 and the character object 811b3 of the user B3 in the user output images 812b that are included in the communication screen 1510 temporarily use the specific object that corresponds to the result of selection in the selection event depending on the instruction for selecting from the user B1. After the event provision button 1402 is selected by the user A who operates the input device 24, the selection instruction screen 911 is displayed. The displayed selection instruction screen 911 has the same function as the selection instruction screen 911 illustrated in FIG. 27B. In the case where the selection instruction buttons 912 (the selection instruction buttons 912a and 912b) that are included in the selection instruction screen 911 are selected, the selecting process of the same selection event as the selection event depending on the instruction for selecting from the user B1 is performed.

As for the existing information system, a user needs to suspend a communication service to change an output image including a character object after communication with another user starts by using the character object. It is necessary to start a function of changing the appearance of the character object and/or an image such as a background in the output image including the character object after the communication service is suspended. The user needs to perform a complex procedure for participating in the communication service again after the character object and/or the output image is changed by using the function of changing. In contrast, the information system 1 according to the present embodiment can display information related to the selection event without suspending communication by using the character object. Consequently, as for the information system 1 according to the present embodiment, the user interface for changing the character object of the user during the communication is not complex, and accordingly, the usability can be improved unlike the existing information system. The information system 1 according to the present embodiment can change the character object of the user without suspending the communication and can accordingly reduce the number of the communication between the server device 3 and the terminal device 2 and the amount of the communication. The information system 1 according to the present embodiment can thus improve the communication between the server device 3 and the terminal device 2. In some cases where the user wishes to use the object that is provided in the selection event, the user needs to perform the selection event, and the user may hesitate to perform the selection event. The information system 1 according to the present embodiment enables the user who performs a simple operation to temporarily use, for example, the object that is acquired by another user in the selection event that is performed by the other user. The user can perform the selection event after the user views the situation of the use of the object that is acquired by the other user in the selection event. The information system 1 according to the present embodiment thus improves the usability unlike the existing information system and enables trial use of the object in the selection event to be made.

Operation Sequence of Information System 1

FIG. 34 illustrates an example of the operation sequence of the information system 1. The operation sequence is performed based on the control programs that are stored in each terminal storage device 22 and the server storage device 32 in advance by mainly using each terminal processing device 27 and the server processing device 33 in corporation with each terminal device 2 and the server device 3. In the following description, the user A operates a terminal device 2*a*, the user B1 operates a terminal device 2*b*1, and the user B2 operates a terminal device 2*b*2. The terminal devices of the other users other than the user A are not limited to the terminal device 2*b*1 and 2*b*2 of the users B1 and B2, but the terminal devices 2 of three or more users may be connected to the server device 3.

The transmission unit 272 of the terminal device 2*a* first transmits the character video data including the motion data of the user A that is generated by the generation unit 271, based on the imaging data that is continuously outputted by the imaging device 25, the voice data of the user A that is outputted from the microphone 26, and the output information including the user ID of the user A to the server device 3 via the terminal communication I/F 21 (step S101). The output information may include the game image data that represents the game screen of the game that is played by the user, and the user ID of the user A. The transmission process of the transmission unit 272 may include the destination information. The process at the step S101 is continuously performed at a predetermined time interval (for example, every 2 seconds) until the livestream event ends, and accordingly, the process at the step S101 to a process at a step S110 are intermittently performed.

Subsequently, the server transmission unit 332 of the server device 3 transmits the output information that is received from the terminal device 2*a* to the terminal device 2*b*1 (step S102) and to the terminal device 2*b*2 (step S103) via the server communication I/F 31.

The transmission unit 272 of the terminal device 2*b*1 transmits the output information including the character video data of the user B1, the voice data of the user B1, and the user ID of the user B1 to the server device 3 via the terminal communication I/F 21 (step S104). Subsequently, the server transmission unit 332 of the server device 3 transmits the output information that is received from the terminal device 2*b*1 to the terminal device 2*a* (step S105) and to the terminal device 2*b*2 via the server communication I/F 31.

The transmission unit 272 of the terminal device 2*b*2 transmits the output information including the character video data of the user B2, the voice data of the user B2, and the user ID of the user B2 to the server device 3 via the terminal communication I/F 21 (step S106). Subsequently, the server transmission unit 332 of the server device 3 transmits the output information that is received from the terminal device 2*b*2 to the terminal device 2*a* (step S107) and to the terminal device 2*b*1 via the server communication I/F 31.

The display processing unit 274 of the terminal device 2*a* outputs the communication screen including the user output image including the character object of the user A, the user output image including the character object of the user B1, and the user output image including the character object of the user B2 to the display device 23 of the terminal device 2*a* for displaying, based on the output information about the user A, the user B1, and the user B2 and outputs the voices of the user B1 and the user B2 (step S108).

The display processing unit 274 of the terminal device 2*b*1 outputs the communication screen including the user output image including the character object of the user A, the user output image including the character object of the user B1, and the user output image including the character object of the user B2 to the display device 23 of the terminal device 2*b*1 for displaying, based on the output information about the user A, the user B1, and the user B2 and outputs the voices of the user A and the user B2 (step S109) as in the step S108.

The display processing unit 274 of the terminal device 2*b*2 outputs the communication screen including the user output image including the character object of the user A, the user output image including the character object of the user B1, and the user output image including the character object of the user B2 to the display device 23 of the terminal device 2*b*2 for displaying, based on the output information about the user A, the user B1, and the user B2 and outputs the voices of the user A and user B1 (step S110) as in the step S108.

Subsequently, the transmission unit 272 of the terminal device 2*a* transmits the information that represents the instruction for selecting and that is inputted from the user A who operates the input device 24 to the server device 3 via the terminal communication I/F 21 (step S111).

Subsequently, the selection unit 333 of the server device 3 performs the selecting process, based on the information that represents the instruction for selecting that is received from the terminal device 2*a* (step S112) and inputs the information that represents the result of the selecting process (the information that represents the result of selection) into the server transmission unit 332.

Subsequently, the server transmission unit 332 of the server device 3 transmits the information that represents the result of selection and that is acquired from the selection unit 333 to the terminal device 2*a* (step S113), to the terminal device 2*b*1 (step S114), and to the terminal device 2*b*2 (step S115) via the server communication I/F 31.

The display processing unit 274 of the terminal device 2*a* outputs the selection result screens 1200 and 1210 to the display device 23 of the terminal device 2*b*1 for displaying, based on the information that represents the result of selection and that is transmitted from the server device 3 (step S116). The display processing unit 274 of the terminal device 2*b*1 outputs the selection result screens 1300 and 1310 to the display device 23 of the terminal device 2*b*1 for displaying, based on the information that represents the result of selection and that is transmitted from the server device 3 (step S117). The display processing unit 274 of the terminal device 2*b*2 outputs the selection result screens 1300 and 1310 to the display device 23 of the terminal device 2*b*1 for displaying, based on the information that represents the result of selection and that is transmitted from the server device 3 (step S118).

As for the information system 1 according to the present embodiment, the user output image including the character object of the user A that is at least partly changed based on the specific object that is selected from the multiple specific objects depending on the instruction from the user A is displayed as described in detail above. As for the information system 1 according to the present embodiment, the output from the terminal device 2 is thus diverse depending on the instruction from the user A during the communication service, and accordingly, the willingness of the user to continuously use the communication can be improved.

First Modification of Second Example

The present disclosure is not limited to the present embodiment. For example, a benefit may be provided to the user or another user depending on the situation of selection of the user regarding the selection instruction buttons 1301a and 1301b that are included in the selection result screens 1300 and 1310.

For example, in the case where any one of the users B1 to B3 selects the selection instruction buttons 1301a and 1301b that are included in the selection result screens 1300 and 1310 related to the information that represents the result of selection in the selection event depending on the instruction for selecting from the user A, a benefit W is provided to the user A. For example, information that represents the benefit W that is associated with the user ID of the user A is stored in the terminal storage device 22 of the terminal device 2 of the user A and/or the server storage device 32 of the server device 3, and consequently, the benefit W is provided to the user A. An example of the benefit W is a predetermined object (such as a "ticket object") that is consumed to select the selection instruction buttons 912a and 912b. An example of the benefit W may be a point that can be exchanged with the predetermined object that is consumed to select the selection instruction buttons 912a and 912b. In the case where any one of the users B1 to B3 selects the selection instruction buttons 1301a and 1301b that are included in the selection result screens 1300 and 1310 related to the information that represents the result of selection in the selection event depending on the instruction for selecting from the user A, the benefit W may be provided to the user A if a predetermined time condition is satisfied. Examples of the predetermined time condition include that a time until any one of the users B1 to B3 selects the selection instruction buttons 1301a and 1301b after the instruction for selecting is inputted from the user A is within a predetermined provision condition period. The predetermined time condition may be that a time until any one of the users B1 to B3 selects the selection instruction buttons 1301a and 1301b after the selection result screens 1300 and 1310 related to the information that represents the result of selection in the selection event depending on the instruction for selecting from the user A are displayed is within the predetermined provision condition period.

In the case where any one of the users B1 to B3 selects the selection instruction buttons 1301a and 1301b that are included in the selection result screens 1300 and 1310 related to the information that represents the result of selection in the selection event depending on the instruction for selecting from the user A, a benefit X may be provided to the user who selects the selection instruction buttons 1301a and 1301b. In the case where any one of the users B1 to B3 selects the selection instruction buttons 1301a and 1301b that are included in the selection result screens 1300 and 1310 related to the information that represents the result of selection in the selection event depending on the instruction for selecting from the user A, a benefit Y may be provided to a user who does not select the selection instruction buttons 1301a and 1301b. In the case where, within a predetermined time, none of the users B1 to B3 selects the selection instruction buttons 1301a and 1301b that are included in the selection result screens 1300 and 1310 related to the information that represents the result of selection in the selection event depending on the instruction for selecting from the user A, the benefit Y may be provided to the users B1 to B3. In the case where any one of the users B1 to B3 selects the selection instruction buttons 1301a and 1301b that are included in the selection result screens 1300 and 1310 related to the information that represents the result of selection in the selection event depending on the instruction for selecting from the user A, a benefit Z may be provided to all of the user A and the users B1 to B3. In the case where any one of the users B1 to B3 selects the selection instruction buttons 1301a and 1301b that are included in the selection result screens 1300 and 1310 related to the information that represents the result of selection in the selection event depending on the instruction for selecting from the user A, a benefit may be provided to all or some of users to which no benefit is provided among the user A and the users B1 to B3.

The benefit W has a value higher than those of the benefits X and Y. The benefit X may have a value higher than that of the benefit Y. In the case where a benefit is an additional object that is selected in the selection event, a valuable benefit means an additional object that is unlikely to be selected in the selection event. In the case where a benefit is a ticket object, the valuable benefit means a ticket object that increases a number of times the selection instruction button 912 can be selected.

In the case where the user B1 selects the selection instruction buttons 1301a and 1301b that are included in the selection result screens 1300 and 1310 related to the information that represents the result of selection in the selection event depending on the instruction for selecting from the user A, and the user B2 subsequently selects the selection instruction buttons 1301a and 1301b, the benefit X that is provided to the user B1 may have a value higher than that of the benefit X that is provided to the user B2. The benefit X that has an increased value is provided to a user who selects the selection instruction buttons 1301a and 1301b earlier than the others.

In the case where the user B1 selects the selection instruction buttons 1301a and 1301b that are included in the selection result screens 1300 and 1310 related to the information that represents the result of selection in the selection event depending on the instruction for selecting from the user A, and the user B2 subsequently selects the selection instruction buttons 1301a and 1301b, the benefit X that is provided to the user B1 may have a value lower than that of the benefit X that is provided to the user B2. A user who is attracted by the selection instruction buttons 1301a and 1301b that are selected by another user and selects the selection instruction buttons 1301a and 1301b receives the benefit X that has a value higher than that for the other user who selects the selection instruction buttons 1301a and 1301b earlier.

Second Modification of Second Example

In the case where all of the user A and the users B1 to B3 who belong to the same communication group and participate in the communication service perform the selecting process of the same kind of the selection event during the communication service, a single specific object among multiple specific objects related to the same kind of the selection event may be provided to the user A and the users B1 to B3. In the case where the user A and the users B1 to B3 perform the selecting process of the selection event in a predetermined order during the communication service, a single specific object among multiple specific objects related to a predetermined selection event may be provided to the user A and the users B1 to B3.

Third Modification of Second Example

In the case where any one of the user A and the users B1 to B3 who belong to the same communication group and participate in the communication service consumes a predetermined object during the communication service and performs the selecting process of the selection event by selecting the selection instruction buttons 912a and 912b, another user among the user A and the users B1 to B3 may be able to perform the selecting process of the selection event by selecting the selection instruction buttons 912a and 912b without consuming the predetermined object until the communication service ends.

Fourth Modification of Second Example

In the case where any one of the user A and the users B1 to B3 who belong to the same communication group and participate in the communication service consumes a predetermined object during the communication service and performs the selecting process of the selection event by selecting the selection instruction buttons 912a and 912b, another user among the user A and the users B1 to B3 may be able to perform the selecting process of the selection event by selecting the selection instruction buttons 912a and 912b without consuming the predetermined object until the communication service ends.

Fifth Modification of Second Example

Figure 35A:
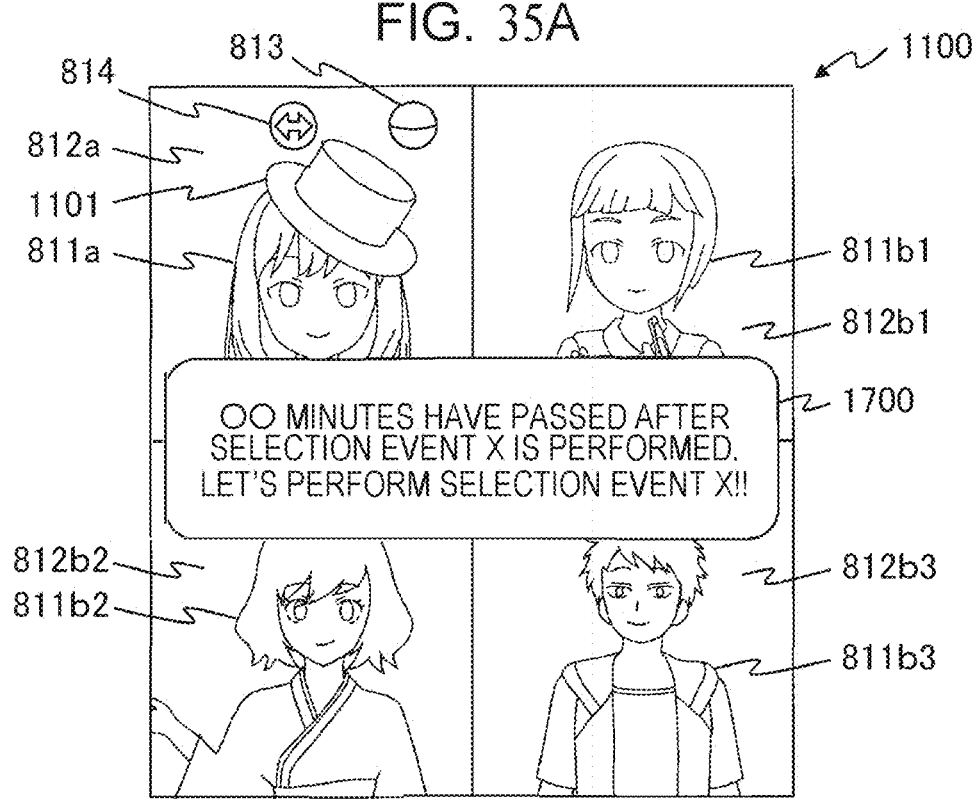
FIG. 35A and FIG. 35B illustrate examples of the screen that is displayed on the display device of the terminal device according to the Second Example of the present disclosure.

For example, in the case where a predetermined time has passed after the selection event depending on the instruction for selecting from the user A is performed, the display processing unit 274 of the terminal device 2 of the user A may display information 1700 for prompting the selection of the selection instruction buttons 912a and 912b (FIG. 35A). In the case where a predetermined time has passed after the character object of the user A uses the specific object that is received as the information that represents the result of selection in the selection event depending on the instruction for selecting from the user A, the display processing unit 274 of the terminal device 2 of the user A may display the information 1700 for prompting the selection of the selection instruction buttons 912a and 912b. In the case where a time during which the number of the character object that temporarily uses the specific object that is received as the information that represents the result of selection in the selection event depending on the instruction for selecting from the user A is less than a predetermined number (for example, "1") exceeds a predetermined time, the display processing unit 274 of the terminal device 2 of the user A may display the information 1700 for prompting the selection of the selection instruction buttons 912a and 912b. The terminal device 2 of the user A may display the information 1700 for prompting the selection of the selection instruction buttons 912a and 912b in the case where the character object of one of the users B1 to B3 on which the user A performs a predetermined operation uses the specific object. For example, in the case where the size of the user output image of another user can be changed on the communication screen by the operation of the user, the user on which the user A performs the predetermined operation is the user of the user output image, the size of which is greatly changed by the operation of the user A. In this case, in the selection event that is prompted by using the information 1700, the specific object that is used by the user on which the user A performs the predetermined operation can be selected. The communication screen 1100 includes the selection event button 813, and accordingly, the user A can arrive at the screen for starting the selection event by selecting the selection event button 813 when the willingness to perform the selection event that is prompted by using the information 1700 is improved. In this case, after the selection event button 813 is selected, the selection instruction screen 911 related to the selection event that is prompted by using the information 1700 may be displayed. The information 1700 may be displayed so as to be selectable by the user. In the case where the information 1700 is selected by the user A, the selection instruction screen 911 related to the selection event that is prompted by using the information 1700 may be displayed.

Figure 35B:
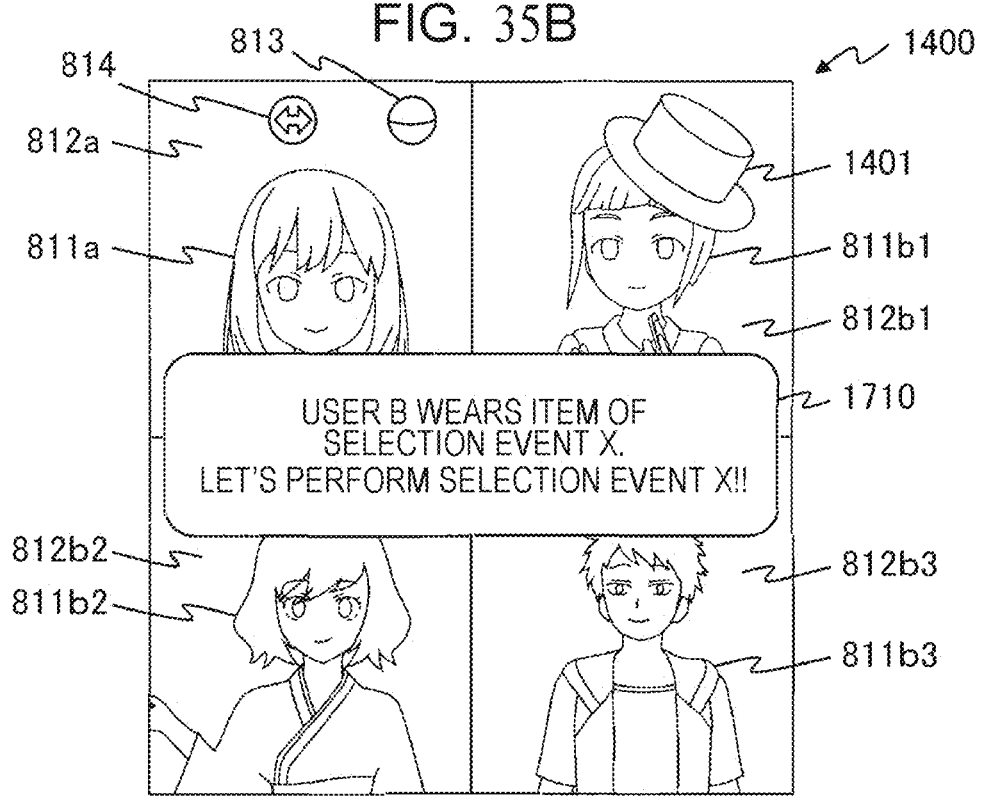

The terminal device 2 of the user A may display information 1710 for prompting the selection of the selection instruction buttons 912a and 912b when the character object uses the specific object that is received as the information that represents the result of selection in the selection event depending on the instruction for selecting from any one of the users B1 to B3 (FIG. 35B). The terminal device 2 of the user A may display the information 1710 for prompting the selection instruction buttons 912a and 912b in the case where the number of the users B who participate in the communication service in which the user A participates is less than a predetermined number. The terminal device 2 of the user A may display the information 1710 for prompting the selection of the selection instruction buttons 912a and 912b in the case where the number of the users B who participate in the communication service in which the user A participates is equal to or more than a predetermined number. The terminal device 2 of the user A may display the information 1710 for prompting the selection of the selection instruction buttons 912a and 912b when a predetermined time has passed after the number of the users B who participate in the communication service in which the user A participates becomes a fixed number. The communication screen 1400 includes the selection event button 813, and accordingly, the user A can arrive at the screen for starting the selection event by selecting the selection event button 813 when the willingness to perform the selection event that is prompted by using the information 1710 is improved. In this case, after the selection event button 813 is selected, the selection instruction screen 911 related to the selection event that is prompted by using the information 1710 (the selection event that is performed depending on the instruction for selecting from any one of the users B1 to B3) may be displayed. The information 1710 may be displayed so as to be selectable by the user. In the case where the information 1710 is selected by the user A, the selection instruction screen 911 related to the selection event that is prompted by using the information 1710 may be displayed.

Sixth Modification of Second Example

For example, whenever the character object temporarily uses the specific object that is received as the information that represents the result of selection in the selection event depending on the instruction for selecting from the user A, the display processing unit 274 of the terminal device 2 of the user A may display the name of the user of the character object that is temporarily used at this time and information that represents the temporary use.

Seventh Modification of Second Example

In the case where the character object is generated based on the three-dimensional model data for generating the three-dimensional animation, the user output image of each user may be an image acquired when the character object that is the three-dimensional object that is placed in the virtual space that is defined for every user is viewed from a predetermined viewpoint in the virtual space. For example, as for the display processing unit 274, a two-dimensional screen is placed in the direction of the line of sight from the predetermined viewpoint, the three-dimensional coordinates of various three-dimensional objects that are placed in the virtual space are projected on the two-dimensional screen, and the image of a surface of the two-dimensional screen on which the various objects are projected is displayed as the user output image. For example, the direction of the line of sight from the predetermined viewpoint for displaying the user output image of the user A that is displayed on the terminal device 2 of the user A is a direction toward the character object of the user A. The two-dimensional screen for displaying the user output image of the user A that is displayed on the terminal device 2 of the user A is controlled so as to move and rotate depending on the movement of the predetermined viewpoint and the rotation of the direction of the line of sight.

Eighth Modification of Second Example

In the case where the character object is generated based on the three-dimensional model data for generating the three-dimensional animation, the user output image of each user may be an image acquired when the interior of the virtual space is viewed from a user viewpoint that is located at a predetermined position (for example, the position of the eyes of the character object) on the character object that is the three-dimensional object that is placed in the virtual space common to each user. The user viewpoint may move from the predetermined position on the character object depending on the operation of the user and/or automatically and may be positioned behind, above, or in front of the character object.

Figure 36:
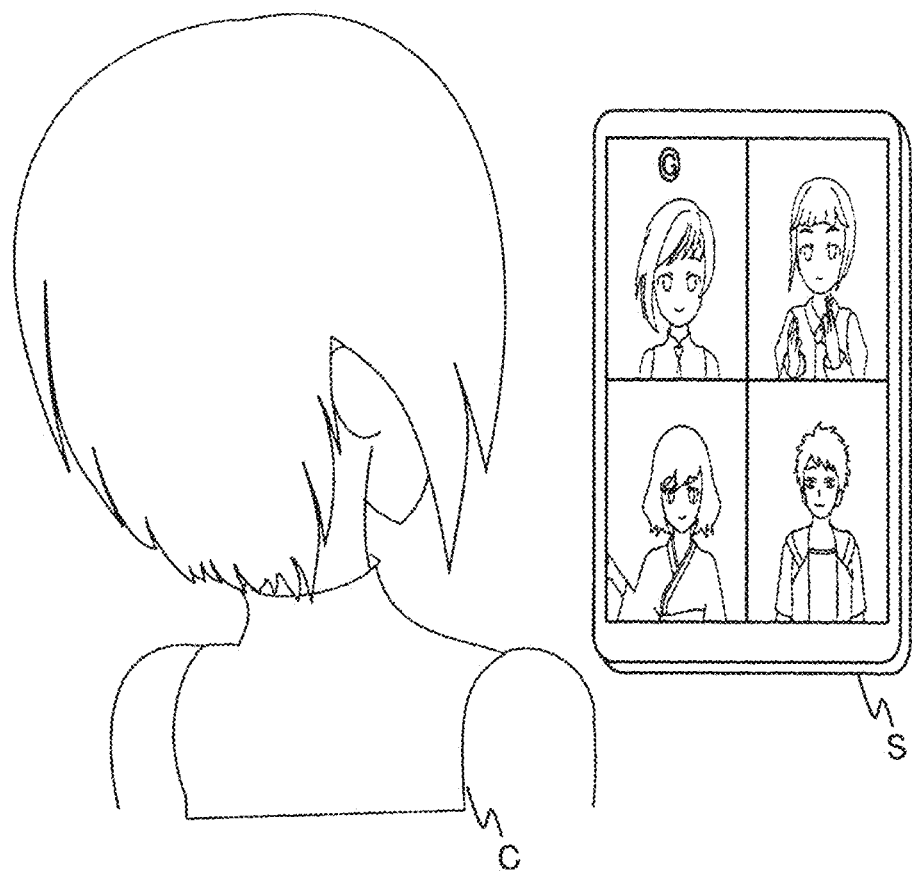
FIG. 36 is a schematic diagram for describing a virtual space according to the Second Example of the present disclosure.

An example of a method of using the communication service in the virtual space common to each user will be described. For example, as illustrated in FIG. 36, the display processing unit 274 creates a device object S such as a virtual tablet PC within the range of the field of view from the user viewpoint of a character object C of the user A in the virtual space. The various screens described with reference to FIG. 24A to FIG. 33B, FIG. 35A, and FIG. 35B are displayed on a display device for the device object S. In this case, the user output image of the user A that is displayed on the display device for the device object S is a two-dimensional image acquired when the interior of the virtual space is viewed from a virtual camera that is disposed at a predetermined position on the device object S. The voice data of the user A is acquired by the microphone 26 of the terminal device 2.

The transmission unit 272 of the terminal device 2 transmits the user output image of the user A, the voice data of the user A, and the user ID of the user A to the terminal devices 2 of all of the users B via the server device 3. The transmission unit 272 may transmit the direction of the line of sight and the position of the virtual camera in the virtual space, the direction of the body and the position of the character object of the user A in the virtual space, and the motion data of the user A instead of the user output image of the user A. The terminal device 2 of the user A receives the user output image of each user B, the voice data of the user B, and the user ID of the user B from the terminal device 2 of the user B via the server device 3. The display processing unit 274 of the terminal device 2 of the user A displays the user output image of the user B on the display device for the device object S and outputs the voice data of the user B from the terminal device 2. Consequently, the communication service that uses the virtual device object S can be provided.

Ninth Modification of Second Example

At least a part of the function that is fulfilled by the terminal processing device 27 of each terminal device 2 may be fulfilled by using a processor other than the terminal processing device 27 of the terminal device 2. For example, at least a part of the function that is fulfilled by the terminal processing device 27 may be fulfilled by using the server processing device 33 of the server device 3. Specifically, parts of the functions of the generation unit 271 and the display processing unit 274 may be performed by the server device 3. For example, the terminal device 2 transmits the imaging data and the voice data that are continuously acquired to the server device 3 together with the user ID of the user who operates the terminal device 2. The server device 3 generates the character video data by using the functions of the generation unit 271 and the display processing unit 274 and generates display information for displaying the communication screen including the user output images of all of the users on the display device 23. The server device 3 transmits the display information to the terminal devices 2 of all of the users together with the voice information (the voice data). The terminal devices 2 output the information that is received from the server device 3 (so-called "server rendering").

Tenth Modification of Second Example

Each terminal device 2 has a function of displaying, for example, the communication screen by executing various instructions that are included in the control program that is stored in the terminal device 2. The terminal device 2 may call a browser function that is incorporated into web application to perform the communication service, may receive a webpage (a document that is written by using a markup language such as the hypertext markup language (HTML)) by using the browser function from the server device, and may perform a control program that is incorporated into the webpage (so-called "browser rendering"). For example, the use of HTML5 as the markup language enables the terminal device 2 to readily perform a new information process. The use of the web application by the terminal device for providing the communication service enables the new information process to be provided to a client side (the terminal device) merely by incorporating a new program into the webpage that is transmitted by the server device and enables a time required for creating the new program to be greatly reduced. The client side can receive a newly provided service merely by receiving the webpage without downloading a new control program, can reduce the load of the communication network, communication costs, and/or a communication time unlike downloading of the control program, and can simplify the user interface.

Eleventh Modification of Second Example

The generation unit 271 of the terminal device 2 of the user A may generate the output information including the face motion data without using the imaging data. For example, the terminal storage device 22 of each terminal device 2 may store the face motion data that corresponds to the voice data, and the generation unit 271 may extract the face motion data that corresponds to the acquired voice data of the user A from the terminal storage device 22 and may generate the output information including the extracted face motion data, the voice data, and the user ID of the user A. The generation unit 271 of the terminal device 2 of the user A may generate the output information including the voice data of the user A that is outputted from the microphone 26 and the user ID that is stored in the terminal storage device 22 without the face motion data. In this case, the display processing unit 274 of the terminal device 2 of each user B may extract the face motion data that corresponds to the voice data of the user A that is included in the output information about the user A that is received via the server device 3 and may generate the animation of the character object of the user A. A process of generating the face motion data that corresponds to the voice data of the user may use a known lip sync algorithm.

The terminal device 2 of the user A that uses a HMD as the display device 23 can have the communication with the users B by using the character object without acquiring the imaging data of the user A.

What is claimed is:

1. A control method, comprising:
displaying, at a terminal device of a first user, a first image and a second image, the first image including a first object representing the first user, and the second image including a second object representing a second user different from the first user,
transmitting, via a network, information about display of the first image to a terminal device of the second user;
transmitting, via the network, first audio data of the first user for acquisition by the terminal device of the second user in a case that the terminal of the first user obtains the first audio data;
displaying the first image including the first object as being changed in accordance with the first audio data or a motion of the first user;
outputting second audio data of the second user, received via the network, in a case that the terminal device of the first user obtains the second audio data;
displaying the second image including the second object as being changed in accordance with the second audio data or a motion of the second user;
receiving a first instruction from the first user or a second instruction from the second user,
in response to receiving the first instruction, displaying the first image including:
the first object as being at least partly changed in accordance with the first instruction; and
a third object that corresponds to a candidate object which is selected from a selection group, including one or more candidate objects, in accordance with the second instruction, wherein in a case that a predetermined condition is satisfied, the selection group includes a specific candidate object:
in response to receiving the second, displaying the second image including:
the second object as being at least partly changed in accordance with the second instruction; and
the third object that corresponds to the candidate object in accordance with the first instruction; and
transmitting information about display of the third object to the terminal device of the second user.

2. The control method according to claim 1, wherein the displaying the first image including the first object as being at least partly changed includes selecting another candidate object from one or more other candidate objects that are associated with the first user in accordance with the first instruction from the first user.

3. The control method according to claim 2, wherein
the first object is a three-dimensional object that is placed in a virtual space, and
the control method further comprises:
displaying, as the first image, an image that represents the virtual space viewed from a viewpoint in the virtual space; and
displaying the first image as being at least partly changed according to a representation of movement of the viewpoint in the virtual space.

4. The control method according to claim 3, wherein the movement of the viewpoint is controlled such that the viewpoint approaches a changed part of the first object.

5. The control method according to claim 3, wherein the movement of the viewpoint is controlled such that the viewpoint moves around the first object.

6. The control method according to claim 1, wherein the predetermined condition includes a condition related to a display time of at least one of the first image and a display time of the second image.

7. The control method according to claim 1,
wherein the predetermined condition includes a condition related to a number of times the second candidate object is selected by the first user and/or the second user.

8. The control method according to claim 1, further comprising:
displaying a plurality of second images, each of which represents a corresponding one of a plurality of the second users; and
displaying the plurality of the second images and the first image including the third object that corresponds to the selected candidate object, based on the candidate object that is selected in accordance with the second instruction from the second user.

9. The control method according to claim 1, further comprising:
receiving an instruction, input from the first user, for selecting the third object; and
displaying the first image including the first object that is partly changed according to the instruction for selecting the third object.

10. The control method according to claim 1, wherein the displaying the first image as being at least partly changed includes displaying an image that represents a progression of a game that is played by the first user and/or the second user instead of at least a part of the first image.

11. The control method according to claim 1, further comprising displaying an image that represents a progression of a game that is played by at least one of the first user and the second user instead of at least a part of the second image in a case that the candidate object that is selected according to the second instruction from the second user corresponds to the game.

12. A terminal device of a first user, the terminal device comprising:
processing circuitry configured to:
display a first image and a second image, the first image including a first object representing the first user, and the second image including a second object representing a second user different from the first user;
transmit, via a network, information about display of the first image to a terminal device of the second user;
transmit, via the network, first audio data of the first user for acquisition by the terminal device of the second user in a case that the terminal of the first user obtains the first audio data;
display the first image including the first object as being changed in accordance with the first audio data or a motion of the first user;
output second audio data of the second user, received via the network, in a case that the terminal device of the first user obtains the second audio data;
display the second image including the second object as being changed in accordance with the second audio data or a motion of the second user;
receive a first instruction from the first user or a second instruction from the second user;
in response to receiving the first instruction, display the first image including;
the first object as being at least partly changed in accordance with the first instruction; and
a third object that corresponds to a candidate object which is selected from a selection group, including one or more candidate objects, in accordance with the second instruction, wherein
in a case that a predetermined condition is satisfied, the selection group includes a specific candidate object;
in response to receiving the second, display the second image including;
the second object as being at least partly changed in accordance with the second instruction; and
the third object that corresponds to the candidate object in accordance with the first instruction; and
transmit information about display of the third object to the terminal device of the second user.

13. The terminal device according to claim 12, wherein the processing circuitry is configured to display the first object as being at least partly changed by selecting a-first another candidate object from one or more other candidate objects that are associated with the first user in accordance with the first instruction from the first user.

14. The terminal device according to claim 13, wherein the first object is a three-dimensional object that is placed in a virtual space, and
the processing circuitry is further configured to
display, as the first image, an image that represents the virtual space viewed from a viewpoint in the virtual space; and
display the first image as being at least partly changed according to a representation of movement of the viewpoint in the virtual space.

15. The terminal device according to claim 14, wherein the movement of the viewpoint is controlled such that the viewpoint approaches a changed part of the first object.

16. A control method, comprising:
displaying, at a terminal device of a first user, a first image and a second image, the first image including a first object representing the first user, and the second image including a second object representing a second user different from the first user,
transmitting, via a network, information about display of the first image to a terminal device of the second user,
transmitting, via the network, first audio data of the first user for acquisition by the terminal device of the second user in a case that the terminal of the first user obtains the first audio data;
displaying the first image including the first object as being changed in accordance with the first audio data or a motion of the first user;
outputting second audio data of the second user, received via the network, in a case that the terminal device of the first user obtains the second audio data;
displaying the second image including the second object as being changed in accordance with the second audio data or a motion of the second user;
displaying the first image including the first object as being at least partly changed in accordance with an instruction from the first user or displaying the second image including the second object as being at least partly changed in accordance with an instruction from the second user;
displaying the first image as including a third object that corresponds to a candidate object that is selected from a selection group including one or more candidate objects depending on the instruction from the second user, wherein
the selection group includes a specific candidate object in a case that a predetermined condition related to a display time of at least one of the first image and a display time of the second image is satisfied.

17. The control method according to claim 16, wherein the displaying the first image including the first object as being at least partly changed includes selecting another candidate object from one or more other candidate objects that are associated with the first user in accordance with the first instruction from the first user.

18. The control method according to claim 17, wherein the first object is a three-dimensional object that is placed in a virtual space, and
the control method further comprises:
displaying, as the first image, an image that represents the virtual space viewed from a viewpoint in the virtual space; and
displaying the first image as being at least partly changed according to a representation of movement of the viewpoint in the virtual space.

19. The control method according to claim 18, wherein the movement of the viewpoint is controlled such that the viewpoint approaches a changed part of the first object.

20. The control method according to claim 18, wherein the movement of the viewpoint is controlled such that the viewpoint moves around the first object.

* * * * *